US011945217B2

(12) United States Patent
Yamaguchi et al.

(10) Patent No.: US 11,945,217 B2
(45) Date of Patent: Apr. 2, 2024

(54) TAPE CASSETTE

(71) Applicant: BROTHER KOGYO KABUSHIKI KAISHA, Aichi (JP)

(72) Inventors: Koshiro Yamaguchi, Kakamigahara (JP); Tsutomu Kato, Nagoya (JP); Masato Kato, Kasugai (JP); Yasuhiro Iriyama, Mie-gun (JP); Yasuhiro Shibata, Okazaki (JP); Teruo Imamaki, Nissin (JP); Akira Sago, Seto (JP); Tsuyoshi Nagae, Kasugai (JP); Takashi Horiuchi, Kariya (JP); Tomohiko Sugino, Nagoya (JP); Kengo Noda, Inazawa (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/570,849

(22) Filed: Jan. 7, 2022

(65) Prior Publication Data

US 2022/0203727 A1 Jun. 30, 2022

Related U.S. Application Data

(63) Continuation of application No. 16/923,690, filed on Jul. 8, 2020, now Pat. No. 11,254,149, which is a (Continued)

(30) Foreign Application Priority Data

Mar. 31, 2009 (JP) ................................. 2009086172
Mar. 31, 2009 (JP) ................................. 2009086184

(Continued)

(51) Int. Cl.

*B41J 15/04* (2006.01)
*B41J 3/407* (2006.01)

(Continued)

(52) U.S. Cl.

CPC ........... *B41J 15/044* (2013.01); *B41J 3/4075* (2013.01); *B41J 11/009* (2013.01); *B41J 32/00* (2013.01)

(58) Field of Classification Search

CPC ...... B41J 15/044; B41J 11/009; B41J 3/4075; B41J 32/00

See application file for complete search history.

(56) References Cited

U.S. PATENT DOCUMENTS 3,901,372 A 8/1975 Denley
4,127,883 A 11/1978 Mestdagh (Continued)

FOREIGN PATENT DOCUMENTS

CH 121073 D 6/1927
CH 136498 D 11/1929

(Continued)

OTHER PUBLICATIONS

Notice of Reasons for Refusal dated Aug. 30, 2022 received in Japanese Patent Application No. JP 2021-156029.

(Continued)

*Primary Examiner* — Kristal Feggins
(74) *Attorney, Agent, or Firm* — Kenealy Vaidya LLP

(57) ABSTRACT

A tape cassette that includes a box-shaped cassette case whose outline being defined by a bottom wall, a top wall, and a side wall and including a plurality of corner portions, at least one tape contained within a tape containment area defined within the outline, a pair of cavities extending from the bottom wall and being provided between the tape containment area and the outline at opposite ends of a diagonal line connecting one of the corner portions to another of the corner portions, and a side face indicator portion provided in the side wall, indicating a type of the tape, and including a plurality of indicator portions disposed (Continued)

in a pattern in accordance with the type of the tape, each of the indicator portions being one of a switch hole and a surface portion.

25 Claims, 54 Drawing Sheets

Related U.S. Application Data continuation of application No. 16/796,463, filed on Feb. 20, 2020, now Pat. No. 10,744,802, which is a continuation of application No. 16/160,343, filed on Oct. 15, 2018, now Pat. No. 10,618,325, which is a continuation of application No. 15/389,497, filed on Dec. 23, 2016, now Pat. No. 10,201,993, which is a continuation of application No. 13/240,322, filed on Sep. 22, 2011, now Pat. No. 9,566,808, which is a continuation-in-part of application No. PCT/JP2010/055324, filed on Mar. 26, 2010.

(30) Foreign Application Priority Data

| | | |
|---|---|---|
| Mar. 31, 2009 | (JP) | 2009086201 |
| Mar. 31, 2009 | (JP) | 2009086222 |
| Mar. 31, 2009 | (JP) | 2009088227 |
| Mar. 31, 2009 | (JP) | 2009088238 |
| Mar. 31, 2009 | (JP) | 2009088241 |
| Mar. 31, 2009 | (JP) | 2009088440 |
| Mar. 31, 2009 | (JP) | 2009088441 |
| Mar. 31, 2009 | (JP) | 2009088456 |
| Mar. 31, 2009 | (JP) | 2009088460 |
| Mar. 31, 2009 | (JP) | 2009088468 |
| Jun. 30, 2009 | (JP) | 2009154695 |
| Jun. 30, 2009 | (JP) | 2009156350 |
| Jun. 30, 2009 | (JP) | 2009156355 |
| Jun. 30, 2009 | (JP) | 2009156357 |
| Jun. 30, 2009 | (JP) | 2009156369 |
| Jun. 30, 2009 | (JP) | 2009156398 |
| Jun. 30, 2009 | (JP) | 2009156399 |
| Jun. 30, 2009 | (JP) | 2009156403 |
| Jun. 30, 2009 | (JP) | 2009156404 |
| Sep. 9, 2009 | (JP) | 2009208321 |
| Nov. 27, 2009 | (JP) | 2009269693 |
| Nov. 27, 2009 | (JP) | 2009270056 |
| Nov. 27, 2009 | (JP) | 2009270067 |
| Nov. 27, 2009 | (JP) | 2009270163 |
| Nov. 27, 2009 | (JP) | 2009270325 |

(51) Int. Cl.
*B41J 11/00* (2006.01)
*B41J 32/00* (2006.01)

(56) References Cited

U.S. PATENT DOCUMENTS

| | | | |
|---|---|---|---|
| 4,226,547 | A | 10/1980 | Bradshaw et al. |
| 4,360,278 | A | 11/1982 | Paque |
| D267,330 | S | 12/1982 | Worrell |
| 4,391,539 | A | 7/1983 | Connoy |
| 4,402,619 | A | 9/1983 | Paque et al. |
| 4,557,617 | A | 12/1985 | Richardson et al. |
| 4,567,488 | A | 1/1986 | Moriguchi et al. |
| 4,678,353 | A | 7/1987 | Richardson et al. |
| 4,725,155 | A | 2/1988 | Kittel et al. |
| 4,773,775 | A | 9/1988 | Bradshaw et al. |
| 4,815,875 | A | 2/1989 | Richardson et al. |
| 4,815,871 | A | 3/1989 | McGourty et al. |
| 4,815,874 | A | 3/1989 | Richardson et al. |
| 4,832,514 | A | 5/1989 | Basile |
| 4,844,636 | A | 7/1989 | Paque |
| 4,880,325 | A | 11/1989 | Ueda et al. |
| 4,892,425 | A | 1/1990 | Shimizu et al. |
| D307,296 | S | 4/1990 | Ivarson et al. |
| 4,915,516 | A | 4/1990 | Shimizu et al. |
| 4,917,514 | A | 4/1990 | Richardson et al. |
| D307,918 | S | 5/1990 | Goda |
| 4,927,278 | A | 5/1990 | Kuzuya et al. |
| 4,930,913 | A | 6/1990 | Basile |
| D311,416 | S | 10/1990 | Richardson et al. |
| 4,966,476 | A | 10/1990 | Kuzuya et al. |
| 4,983,058 | A | 1/1991 | Nagae |
| 5,022,771 | A | 6/1991 | Paque |
| D319,070 | S | 8/1991 | Lavander |
| D320,391 | S | 10/1991 | Paque |
| 5,056,940 | A | 10/1991 | Basile |
| 5,078,523 | A | 1/1992 | McGourty et al. |
| 5,098,208 | A | 3/1992 | Martinez |
| 5,104,247 | A | 4/1992 | Ohshima |
| 5,111,216 | A | 5/1992 | Richardson et al. |
| 5,188,469 | A | 2/1993 | Nagao et al. |
| 5,193,919 | A | 3/1993 | Godo et al. |
| 5,195,835 | A | 3/1993 | Collins |
| 5,203,951 | A | 4/1993 | Hatiori et al. |
| 5,223,939 | A | 6/1993 | Imaizumi et al. |
| 5,239,437 | A | 8/1993 | Hoge et al. |
| D342,275 | S | 12/1993 | Cooper |
| 5,273,272 | A | 12/1993 | Nakamura et al. |
| RE34,521 | E | 1/1994 | Shimizu et al. |
| 5,277,503 | A | 1/1994 | Nagao |
| 5,318,370 | A | 6/1994 | Nehowig |
| 5,348,406 | A | 9/1994 | Yoshiaki et al. |
| 5,350,243 | A | 9/1994 | Ichinomiya et al. |
| D352,305 | S | 11/1994 | Cooper |
| 5,374,132 | A | 12/1994 | Kimura |
| D356,333 | S | 3/1995 | Pearce et al. |
| 5,399,033 | A | 3/1995 | Putman |
| D357,497 | S | 4/1995 | Gray et al. |
| 5,411,339 | A | 5/1995 | Bahrabadi et al. |
| 5,419,648 | A | 5/1995 | Nagao et al. |
| D359,303 | S | 6/1995 | Gray et al. |
| 5,424,757 | A | 6/1995 | Thom |
| 5,429,443 | A | 7/1995 | Kobayashi et al. |
| 5,431,504 | A | 7/1995 | Beadman et al. |
| 5,435,657 | A | 7/1995 | Pearce et al. |
| 5,454,650 | A | 10/1995 | Yamaguchi |
| 5,466,076 | A | 11/1995 | Kobayashi et al. |
| 5,492,282 | A | 2/1996 | Okuchi et al. |
| 5,492,420 | A | 2/1996 | Nunokawa et al. |
| 5,494,362 | A | 2/1996 | Kobayashi et al. |
| 5,506,736 | A | 4/1996 | Ota |
| 5,511,891 | A | 4/1996 | Nehowig et al. |
| 5,518,328 | A | 5/1996 | Okuchi et al. |
| D372,044 | S | 7/1996 | Ware et al. |
| 5,533,818 | A | 7/1996 | Bahrabadi |
| 5,536,092 | A | 7/1996 | Yamaguchi |
| 5,538,352 | A | 7/1996 | Sugiura |
| 5,540,510 | A | 7/1996 | Sims et al. |
| 5,541,796 | A | 7/1996 | Sawada |
| 5,553,952 | A | 9/1996 | Umbach |
| 5,564,843 | A | 10/1996 | Kawaguchi |
| 5,593,237 | A | 1/1997 | Nozaki et al. |
| 5,595,447 | A | 1/1997 | Takayama et al. |
| 5,599,119 | A | 2/1997 | Nunokawa et al. |
| 5,605,404 | A | 2/1997 | Nunokawa et al. |
| 5,620,268 | A | 4/1997 | Yamaguchi et al. |
| 5,634,728 | A | 6/1997 | Nunokawa et al. |
| 5,653,542 | A | 8/1997 | Sugimoto et al. |
| 5,658,083 | A | 8/1997 | Day et al. |
| 5,659,441 | A | 8/1997 | Eckberg et al. |
| 5,709,486 | A | 1/1998 | Day |
| 5,727,888 | A | 3/1998 | Sugimoto et al. |
| 5,730,536 | A | 3/1998 | Yamaguchi |
| 5,739,839 | A | 4/1998 | Iwai et al. |
| 5,752,777 | A | 5/1998 | Nunokawa et al. |
| 5,755,519 | A | 5/1998 | Klinefelter |
| 5,765,954 | A | 6/1998 | Nunokawa et al. |

(56) References Cited

U.S. PATENT DOCUMENTS

| | | | |
|---|---|---|---|
| 5,771,803 | A | 6/1998 | Takami |
| 5,795,086 | A | 8/1998 | Watanabe et al. |
| 5,813,773 | A | 9/1998 | Kawai |
| 5,813,779 | A | 9/1998 | Palmer et al. |
| 5,823,689 | A | 10/1998 | Nehowig et al. |
| 5,825,724 | A | 10/1998 | Matsumoto et al. |
| 5,826,995 | A | 10/1998 | Day et al. |
| 5,857,788 | A | 1/1999 | Gutsell et al. |
| 5,860,752 | A | 1/1999 | Watanabe et al. |
| 5,887,993 | A | 3/1999 | Nunokawa et al. |
| 5,961,225 | A | 10/1999 | Nunokawa et al. |
| 5,964,539 | A | 10/1999 | Yamaguchi et al. |
| 5,967,678 | A | 10/1999 | Nunokawa et al. |
| 5,997,194 | A | 12/1999 | Nunokawa et al. |
| 6,012,860 | A | 1/2000 | Nunokawa et al. |
| 6,016,749 | A | 1/2000 | Tukahara et al. |
| 6,042,280 | A | 3/2000 | Yamaguchi et al. |
| 6,048,118 | A | 4/2000 | Martinez et al. |
| 6,050,672 | A | 4/2000 | Matsuhashi |
| 6,050,734 | A | 4/2000 | Watanabe et al. |
| 6,059,469 | A | 5/2000 | Hirumi |
| 6,106,171 | A | 8/2000 | Nunokawa et al. |
| 6,116,796 | A | 9/2000 | Yamaguchi et al. |
| 6,132,120 | A | 10/2000 | Yamaguchi et al. |
| 6,146,034 | A | 11/2000 | Watanabe et al. |
| 6,149,325 | A | 11/2000 | Nunokawa et al. |
| 6,160,679 | A | 12/2000 | Maekawa et al. |
| 6,168,328 | B1 | 1/2001 | Ueda et al. |
| 6,190,065 | B1 | 2/2001 | Brzuskiewicz |
| 6,190,067 | B1 | 2/2001 | Kobayashi et al. |
| 6,190,069 | B1 | 2/2001 | Yamaguchi et al. |
| 6,196,740 | B1 | 3/2001 | Yamaguchi et al. |
| 6,227,477 | B1 | 5/2001 | Komatsuzaki et al. |
| 6,232,993 | B1 | 5/2001 | Kobayashi et al. |
| 6,247,860 | B1 | 6/2001 | Yanagisawa |
| 6,270,269 | B1 | 8/2001 | Watanabe et al. |
| 6,317,156 | B1 | 11/2001 | Nagasaki et al. |
| 6,334,724 | B2 | 1/2002 | Yamaguchi et al. |
| 6,366,425 | B1 | 4/2002 | Kletzl et al. |
| 6,406,202 | B1 | 6/2002 | Unno et al. |
| 6,435,744 | B1 | 8/2002 | Dunn et al. |
| 6,476,838 | B1 | 11/2002 | Italiano |
| 6,485,206 | B1 | 11/2002 | Takahashi |
| 6,520,696 | B2 | 2/2003 | Huss et al. |
| 6,644,876 | B2 | 11/2003 | Carriere et al. |
| D486,853 | S | 2/2004 | Wilken et al. |
| 6,707,571 | B1 | 3/2004 | Kurashina |
| 6,709,179 | B2 | 3/2004 | Yamaguchi et al. |
| 6,910,819 | B2 | 6/2005 | Ero et al. |
| 6,929,415 | B2 | 8/2005 | Wilken |
| 6,955,318 | B2 | 10/2005 | Nonomuro |
| D519,522 | S | 4/2006 | Lee |
| 7,070,347 | B2 | 7/2006 | Carriere et al. |
| 7,070,348 | B2 | 7/2006 | Sugimoto et al. |
| 7,097,372 | B1 | 8/2006 | Heyse et al. |
| 7,121,751 | B2 | 10/2006 | Harada et al. |
| 7,128,483 | B2 | 10/2006 | Harada et al. |
| D534,203 | S | 12/2006 | Harada et al. |
| 7,201,522 | B2 | 4/2007 | Bandholz et al. |
| D542,334 | S | 5/2007 | Harada et al. |
| 7,232,268 | B2 | 6/2007 | Sugimoto et al. |
| 7,251,044 | B1 | 7/2007 | Kurashina |
| 7,287,715 | B2 | 10/2007 | Ban |
| 7,296,941 | B2 | 11/2007 | Suzuki et al. |
| 7,357,585 | B2 | 4/2008 | Kurashina |
| 7,404,684 | B2 | 7/2008 | Sugimoto et al. |
| D579,942 | S | 11/2008 | Terry et al. |
| 7,503,714 | B2 | 3/2009 | Yamamoto et al. |
| 7,841,790 | B2 | 11/2010 | Yamaguchi et al. |
| 7,942,594 | B2 | 5/2011 | Kumazaki et al. |
| 7,965,308 | B2 | 6/2011 | Jauert et al. |
| 8,045,288 | B2 | 10/2011 | Ota et al. |
| 8,109,684 | B2 | 2/2012 | Yamaguchi |
| 8,162,553 | B2 | 4/2012 | Vandermeulen |
| 8,164,609 | B2 | 4/2012 | Liu et al. |
| 8,382,389 | B2 | 2/2013 | Yamaguchi et al. |
| D681,727 | S | 5/2013 | Van Den Broecke |
| 8,529,142 | B2 | 9/2013 | Tanaka |
| 8,540,444 | B2 | 9/2013 | Vandermeulen et al. |
| 8,550,393 | B2 | 10/2013 | Tada |
| 8,562,228 | B2 | 10/2013 | Yamaguchi et al. |
| 8,641,304 | B2 | 2/2014 | Yamaguchi et al. |
| 8,734,035 | B2 | 5/2014 | Suva et al. |
| 8,740,482 | B2 | 6/2014 | Yamaguchi et al. |
| 8,757,907 | B2 | 6/2014 | Yamaguchi et al. |
| 8,764,326 | B2 | 7/2014 | Yamaguchi et al. |
| 8,770,877 | B2 | 7/2014 | Yamaguchi et al. |
| 9,498,998 | B2 | 11/2016 | Yamaguchi et al. |
| 9,533,522 | B2 | 1/2017 | Yamaguchi et al. |
| 9,566,808 | B2 | 2/2017 | Yamaguchi et al. |
| 9,656,495 | B2 | 5/2017 | Noda |
| 9,802,432 | B2 | 10/2017 | Yamaguchi et al. |
| 9,855,768 | B2 | 1/2018 | Tanizaki |
| 9,855,779 | B2 | 1/2018 | Yamaguchi et al. |
| 10,226,949 | B2 | 3/2019 | Yamaguchi et al. |
| 10,265,982 | B2 | 4/2019 | Noda |
| 10,315,442 | B2 | 6/2019 | Sato |
| 10,391,732 | B2 | 8/2019 | Tanaka |
| 10,414,176 | B2 | 9/2019 | Kawai |
| 10,625,527 | B2 | 4/2020 | Sato |
| 10,675,894 | B2 | 6/2020 | Yamaguchi et al. |
| 11,052,685 | B2 | 7/2021 | Yamaguchi et al. |
| 2002/0006303 | A1 | 1/2002 | Yamaguchi et al. |
| 2002/0012558 | A1 | 1/2002 | Huss et al. |
| 2002/0047063 | A1 | 4/2002 | Kaneda et al. |
| 2002/0085080 | A1 | 7/2002 | Kurashina |
| 2002/0135938 | A1 | 9/2002 | Hiraguchi et al. |
| 2003/0081978 | A1 | 5/2003 | Carriere et al. |
| 2004/0056143 | A1 | 3/2004 | Nonomura |
| 2004/0062586 | A1 | 4/2004 | Harada et al. |
| 2004/0233269 | A1 | 11/2004 | Tsubota |
| 2004/0265027 | A1 | 12/2004 | Hine et al. |
| 2005/0036816 | A1 | 2/2005 | Carriere et al. |
| 2005/0117881 | A1 | 6/2005 | Baba et al. |
| 2005/0152732 | A1 | 7/2005 | Bandholz et al. |
| 2005/0172981 | A1 | 8/2005 | Byun |
| 2006/0008608 | A1 | 1/2006 | Kurashina |
| 2006/0088802 | A1 | 4/2006 | Akaiwa |
| 2006/0121229 | A1 | 6/2006 | Nagae |
| 2006/0182921 | A1 | 8/2006 | Tioki et al. |
| 2006/0193669 | A1 | 8/2006 | Takada et al. |
| 2006/0204304 | A1 | 9/2006 | Hioki et al. |
| 2006/0216099 | A1 | 9/2006 | Sakano et al. |
| 2006/0216100 | A1 | 9/2006 | Minoya et al. |
| 2006/0233582 | A1 | 10/2006 | Toriuchi |
| 2006/0238600 | A1 | 10/2006 | Vandermeulen et al. |
| 2006/0239743 | A1 | 10/2006 | Naito |
| 2007/0009302 | A1 | 1/2007 | Vandermeulen |
| 2007/0009306 | A1 | 1/2007 | Harada et al. |
| 2007/0031171 | A1 | 2/2007 | Heyse et al. |
| 2007/0041772 | A1 | 2/2007 | Harada et al. |
| 2007/0070168 | A1 | 3/2007 | Mindler et al. |
| 2007/0098473 | A1 | 5/2007 | Heyse et al. |
| 2007/0172293 | A1 | 7/2007 | Vandermeulen |
| 2007/0212149 | A1 | 9/2007 | Ota et al. |
| 2007/0212151 | A1 | 9/2007 | Innocenti et al. |
| 2007/0231041 | A1 | 10/2007 | Ueda et al. |
| 2007/0237562 | A1 | 10/2007 | Kato et al. |
| 2007/0264070 | A1 | 11/2007 | Loo et al. |
| 2007/0283249 | A1 | 12/2007 | Nose et al. |
| 2008/0003043 | A1 | 1/2008 | Fukui et al. |
| 2008/0029530 | A1 | 2/2008 | Yuyama et al. |
| 2008/0050160 | A1 | 2/2008 | Yamaguchi et al. |
| 2008/0056793 | A1 | 3/2008 | Yokoyama |
| 2008/0080922 | A1 | 4/2008 | Vandermeulen |
| 2008/0165009 | A1 | 7/2008 | Hirota |
| 2008/0181703 | A1 | 7/2008 | Ito et al. |
| 2008/0181708 | A1 | 7/2008 | Yamaguchi et al. |
| 2008/0205958 | A1 | 8/2008 | Moriyama et al. |
| 2008/0226373 | A1 | 9/2008 | Yamaguchi et al. |
| 2008/0232886 | A1 | 9/2008 | Kato et al. |
| 2008/0310904 | A1 | 12/2008 | Yamaguchi et al. |
| 2009/0016795 | A1 | 1/2009 | Caveney et al. |
| 2009/0085451 | A1 | 4/2009 | Yuyama et al. |

(56) References Cited

U.S. PATENT DOCUMENTS

| | | | |
|---|---|---|---|
| 2009/0190988 | A1 | 7/2009 | Vereecken et al. |
| 2009/0202283 | A1 | 8/2009 | Kumazaki et al. |
| 2009/0231607 | A1 | 9/2009 | Kurashina |
| 2009/0285617 | A1 | 11/2009 | Vandermeulen |
| 2010/0119280 | A1 | 5/2010 | Vandermeulen |
| 2010/0119281 | A1 | 5/2010 | Ford et al. |
| 2010/0166475 | A1 | 7/2010 | Yamaguchi et al. |
| 2010/0166478 | A1 | 7/2010 | Yamaguchi et al. |
| 2010/0166479 | A1 | 7/2010 | Yamaguchi et al. |
| 2010/0232862 | A1 | 9/2010 | Vandermeulen |
| 2010/0247208 | A1 | 9/2010 | Yamaguchi et al. |
| 2010/0247209 | A1 | 9/2010 | Yamaguchi et al. |
| 2010/0247210 | A1 | 9/2010 | Yamaguchi et al. |
| 2010/0250233 | A1 | 9/2010 | Tanaka |
| 2010/0272492 | A1 | 10/2010 | Van Britsom et al. |
| 2011/0058884 | A1 | 3/2011 | Kato et al. |
| 2012/0008999 | A1 | 1/2012 | Yamaguchi et al. |
| 2012/0009001 | A1 | 1/2012 | Sago et al. |
| 2012/0027485 | A1 | 2/2012 | Suva et al. |
| 2012/0027486 | A1 | 2/2012 | Suva et al. |
| 2012/0027487 | A1 | 2/2012 | Suva et al. |
| 2012/0057917 | A1 | 3/2012 | Van Britsom et al. |
| 2012/0080550 | A1 | 4/2012 | Yamaguchi et al. |
| 2012/0170959 | A1 | 7/2012 | Vandermeulen et al. |
| 2012/0175454 | A1 | 7/2012 | Noda |
| 2012/0188325 | A1 | 7/2012 | Yamaguchi et al. |
| 2012/0189366 | A1 | 7/2012 | Yamaguchi et al. |
| 2012/0201588 | A1 | 8/2012 | Yamaguchi et al. |
| 2014/0205350 | A1 | 7/2014 | Yamaguchi et al. |
| 2014/0218458 | A1 | 8/2014 | Suva et al. |
| 2015/0283837 | A1 | 10/2015 | Sakano |
| 2017/0100948 | A1 | 4/2017 | Yamaguchi et al. |
| 2018/0257400 | A1 | 9/2018 | Yamaguchi |

FOREIGN PATENT DOCUMENTS

| | | | |
|---|---|---|---|
| CN | 1063641 | A | 8/1992 |
| CN | 1119146 | A | 3/1996 |
| CN | 146954 | A | 4/1997 |
| CN | 1148547 | A | 4/1997 |
| CN | 1148548 | A | 4/1997 |
| CN | 1166155 | A | 11/1997 |
| CN | 1209776 | A | 3/1999 |
| CN | 1469811 | A | 1/2001 |
| CN | 1289293 | A | 3/2001 |
| CN | 1085151 | C | 5/2002 |
| CN | 1376115 | A | 10/2002 |
| CN | 1397431 | A | 2/2003 |
| CN | 1415482 | A | 5/2003 |
| CN | 1415484 | A | 5/2003 |
| CN | 1493462 | A | 5/2004 |
| CN | 1636755 | A | 7/2005 |
| CN | 1642746 | A | 7/2005 |
| CN | 1663807 | A | 9/2005 |
| CN | 1744994 | A | 3/2006 |
| CN | 1762720 | A | 4/2006 |
| CN | 1785685 | A | 6/2006 |
| CN | 1799850 | A | 7/2006 |
| CN | 1799851 | A | 7/2006 |
| CN | 1820940 | A | 8/2006 |
| CN | 1827386 | A | 9/2006 |
| CN | 1829607 | A | 9/2006 |
| CN | 1835867 | A | 9/2006 |
| CN | 1865012 | A | 11/2006 |
| CN | 1914045 | A | 2/2007 |
| CN | 1990261 | A | 7/2007 |
| CN | 1331684 | C | 8/2007 |
| CN | 101028771 | A | 9/2007 |
| CN | 101035683 | A | 9/2007 |
| CN | 101039807 | A | 9/2007 |
| CN | 101060985 | A | 10/2007 |
| CN | 101077664 | A | 11/2007 |
| CN | 101128324 | A | 2/2008 |
| CN | 201030694 | Y | 3/2008 |
| CN | 101229724 | A | 7/2008 |
| CN | 101264701 | A | 9/2008 |
| CN | 101264702 | A | 9/2008 |
| CN | 101310989 | A | 11/2008 |
| CN | 101327696 | A | 12/2008 |
| CN | 101356061 | A | 1/2009 |
| CN | 101516628 | A | 8/2009 |
| CN | 101758676 | A | 6/2010 |
| CN | 102616025 | A | 8/2012 |
| EP | 214466 | A2 | 3/1987 |
| EP | 0329369 | A2 | 8/1989 |
| EP | 0511602 | A1 | 11/1992 |
| EP | 0629509 | A2 | 12/1994 |
| EP | 0635375 | A2 | 1/1995 |
| EP | 0644506 | A2 | 3/1995 |
| EP | 0629509 | A3 | 7/1995 |
| EP | 0644506 | A3 | 11/1995 |
| EP | 0684143 | A2 | 11/1995 |
| EP | 734878 | A2 | 10/1996 |
| EP | 0 760 291 | A2 | 3/1997 |
| EP | 0555954 | B1 | 3/1997 |
| EP | 734878 | A3 | 5/1997 |
| EP | 0863021 | B1 | 9/1998 |
| EP | 0644506 | B | 4/1999 |
| EP | 0684143 | A3 | 1/2000 |
| EP | 1199179 | A | 4/2002 |
| EP | 1284196 | A2 | 2/2003 |
| EP | 1502758 | A1 | 2/2005 |
| EP | 1516739 | A | 3/2005 |
| EP | 1552949 | A1 | 7/2005 |
| EP | 1700705 | A | 9/2006 |
| EP | 1707395 | A1 | 10/2006 |
| EP | 2236303 | A1 | 10/2010 |
| EP | 2236304 | A1 | 10/2010 |
| EP | 2448762 | B1 | 9/2013 |
| JP | S56-20944 | U | 2/1981 |
| JP | S58-139415 | U | 9/1983 |
| JP | S58-220783 | A | 12/1983 |
| JP | S59-78879 | A | 5/1984 |
| JP | S60-99692 | A | 7/1985 |
| JP | S61-179776 | A | 8/1986 |
| JP | S62-173944 | U | 11/1987 |
| JP | S63-81063 | U | 5/1988 |
| JP | S63-166557 | A | 7/1988 |
| JP | S63-203348 | A | 8/1988 |
| JP | S63-254085 | A | 10/1988 |
| JP | H01-195088 | A | 8/1989 |
| JP | H01-146945 | U | 10/1989 |
| JP | H02-56664 | U | 4/1990 |
| JP | H02-56665 | U | 4/1990 |
| JP | H02-56666 | U | 4/1990 |
| JP | H02-147272 | A | 6/1990 |
| JP | H03-093584 | A | 4/1991 |
| JP | H03-151261 | A | 6/1991 |
| JP | H03-63155 | B2 | 9/1991 |
| JP | H03-118672 | U | 12/1991 |
| JP | H03-120680 | A | 12/1991 |
| JP | H04-016113 | U | 2/1992 |
| JP | H04-037575 | A | 2/1992 |
| JP | H04-133756 | A | 5/1992 |
| JP | H04-168086 | A | 6/1992 |
| JP | H05-016342 | U | 3/1993 |
| JP | H05-18853 | U | 3/1993 |
| JP | H05-063067 | A | 3/1993 |
| JP | H05-104840 | A | 4/1993 |
| JP | H05-155067 | A | 6/1993 |
| JP | 5-51662 | U | 7/1993 |
| JP | H05-054225 | U | 7/1993 |
| JP | H05-078565 | U | 10/1993 |
| JP | H05-080765 | U | 11/1993 |
| JP | H05-294051 | A | 11/1993 |
| JP | H05-301435 | A | 11/1993 |
| JP | H06-012053 | U | 2/1994 |
| JP | H06-021953 | U | 3/1994 |
| JP | H07-068814 | A | 3/1994 |
| JP | H06-122239 | A | 5/1994 |
| JP | H06-122249 | A | 5/1994 |
| JP | H06-124406 | A | 5/1994 |
| JP | H06-127094 | A | 5/1994 |
| JP | H06-152907 | A | 5/1994 |

(56) References Cited

FOREIGN PATENT DOCUMENTS

JP H06143761 A 5/1994
JP H06-53560 U 7/1994
JP H06-183117 A 7/1994
JP H06-191081 A 7/1994
JP H06-210889 A 8/1994
JP H06-74348 U 10/1994
JP H06-328800 A 11/1994
JP H07-1782 A 1/1995
JP H07-001805 A 1/1995
JP H07-009743 A 1/1995
JP H07-25122 A 1/1995
JP H07-25123 A 1/1995
JP H07-47737 A 2/1995
JP H07-020725 B2 3/1995
JP H07-61009 A 3/1995
JP H07-68877 A 3/1995
JP H07-69497 A 3/1995
JP H07-89115 A 4/1995
JP H07-089196 A 4/1995
JP H07-101133 A 4/1995
JP H07-108702 A 4/1995
JP H07-108730 A 4/1995
JP H07-137327 A 5/1995
JP H07-164680 A 6/1995
JP H07-040456 U 7/1995
JP H07-214876 A 8/1995
JP H07-237314 A 9/1995
JP H07-251539 A 10/1995
JP H07-276695 A 10/1995
JP H07-290803 A 11/1995
JP H07-314862 A 12/1995
JP H07-314864 A 12/1995
JP H07-314865 A 12/1995
JP H07-314866 A 12/1995
JP H08-25768 A 1/1996
JP H08-039909 A 2/1996
JP H08-58211 A 3/1996
JP H08-118738 A 5/1996
JP H08-165035 A 6/1996
JP H08-216461 A 8/1996
JP H08-252964 A 10/1996
JP H08-267839 A 10/1996
JP H08-290618 A 11/1996
JP H08-290681 A 11/1996
JP H09-039347 A 2/1997
JP 9-76614 A 3/1997
JP H09-85928 A 3/1997
JP 2596263 B2 4/1997
JP H09-109533 A 4/1997
JP H09-118044 A 5/1997
JP H09-123579 A 5/1997
JP H09-134557 A 5/1997
JP H09-141986 A 6/1997
JP H09-141997 A 6/1997
JP H09-188049 A 7/1997
JP H09-188050 A 7/1997
JP H09-240158 A 9/1997
JP 9-277673 A 10/1997
JP H10-056604 A 2/1998
JP H10-181063 A 7/1998
JP H11-78188 A 3/1999
JP H11-78189 A 3/1999
JP H11-91144 A 4/1999
JP H11-105351 A 4/1999
JP H11-129563 A 5/1999
JP H11-263055 A 9/1999
JP H11-263056 A 9/1999
JP 2000-006481 A 1/2000
JP 2000-006501 A 1/2000
JP 2000-025251 A 1/2000
JP 2000-025316 A 1/2000
JP 2998617 B2 1/2000
JP 2000-043336 A 2/2000
JP 2000-043337 A 2/2000
JP 2000-076372 A 3/2000
JP 2000-085224 A 3/2000
JP 2000-103129 A 4/2000
JP 2000-103131 A 4/2000
JP 3031439 B2 4/2000
JP 2000-135843 A 5/2000
JP 2000-198258 A 7/2000
JP 2000-211193 A 8/2000
JP 2000-229750 A 8/2000
JP 2001-011594 A 1/2001
JP 2001-048389 A 2/2001
JP 2001-088359 A 4/2001
JP 2001-121797 A 5/2001
JP 3207860 B2 9/2001
JP 2001-310540 A 11/2001
JP 2001-319447 A 11/2001
JP 2002-042441 A 2/2002
JP 3266739 B2 3/2002
JP 2002-103762 A 4/2002
JP 2002-104568 A 4/2002
JP 2002-166605 A 6/2002
JP 2002-166606 A 6/2002
JP 2002-167084 A 6/2002
JP 2002-179300 A 6/2002
JP 2002-192769 A 10/2002
JP 2002-308481 A 10/2002
JP 2002-308518 A 10/2002
JP 2002-367333 A 12/2002
JP 3357128 B2 12/2002
JP 2003-011454 A 1/2003
JP 2003-026164 A 1/2003
JP 2003-048337 A 2/2003
JP 2003-506235 A 2/2003
JP 3378622 B2 2/2003
JP 2003-072127 A 3/2003
JP 2003-145902 A 5/2003
JP 3426983 B2 7/2003
JP 2003-251902 A 9/2003
JP 2003-251904 A 9/2003
JP 2003-285522 A 10/2003
JP 2004-018077 A 1/2004
JP 2004-155150 A 6/2004
JP 3543659 B2 7/2004
JP 2004-255656 A 9/2004
JP 3564848 B2 9/2004
JP 3567469 B2 9/2004
JP 2004-291591 A 10/2004
JP 2004-323241 A 11/2004
JP 3106187 U 12/2004
JP 2005-059504 A 3/2005
JP 2005-088597 A 4/2005
JP 2005-178206 A 7/2005
JP 2005-231203 A 9/2005
JP 2005-280008 A 10/2005
JP 2005-297348 A 10/2005
JP 2005-298031 A 10/2005
JP 2006-021432 A 1/2006
JP 2006-096030 A 4/2006
JP 2006-142835 A 6/2006
JP 2006-168974 A 6/2006
JP 2006-182034 A 7/2006
JP 2006-224675 A 8/2006
JP 2006-240310 A 9/2006
JP 2006-248059 A 9/2006
JP 2006-264337 A 10/2006
JP 2006-272895 A 10/2006
JP 2006-272977 A 10/2006
JP 2006-289991 A 10/2006
JP 2007-070028 A 3/2007
JP 2007-111863 A 5/2007
JP 2007-196654 A 8/2007
JP 2007-268815 A 10/2007
JP 2007-296863 A 11/2007
JP 4003068 B2 11/2007
JP 2007313681 A 12/2007
JP 2008-044180 A 2/2008
JP 4061507 B2 3/2008
JP 2008-080668 A 4/2008
JP 2008-083432 A 4/2008
JP 2008-094103 A 4/2008

(56) References Cited

FOREIGN PATENT DOCUMENTS

| | | | |
|---|---|---|---|
| JP | 2008-509823 | A | 4/2008 |
| JP | 2008-229855 | A | 10/2008 |
| JP | 2008-254384 | A | 10/2008 |
| JP | 2008-265180 | A | 11/2008 |
| JP | 2008-265278 | A | 11/2008 |
| JP | 2008-279678 | A | 11/2008 |
| JP | 2008-307703 | A | 12/2008 |
| JP | 2009-001020 | A | 1/2009 |
| JP | 2009-028976 | A | 2/2009 |
| JP | 2009-509812 | A | 3/2009 |
| JP | 2009-184832 | A | 8/2009 |
| JP | 2009-214431 | A | 9/2009 |
| JP | 2011-011407 | A | 1/2011 |
| JP | 2011-110843 | A | 6/2011 |
| JP | 2011-110845 | A | 6/2011 |
| JP | 2011-110848 | A | 6/2011 |
| WO | 2000/032401 | A1 | 6/2000 |
| WO | 01/10649 | A1 | 2/2001 |
| WO | 2002/32680 | A1 | 4/2002 |
| WO | 03/080350 | A1 | 10/2003 |
| WO | 2005101306 | A1 | 10/2005 |
| WO | 2006/013466 | A2 | 2/2006 |
| WO | 2006/033431 | A1 | 2/2006 |
| WO | 2006/024913 | A2 | 3/2006 |
| WO | 2006/024913 | A3 | 3/2006 |
| WO | 2006/033432 | A1 | 3/2006 |
| WO | 2006/090842 | A1 | 8/2006 |
| WO | 2009/107534 | A1 | 9/2009 |
| WO | 2010/113782 | A1 | 10/2010 |
| WO | 2010113365 | A1 | 10/2010 |
| WO | 2010113445 | A1 | 10/2010 |
| WO | 2010113532 | A1 | 10/2010 |
| WO | 2010113780 | A1 | 10/2010 |
| WO | 2011001723 | A1 | 1/2011 |
| WO | 2011001724 | A1 | 1/2011 |
| WO | 2011030579 | A1 | 3/2011 |
| WO | 2011074086 | A1 | 6/2011 |
| WO | 2011080840 | A1 | 7/2011 |

OTHER PUBLICATIONS

Supplemental List of Patents or Patent Applications Treated as Related dated Sep. 21, 2022.

May 21, 2010 (EP) Extended European Search Report issued in European Application No. 09180351.0.

Jul. 2, 2010 (EP) Extended European Search Report issued in European Application No. 10157994.4.

Jul. 12, 2010 (EP) Extended European Search Report issued in European Application No. 10158024.9.

Oct. 12, 2010 (EP) Extended European Search Report issued in European Application No. 10155348.5.

May 21, 2010 (EP) Extended European Search Report issued in European Application No. 09180354.4.

Dec. 3, 2010 (EP) Extended European Search Report issued in European Application No. 10175769.8.

May 20, 2010 (PCT) International Search Report in International Application No. PCT/JP2009/007086.

May 20, 2010 (PCT) International Search Report in International Application No. PCT/JP2009/007085.

Jul. 30, 2010 (PCT) International Search Report in International Application No. PCT/JP2010/002169.

Jul. 30, 2010 (PCT) International Search Report in International Application No. PCT/JP2010/002165.

Mar. 23, 2010 (PCT) International Search Report in International Application No. PCT/JP2009/071568.

May 21, 2010 (PCT) International Search Report in International Application No. PCT/JP2009/007089.

Jun. 22, 2010 (PCT) International Search Report in International Application No. PCT/JP2010/055324.

Jun. 22, 2010 (PCT) International Search Report in International Application No. PCT/JP2010/055326.

Mar. 16, 2010 (PCT) International Search Report in International Application No. PCT/JP2010/050253.

May 20, 2010 (PCT) International Search Report in International Application No. PCT/JP2009/007087.

Mar. 5, 2010 (PCT) International Search Report in International Application No. PCT/JP2009/007088.

Aug. 3, 2010 (PCT) International Search Report in International Application No. PCT/JP2010/002154.

Aug. 3, 2010 (PCT) International Search Report in International Application No. PCT/JP2010/002161.

Jun. 22, 2010 (PCT) International Search Report in International Application No. PCT/JP2010/055305.

Aug. 24, 2010 (PCT) International Search Report in International Application No. PCT/JP2010/004076.

Jun. 22, 2010 (PCT) International Search Report in International Application No. PCT/JP2010/055311.

Jun. 22, 2010 (PCT) International Search Report in International Application No. PCT/JP2010/055310.

Jun. 28, 2010 (PCT) International Search Report in International Application No. PCT/JP2010/002170.

Mar. 23, 2010 (PCT) International Search Report in International Application No. PCT/JP2009/070971.

Mar. 16, 2010 (PCT) International Search Report in International Application No. PCT/ JP2009/071812.

Oct. 11, 2011 (JP) Office Action issued in Japanese Patent Application No. 2008-331634.

Oct. 11, 2011 (JP) Office Action issued in Japanese Patent Application No. 2009-088440.

Oct. 11, 20111 (JP) Office Action issued in Japanese Patent Application No. 2009-088227.

Oct. 11, 2011 (JP) Office Action issued in Japanese Patent Application No. 2009-088238.

Oct. 11, 2011 (JP) Office Action issued in Japanese Patent Application No. 2009-088441.

Oct. 11, 2011 (JP) Office Action issued in Japanese Patent Application No. 2009-088460.

Nov. 15, 2011 (JP) Office Action issued in Japanese Patent Application No. 2009-088241.

Jan. 17, 2012 (JP) Office Action issued in Japanese Patent Application No. 2009-088456.

Mar. 27, 2012 (JP) Office Action issued in Japanese Patent Application No. 2008-331638.

Mar. 27, 2012 (JP) Office Action issued in Japanese Patent Application No. 2008-331639.

Mar. 27, 2012 (JP) Office Action issued in Japanese Patent Application No. 2009-156405.

Mar. 27, 2012 (JP) Office Action issued in Japanese Patent Application No. 2009-156406.

Mar. 27, 2012 (JP) Office Action issued in Japanese Patent Application No. 2009-156407.

Mar. 27, 2012 (JP) Office Action issued in Japanese Patent Application No. 2009-270221.

May 22, 2012 (JP) Japanese Office Action issued in Japanese Patent Application No. 2010-041323.

Jun. 12, 2012 (JP) Office Action issued in Japanese Patent Application No. 2010-084499.

May 8, 2012 (JP) Office Action issued in Japanese Patent Application No. 2009-086239.

Jun. 12, 2012 (JP) Office Action issued in Japanese Patent Application No. 2009-086222.

Sep. 11, 2012 (JP) Office Action issued in Japanese Patent Application No. 2009-086172.

Sep. 11, 2012 (JP) Office Action issued in Japanese Patent Application No. 2009-088449.

Sep. 6, 2012 (EP) European Communication issued in European Patent Application No. 10711477.9-1251.

Jul. 3, 2012 (JP) Office Action issued in Japanese Patent Application No. 2010-084500.

Jul. 3, 2012 (JP) Office Action issued in Japanese Patent Application No. 2010-084501.

Jul. 3, 2012 (JP) Office Action issued in Japanese Patent Application No. 2010-084502.

(56) References Cited

OTHER PUBLICATIONS

Jun. 20, 2014 (CN) Office action issued in Chinese Patent Application No. 201210070147.9.
Jun. 26, 2014 (CN) Office action issued in Chinese Patent Application No. 200980161405.0.
Jul. 18, 2014 U.S. Office Action in U.S. Appl. No. 13/431,350.
Jul. 22, 2014 U.S. Office Action in U.S. Appl. No. 12/732,257.
Jul. 25, 2014—(CN) Notice of Second Office Action—App 201010150090.4—Eng Tran.
Jul. 28, 2014—(CN) Notice of Second Office Action—App 201010150088.7—Eng Tran.
Aug. 12, 2014—(CN) Notice of Second Office Action—App 201210071810.7—Eng Tran.
Aug. 28, 2014—U.S. Non-Final Office Action—U.S. Appl. No. 13/240,216.
Sep. 2, 2014—U.S. Non-Final Office Action—U.S. Appl. No. 14/226,165.
Sep. 10, 2014—U.S. Notice of Allowance—U.S. Appl. No. 13/934,512.
Sep. 9, 2014—U.S. Non-Final Office Action—U.S. Appl. No. 14/226,380.
Sep. 9, 2014—U.S. Non-Final Office Action—U.S. Appl. No. 14/226,417.
Aug. 26, 2014—(CN) Notice of Second Office Action—App 201010274378.2—Eng Tran.
Sep. 11, 2014—U.S. Non-Final Office Action—U.S. Appl. No. 13/848,750.
Sep. 12, 2014—U.S. Final Office Action—U.S. Appl. No. 13/431,371.
Sep. 24, 2014—(JP) Notification of Rejection—App 2013-142488—Eng Tran.
Sep. 12, 2014—U.S. Non-Final Office Action—U.S. Appl. No. 14/226,386.
Sep. 22, 2014—U.S. Non-Final Office Action—U.S. Appl. No. 14/141,673.
Sep. 24, 2014—U.S. Notice of Allowance—U.S. Appl. No. 13/431,277.
Sep. 25, 2014—U.S. Non-Final Office Action—U.S. Appl. No. 14/226,424.
Oct. 2, 2014—U.S. Non-Final Office Action—U.S. Appl. No. 13/430,033.
Oct. 30, 2014 U.S. Final Office Action App—U.S. Appl. No. 14/226,256.
Oct. 27, 20014—U.S. Non-Final Office Action—U.S. Appl. No. 14/141,576.
Nov. 4, 2014—U.S. Non-Final Office Action—U.S. Appl. No. 14/226,367.
Oct. 10, 2014—U.S. Notice of Allowance—U.S. Appl. No. 12/732,457.
Nov. 4, 2014—U.S. Non-Final Office Action—U.S. Appl. No. 14/226,428.
Nov. 5, 2014—U.S. Non-Final Office Action—U.S. Appl. No. 14/226,373.
Dec. 1, 2014—U.S. Non-Final Office Action—U.S. Appl. No. 14/226,289.
Dec. 5, 2014—U.S. Non-Final Office Action—U.S. Appl. No. 14/226,325.
Nov. 12, 2014 (MX) Office Action in Application No. MX/a/2011/013553.
Dec. 16, 2014—U.S. Notice of Allowance—U.S. Appl. No. 13/240,216.
Dec. 16, 2014—U.S. Non-Final Office Action—U.S. Appl. No. 14/226,259.
Dec. 26, 2014—(CN) Office Action in Application No. 201080013339.5.
Jan. 2, 2015—U.S. Non-Final Office Action—U.S. Appl. No. 14/226,262.
Jan. 22, 2015—U.S. Notice of Allowance—U.S. Appl. No. 12/732,457.
Jan. 5, 2015—U.S. Non-final Office Action—U.S. Appl. No. 14/226,201.
Jan. 28, 2015—U.S. Notice of Allowance—U.S. Appl. No. 13/431,277.
Jan. 20, 2015—U.S. Non-Final Office Action—U.S. Appl. No. 13/431,371.
Jan. 23, 2015 (AU) Office Action in Application No. 2010231426.
Jan. 16, 2015—U.S. Non-Final Office Action—U.S. Appl. No. 14/226,402.
Jan. 22, 2015—U.S. Non-Final Office Action—U.S. Appl. No. 14/226,411.
Feb. 6, 2015—(EP) Extended Search Report—App. 14189221.6.
Feb. 10, 2015—U.S. Notice of Allowance—U.S. Appl. No. 14/226,380.
Feb. 12, 2015—U.S. Final Office Action—U.S. Appl. No. 14/226,417.
Jan. 29, 2015—(TW) Office Action—App 099132599.
Feb. 12, 2015—U.S. Final Office Action—U.S. Appl. No. 13/431,350.
Feb. 12, 2015—U.S. Final Office Action—U.S. Appl. No. 12/732,257.
Feb. 17, 20157—U.S. Final Office Action—U.S. Appl. No. 14/141,673.
Mar. 6, 2015 (AU) Office Action in Application No. 2010231425.
Mar. 10, 2015 (JP) Office Action in Application No. 2014-095027.
Japanese Office Action issue in Application No. JP 2011-507142 dated Nov. 26, 2013.
European Office Action issued in Application No. EP 10711776.4 dated Nov. 22, 2013.
United States Office Action issue in U.S. Appl. No. 13/934,512 dated Nov. 19, 2013.
Japanese Office Action issue in Application No. JP 2011-507049 dated Dec. 3, 2013.
Chinese Office Action issue in Application No. CN 200980161405.0 dated Nov. 1, 2013.
New Zealand Office Action issue in Application No. NZ 596044 dated Nov. 8, 2013.
Extended European Search Report dated Dec. 16, 2013 in Application No. EP 12160324.5.
Extended European Search Report dated Dec. 18, 2013 in Application No. EP 12160192.6.
United States Final Office Action dated Dec. 23, 2013 in U.S. Appl. No. 13/431,350.
Extended European Search Report dated Dec. 20, 2013 in Application No. EP 12161271.7.
Chinese Office Action dated Dec. 19, 2013 in Application No. CN 200910262674.8.
Chinese Office Action dated Jan. 17, 2014 in Application No. CN 201210071810.7.
Australian Office Action dated Jan. 3, 2014 in Application No. AU 2010231426.
Chinese Office Action dated Dec. 30, 2013 in Application No. CN 201010209208.6.
Chinese Office Action dated Dec. 30, 2013 in Application No. CN 201210070147.9.
Extended European Search Report dated Feb. 5, 2014 in Application No. EP 09852818.5.
Chinese Office Action issued in Application No. CN 201010274378.2 dated Jan. 22, 2014.
United States Non-Final Office Action received in U.S. Appl. No. 13/430,080 dated Mar. 10, 2014.
Japanese Office Action dated Apr. 1, 2014 in Application No. JP 2013-035990.
United States Non-Final Office Action received in U.S. Appl. No. 13/431,371 dated Mar. 25, 2014.
United States Final Office Action received in U.S. Appl. No. 12/732,457 dated Mar. 26, 2014.
Chinese Office Action dated Mar. 13, 2014 in Application No. CN 201010150928.X.
United States Notice of Allowance issued in U.S. Appl. No. 13/240,266 dated Mar. 27, 2014.
United States Notice of Allowance issued in U.S. Appl. No. 12/732,404 dated Feb. 4, 2014.
United States Notice of Allowance issued in U.S. Appl. No. 12/732,828 dated Jan. 27, 2014.
United States Notice of Allowance issued in U.S. Appl. No. 12/732,747 dated ed Feb. 19, 2014.
United States Notice of Allowance issued in U.S. Appl. No. 12/644,451 dated Feb. 24, 2014.
Australian Office Action dated Apr. 15, 2014 in Application No. AU 2009332345.
Apr. 10, 2014 (CN) Office Action issued in Application No. CN 201010150109.5.
Chinese Office Action dated Apr. 2, 2014 in Application No. CN 201210070968.2.
Russian Office Action dated Apr. 17, 2014 in Application No. RU 2011143817.

(56) References Cited

OTHER PUBLICATIONS

Vietnamese Office Action dated May 9, 2014 in Application No. VN 1-2011-02491.
United States Final Office Action received in U.S. Appl. No. 13/240,216 dated May 7, 2014.
United States Notice of Allowance issued in U.S. Appl. No. 12/644,572 dated Apr. 11, 2014.
United States Notice of Allowance issued in U.S. Appl. No. 13/934,512 dated May 6, 2014.
May 21, 2014 (EP) Extended European Search Report issued in Application No. EP 10758552.3.
May 6, 2014 (CN) Chinese Office Action issued in Chinese Application No. 201010150087.2.
May 6, 2014 (CN) Chinese Office Action issued in Chinese Application No. 201010150878.5.
May 13, 2014 (CN) Chinese Office Action issued in Chinese Application No. 201080013339.5.
Apr. 25, 2014 (MX) Mexican Office Action issued in Mexican Application No. MX/a/2011/013553.
Jun. 10, 2014 (JP) Japanese Office Action issued Japanese Application No. 2013-142488.
United States Non-Final Office Action received in U.S. Appl. No. 14/226,256 dated May 22, 2014.
Jun. 24, 2014 (JP) Japanese Office Action issued Japanese Application No. 2013-153250.
Jun. 24, 2014 (JP) Japanese Office Action issued Japanese Application No. 2013-153340.
Jul. 8, 2014 (JP) Office Action issued in Japanese Patent Application No. 2013-153421.
Jul. 8, 2014 (JP) Office Action issued in Japanese Patent Application No. 2013-153495.
Jun. 27, 2014 (AU) Office Action issued in Australian Patent Application No. 2010231426.
Jun. 2, 2014 (AU) Office action issued in Australian Patent Application No. 2010231425.
Jul. 7, 2014 U.S. Final Office Action issued in U.S. Appl. No. 13/430,080.
Jul. 8, 2014 (CA) Office Action issued in Canadian Patent Application No. 2,755,882.
Notice of Allowance dated Jun. 10, 2022 received in U.S. Appl. No. 16/924,874.
U.S. Office Action dated Aug. 25, 2017 received in related U.S. Appl. No. 15/389,497.
Notification of First Office Action dated Nov. 6, 2017 received in related application CN 201610344359.X together with an English language translation.
Official Action dated Jul. 4, 2017 received from the Chinese Patent Office in related application CN 201510714069.5 together with English language translation.
Feb. 13, 2015 U.S. Non-Final Office Action—U.S. Appl. No. 13/240,322.
Oct. 7, 2015 U.S. Final Office Action—U.S. Appl. No. 13/240,322.
Feb. 5, 2016—U.S. Office Action—U.S. Appl. No. 13/240,322.
Nov. 15, 2011(PCT)International Preliminary Report on Patentability issued in PCT/JP2009/071568.
Nov. 15, 2011(PCT)International Preliminary Report on Patentability issued in PCT/JP2010/055324.
Nov. 15, 2011(PCT)International Preliminary Report on Patentability issued in PCT/JP2010/055326.
Nov. 15, 2011(PCT)International Preliminary Report on Patentability issued in PCT/JP2010/050253.
Feb. 14, 2012(PCT)International Preliminary Report on Patentability issued in PCT/JP2010/055305.
Feb. 14, 2012(PCT)International Preliminary Report on Patentability issued in PCT/JP2010/055311.
Apr. 11, 2012(PCT)International Preliminary Report on Patentability issued in PCT/JP2010/055310.
Jul. 10, 2012(PCT)International Preliminary Report on Patentability issued in PCT/JP2009/070971.
Aug. 14, 2012(PCT)International Preliminary Report on Patentability issued in PCT/JP2009/071812.
Chinese Office Action issued in Application No. CN 201310662324.7 dated May 26, 2015.
United States Office Action dated Jan. 8, 2018 received in U.S. Appl. No. 15/226,188.
United States Office Action dated Apr. 20, 2018 received in U.S. Appl. No. 14/742,077.
United States Office Action dated Apr. 27, 2018 received in U.S. Appl. No. 15/832,531.
Photographs of a Brother Kogyo Kabushiki Kaisha TX series cassette sold in the United States at least around Jan. 6, 1993.
Photographs of a Brother Kogyo Kabushiki Kaisha TC series cassette sold in the United States at least around Dec. 28, 1988.
United States Notice of Allowance dated Sep. 21, 2018 received in U.S. Appl. No. 15/250,310.
United States Notice of Allowance dated Jun. 29, 2018 received in U.S. Appl. No. 15/250,310.
United States Notice of Allowance dated Feb. 8, 2018 received in U.S. Appl. No. 15/250,310.
United States Notice of Allowance dated Sep. 25, 2017 received in U.S. Appl. No. 15/250,310.
United States Office Action dated May 18, 2017 received in U.S. Appl. No. 15/250,310.
United States Office Action dated Oct. 3, 2016 received in U.S. Appl. No. 15/250,310.
United States Notice of Allowance dated Sep. 4, 2018 received in U.S. Appl. No. 15/276,474.
United States Notice of Allowance dated Jul. 11, 2018 received in U.S. Appl. No. 15/276,474.
United States Notice of Allowance dated Feb. 16, 2018 received in U.S. Appl. No. 15/276,474.
United States Notice of Allowance dated Nov. 27, 2017 received in U.S. Appl. No. 15/276,474.
United States Office Action dated Jul. 14, 2017 received in U.S. Appl. No. 15/276,474.
United States Notice of Allowance dated Jun. 26, 2018 received in U.S. Appl. No. 15/357,004.
United States Office Action dated Jan. 22, 2018 received in U.S. Appl. No. 15/357,004.
United States Office Action dated Jul. 5, 2017 received in U.S. Appl. No. 15/357,004.
United States Notice of Allowance dated Oct. 1, 2018 received in U.S. Appl. No. 15/389,497.
United States Notice of Allowability dated Aug. 6, 2018 received in U.S. Appl. No. 15/389,497.
United States Notice of Allowability dated Jul. 2, 2018 received in U.S. Appl. No. 15/389,497.
United States Notice of Allowance dated Jun. 12, 2018 received in U.S. Appl. No. 15/389,497.
United States Office Action dated Aug. 25, 2017 received in U.S. Appl. No. 15/389,497.
United States Notice of Allowance dated Jul. 6, 2018 received in U.S. Appl. No. 15/866,000.
United States Notice of Allowance dated Sep. 27, 2018 received in U.S. Appl. No. 15/866,000.
United States Office Action dated May 3, 2018 received in U.S. Appl. No. 15/226,188.
United States Office Action dated Oct. 30, 2018 from related U.S. Appl. No. 15/832,531.
Notification of Reasons for Rejection dated Oct. 29, 2019 received from the Japanese Patent Office in application JP 2018-246396 together with an English language translation.
Extended European Search Report dated Aug. 29, 2019 received in European Patent Application No. 19173286.6.
Office Action dated Apr. 4, 2019 received in related U.S. Appl. No. 16/256,604.
Office Action dated Apr. 12, 2019 received in related U.S. Appl. No. 15/715,329.
Notice of Allowance dated Jun. 5, 2019 received in related U.S. Appl. No. 15/832,531.
Office Action dated Jun. 5, 2019 received in related U.S. Appl. No. 15/981,465.

(56) References Cited

OTHER PUBLICATIONS

Sep. 8, 2015—(JP) Office Action—App 2014-210427—Eng Tran.
Sep. 9, 2015—U.S. Final Office Action—U.S. Appl. No. 14/226,386.
Sep. 17, 2015—U.S. Non-Final Office Action—U.S. Appl. No. 14/226,424.
Sep. 18, 2015—U.S. Non-Final Office Action—U.S. Appl. No. 14/226,428.
Oct. 1, 2015—U.S. Notice of Allowance—U.S. Appl. No. 12/732,457.
Oct. 5, 2015—U.S. Notice of Allowance—U.S. Appl. No. 12/644,572.
Oct. 5, 2015—U.S. Notice of Allowance—U.S. Appl. No. 14/141,673.
Oct. 13, 2015—U.S. Notice of Allowance—U.S. Appl. No. 13/430,033.
Sep. 2, 2015—(CN) Notification of First Office Action—App 201410200475.5.
Oct. 20, 2015—U.S. Notice of Allowance—U.S. Appl. No. 14/226,201.
Oct. 22, 2015—U.S. Final Office Action—U.S. Appl. No. 14/641,681.
Oct. 23, 2015—U.S. Final Office Action—U.S. Appl. No. 13/431,350.
Oct. 26, 2015—U.S. Non-Final Office Action—U.S. Appl. No. 14/643,865.
Nov. 3, 2015—U.S. Notice of Allowance—U.S. Appl. No. 14/226,259.
Oct. 30, 2015—U.S. Non-Final Office Action—U.S. Appl. No. 14/226,373.
Nov. 9, 2015—U.S. Notice of Allowance—U.S. Appl. No. 13/848,750.
Oct. 27, 2015—(CN) Office Action—App 201410195767.4.
Nov. 13, 2015—U.S. Non-Final Office Action—U.S. Appl. No. 14/226,289.
Nov. 27, 2015—U.S. Notice of Allowance—U.S. Appl. No. 14/226,367.
Nov. 25, 2015—U.S. Final Office Action—U.S. Appl. No. 14/226,256.
Nov. 20, 2015—(KR) Office Action—App 10-2011-7017238.
Nov. 20, 2015—(KR) Office Action—App 10-2015-7006347.
Dec. 4, 2015—U.S. Notice of Allowance—U.S. Appl. No. 14/226,325.
Dec. 10, 2015—U.S. Non-Final Office Action—U.S. Appl. No. 14/755,141.
Dec. 11, 2015—U.S. Notice of Allowance—U.S. Appl. No. 14/226,165.
Dec. 17, 2015—U.S. Non-Final Office Action—U.S. Appl. No. 14/920,398.
Dec. 21, 2015—U.S. Notice of Allowance—U.S. Appl. No. 13/934,512.
Nov. 27, 2015—(CN) Office Action—App 201410311930.9.
Dec. 3, 2015—(CN) Office Action—App 201510088644.5.
Dec. 23, 2015—U.S. Final Office Action—U.S. Appl. No. 14/226,417.
Dec. 24, 2015—U.S. Non-Final Office Action—U.S. Appl. No. 14/226,380.
Jan. 12, 2016—U.S. Notice of Allowance—U.S. Appl. No. 13/431,371.
Jan. 15, 2016—U.S. Notice of Allowance—U.S. Appl. No. 12/732,257.
Dec. 24, 2015—(TW) Decision of Rejection—App 101110368—Eng Tran.
Jan. 29, 2016—U.S. Notice of Allowance—U.S. Appl. No. 14/226,411.
Feb. 11, 2016—U.S. Notice of Allowance—U.S. Appl. No. 14/226,402.
Feb. 16, 2016—U.S. Non-Final Office Action—U.S. Appl. No. 14/867,877.
Feb. 24, 2016—U.S. Non-Final Office Action—U.S. Appl. No. 14/226,262.
Feb. 25, 2016—U.S. Non-Final Office Action—U.S. Appl. No. 14/141,568.
Feb. 22, 2016—U.S. Non-Final Office Action—U.S. Appl. No. 14/226,386.
Mar. 29, 2016—U.S. Notice of Allowance—U.S. Appl. No. 13/431,350.
Mar. 29, 2016—U.S. Notice of Allowance—U.S. Appl. No. 14/641,681.
Apr. 19, 2016—U.S. Notice of Allowance—U.S. Appl. No. 14/226,417.
Apr. 21, 2016—U.S. Notice of Allowance—U.S. Appl. No. 14/226,428.
May 25, 2016—U.S. Notice of Allowance—U.S. Appl. No. 14/755,141.
Mar. 4, 2016—U.S. Notice of Allowance—U.S. Appl. No. 14/643,865.
Jun. 24, 2016—U.S. Notice of Allowance—U.S. Appl. No. 14/226,256.
Sep. 22, 2016—(KR) Notice ofFinal Rejection—App 10-2011-7021961, Eng Tran.
Dec. 1, 2016—U.S. Notice of Allowance and Fees Due—U.S. Appl. No. 14/226,262.
US Notice of Allowance dated Dec. 20, 2017 received in related U.S. Appl. No. 15/389,497.
Office Action dated May 20, 2019 received from the United States Patent Office in related U.S. Appl. No. 15/226,188.
Official Action dated Jun. 3, 2019 received from the Chinese Patent Office in related application CN 201711461753.2 together with an English language translation.
United States Office Action dated Jun. 5, 2019 received in U.S. Appl. No. 15/981,465.
United States Office Action dated Apr. 12, 2019 received in U.S. Appl. No. 15/715,329.
United States Office Action dated Nov. 12, 2019 received in U.S. Appl. No. 15/981,465.
United States Office Action dated Dec. 9, 2019 received in U.S. Appl. No. 16/286,132.
United States Office Action dated Dec. 3, 2019 received in U.S. Appl. No. 16/256,604.
United States Notice of Allowance dated Nov. 30, 2018 received in U.S. Appl. No. 15/357,004.
United States Office Action dated Jan. 28, 2020 received in U.S. Appl. No. 15/226,188.
United States Notice of Allowance dated Mar. 5, 2019 received in U.S. Appl. No. 15/832,531.
United States Notice of Allowance dated Apr. 9, 2020 received in U.S. Appl. No. 15/981,465.
United States Notice of Allowance dated Apr. 8, 2020 received in U.S. Appl. No. 16/796,463.
Office Action dated Jul. 1, 2020 received in related U.S. Appl. No. 15/715,329.
Office Action dated Jul. 29, 2020 received in related U.S. Appl. No. 16/286,132.
Office Action dated Oct. 6, 2020 received in related U.S. Appl. No. 16/866,950.
Official Action dated Oct. 12, 2020 received in related German Patent Application No. DE 10 2010 012 892.9 together with an English language translation.
Official Action dated Nov. 24, 2020 received in related U.S. Appl. No. 16/782,368.
Official Action dated Dec. 14, 2020 received in related U.S. Appl. No. 15/715,329.
Office Action dated Jan. 7, 2021 from related U.S. Appl. No. 16/293,984.
Notice of Allowance dated Mar. 4, 2021 from related U.S. Appl. No. 16/866,950.
Office Action dated Mar. 30, 2021 received in related U.S. Appl. No. 16/286,132.
Office Action dated Apr. 22, 2021 received in related U.S. Appl. No. 15/715,329.
Office Action dated Jul. 1, 2021 received in related U.S. Appl. No. 16/782,368.
Notice of Allowance dated Oct. 7, 2021 received in related U.S. Appl. No. 16/923,690.
Office Action dated Oct. 21, 2021 received in related U.S. Appl. No. 16/924,874.
Notice of Allowance dated Nov. 22, 2021 received in related U.S. Appl. No. 16/782,368.
List of Patents or Patent Applications Treated as Related dated Jan. 7, 2022.
Notice of Allowance dated Sep. 23, 2021 received in related U.S. Appl. No. 16/286,132.
Office Action dated Mar. 24, 2022 received in U.S. Appl. No. 17/339,374.
Office Action dated Oct. 26, 2022 received in related U.S. Appl. No. 17/538,254.
Notice of Allowance dated Oct. 26, 2022 received in related U.S. Appl. No. 17/339,374.
Office Action dated Nov. 9, 2022 received in related U.S. Appl. No. 17/677,455.
Mar. 6, 2015—U.S. Final Office Action—U.S. Appl. No. 14/226,424.
Mar. 4, 2015—U.S. Final Office Action—U.S. Appl. No. 14/141,576.
Mar. 4, 2015—U.S. Non-Final Office Action—U.S. Appl. No. 14/226,386.
Mar. 13, 2015 U.S. Notice of Allowance in U.S. Appl. No. 14/226,165.
Mar. 17, 2015—U.S. Notice of Allowance—U.S. Appl. No. 13/848,750.
Mar. 12, 2015 (EP) Search Report in Application No. 14156840.2.
Feb. 19, 2015 (CA) Office Action in Application No. 2755885.
Mar. 2, 2015 (TW) Office Action in Application No. 101110368.

(56) References Cited

OTHER PUBLICATIONS

Mar. 23, 2015 U.S. Notice of Allowance in U.S. Appl. No. 13/934,512.
Apr. 1, 2015—U.S. Notice of Allowance—U.S. Appl. No. 13/430,033.
Apr. 1, 2015—U.S. Notice of Allowance—U.S. Appl. No. 12/732,457.
Apr. 2, 2015 (EP) Office Action in Application No. 10711776.4.
Apr. 9, 2015—U.S. Notice of Allowance—U.S. Appl. No. 13/431,277.
Apr. 10, 2015—U.S. Non-Final Office Action—U.S. Appl. No. 13/430,080.
Apr. 7, 2015 (TW) Office Action in U.S. Appl. No. 99/132,600.
Apr. 14, 2015—U.S. Notice of Allowance—U.S. Appl. No. 13/240,266.
Apr. 9, 2015—U.S. Non-Final Office Action—U.S. Appl. No. 14/641,681.
Apr. 20, 2015 (AU) Office Action in Application No. 2010231426.
Apr. 17, 2015—U.S. Final Office Action—U.S. Appl. No. 14/226,367.
Apr. 21, 2015—U.S. Final Office Action—U.S. Appl. No. 14/226,428.
May 1, 2015—U.S. Notice of Allowance—U.S. Appl. No. 12/644,572.
Apr. 13, 2015—(CN) Notification ofThird Office Action—App 201210071810.7—Eng. Tran.
May 6, 2015—U.S. Final Office Action—U.S. Appl. No. 14/226,373.
May 6, 2015—U.S. Final Office Action—U.S. Appl. No. 14/226,259.
Apr. 9, 2015—(TW) Office Action—App 099132598—Eng. Tran.
May 19, 2015—U.S. Final Office Action—U.S. Appl. No. 14/226,289.
May 22, 2015—U.S. Non-Final Office Action—U.S. Appl. No. 12/732,257.
Jun. 2, 2015—U.S. Final Office Action—U.S. Appl. No. 14/226,262.
May 19, 2015—U.S. Notice of Allowance—U.S. Appl. No. 14/226,201.
May 20, 2015—U.S. Notice of Allowance—U.S. Appl. No. 13/848,750.
Jun. 5, 2015—U.S. Notice of Allowance—U.S. Appl. No. 14/226,380.
Jun. 2, 2015—U.S. Non-Final Office Action—U.S. Appl. No. 14/226,256.
May 26, 2015—(CN) Office Action—App 201310659625.4.
May 29, 2015—U.S. Notice of Allowance—U.S. Appl. No. 14/226,165.
Jun. 17, 2015—U.S. Final Office Action—U.S. Appl. No. 14/226,325.
May 29, 2015—(MY) Substantive Examination Adverse Report—App. PI 2013702520—Eng Tran.
Jun. 25, 2015—U.S. Non-Final Office Action—U.S. Appl. No. 13/431,350.
Jun. 1, 2015—(CN) Notification of First Office Action—App 201310717842.4—Eng Tran.
Jun. 1, 2015—(CN) Notification of First Office Action—App 201310717871.0—Eng Tran.
Jul. 7, 2015—U.S. Notice of Allowance—U.S. Appl. No. 14/141,673.
Jun. 19, 2015 (CN) Notification of First Office Action—App 201310659875.8—Eng Tran.
Jul. 16, 2015—U.S. Non-Final Office Action—U.S. Appl. No. 14/226,417.
Jul. 31, 2015—U.S. Final Office Action—U.S. Appl. No. 14/226,411.
Aug. 4, 2015—U.S. Notice of Allowance—U.S. Appl. No. 14/141,576.
Aug. 13, 2015—U.S. Final Office Action—U.S. Appl. No. 13/431,371.
Aug. 11, 2015—(AU) Patent Examination Report 1—App 2014221250.
Aug. 24, 2015—U.S. Final Office Action—U.S. Appl. No. 14/226,402.
Sep. 1, 2015—U.S. Notice of Allowance—U.S. Appl. No. 14/226,259.
Aug. 6, 2015—(CN) Office Action—App 201410046812.X—Eng Tran.
Sep. 8, 2015—U.S. Notice of Allowance—U.S. Appl. No. 14/141,673.
Explanation of Proofs submitted in Nullification Appeal for JP Patent 5233800 dated Feb. 17, 2022 together with English language translation.
NZ Examination Report of Application No. NZ 596044 dated Sep. 28, 2012.
Japanese Office Action of Application No. JP 2009-270056 dated Nov. 13, 2012.
Japanese Office Action of Application No. JP 2009-297502 dated Nov. 13, 2012.
Japanese Office Action of Application No. JP 2009-156369 dated Dec. 18, 2012.
Japanese Office Action issued in Application No. JP 2011-506968 dated Jan. 29, 2013.
Japanese Office Action issued in Application No. JP 2009-156398 dated Apr. 2, 2013.
Japanese Office Action issued in Application No. JP 2009-156403 dated Apr. 2, 2013.
Japanese Office Action issued in Application No. JP 2009-156281 dated Apr. 2, 2013.
Japanese Office Action issued in Application No. JP 2009-156355 dated Apr. 2, 2013.
Japanese Office Action issued in Application No. JP 2009-156399 dated Apr. 2, 2013.
Japanese Office Action issued in Application No. JP 2009-156404 dated Apr. 2, 2013.
Japanese Office Action issued in Application No. JP 2009-156350 dated Apr. 2, 2013.
Japanese Office Action issued in Application No. JP 2009-156357 dated Apr. 2, 2013.
Japanese Office Action issued in Application No. JP 2009-156371 dated Apr. 2, 2013.
Japanese Office Action issued in Application No. JP 2009-270325 dated Apr. 2, 2013.
Chinese Office Action issued in Application No. CN 200980158165.9 dated Mar. 8, 2013.
Extended European Search Report issued in Application No. EP 09852278.2 dated Apr. 8, 2013.
Chinese Office Action issued in Application No. CN 201080013099.9 dated Apr. 15, 2013.
Chinese Office Action issued in Application No. CN 200910262678.6 dated Apr. 19, 2013.
Japanese Office Action issued in Application No. JP 2009-154698 dated May 21, 2013.
Japanese Office Action issued in Application No. JP 2009-154699 dated May 21, 2013.
Chinese Office Action issued in Application No. CN 200910262676.7 dated Apr. 26, 2013.
Chinese Office Action issued in Application No. CN 200910262680.3 dated May 2, 2013.
Chinese Office Action issued in Application No. CN 200910262679.0 dated May 2, 2013.
Chinese Office Action issued in Application No. CN 200910262677.1 dated May 2, 2013.
Japanese Office Action issued in Application No. JP 2010-073747 dated May 14. 2013.
Japanese Office Action issued in Application No. JP 2010-73748 dated Apr. 23, 2013.
Japanese Office Action issued in Application No. JP 2010-073749 dated May 21, 2013.
Japanese Office Action issued in Application No. JP 2010-73750 dated Apr. 23, 2013.
Japanese Office Action issued in Application No. JP 2010-073751 dated May 28, 2013.
Japanese Office Action issued in Application No. JP 2010-073754 dated Jun. 4, 2013.
Japanese Office Action issued in Application No. JP 2010-073755 dated May 21, 2013.
Japanese Office Action issued in Application No. JP 2009-156350 dated Jul. 2, 2013.
Japanese Office Action issued in Application No. JP 2009-156281 dated Jul. 2, 2013.
Chinese Office Action issued in Application No. CN 200980161443.6 dated Jun. 4, 2013.
New Zealand Office Action issued in Application No. NZ 596044 dated Jul. 10, 2013.
Japanese Office Action issued in Application No. JP 2011-507143 dated Sep. 3, 2013.
Chinese Office Action issued in Application No. CN 200910262675.2 dated Aug. 7, 2013.
Chinese Office Action issued in Application No. CN 201080013339.5 dated Aug. 22, 2013.
Japanese Office Action issued in Application No. JP 2011-547222 dated Oct. 1, 2013.
New Zealand Office Action issued in Application No. NZ 596044 dated Sep. 25, 2013.
Chinese Office Action issued in Application No. Cn 201010150928.X dated Sep. 3, 2013.

(56) References Cited

OTHER PUBLICATIONS

United States Office Action issued in No. U.S. Appl. No. 13/240,266 dated Oct. 16, 2013.
Chinese Office Action issued in Application No. CN 201010150090.4 Sep. 26, 2013.
Chinese Office Action issued in Application No. CN 201010150109.5 dated Sep. 22, 2013.
Extended European Search Report issued in Application No. EP 09842716.4 dated Nov. 6, 2013.
Chinese Office Action issued in Application No. CN 201010150088.7 dated Sep. 30, 2013.
Chinese Office Action issued in Application No. CN 200980158165.9 dated Oct. 28, 2013.
Extended European Search Report issued in Application No. EP 10758310.6 dated Nov. 12, 2013.
United States Office Action issued in No. U.S. Appl. No. 13/240,216 dated Nov. 13, 2013.
Office Action dated Sep. 22, 2023 received in related U.S. Appl. No. 17/538,254.

FIG. 40

510

| | LAMINATED | RECEPTOR | REMARKS | SW1 | SW2 | SW3 | SW4 | SW5 |
|---|---|---|---|---|---|---|---|---|
| 0 | | | ERROR 1 | 0 | 0 | 0 | 0 | 0 |
| 1 | 6 | | | 0 | 0 | 0 | 1 | 0 |
| 2 | 9 | | | 1 | 0 | 0 | 1 | 0 |
| 3 | 12 | | | 0 | 1 | 0 | 1 | 0 |
| 4 | RESERVED | | | 1 | 1 | 0 | 1 | 0 |
| 5 | 9 | | | 1 | 0 | 0 | 0 | 0 |
| 6 | 12 | | | 0 | 1 | 0 | 0 | 0 |
| 7 | RESERVED | | | 1 | 1 | 0 | 0 | 0 |
| 8 | | 6 | | 0 | 0 | 1 | 1 | 0 |
| 9 | | 9 | | 1 | 0 | 1 | 1 | 0 |
| 10 | | 12 | | 0 | 1 | 1 | 1 | 0 |
| 11 | | 3. 5 | | 1 | 1 | 1 | 0 | 0 |
| 12 | | 6 | | 0 | 0 | 1 | 0 | 0 |
| 13 | | 9 | | 1 | 0 | 1 | 0 | 0 |
| 14 | | 12 | | 0 | 1 | 1 | 0 | 0 |
| 15 | | | ERROR 2 | 1 | 1 | 1 | 1 | 0 |
| 16 | 18 | | | 0 | 0 | 0 | 1 | 1 |
| 17 | 24 | | | 1 | 0 | 0 | 1 | 1 |
| 18 | 36 | | | 0 | 1 | 0 | 1 | 1 |
| 19 | RESERVED | | | 1 | 1 | 0 | 1 | 1 |
| 20 | 18 | | | 0 | 0 | 0 | 0 | 1 |
| 21 | 24 | | | 1 | 0 | 0 | 0 | 1 |
| 22 | 36 | | | 0 | 1 | 0 | 0 | 1 |
| 23 | RESERVED | | | 1 | 1 | 0 | 0 | 1 |
| 24 | | 18 | | 0 | 0 | 1 | 0 | 1 |
| 25 | | 24 | | 1 | 0 | 1 | 0 | 1 |
| 26 | | 36 | | 0 | 1 | 1 | 0 | 1 |
| 27 | | RESERVED | | 1 | 1 | 1 | 0 | 1 |
| 28 | | 18 | | 0 | 0 | 1 | 1 | 1 |
| 29 | | 24 | | 1 | 0 | 1 | 1 | 1 |
| 30 | | 36 | | 0 | 1 | 1 | 1 | 1 |
| 31 | | | ERROR 3 | 1 | 1 | 1 | 1 | 1 |

FIG. 44

520

521 522

| | ST1 | ST2 | ST3 | ST4 | ST5 | FIRST COLOR TABLE | | SECOND COLOR TABLE | |
|---|---|---|---|---|---|---|---|---|---|
| | | | | | | TAPE COLOR | CHARACTER COLOR | TAPE COLOR | CHARACTER COLOR |
| 0 | 0 | 1 | 1 | 1 | 0 | White | Black | Mat white | Black |
| 1 | 0 | 1 | 1 | 0 | 0 | Clear | Black | Mat Clear | Black |
| 2 | 1 | 0 | 1 | 0 | 0 | Yellow | Black | RESERVED | Black |
| 3 | 0 | 0 | 1 | 1 | 0 | Blue | Black | RESERVED | Black |
| 4 | 0 | 1 | 0 | 1 | 0 | Red | Black | RESERVED | Black |
| 5 | 1 | 0 | 1 | 1 | 0 | Green | Black | RESERVED | Black |
| 6 | 1 | 1 | 1 | 0 | 0 | Flu. Orange | Black | RESERVED | Black |
| 7 | 0 | 1 | 0 | 0 | 0 | Flu. Yellow | Black | RESERVED | Black |
| 8 | 1 | 0 | 0 | 1 | 0 | Mat Silver | Black | Silver | Black |
| 9 | 1 | 0 | 0 | 0 | 0 | Flu. Green | Black | RESERVED | Black |
| 10 | 1 | 1 | 0 | 0 | 0 | Gold | Black | RESERVED | Black |
| 11 | 0 | 0 | 0 | 1 | 0 | RESERVED | Black | RESERVED | Black |
| 12 | 0 | 0 | 1 | 0 | 0 | RESERVED | Black | RESERVED | Black |
| 13 | 1 | 1 | 1 | 1 | 0 | RESERVED | Black | RESERVED | Black |
| 14 | 1 | 1 | 0 | 1 | 0 | RESERVED | Black | RESERVED | Black |
| 15 | 0 | 0 | 0 | 0 | 0 | ERROR | | ERROR | |
| 16 | 0 | 1 | 1 | 1 | 1 | White | Blue | White | Red |
| 17 | 0 | 1 | 1 | 0 | 1 | Clear | Blue | Clear | Red |
| 18 | 1 | 0 | 1 | 0 | 1 | Yellow | Blue | RESERVED | RESERVED |
| 19 | 0 | 0 | 1 | 1 | 1 | Blue | Blue | Mat Silver | Gold |
| 20 | 0 | 1 | 0 | 0 | 1 | Pink | Blue | Pink | Red |
| 21 | 1 | 0 | 1 | 1 | 1 | Blue | White | Mat Gray | White |
| 22 | 1 | 1 | 1 | 0 | 1 | Clear | White | Mat Green | White |
| 23 | 0 | 1 | 0 | 1 | 1 | Red | White | Mat Pink | White |
| 24 | 0 | 0 | 0 | 1 | 1 | Black | White | Mat Gold | White |
| 25 | 1 | 0 | 0 | 1 | 1 | Black | Gold | Mat Silver | Red |
| 26 | 1 | 0 | 0 | 0 | 1 | RESERVED | RESERVED | COLOR 1 | |
| 27 | 1 | 1 | 0 | 0 | 1 | RESERVED | RESERVED | COLOR 2 | |
| 28 | 0 | 0 | 1 | 0 | 1 | RESERVED | RESERVED | COLOR 3 | |
| 29 | 0 | 0 | 0 | 0 | 1 | RESERVED | RESERVED | RESERVED | RESERVED |
| 30 | 1 | 1 | 1 | 1 | 1 | RESERVED | RESERVED | RESERVED | RESERVED |
| 31 | 1 | 1 | 0 | 1 | 1 | ERROR | | ERROR | |

TAPE CASSETTE

CROSS-REFERENCE TO RELATED APPLICATION

This application is a continuation application of U.S. Ser. No. 16/923,690 filed on Jul. 8, 2020, which is a continuation of U.S. Ser. No. 16/796,463 filed on Feb. 20, 2020, now U.S. Pat. No. 10,744,802 issued on Aug. 18, 2020, which is a continuation of U.S. Ser. No. 16/160,343 filed on Oct. 15, 2018, now U.S. Pat. No. 10,618,325 issued on Apr. 14, 2020, which is a continuation of U.S. Ser. No. 15/389,497 filed on Dec. 23, 2016, now U.S. Pat. No. 10,201,993 issued on Feb. 12, 2019, which is a continuation of U.S. Ser. No. 13/240,322 filed on Sep. 22, 2011, now U.S. Pat. No. 9,566,808 issued on Feb. 14, 2017, which is a continuation-in-part of International Application No. PCT/JP2010/0055324, filed Mar. 26, 2010, which claims priority from Japanese Patent Application Nos. 2009-088440, filed on Mar. 31, 2009, 2009-088456, filed on Mar. 31, 2009, 2009-088468 filed on Mar. 31, 2009, 2009-088441, filed on Mar. 31, 2009, 2009-088460, filed on Mar. 31, 2009, 2009-086172, filed on Mar. 31, 2009, 2009-086184, filed on Mar. 31, 2009, 2009-086201, filed on Mar. 31, 2009, 2009-086222, filed on Mar. 31, 2009, 2009-088227, filed on Mar. 31, 2009, 2009-088238, filed on Mar. 31, 2009, 2009-088241, filed on Mar. 31, 2009, 2009-156398, filed on Jun. 30, 2009, 2009-156399, filed on Jun. 30, 2009, 2009-156403, filed on Jun. 30, 2009, 2009-156404, filed on Jun. 30, 2009, 2009-156355, filed on Jun. 30, 2009, 2009-156357, filed on Jun. 30, 2009, 2009-156369, filed on Jun. 30, 2009, 2009-154695, filed on Jun. 30, 2009, 2009-156350, filed on Jun. 30, 2009, 2009-208321, filed on Sep. 9, 2009, 2009-270056, filed on Nov. 27, 2009, 2009-270325, filed on Nov. 27, 2009, 2009-270067, filed on Nov. 27, 2009, 2009-269693, filed on Nov. 27, 2009, 2009-270163, filed on Nov. 27, 2009. The disclosure of the foregoing applications is hereby incorporated by reference in its entirety.

BACKGROUND

The present invention relates to a tape cassette that can be mounted in and removed from a tape printer.

A tape cassette in which a tape is contained within a cassette case may be mounted in a cassette mounting portion of a tape printer. A tape cassette is known that, when mounted in the cassette mounting portion, allows the tape printer to detect a type of the tape that is contained within the cassette case (for example, refer to Patent Literatures 1 and 2).

Specifically, a cassette detection portion, in which one or more switch holes are formed in a pattern that corresponds to the type of the tape, is provided in a part of a bottom face of the tape cassette. A plurality of detection switches that project upward are provided in the cassette mounting portion. When the tape cassette is mounted in the cassette mounting portion, the cassette detection portion selectively depresses the plurality of detection switches according to the pattern of the switch holes. The tape printer detects the type of the tape according to a combination of the plurality of detection switches that are depressed and not depressed.

SUMMARY

In a case where a user has not mounted the tape cassette correctly, or in a case where the user has not operated the tape printer correctly, for example, the tape cassette may be mounted in the cassette mounting portion in a state in which it is tilted out of its proper position. In a case where the tape cassette is tilted within the cassette mounting portion, the cassette detection portion may not be accurately positioned opposite the plurality of detection switches. In that case, the cassette detection portion may not depress the detection switch or switches that should be depressed, and the cassette detection portion may depress the detection switch or switches that should not be depressed.

In a case where the plurality of detection switches have been depressed in an erroneous pattern, the tape printer will detect a type of tape that is different from the type of the tape that is contained within the tape cassette that is mounted in the cassette mounting portion. If the tape printer thus detects the wrong type of tape, faulty operation of the tape printer, printing defects, and the like may occur.

Various exemplary embodiments of the general principles herein provide a tape cassette that can allow a tape printer to detect a type of a tape accurately.

Exemplary embodiments herein provide a tape cassette that includes a box-shaped cassette case, at least one tape, a pair of cavities, and a side face indicator portion. An outline of the cassette case is defined by a bottom wall, a top wall, and a side wall and the cassette case includes a plurality of corner portions. The at least one tape is contained within a tape containment area that is defined within the outline. The pair of cavities extend from the bottom wall and are provided between the tape containment area and the outline at opposite ends of a diagonal line that connects one of the corner portions to another of the corner portions. The side face indicator portion is provided in the side wall, indicates a type of the tape, and includes a plurality of indicator portions that are disposed in a pattern that is in accordance with the type of the tape. Each of the indicator portions is one of a switch hole and a surface portion.

Exemplary embodiments also provide a tape cassette that can be mounted in and removed from a tape printer that is provided with a head holder that has a printing head. The tape cassette includes a box-shaped cassette case, a tape, a head insertion portion, an arm portion, a latch hole, and a width direction restraining portion. The cassette case includes a top case and a bottom case. The top case has a top wall, and the bottom case has a bottom wall and a bottom outside wall that is an outside wall extending vertically upward from an edge of the bottom wall. The tape is contained in the cassette case. The head insertion portion is a space extending through the cassette case in an up-down direction and into which the head holder is to be inserted. The arm portion has a first wall portion and a second wall portion, and is adapted to guide the tape along a feed path between the first wall portion and the second wall portion to an exit. The first wall portion is a portion of the bottom outside wall. The second wall portion is provided between the first wall portion and the head insertion portion and is a wall extending vertically upward from the bottom wall. The latch hole is always provided in the first wall portion, regardless of a type of the tape. The width direction restraining portion is provided in the second wall portion and is adapted to restrain a movement of the tape in a width direction.

Exemplary embodiments further provide a tape cassette that can be mounted in and removed from a tape printer that is provided with a head holder that has a printing head. The tape cassette includes a box-shaped cassette case, at least one tape, a pair of cavities, a head insertion portion, and a support receiving portion. An outline of the cassette case is defined by a bottom wall forming a bottom face, a top wall forming a top face, and a side wall forming a side face and the cassette case includes a plurality of corner portions. The at least one tape is contained within a tape containment area that is defined within the outline. The pair of cavities extend from the bottom wall and are provided between the tape containment area and the outline at opposite ends of a diagonal line that connects one of the corner portions to another of the corner portions. The head insertion portion is a space extending through the cassette case in an up-down direction and into which the head holder is to be inserted. The support receiving portion is a recessed portion that is recessed upward from the bottom face and that is connected to an end portion of the head insertion portion.

BRIEF DESCRIPTION OF THE DRAWINGS

Exemplary embodiments will be described below in detail with reference to the accompanying drawings in which:

FIG. 40 is a figure that shows a data configuration of a printing information table 510.

FIG. 44 is a figure that shows a data configuration of a color information table 520.

DETAILED DESCRIPTION OF THE EXEMPLARY EMBODIMENTS

Figure 1:
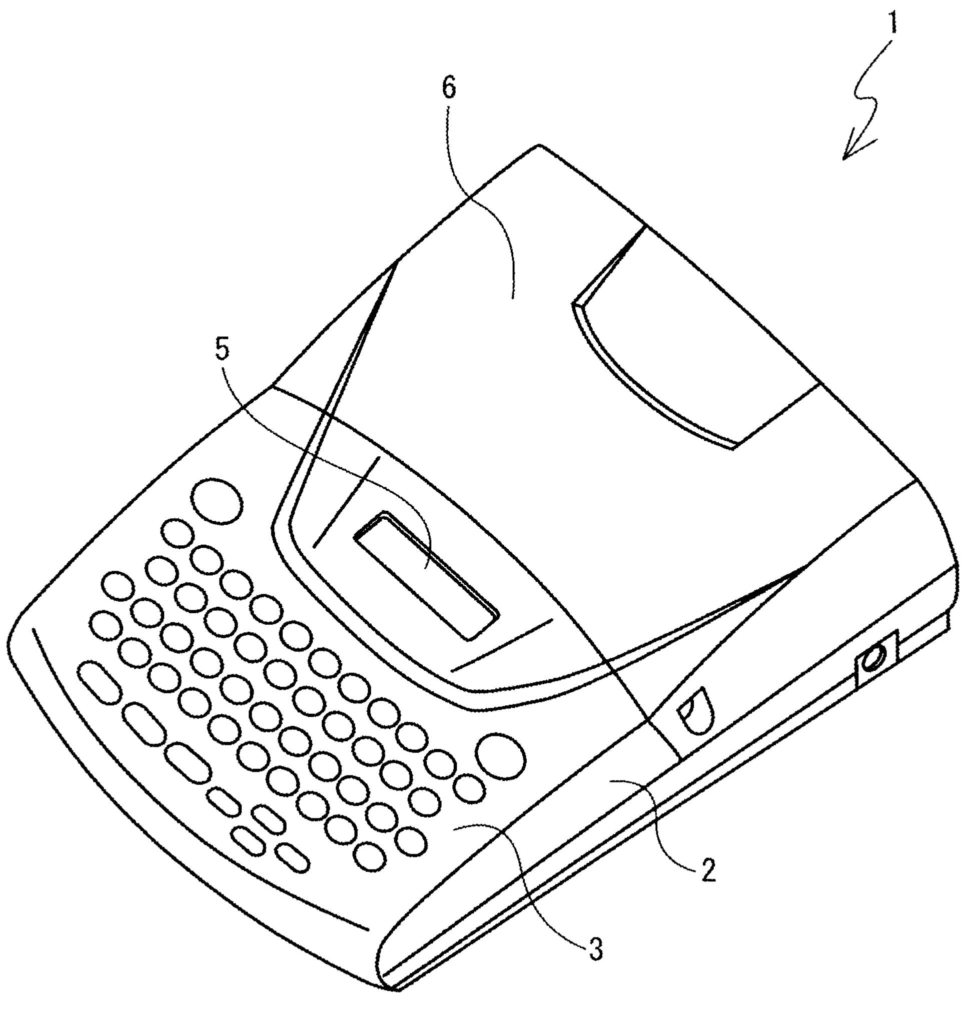
FIG. 1 is an oblique view of a tape printer 1 in which a cassette cover 6 is in a closed state.

Embodiments of the present invention will be explained with reference to the drawings. Note that the referenced drawings are merely explanatory examples that are used for explaining technical features that the present invention can employ.

A tape printer 1 and a tape cassette 30 according to the present embodiment will be explained with reference to FIGS. 1 to 52. In the explanation of the present embodiment, the lower left side, the upper right side, the lower right side, and the upper left side in FIGS. 1 and 2 respectively correspond to the front side, the rear side, the right side, and the left side of the tape printer 1. The lower right side, the upper left side, the upper right side, and the lower left side in FIG. 3 respectively correspond to the front side, the rear side, the right side, and the left side of the tape cassette 30.

In the present embodiment, different varieties of the tape that is contained in the tape cassette 30 (for example, a thermal paper tape 55, a printing tape 57, a double-sided adhesive tape 58, a film tape 59) are collectively called the tapes. The types (for example, a tape width, a printing format, a tape color, a character color, and the like) of the tape that is contained in the tape cassette 30 are collectively called the tape types.

First, the tape printer 1 will be explained with reference to FIGS. 1 to 14. For ease of explanation, side walls that are formed around a cassette mounting portion 8 are shown in FIGS. 3 to 8, but these drawings are merely schematic drawings, and the side walls are shown in the drawings as being thicker than they actually are. A gear train that is shown in FIG. 3 and that includes gears 91, 93, 94, 97, 98, and 101 is actually covered up by a bottom face of a cavity 811. The bottom face of the cavity 811 is not shown in FIG. 3 because the gear train must be explained. In FIGS. 5 to 8, the tape cassette 30 that has been mounted in the cassette mounting portion 8 is shown in a state in which a top case 311 has been removed.

An overview of the configuration of the tape printer 1 will be explained. The tape printer 1 is a general-purpose tape printer in which various types of tape cassettes can be used, such as a thermal type, a receptor type, a laminated type, and the like. The thermal type of tape cassette is provided with a thermal paper tape. The receptor type of tape cassette is provided with a printing tape and an ink ribbon. The laminated type of tape cassette is provided with a double-sided adhesive tape, a film tape, and an ink ribbon.

Figure 2:
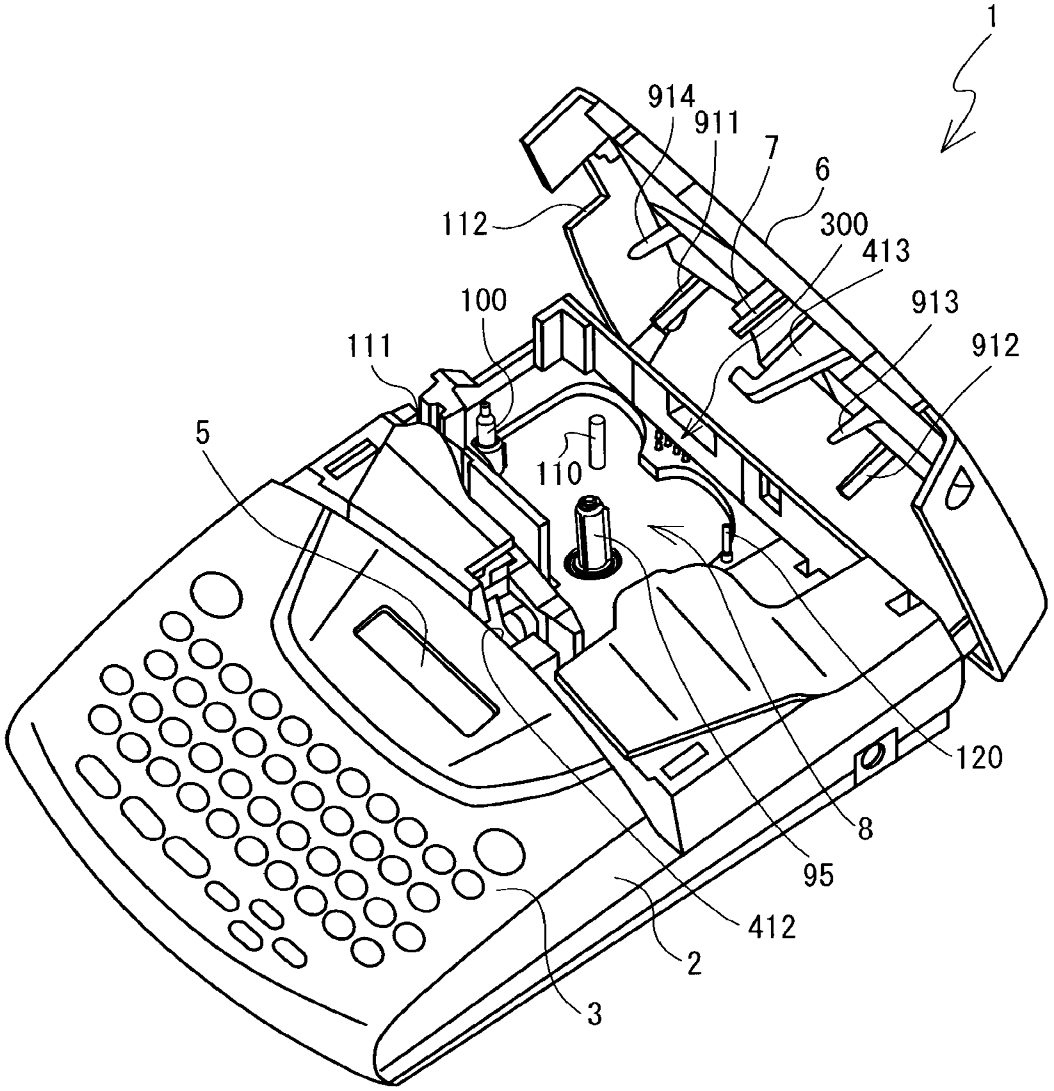
FIG. 2 is an oblique view of the tape printer 1 in which the cassette cover 6 is in an open state.
Figure 3:
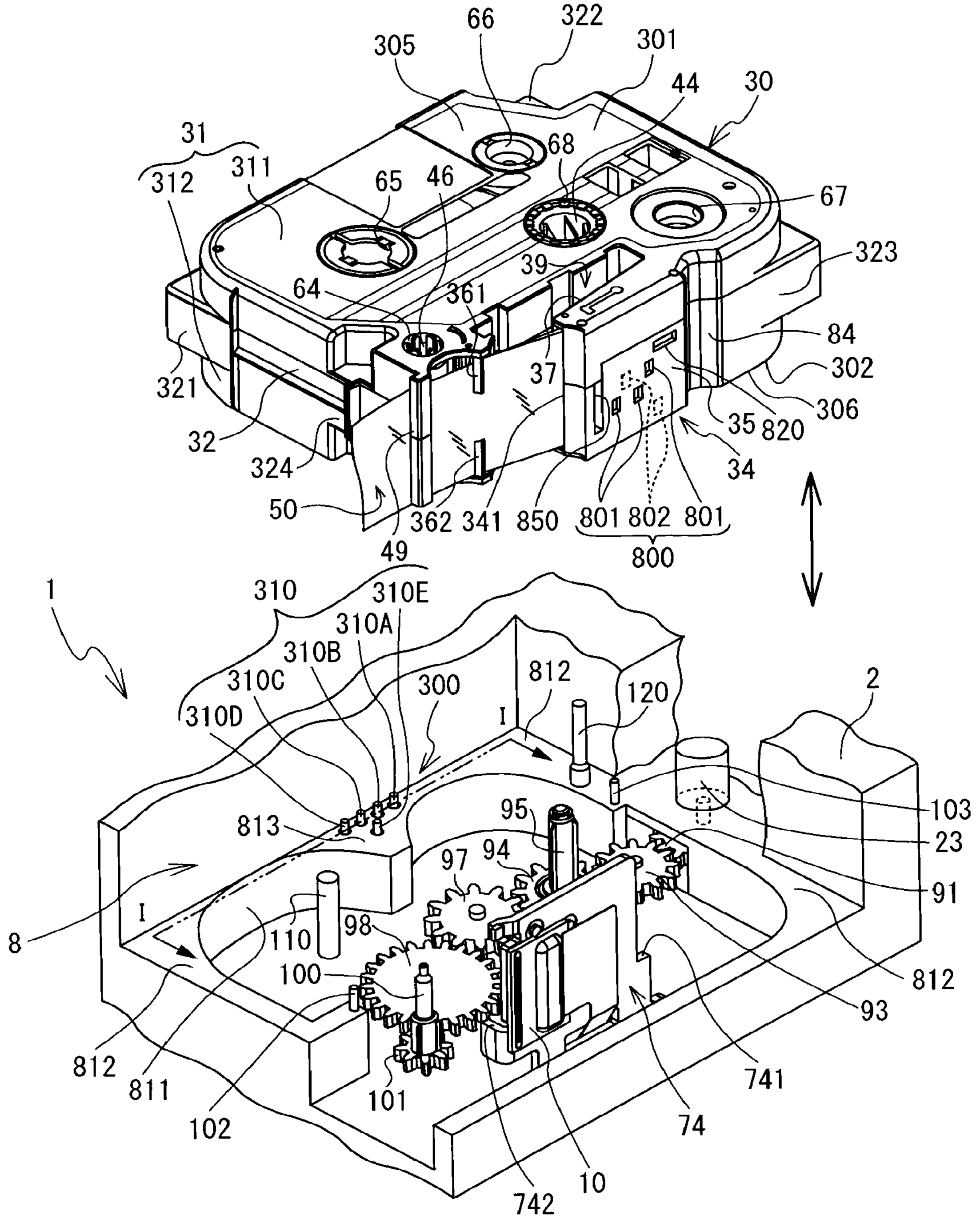
FIG. 3 is an oblique view for explaining a tape cassette 30 and a cassette mounting portion 8.

As shown in FIGS. 1 and 2, the tape printer 1 is provided with a main body cover 2 that has a roughly rectangular shape. A keyboard 3 that includes character keys and function keys is provided toward the front of the top face of the main body cover 2. To the rear of the keyboard 3, a display 5 is provided that can display the characters that are input by the keyboard 3. To the rear of the display 5, a cassette cover 6 is provided that may be opened and closed when the tape cassette 30 (refer to FIG. 3) is replaced.

The cassette cover 6 is a cover portion that is roughly rectangular in a plan view. The cassette cover 6 is axially supported at both the left and right edges of the top of the rear face of the main body cover 2, and it can rotate between a closed position that is shown in FIG. 1 and an open position that is shown in FIG. 2. The cassette mounting portion 8 that is an area into which and from which the tape cassette 30 can be mounted and removed is provided inside the main body cover 2. The cassette mounting portion 8 is covered when the cassette cover 6 is in the closed position (refer to FIG. 1) and is exposed when the cassette cover 6 is in the open position (refer to FIG. 2).

A latch lock 413, a head pressing member 7, and periphery pressing members 911 to 914 are provided on the bottom face of the cassette cover 6. The latch lock 413 is a hook-shaped member that projects downward. A lock hole 412 that corresponds to the latch lock 413 is provided on the front side of the cassette mounting portion 8 of the main body cover 2. When the cassette cover 6 is closed, the latch lock 413 is fitted into the lock hole 412, preventing the cassette cover 6 from opening on its own (refer to FIG. 1).

The head pressing member 7 and the periphery pressing members 911 to 914 are rectangular columns that project downward. When the cassette cover 6 is closed, the head pressing member 7 presses from above on a press receiving portion 393 (refer to FIG. 15) of the tape cassette 30 that has been mounted in the cassette mounting portion 8. When the cassette cover 6 is closed, the periphery pressing members 911 to 914 press from above the periphery of the tape cassette 30 that has been mounted in the cassette mounting portion 8.

A discharge slit 111 is provided to the rear of the left side face of the main body cover 2. The discharge slit 111 discharges a printed tape from the cassette mounting portion 8. A discharge window 112 is provided in the left side face of the cassette cover 6. When the cassette cover 6 is closed, the discharge window 112 exposes the discharge slit 111 to the outside.

Figure 4:
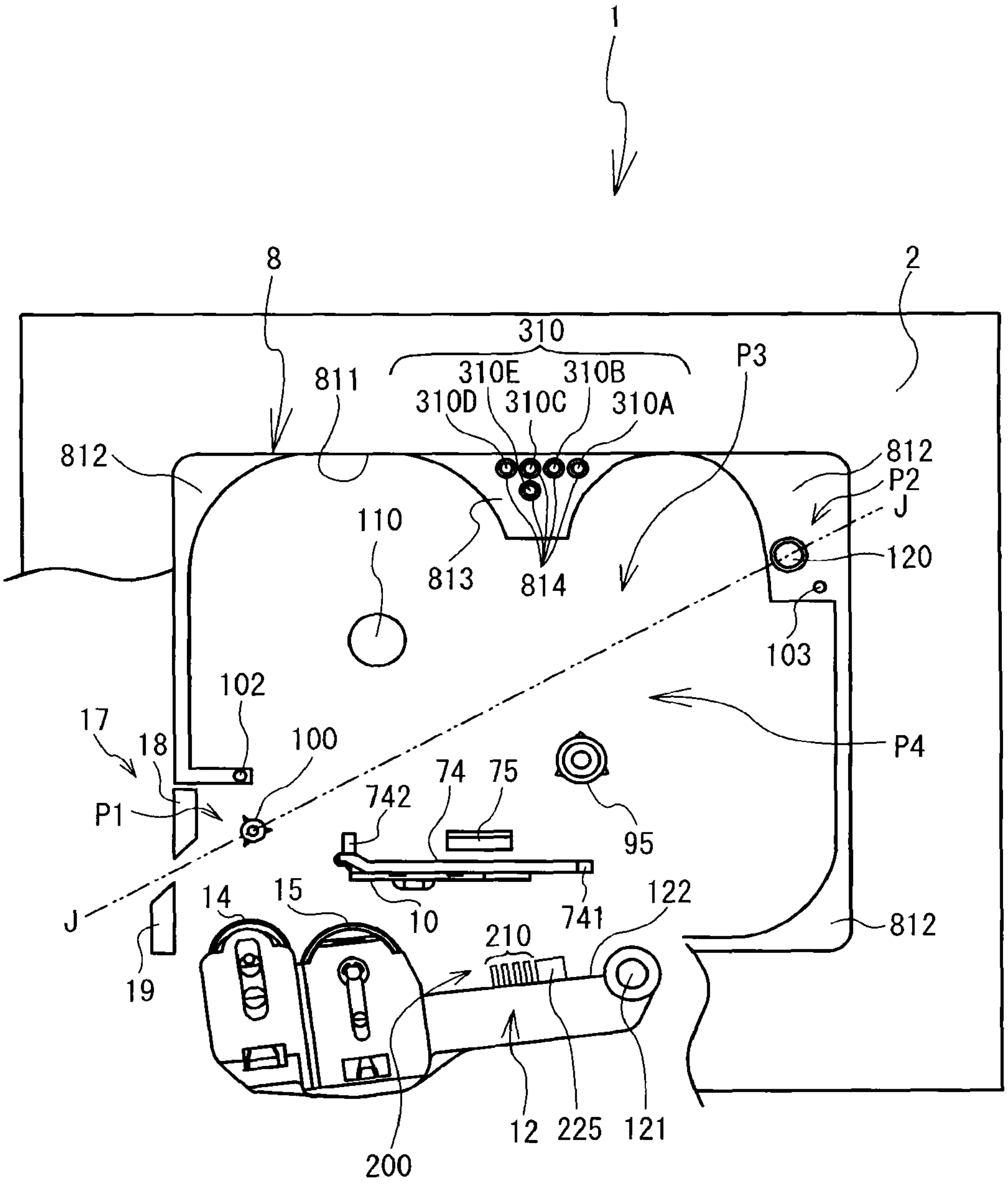
FIG. 4 is a plan view of the cassette mounting portion 8.

The internal configuration of the main body cover 2 underneath the cassette cover 6 will be explained with reference to FIGS. 3 to 8. As shown in FIGS. 3 and 4, the cassette mounting portion 8 includes a cavity 811 and a corner support portion 812. The cavity 811 is a recessed portion that has a flat bottom surface that is shaped such that it roughly corresponds to the shape of a bottom face 302 of a cassette case 31. The corner support portion 812 is a flat portion that extends horizontally from the outer edge of the cavity 811. When the tape cassette 30 is mounted in the cassette mounting portion 8, the corner support portion 812 supports the lower face of the peripheral portion of the tape cassette 30.

Two positioning pins 102, 103 are provided in two locations on the corner support portion 812. Specifically, the positioning pin 102 is provided on the left side of the cavity 811. The positioning pin 103 is provided on the right side of the cavity 811. When the tape cassette 30 is mounted in the cassette mounting portion 8, the positioning pins 102, 103 are respectively inserted into pin holes 62, 63 of the cassette case 31 (refer to FIG. 16). At this time, the positioning pins 102, 103 position the tape cassette 30 in the front-rear and left-right directions by positioning the left and right positions of the peripheral portion of the tape cassette 30.

A head holder 74 is provided in the front portion of the cassette mounting portion 8. A thermal head 10 that is provided with heating elements (not shown in the drawings) is mounted on the head holder 74. A tape drive motor 23 that is a stepping motor is provided on the outside of the cassette mounting portion 8 (on the upper right side in FIG. 3). The gear 91 is affixed to the lower end of a drive shaft of the tape drive motor 23. The gear 91 meshes with the gear 93 through an opening. The gear 93 meshes with the gear 94. The gear 94 meshes with the gear 97. The gear 97 meshes with the gear 98. The gear 98 meshes with the gear 101.

A ribbon winding shaft 95 is provided in a vertical orientation on a top face of the gear 94. The ribbon winding shaft 95 is a shaft on which a ribbon winding spool 44 can be mounted and removed. A plurality of cam members 95A are provided on the ribbon winding shaft 95, extending from a base end toward a tip end in a radiating pattern in a plan view (refer to FIG. 45). A tape drive shaft 100 is provided in a vertical orientation on a top face of the gear 101. The tape drive shaft 100 is a shaft on which a tape drive roller 46 can be mounted and removed. A plurality of cam members 100A are provided on the tape drive shaft 100, extending from a base end toward a tip end in a radiating pattern in a plan view (refer to FIG. 45).

When the tape drive motor 23 rotationally drives the gear 91 in the counterclockwise direction in a state in which the tape cassette 30 having been mounted in the cassette mounting portion 8, the ribbon winding shaft 95 is rotationally driven in the counterclockwise direction through the gear 93 and the gear 94. The ribbon winding shaft 95 rotationally drives the ribbon winding spool 44 that is mounted on the ribbon winding shaft 95. Furthermore, the rotation of the gear 94 is transmitted to the tape drive shaft 100 through the gear 97, the gear 98, and the gear 101, and the tape drive shaft 100 is rotationally driven in the clockwise direction. The tape drive shaft 100 rotationally drives the tape drive roller 46 that is mounted on the tape drive shaft 100.

An auxiliary shaft 110 is provided in a vertical orientation to the rear of the gear 98. The auxiliary shaft 110 is a roughly cylindrical shaft that can be inserted into and removed from a first tape support hole 65. A guide shaft 120 is provided in a vertical orientation on the right side of the cassette mounting portion 8 toward the rear. The guide shaft 120 is a shaft that can be inserted into and removed from a guide hole 47 (refer to FIG. 5).

Figure 45:
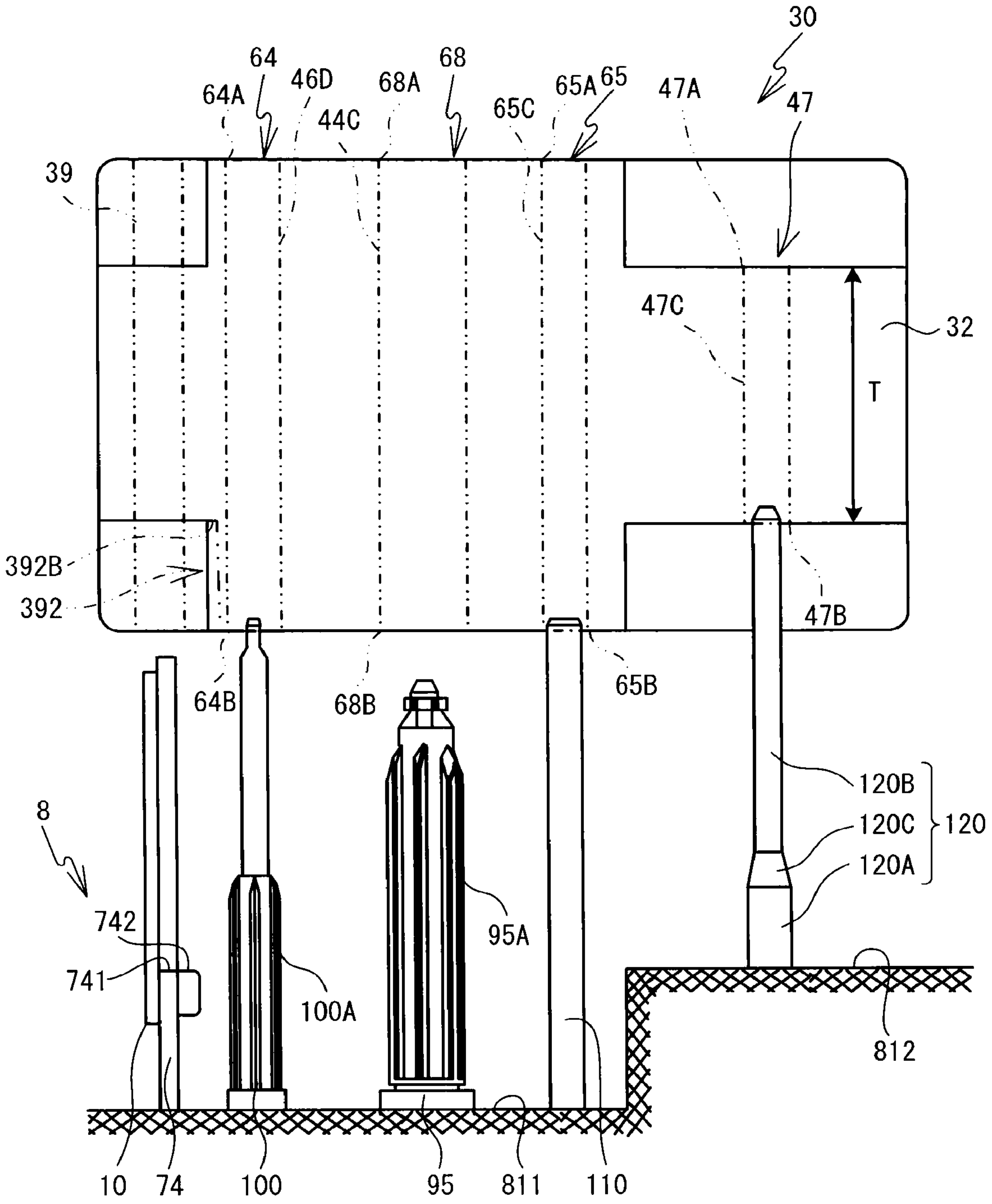
FIG. 45 is an explanatory figure of the cassette mounting portion 8 while the tape cassette 30 is being mounted, as seen from the right side.

The guide shaft 120 includes two shaft portions of different diameters (a large diameter portion 120A and a small diameter portion 120B) and a tapered portion 120C (refer to FIG. 45). The large diameter portion 120A is a shaft portion that forms a base end side of the guide shaft 120, and it has the largest diameter in the guide shaft 120. The small diameter portion 120B is a shaft portion that forms a tip end side of the guide shaft 120, and its diameter is smaller than that of the large diameter portion 120A. The tapered portion 120C is a shaft portion that is provided between the large diameter portion 120A and the small diameter portion 120B. The tapered portion 120C has a tapered face whose diameter gradually decreases from the large diameter portion 120A side toward the small diameter portion 120B side.

In a plan view, the rear edge of the cavity 811 has a shape in which two arcs are arranged side by side on the left and the right. A portion of the corner support portion 812 that is positioned between the two arcs is a rear support portion 813. When the tape cassette 30 is mounted in the cassette mounting portion 8, the rear support portion 813 supports a rear recessed portion 360 (refer to FIG. 16).

Figure 16:
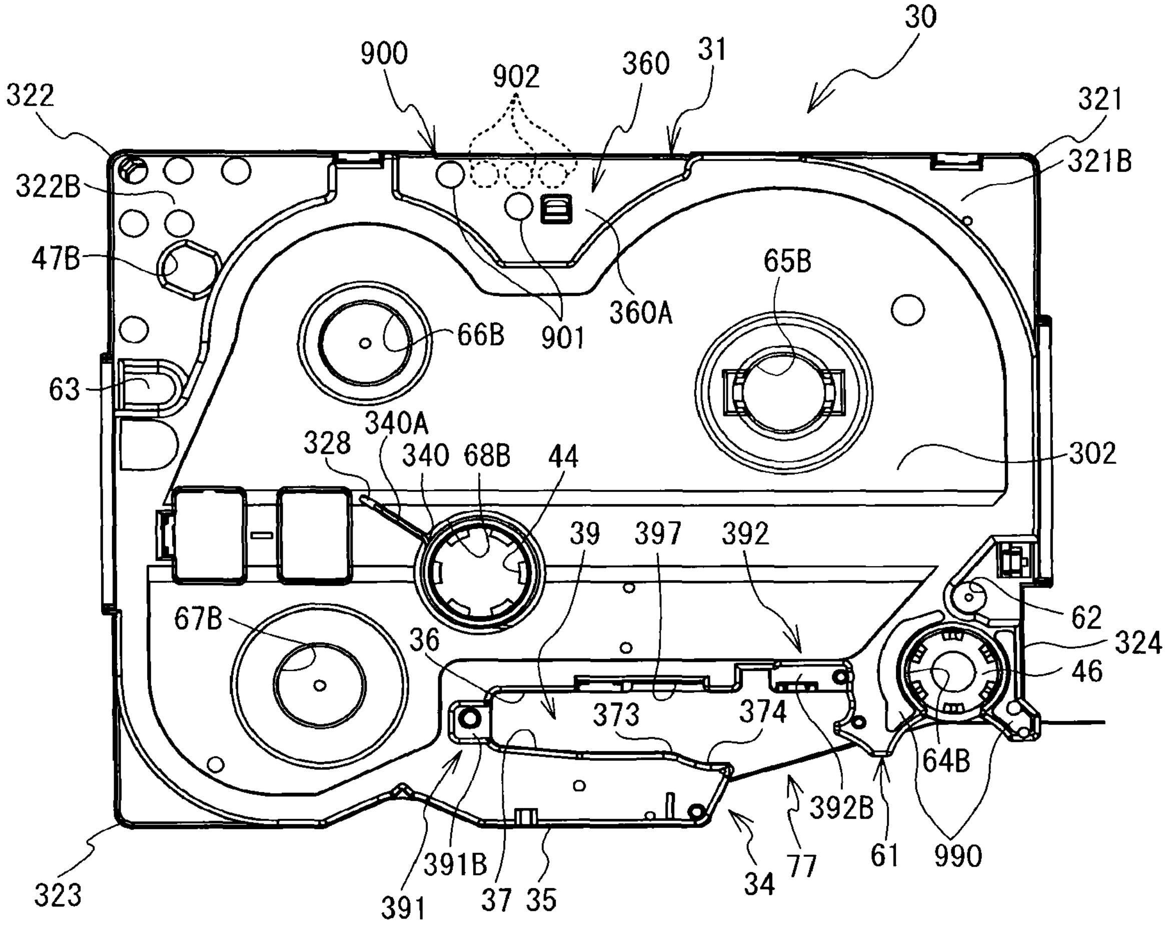
FIG. 16 is a bottom view of the tape cassette 30.

A rear detection portion 300 that includes a plurality of detection switches 310 is provided on the rear support portion 813. Switch terminals 317 of the detection switches 310 (refer to FIG. 13) project upward from the rear support portion 813. When the tape cassette 30 is mounted in the cassette mounting portion 8, the switch terminals 317 are positioned opposite the bottom face 302 (more specifically, a rear stepped wall 360A that is shown in FIG. 16). Hereinafter, the detection switches 310 that are provided in the rear detection portion 300 will be called the rear detection switches 310. The rear detection portion 300 according to the present embodiment includes five rear detection switches 310A to 310E.

As shown in FIGS. 4 to 8, a cassette hook 75 is provided in a vertical orientation to the rear of the head holder 74. The cassette hook 75 is provided with a projecting portion 751 and a hook portion 752 (refer to FIG. 49). The projecting portion 751 is a plate-shaped piece that projects upward in a roughly vertical direction from the bottom surface of the cavity 811 (not shown in the drawings). The hook portion 752 is a projecting portion that is roughly triangular in a sectional view and that projects toward the rear (toward the left in FIG. 49) from the upper end portion of the projecting portion 751. The projecting portion 751 is flexible in the front-rear direction (the up-down direction in FIG. 4). When the tape cassette 30 is mounted in the cassette mounting portion 8, the hook portion 752 is engaged by a latch portion 397 (refer to FIG. 49).

An arm-shaped platen holder 12 is provided in front of the head holder 74. The platen holder 12 is supported such that the platen holder 12 can swing around a shaft support portion 121. On a leading end side of the platen holder 12, a platen roller 15 and a movable feed roller 14 are rotatably supported. The platen roller 15 is opposed to the thermal head 10, and is able to come into contact with and separate from the thermal head 10. The movable feed roller 14 is opposed to the tape drive roller 46 that is mounted on the tape drive shaft 100, and is able to come into contact with and separate from the tape drive roller 46.

Figure 5:
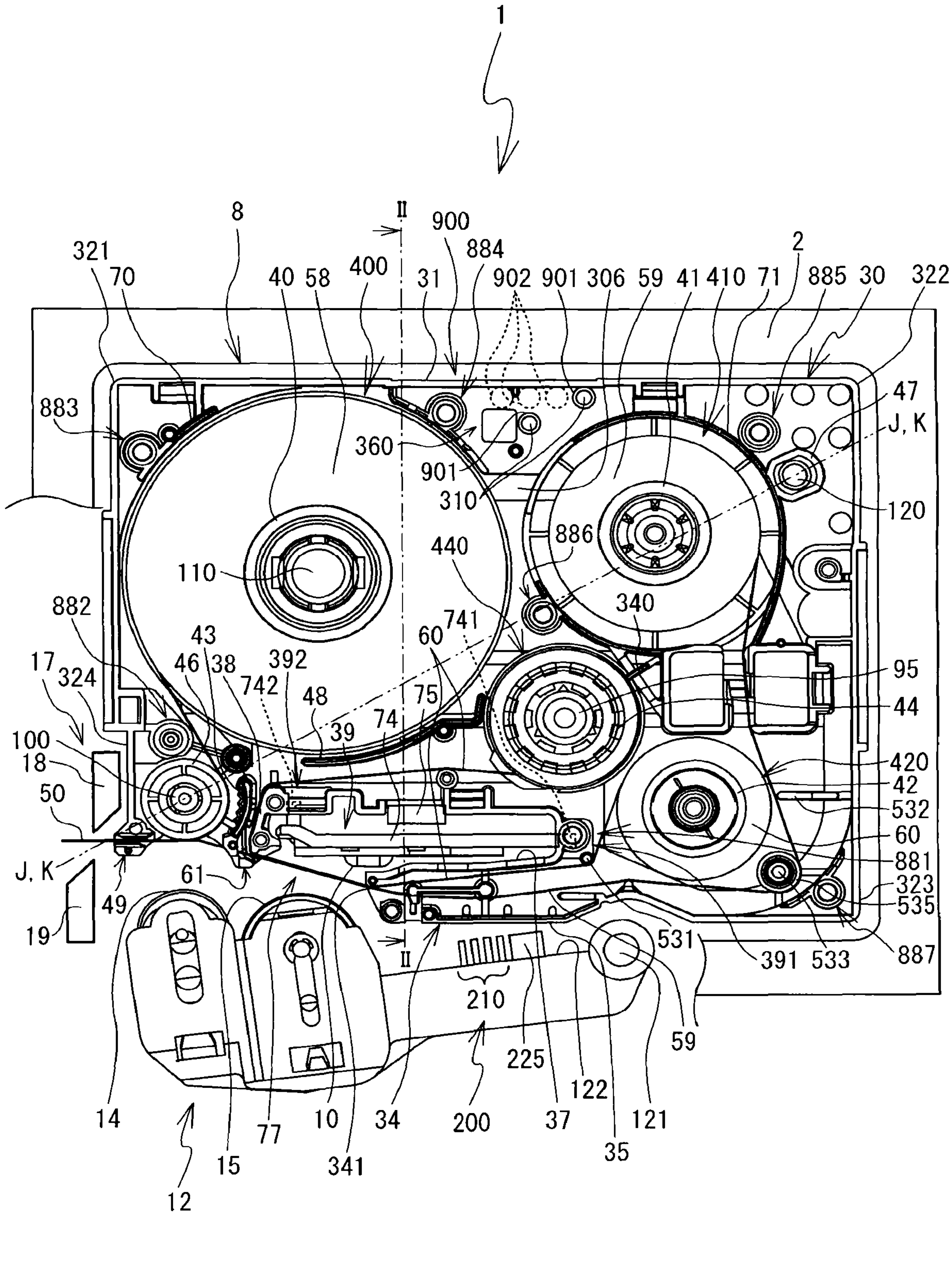
FIG. 5 is a plan view of the cassette mounting portion 8 in which the tape cassette 30 of a laminated type has been mounted, in a case where a platen holder 12 is in a standby position.

A release lever that is not shown in the drawings and that moves in the left-right direction in conjunction with the opening and closing of the cassette cover 6 is coupled to the platen holder 12. When the cassette cover 6 is opened, the release lever moves to the right, and the platen holder 12 moves toward a standby position that is shown in FIG. 5. In the standby position that is shown in FIG. 5, the platen holder 12 is separated from the cassette mounting portion 8, so a person can mount the tape cassette 30 in and remove the tape cassette 30 from the cassette mounting portion 8. The platen holder 12 is constantly elastically urged toward the standby position by a coil spring that is not shown in the drawings.

Figure 6:
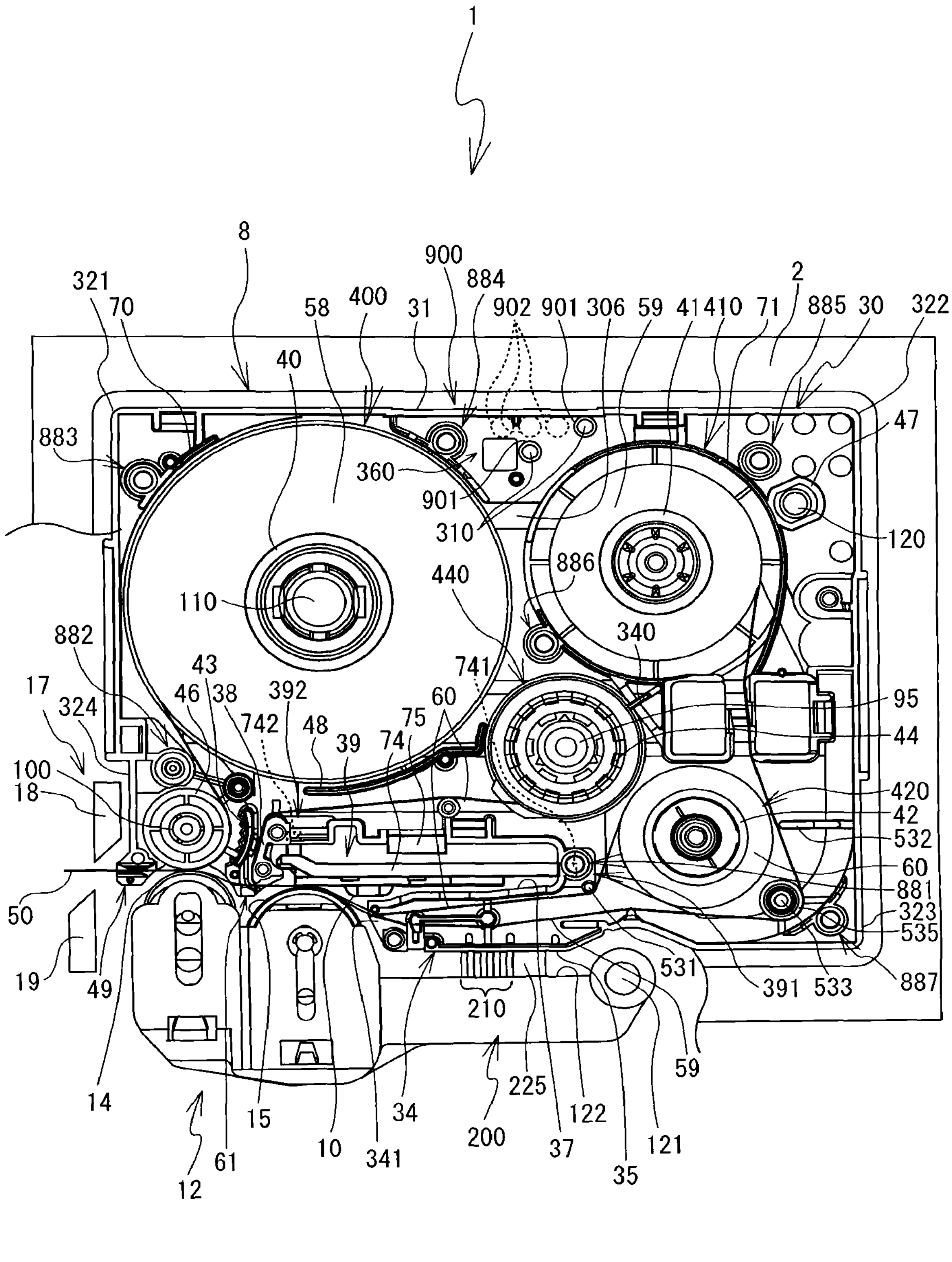
FIG. 6 is a plan view of the cassette mounting portion 8 in which the tape cassette 30 of the laminated type has been mounted, in a case where the platen holder 12 is in a printing position.
Figure 7:
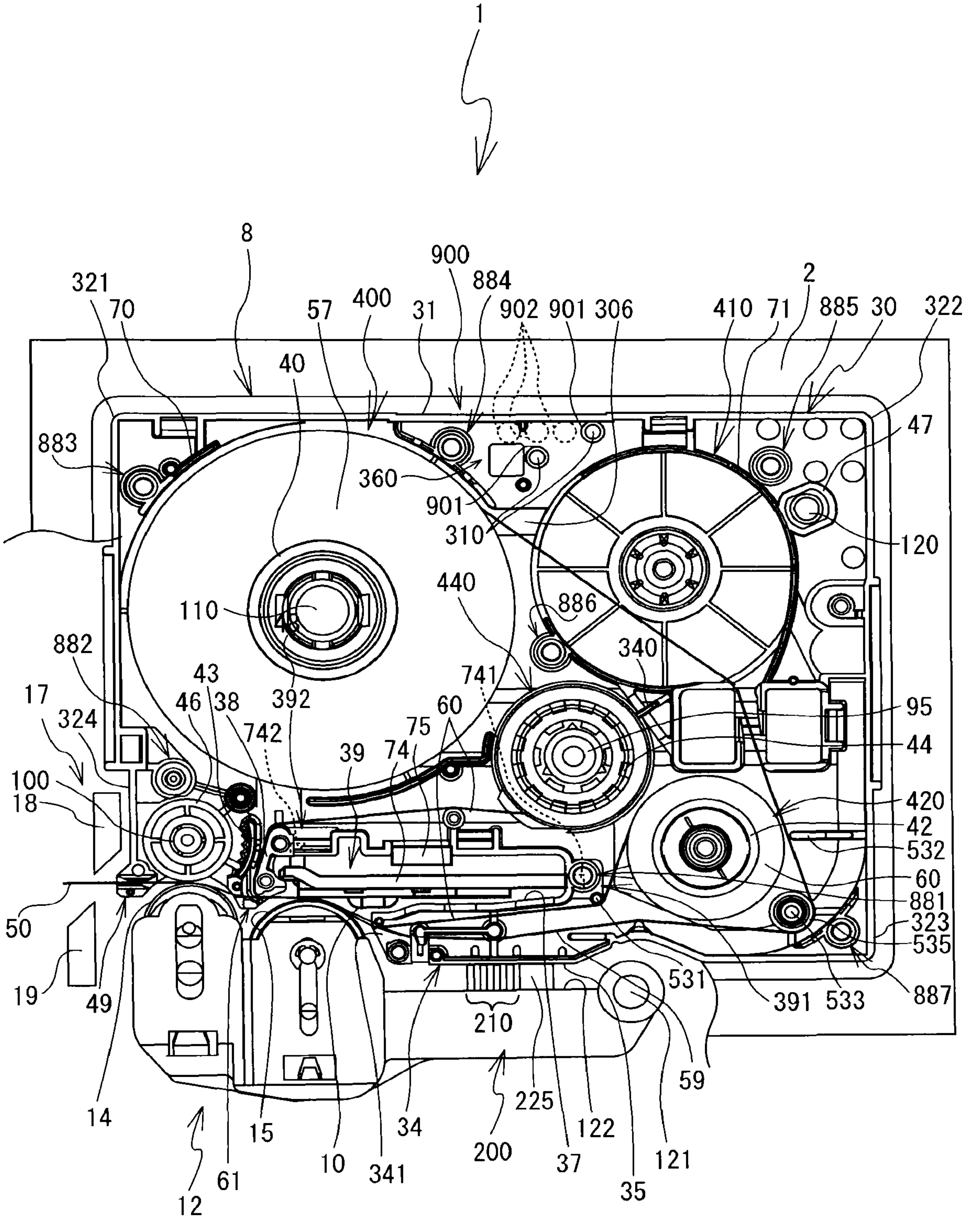
FIG. 7 is a plan view of the cassette mounting portion 8 in which the tape cassette 30 of a receptor type has been mounted, in a case where the platen holder 12 is in the printing position.
Figure 8:
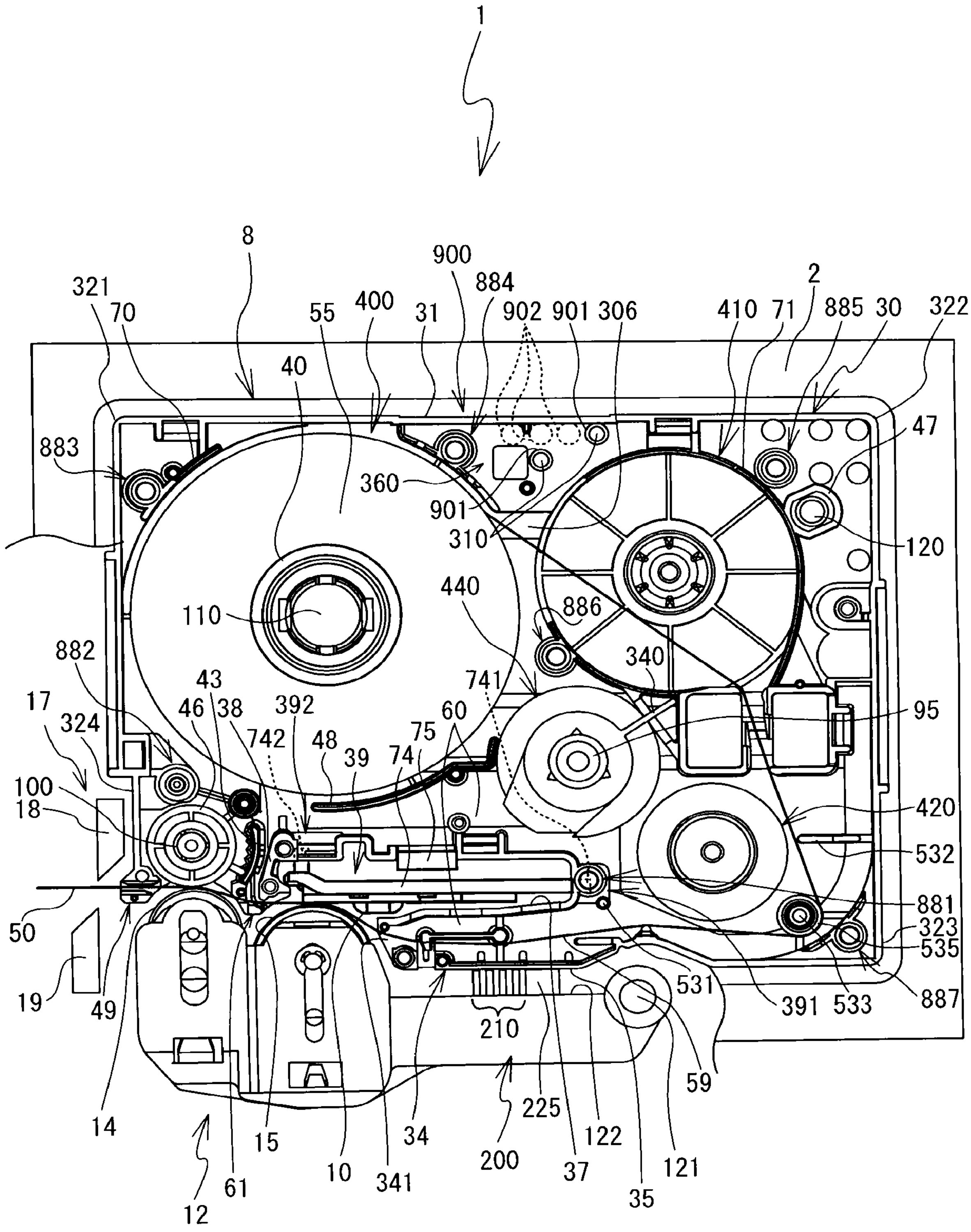
FIG. 8 is a plan view of the cassette mounting portion 8 in which the tape cassette 30 of a thermal type has been mounted, in a case where the platen holder 12 is in the printing position.

When the cassette cover 6 is closed, the release lever moves to the left, and the platen holder 12 moves toward a printing position that is shown in FIGS. 6 to 8. In the printing position that is shown in FIGS. 6 to 8, the platen holder 12 is in proximity to the cassette mounting portion 8. Specifically, when the tape cassette 30 of the laminated type is mounted in the cassette mounting portion 8, as shown in FIG. 6, the platen roller 15 presses the film tape 59 and an ink ribbon 60 against the thermal head 10. At the same time, the movable feed roller 14 presses the double-sided adhesive tape 58 and the film tape 59 against the tape drive roller 46.

When the tape cassette 30 of the receptor type is mounted in the cassette mounting portion 8, as shown in FIG. 7, the platen roller 15 presses the printing tape 57 and the ink ribbon 60 against the thermal head 10. At the same time, the movable feed roller 14 presses the printing tape 57 against the tape drive roller 46. When the tape cassette 30 of the thermal type is mounted in the cassette mounting portion 8, as shown in FIG. 8, the platen roller 15 presses the thermal paper tape 55 against the thermal head 10. At the same time, the movable feed roller 14 presses the thermal paper tape 55 against the tape drive roller 46.

In the printing position that is shown in FIGS. 6 to 8, it is possible for the tape printer 1 to perform printing using the tape cassette 30 that has been mounted in the cassette mounting portion 8. The thermal paper tape 55, the printing tape 57, the double-sided adhesive tape 58, the film tape 59, and the ink ribbon 60 will be described in detail later.

A cutting mechanism 17 that cuts a printed tape 50 at a specified position is provided to the right of the discharge slit 111 (refer to FIG. 2). The cutting mechanism 17 has a fixed blade 18 and a movable blade 19. The movable blade 19 is able to move in the front-rear direction (the up-down direction in FIGS. 4 to 8) in an opposing position to the fixed blade 18.

As shown in FIGS. 4 to 8, an arm detection portion 200 that includes a plurality of detection switches 210 is provided on the rear side surface of the platen holder 12, slightly to the right of a central position in the long direction of the platen holder 12. Hereinafter, the rear side surface of the platen holder 12, that is, the surface of the platen holder 12 that is positioned opposite the thermal head 10, will be called a cassette facing surface 122. Switch terminals 222 of the detection switches 210 (refer to FIG. 12) project roughly horizontally toward the cassette mounting portion 8 from the cassette facing surface 122.

In other words, the switch terminals 222 project in a direction that is approximately orthogonal to a direction in which the tape cassette 30 is mounted and removed in relation to the cassette mounting portion 8 (the up-down direction in FIG. 3). When the tape cassette 30 is mounted in the cassette mounting portion 8, the switch terminals 222 are positioned opposite the front face (more specifically, an arm front face wall 35) of the tape cassette 30. Hereinafter, the detection switches 210 that are provided in the arm detection portion 200 will be called the arm detection switches 210. The arm detection portion 200 according to the present embodiment includes five arm detection switches 210A to 210E.

Figure 9:
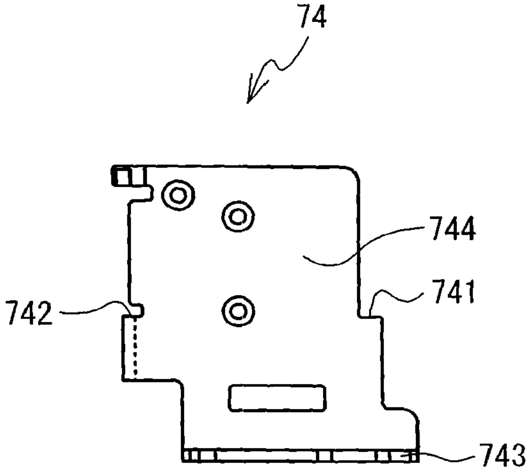
FIG. 9 is a front view of a head holder 74.
Figure 10:
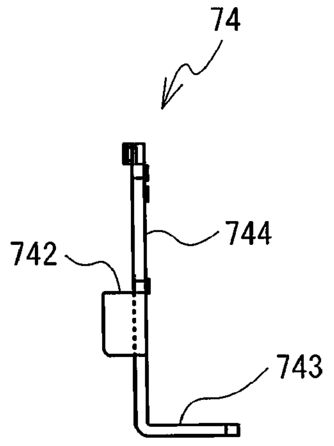
FIG. 10 is a left side view of the head holder 74.

The head holder 74 will be explained in detail with reference to FIGS. 9 and 10. As shown in FIGS. 9 and 10, the head holder 74 is formed from a single plate-shaped member and includes a base portion 743 and a head fixing portion 744. The base portion 743 is fastened below the bottom face of the cavity 811 (not shown in the drawings). The head fixing portion 744 is bent such that it is approximately orthogonal to and extends upward from the base portion 743, and it is oriented in the left-right direction.

When the tape cassette 30 is mounted in the cassette mounting portion 8, the head holder 74 is inserted into a head insertion portion 39. However, in the state in which the head holder 74 has been inserted into the head insertion portion 39, the right end portion of the head holder 74 extends farther to the right than does the right end portion of the head insertion portion 39. The thermal head 10 is fixed to the front surface of the head fixing portion 744 (refer to FIGS. 5 to 8).

A first support portion 741 and a second support portion 742 are provided on the head fixing portion 744. The first support portion 741 and the second support portion 742 support, from below, the tape cassette 30 that has been mounted in the tape printer 1. The first support portion 741 is a stepped portion that is formed at a specified height by cutting out a portion of the right edge of the head fixing portion 744 to form an L-shape in a front view. The second support portion 742 is an extending piece that has a rectangular shape in a side view that is bent toward the rear from the left edge portion of the head fixing portion 744 such that it is approximately orthogonal to the head fixing portion 744. The first support portion 741 and the second support portion 742 are provided at the same position in the vertical direction (at the same height position).

In other words, the first support portion 741 and the second support portion 742 extend in directions that are approximately orthogonal to one another in a plan view. The first support portion 741 and the second support portion 742 support that tape cassette 30 at the same height position on an upstream side and a downstream side, respectively, of the thermal head 10 in the tape feed direction. The first support portion 741 and the second support portion 742 are provided at positions that are separated from the vertical midpoint of the thermal head 10 by a specified distance in the vertical direction. Accordingly, the first support portion 741 and the second support portion 742 serve as references for positioning the tape cassette 30 in the vertical direction in relation to the vertical midpoint of the thermal head 10.

Figure 11:
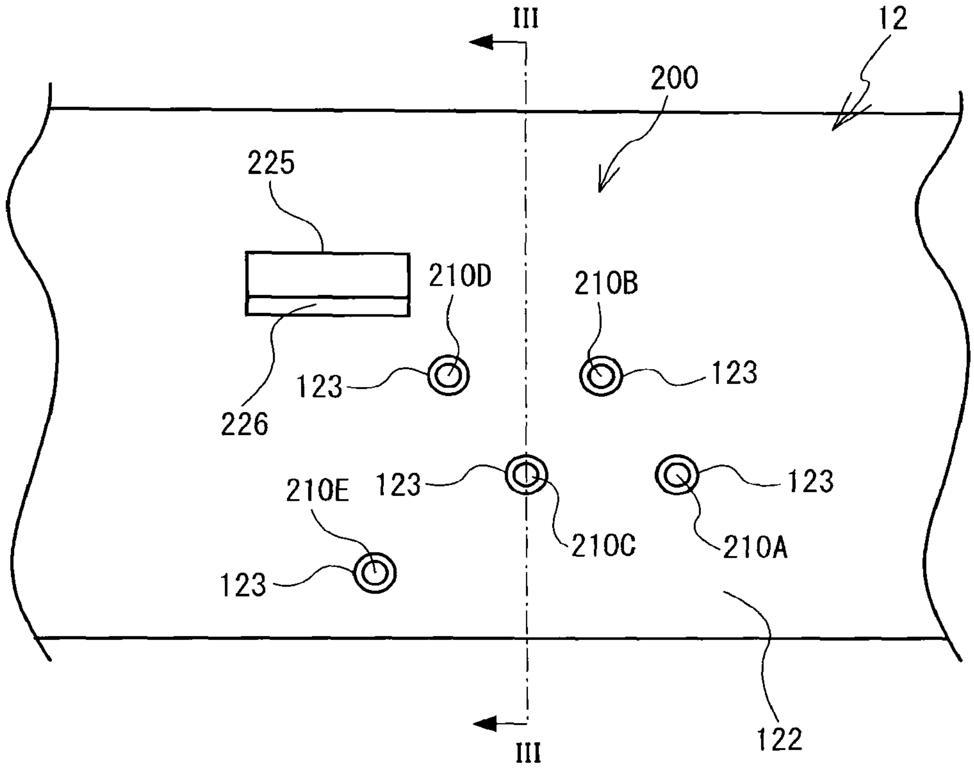
FIG. 11 is a rear view of the platen holder 12.

The arm detection switches 210 will be explained in detail with reference to FIGS. 11 and 12. As shown in FIG. 11, five through holes 123 are provided in the cassette facing surface 122 of the platen holder 12, arrayed in three horizontal rows in the vertical direction. Specifically, two of the through holes 123 are in the top row, two are in the middle row, and one is in the bottom row. The positions of the through holes 123 in the left-right direction are all different.

Specifically, starting from the right side of the cassette facing surface 122 (the left side in FIG. 11), the five through holes 123 are arranged in a zigzag pattern, in order from the bottom row, to the right end of the top row, to the right end of the middle row, to the left end of the top row, to the left end of the middle row. In correspondence to the five through holes 123, the five arm detection switches 210A, 210B, 210C, 210D, 210E are provided in order starting from the left side of the cassette facing surface 122 (the right side in FIG. 11).

Figure 12:
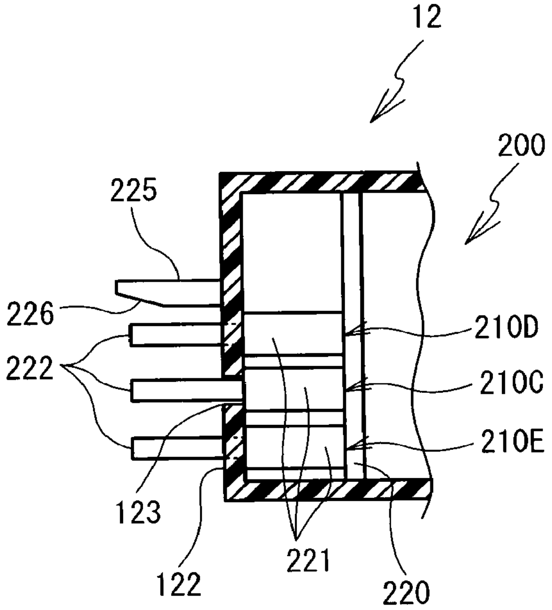
FIG. 12 is a sectional view along a line III-III in FIG. 11 as seen in the direction of the arrows.

As shown in FIG. 12, the arm detection switches 210 are provided with bodies 221 and the switch terminals 222. The bodies 221 are cylindrical bodies that are installed horizontally in the interior of the platen holder 12. The front ends (the right side ends in FIG. 12) of the bodies 221 are fastened to a switch support plate 220 that is provided in the interior of the platen holder 12.

The switch terminals 222 are rod-shaped bodies that are provided at the rear ends of the bodies 221 (the left side in FIG. 12), and they can advance and retract roughly horizontally through the through holes 123. The switch terminals 222 are constantly maintained in a state of protruding toward the rear (the left side in FIG. 12) from the bodies 221 by spring members (not shown in the drawings) that are provided in the interiors of the bodies 221. When the switch terminal 222 is not being pressed from the rear, it is in the state of protruding from the body 221 (an off state), and when the switch terminal 222 is being pressed from the rear, it is in the state of being pushed into the body 221 (an on state).

In a case where the tape cassette 30 has been mounted in the cassette mounting portion 8, when the platen holder 12 moves toward the stand-by position (refer to FIG. 5), the arm detection switches 210 become separated from the tape cassette 30 and thus they come into the off state. When the platen holder 12 moves toward the printing position (refer to FIGS. 6 to 8), the arm detection switches 210 are selectively pressed by an arm indicator portion 800 that will be described later (refer to FIG. 3). The tape printer 1 then detects the type of the tape in the tape cassette 30 based on a combination of the on and off states of the arm detection switches 210.

As shown in FIGS. 11 and 12, a latch piece 225 that is a projecting portion that extends in the left-right direction is provided on the cassette facing surface 122 of the platen holder 12. Specifically, the latch piece 225 is formed as an integral part of the platen holder 12, such that it projects toward the rear (the left side in FIG. 12) from the cassette facing surface 122. In other words, the latch piece 225 projects roughly horizontally toward the cassette mounting portion 8 from the cassette facing surface 122, in the same manner as the switch terminals 222. The distance that the latch piece 225 projects toward the rear from the cassette facing surface 122 is slightly greater than the distance that the switch terminals 222 project toward the rear from the cassette facing surface 122.

The latch piece 225 includes an inclined portion 226 in which a portion of the bottom face of the latch piece 225 is inclined in relation to the horizontal direction, such that the thickness of the latch piece 225 decreases gradually toward the tip end side (the left side in FIG. 12). The latch piece 225 is provided at a height position that corresponds to a latch hole 820 (refer to FIG. 3) in a state in which the tape cassette 30 has been mounted in a proper position in the cassette mounting portion 8. In the present embodiment, the latch piece 225 is disposed at a position on the cassette facing surface 122 such that it is higher in the up-down direction than the arm detection switches 210 in the top row and overlaps the arm detection switch 210 in the bottom row in the left-right direction.

The rear detection switches 310 will be explained in detail with reference to FIGS. 4 and 13. As shown in FIG. 4, five through holes 814 are provided in the rear support portion 813 such that they are arranged in two rows in the front-rear direction. Specifically, four of the through holes 814 are disposed in a rear row, and one is disposed in a front row. In correspondence to the through holes 814, the four rear detection switches 310A to 310D are arrayed in a single row along the rear edge of the rear support portion 813, in order starting from the right side (the left side in FIG. 13), and the one remaining rear detection switch 310E is positioned in front of the rear detection switch 310C, the second from the left.

Figure 13:
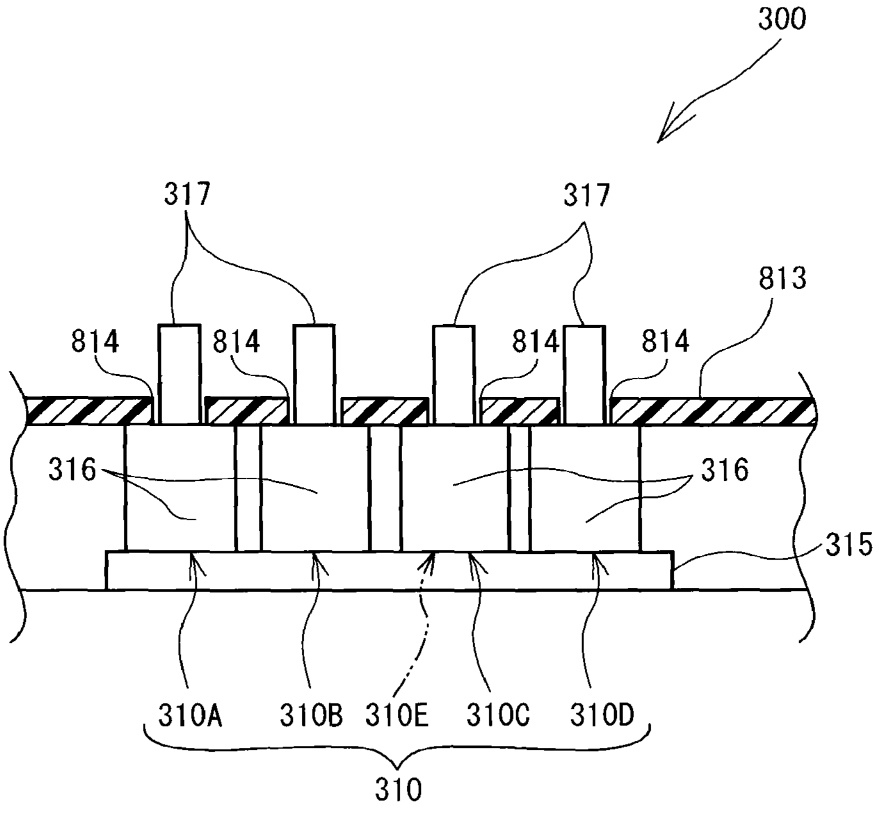
FIG. 13 is a sectional view along a line I-I in FIG. 3 as seen in the direction of the arrows.

As shown in FIG. 13, the rear detection switches 310 are provided with bodies 316 and switch terminals 317. The bodies 316 are cylindrical bodies that are installed vertically underneath the rear support portion 813. The bottom ends of the bodies 316 are fastened to a switch support plate 315 that is installed in the interior of the main body cover 2.

The switch terminals 317 are rod-shaped bodies that are provided at the upper ends of the bodies 316, and they can advance and retract in the up-down direction through the through holes 814. The switch terminals 317 are constantly maintained in a state of protruding upward from the bodies 316 by spring members (not shown in the drawings) that are provided in the interiors of the bodies 316. When the switch terminal 317 is not being pressed from above, it is in the state of protruding from the body 316 (an off state), and when the switch terminal 317 is being pressed from above, it is in the state of being pushed into the body 316 (an on state).

In a case where the tape cassette 30 has not been mounted in the cassette mounting portion 8, the rear detection switches 310 are all in the off state, because they are separated from the tape cassette 30. When the tape cassette 30 is mounted in the proper position in the cassette mounting portion 8, the rear detection switches 310 are selectively pressed by a rear indicator portion 900 that will be described later (refer to FIG. 16). The tape printer 1 thus detects the type of the tape in the tape cassette 30 based on a combination of the on and off states of the rear detection switches 310.

The positional relationships of various vertically oriented members that are provided in the cassette mounting portion 8 will be explained with reference to FIG. 4. The two-dot chain line in FIG. 4 indicates a parting line J that is a virtual line that connects the tape drive shaft 100 and the guide shaft 120 in a plan view. The tape drive shaft 100, the guide shaft 120, the auxiliary shaft 110, the ribbon winding shaft 95, and the head holder 74 are provided in positions that respectively correspond to a roller support hole 64, the guide hole 47, the first tape support hole 65, a winding spool support hole 68, and the head insertion portion 39 in a state in which the tape cassette 30 has been mounted in the cassette mounting portion 8 (refer to FIG. 45).

The tape drive shaft 100 is provided in an area P1 that includes a corner portion that is positioned in the left front part of the cassette mounting portion 8. The area P1 is positioned to the left of the head holder 74, which is fixed in the center of the front portion of the cassette mounting portion 8. In other words, the area P1 is positioned to the downstream side of the printing position of the thermal head 10 in the tape feed direction. The guide shaft 120 is provided in an area P2 that includes a corner portion that is positioned in the right rear part of the cassette mounting portion 8. In other words, when the cassette mounting portion 8 is seen in a plan view, the corner portion that is included in the area P2 is positioned diagonally opposite the corner portion that is included in the area P1.

In a plan view, in a case where the cassette mounting portion 8 is divided by the parting line J, the area to the rear of the parting line J is an area P3, and the area in front of the parting line J is an area P4. The auxiliary shaft 110 is provided in the area P3, more specifically, to the left rear from the center of the cassette mounting portion 8 in a plan view. The ribbon winding shaft 95 is provided in the area P4, more specifically, to the right front from the center of the cassette mounting portion 8 in a plan view. In other words, in a plan view, the auxiliary shaft 110 and the ribbon winding shaft 95 are positioned generally symmetrically on either side of the parting line J.

The positioning pin 102 is provided immediately to the rear of the tape drive shaft 100. The positioning pin 103 is provided immediately in front of the guide shaft 120. The positioning pins 102, 103 position the tape cassette 30 that has been mounted in the cassette mounting portion 8 at points that are close to the tape drive shaft 100 and the guide shaft 120, respectively.

Figure 14:
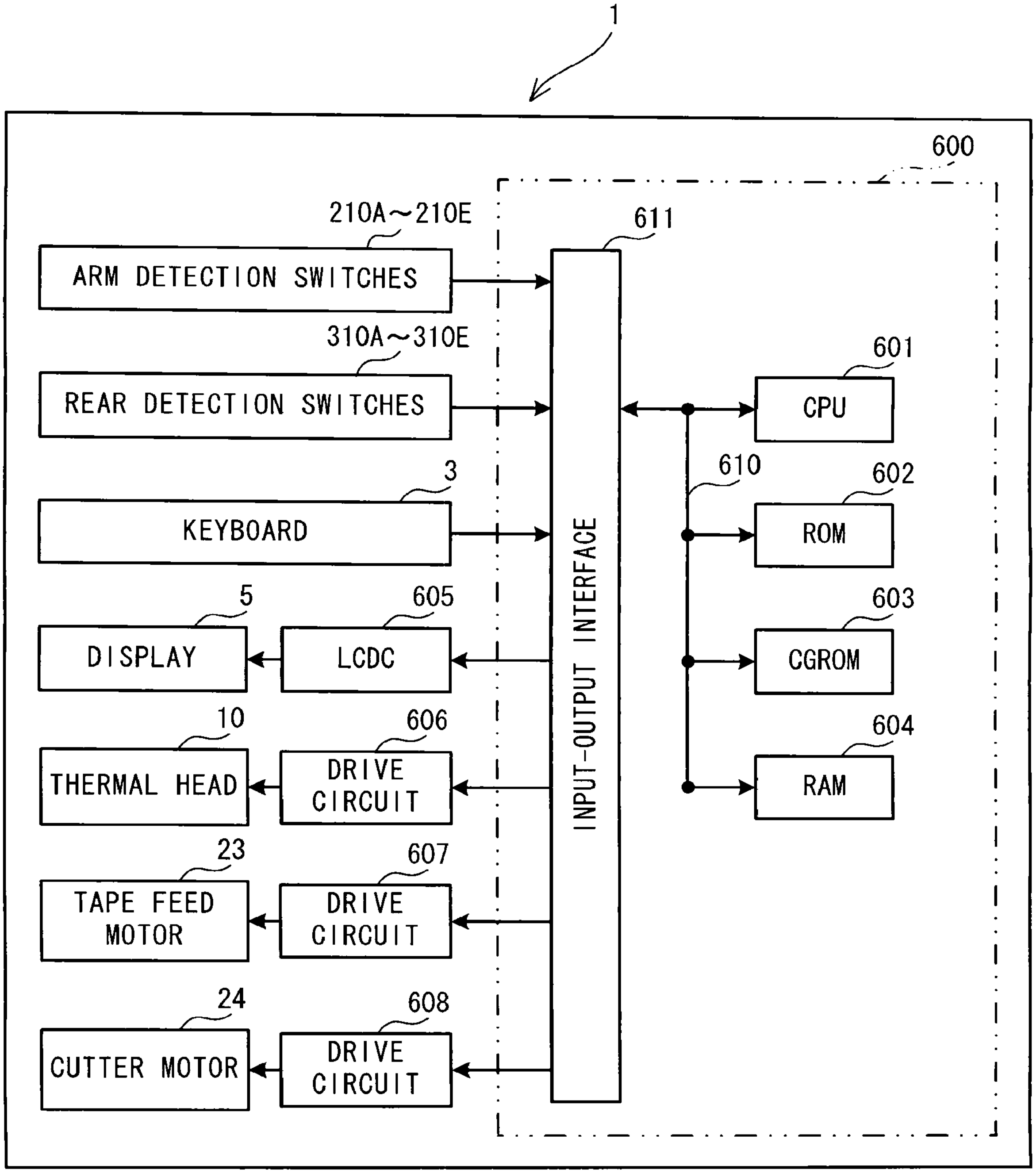
FIG. 14 is a block diagram that shows an electrical configuration of the tape printer 1.

An electrical configuration of the tape printer 1 will be explained with reference to FIG. 14. As shown in FIG. 14, the tape printer 1 is provided with a control circuit 600 that is formed on a control board. In the control circuit 600, a ROM 602, a CGROM 603, a RAM 604, and an input-output interface 611 are connected to a CPU 601 through a data bus 610.

Various types of programs that the CPU 601 executes in order to control the tape printer 1 are stored in the ROM 602. Tables (refer to FIGS. 40, 44) for specifying the type of tape in the tape cassette 30 that is mounted in the cassette mounting portion 8 are also stored in the ROM 602. Printing dot pattern data for printing characters are stored in the CGROM 603. A plurality of storage areas are provided in the RAM 604 for a text memory, a character buffer, and the like.

The arm detection switches 210A to 210E, the rear detection switches 310A to 310E, the keyboard 3, a liquid crystal drive circuit (LCDC) 605, drive circuits 606, 607, 608, and the like are connected to the input-output interface 611. The drive circuit 606 is an electronic circuit for operating the thermal head 10. The drive circuit 607 is an electronic circuit for operating the tape drive motor 23. The drive circuit 608 is an electronic circuit for operating a cutter motor 24. The cutter motor 24 causes the moving blade 19 to move in the front-rear direction in order to cut the printed tape 50. The LCDC 605 includes a video RAM (not shown in the drawings) for outputting display data to the display 5.

Figure 18:
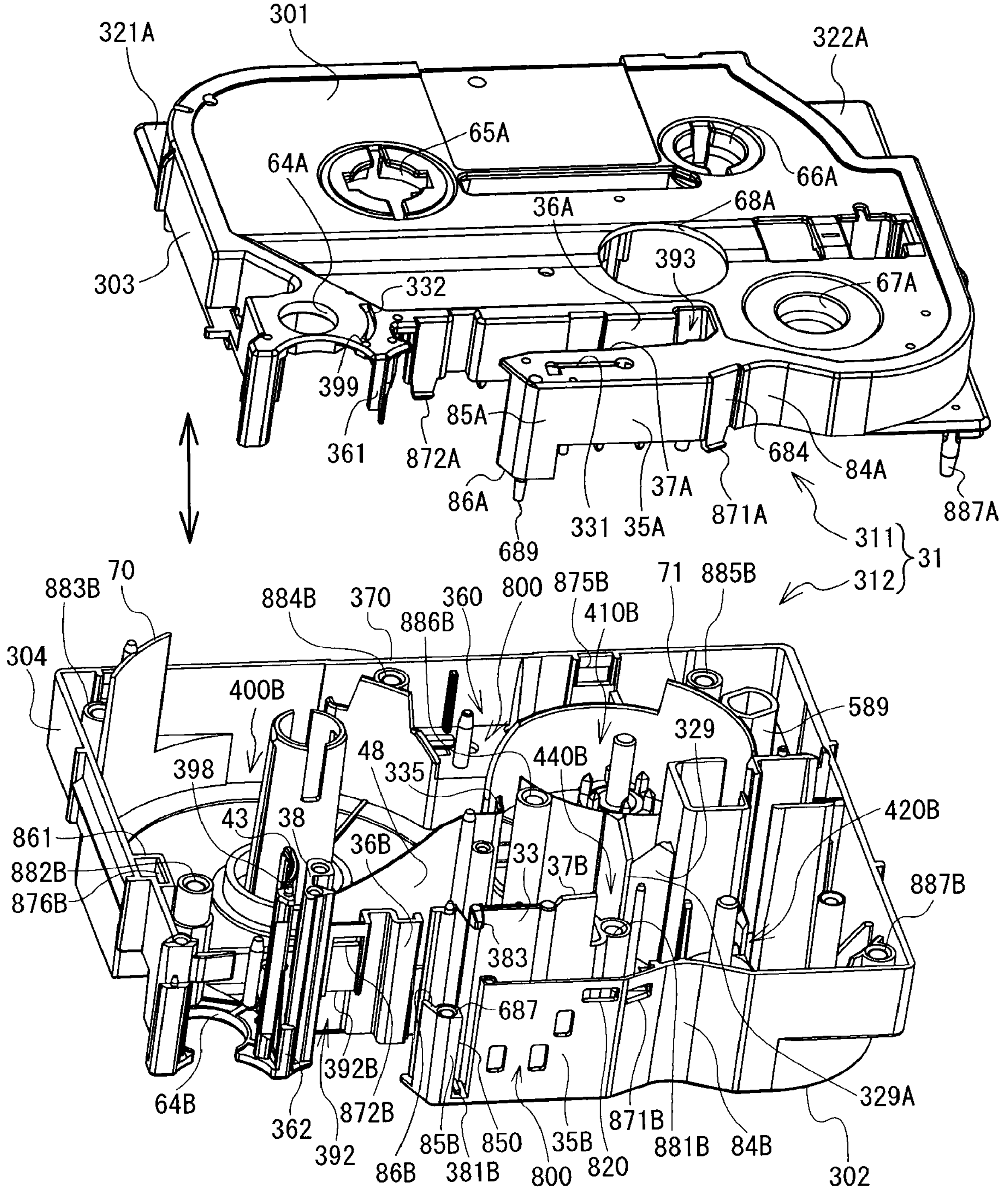
FIG. 18 is an oblique view of a cassette case 31 in a state of being separated into a top case 311 and a bottom case 312.
Figure 19:
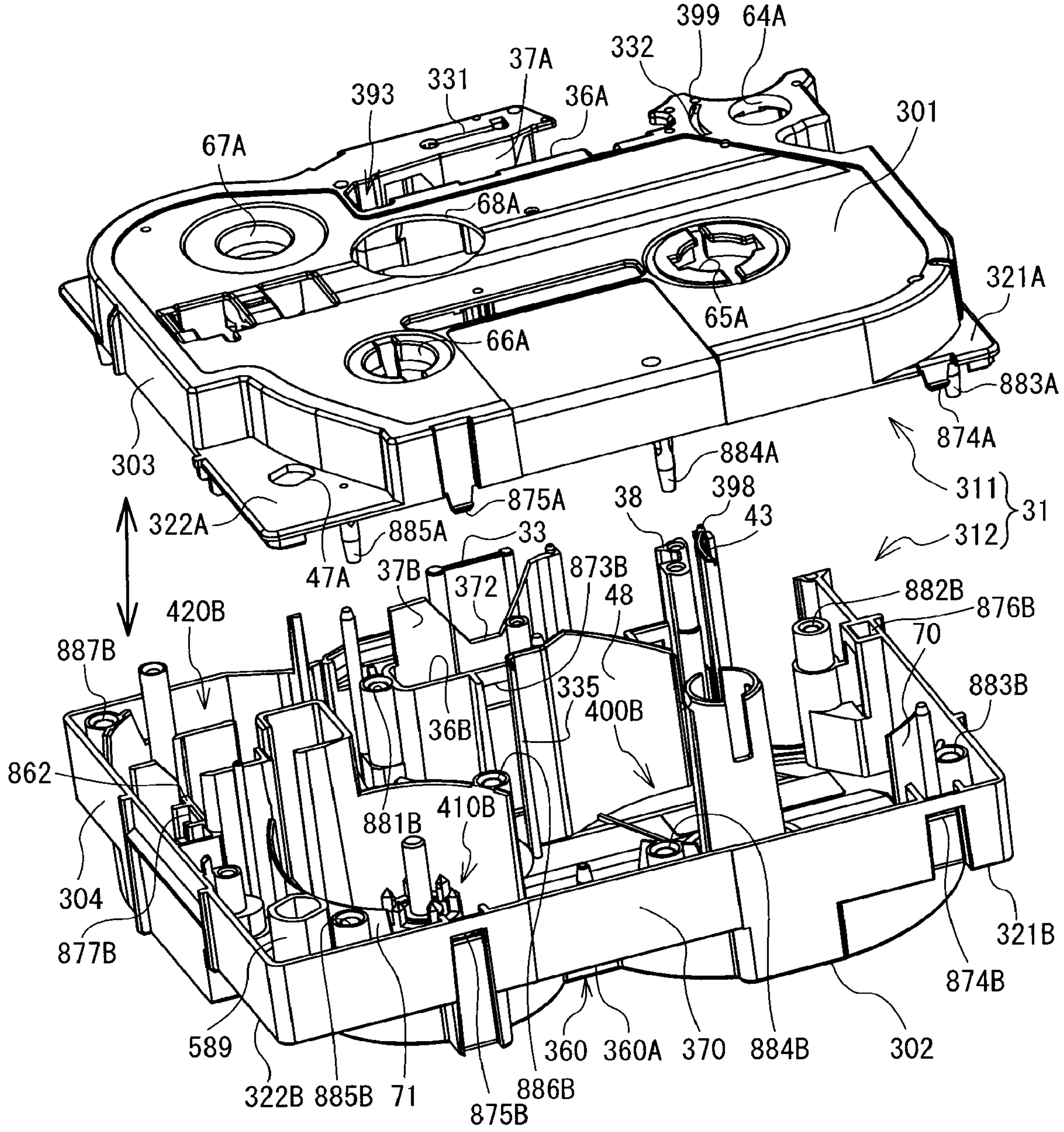
FIG. 19 is another oblique view of the cassette case 31 in a state of being separated into the top case 311 and the bottom case 312.
Figure 27:
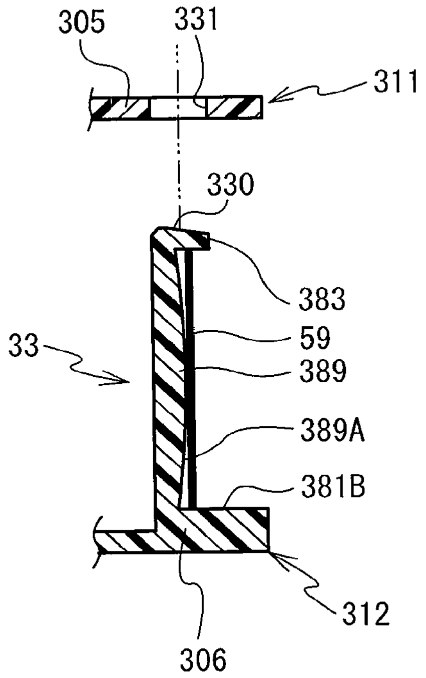
FIG. 27 is a side sectional view of a separating wall 33 of the bottom case 312 and a corresponding portion of the top case 311.
Figure 28:
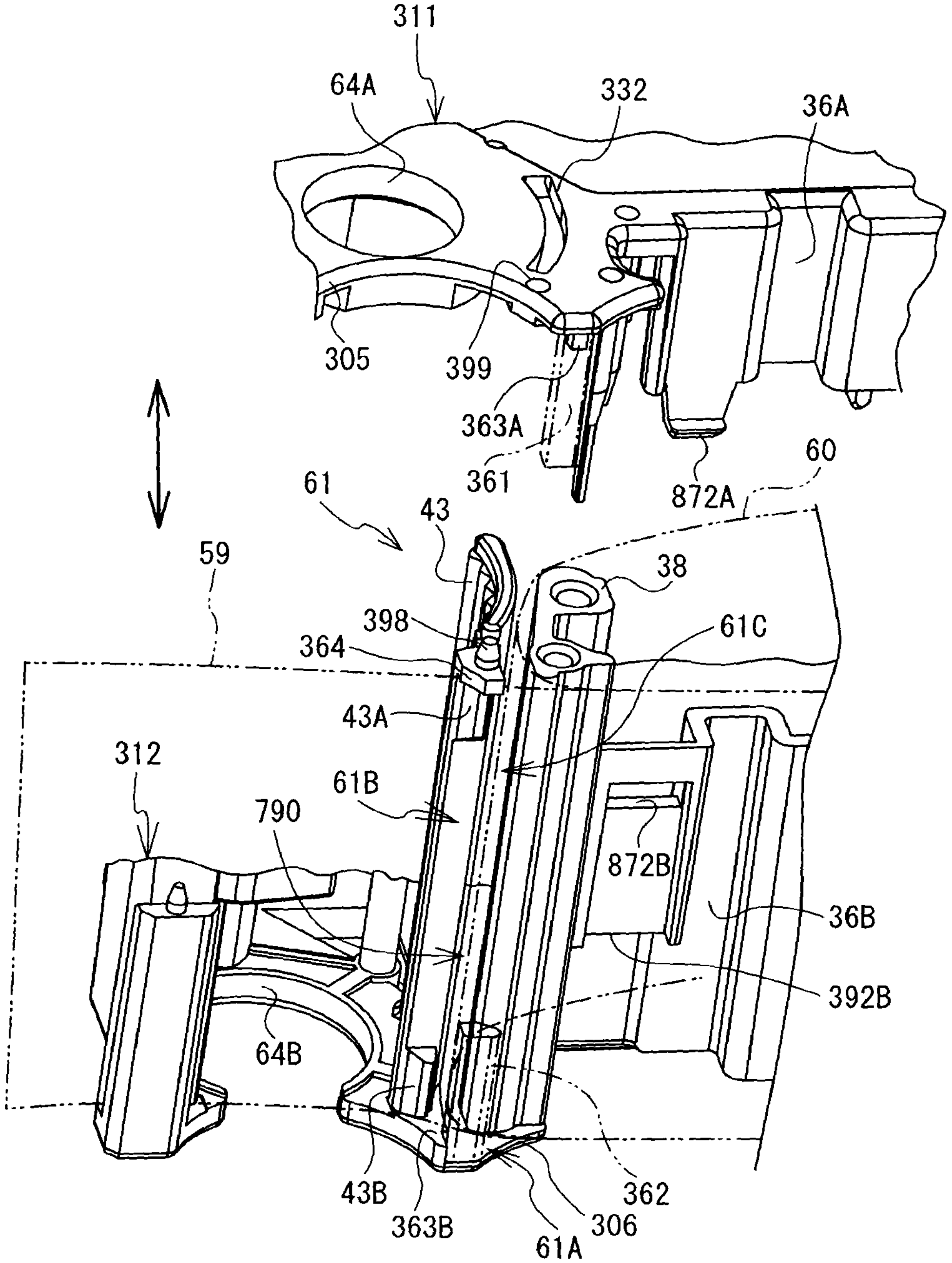
FIG. 28 is an oblique view of a separator portion 61 in a state in which the top case 311 and the bottom case 312 are separated.
Figure 29:
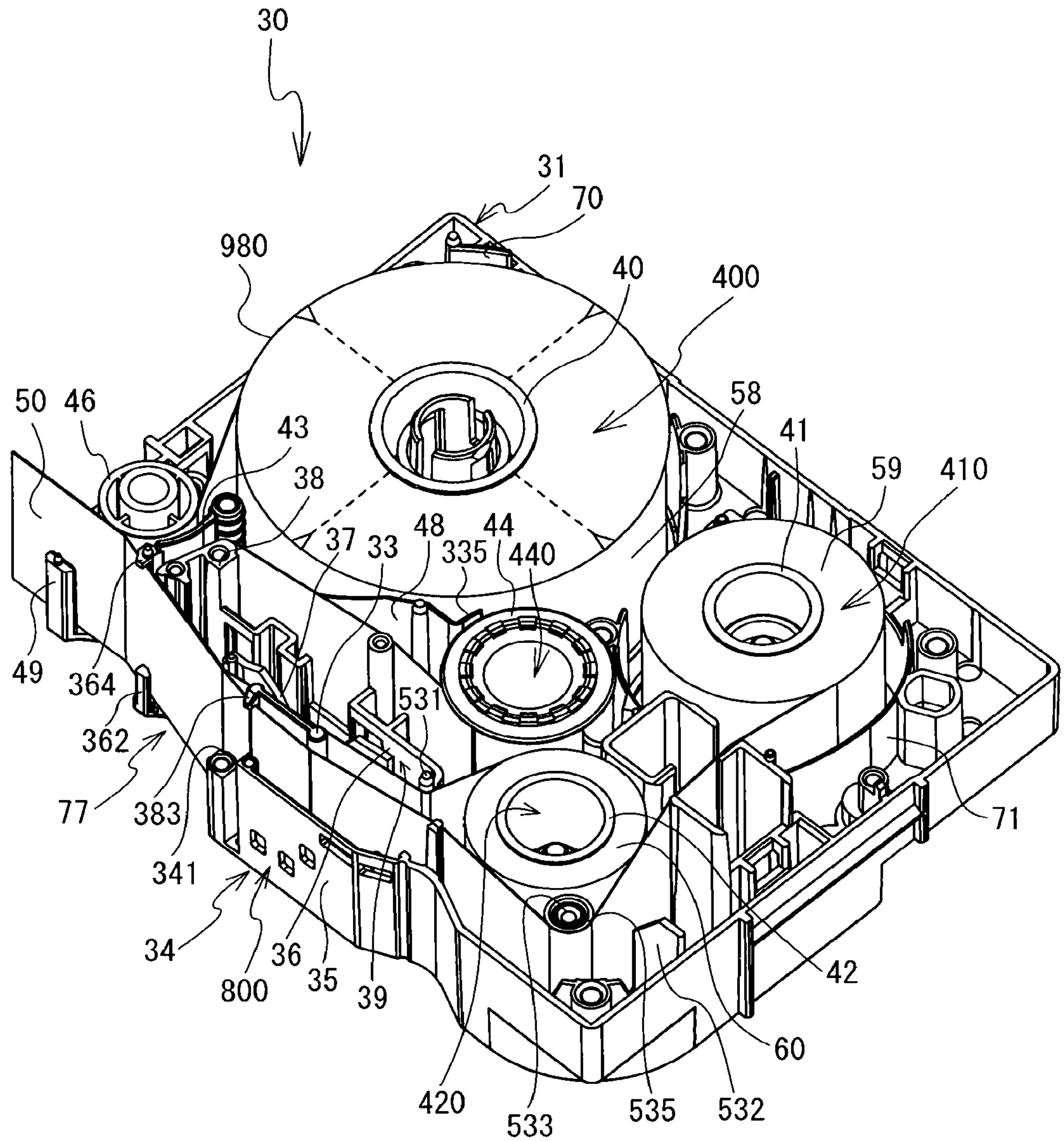
FIG. 29 is an oblique view of the tape cassette 30 in a state in which the top case 311 has been removed.

Next, the tape cassette 30 will be explained with reference to FIGS. 3, 5 to 8, and 15 to 44. In FIGS. 18, 19, and 32, to facilitate the explanation, the cassette case 31, separated into the top case 311 and the bottom case 312, is shown without the tapes and spools that are contained in its interior. However, in FIG. 32, the film tape 59, the ink ribbon 60, and the members that are associated with them are shown. In FIG. 28, in a configuration of an area around a separator portion 61, the film tape 59, the ink ribbon 60, and restraining members 361, 362 are indicated by virtual lines. In FIG. 29, the laminated type of the tape cassette 30 is shown with the top case 311 removed.

The overall configuration of the tape cassette 30 will be explained. The tape cassette 30 is a general-purpose cassette that can be assembled as the previously described thermal type tape, receptor type tape, laminated type tape, and the like by modifying, as desired, the type of the tape that is contained in the interior of the tape cassette 30, the presence or absence of an ink ribbon, and the like.

As shown in FIGS. 3 and 15 to 17, the tape cassette 30 includes the cassette case 31, which is a housing. The overall shape of the cassette case 31 is a roughly rectangular parallelepiped shape (box-like shape), with corner portions that are rounded in a plan view. The cassette case 31 includes the top case 311 and the bottom case 312. The bottom case 312 includes a bottom plate 306 (refer to FIG. 20) that forms the bottom face 302 of the cassette case 31. The top case 311 is affixed to the upper part of the bottom case 312 and includes a top plate 305 (refer to FIG. 22) that forms a top face 301 of the cassette case 31. A distance from the bottom face 302 to the top face 301 is called a height of the tape cassette 30 and the cassette case 31.

The cassette case 31 according to the present embodiment is enclosed by a perimeter wall that forms a side face around the entire perimeter of the top plate 305 and the bottom plate 306, but it is not absolutely necessary for the entire perimeter to be enclosed. For example, an opening that exposes the interior of the cassette case 31 to the outside may be provided in a portion of the perimeter wall (in a rear face, for example), and a boss for connecting the top plate 305 and the bottom plate 306 may be provided in a position that faces the opening.

The cassette case 31 has four corner portions 321 to 324 that are formed to have the same width (the same length in the up-down direction) regardless of the type of the tape in the tape cassette 30. Hereinafter, the left rear corner portion will be called the first corner portion 321, the right rear corner portion will be called the second corner portion 322, the right front corner portion will be called the third corner portion 323, and the left front corner portion will be called the fourth corner portion 324. The first to the third corner portions 321 to 323 project toward the outside from the side faces of the cassette case 31, such that they form right angles in a plan view. The fourth corner portion 324 does not form a right angle, because a discharge guide portion 49 is provided at that corner. The bottom faces of the corner portions 321 to 324 are portions that are supported by the corner support portion 812 when the tape cassette 30 is mounted in the cassette mounting portion 8.

As shown in FIG. 16, the pin holes 62, 63 that respectively correspond to the positioning pins 102, 103 of the tape printer 1 are provided in two locations on the bottom faces of the fourth corner portion 324 and the second corner portion 322. Specifically, a recessed portion that is provided in the bottom face of the fourth corner portion 324 is the pin hole 62 into which the positioning pin 102 is inserted. A recessed portion that is provided in the bottom face of the second corner portion 322 is the pin hole 63 into which the positioning pin 103 is inserted.

Figure 17:
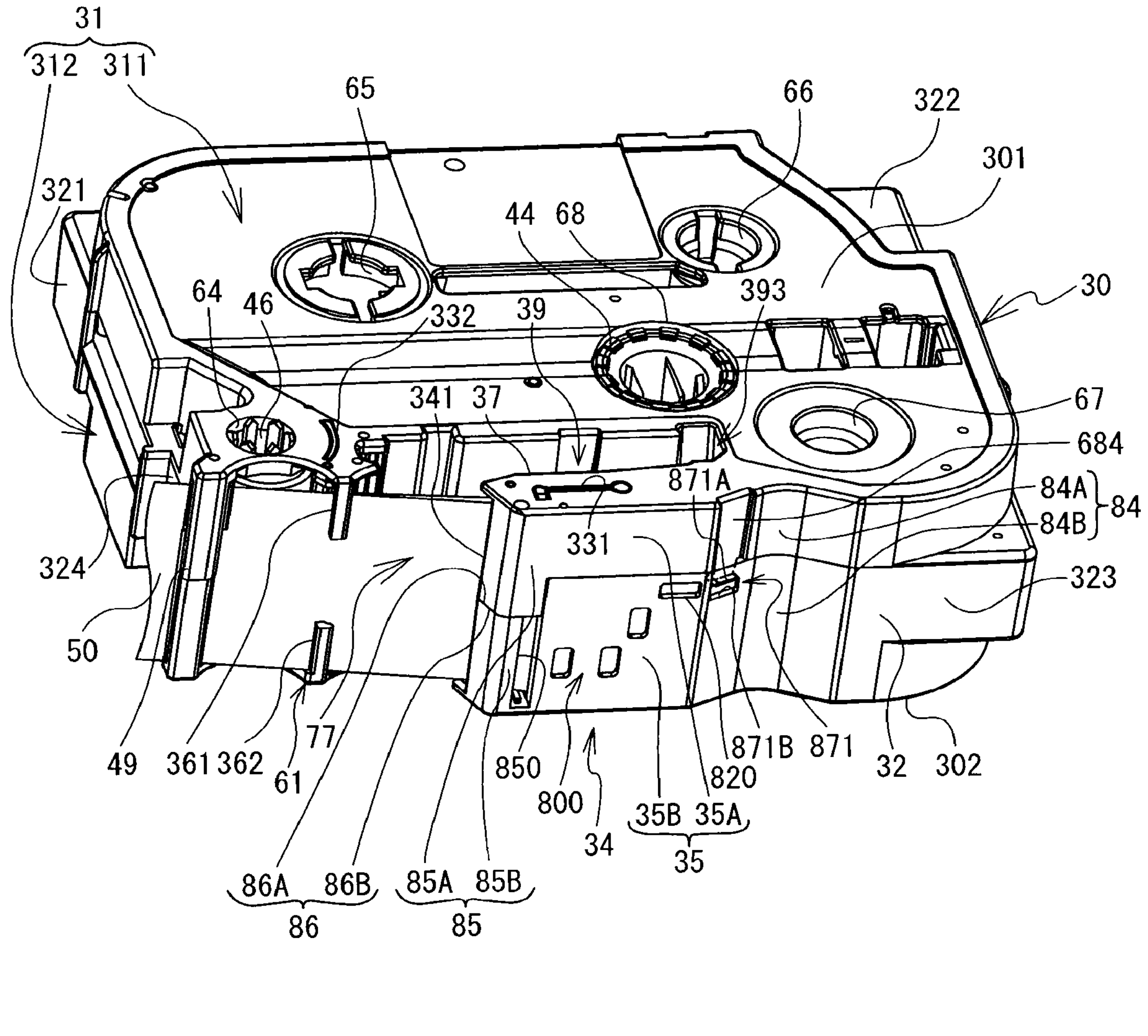
FIG. 17 is an oblique view of the tape cassette 30 from above.

As shown in FIGS. 3 and 17, a portion (that includes the corner portions 321 to 324) that extends around the side faces of the entire cassette case 31 at the same position in the vertical direction of the cassette case 31 (that is, in the height direction in which the top face 301 and the bottom face 302 face one another) as the corner portions 321 to 324, and with the same width as the corner portions 321 to 324, is called a common portion 32. Specifically, the common portion 32 is a portion that has symmetrical widths in the vertical direction in relation to a center line N that demarcates the center of the cassette case 31 in the up-down direction (refer to FIG. 39). The height of the tape cassette 30 varies according to the width of the tape that is contained in the cassette case 31. However, the width T (the length in the vertical direction) of the common portion 32 is set to be the same, regardless of the width of the tape that is contained in the cassette case 31.

To put it concrete terms, as the width of the tape in the tape cassette 30 increases (for example, 18 millimeters, 24 millimeters, 36 millimeters), the height of the cassette case 31 increases accordingly. However, the width T of the common portion 32 (refer to FIG. 39) is fixed, at 12 millimeters, for example, irrespective of the tape width. Note that in a case where the tape width is less than the width T of the common portion 32 (for example, 6 millimeters, 12 millimeters), the height (that is, the width) of cassette case 31 remains fixed at a size that is equal to the width T of the common portion 32 plus a specified width. In that case, the height of the cassette case 31 is at its lowest value.

Four support holes 65 to 68 are provided in the cassette case 31 in order to rotatably support the spools that are mounted in the cassette case 31. Hereinafter, holes that are provided in the left rear portion, the right rear portion, and the right front portion of the cassette case 31 are respectively called the first tape support hole 65, a second tape support hole 66, and a ribbon support hole 67. A hole that is provided between the first tape support hole 65 and the ribbon support hole 67 in a plan view is called the winding spool support hole 68.

The first tape support hole 65 rotatably supports a first tape spool 40 (refer to FIG. 5). The second tape support hole 66 rotatably supports a second tape spool 41 (refer to FIG. 5). The ribbon support hole 67 rotatably supports a ribbon spool 42 (refer to FIG. 5). The winding spool support hole 68 rotatably supports the ribbon winding spool 44 (refer to FIG. 5). A clutch spring 340 (refer to FIG. 16) is attached to a lower portion of the ribbon winding spool 44. The clutch spring 340 is a coil spring that is adapted to prevent the wound ink ribbon 60 from being loosened by the ribbon winding spool 44 rotating in reverse.

As shown in FIGS. 5 to 8, a first tape area 400, a second tape area 410, a first ribbon area 420, and a second ribbon area 440 are provided within the cassette case 31. The first tape area 400 and the second tape area 410 are each areas that can accommodate a tape. The first ribbon area 420 is an area that can accommodate the unused ink ribbon 60. The second ribbon area 440 is an area that can accommodate the ink ribbon 60 after it has been used for printing (hereinafter called the used ink ribbon 60). The tape and the ink ribbon 60 are accommodated and transported within the cassette case 31 such that the width directions of each of the tape and the ink ribbon 60 are parallel to the up-down direction of the tape cassette 30.

The first tape area 400 is an area that is adjacent to the first corner portion 321, that is roughly circular in a plan view, and that occupies almost all of the left half of the cassette case 31. The second tape area 410 is an area that is adjacent to the second corner portion 322, that is roughly circular in a plan view, and that is provided in the right rear portion of the cassette case 31. The first ribbon area 420 is an area that is adjacent to the third corner portion 323 and the head insertion portion 39 and that is provided in the right front portion of the cassette case 31. The second ribbon area 440 is an area that is provided between the first tape area 400 and the first ribbon area 420 in the cassette case 31. The support holes 65 to 68 are provided approximately in the centers, in a plan view, of the first tape area 400, the second tape area 410, the first ribbon area 420, and the second ribbon area 440, respectively.

In the laminated type of the tape cassette 30 that is shown in FIGS. 5 and 6, three types of rolls, specifically, the double-sided adhesive tape 58, the film tape 59, and the ink ribbon 60, are contained within the cassette case 31. The double-sided adhesive tape 58 is a tape in which an adhesive has been applied to both surfaces and that has a release paper affixed to one of the surfaces. The film tape 59 is a transparent tape that has a print surface on which printing is performed using the ink ribbon 60. The ink ribbon 60 has an inked surface to which an ink has been applied.

The double-sided adhesive tape 58, which is wound around the first tape spool 40 with the release paper facing outward, is accommodated in the first tape area 400. The film tape 59, which is wound around the second tape spool 41 with the print surface facing inward, is accommodated in the second tape area 410. The unused ink ribbon 60, which is wound around the ribbon spool 42 with the inked surface facing inward, is accommodated in the first ribbon area 420. The used ink ribbon 60, which is wound around the ribbon winding spool 44, is accommodated in the second ribbon area 440.

In the laminated type of the tape cassette 30, the second tape spool 41 rotates in a clockwise direction in a plan view as the film tape 59 is pulled off. The film tape 59 that has been pulled off from the second tape spool 41 is fed toward the right front corner of the cassette case 31 (the lower right corner in FIGS. 5 and 6). In the right front corner of the cassette case 31, the film tape 59 is fed such that it passes along the outer circumference of the ink ribbon 60 that is wound around the ribbon spool 42, and with a gap provided between the film tape 59 and the ink ribbon 60. This makes it possible to limit contact between the film tape 59 that is being fed and the ink ribbon 60 that is wound around the ribbon spool 42, so the film tape 59 can be fed in a stable manner.

The ribbon spool 42 rotates in a counterclockwise direction in a plan view as the ink ribbon 60 is pulled off. The ink ribbon 60 that has been pulled off from the ribbon spool 42 is fed toward a feed pin 531. The first tape spool 40 rotates in a counterclockwise direction in a plan view as the double-sided adhesive tape 58 is pulled off. The double-sided adhesive tape 58 that has been pulled off from the first tape spool 40 is fed toward the tape drive roller 46, which is provided in the left front corner (the lower left corner in FIGS. 5 and 6) of the cassette case 31.

In the receptor type of the tape cassette 30 that is shown in FIG. 7, two types of rolls, specifically, the printing tape 57 and the ink ribbon 60, are contained within the cassette case 31. The printing tape 57 is a single-sided tape that has a print surface on which printing is performed using the ink ribbon 60, with a release paper affixed to the other surface that is opposite the print surface. The printing tape 57, which is wound around the first tape spool 40 with the release paper facing outward, is accommodated in the first tape area 400. The unused ink ribbon 60, which is wound around the ribbon spool 42, is accommodated in the first ribbon area 420. The used ink ribbon 60, which is wound around the ribbon winding spool 44, is accommodated in the second ribbon area 440. Nothing is accommodated in the second tape area 410, so the second tape spool 41 is not provided.

In the receptor type of the tape cassette 30, the first tape spool 40 rotates in a clockwise direction in a plan view as the printing tape 57 is pulled off. The printing tape 57 that has been pulled off from the first tape spool 40 is fed toward the right front corner of the cassette case 31. The ribbon spool 42 rotates in a counterclockwise direction in a plan view as the ink ribbon 60 is pulled off. The ink ribbon 60 that has been pulled off from the ribbon spool 42 is fed toward the feed pin 531.

In the thermal type of the tape cassette 30 that is shown in FIG. 8, one type of roll, the thermal paper tape 55, is contained within the cassette case 31. The thermal paper tape 55 is a single-sided tape that has a print surface on which printing is performed by a thermal method, with a release paper affixed to the other surface that is opposite the print surface. The thermal paper tape 55, which is wound around the first tape spool 40 with the release paper facing outward, is accommodated in the first tape area 400. Nothing is accommodated in the second tape area 410, the first ribbon area 420, and the second ribbon area 440, so the second tape spool 41, the ribbon spool 42, and the ribbon winding spool 44 are not provided.

In the thermal type of the tape cassette 30, the first tape spool 40 rotates in a clockwise direction in a plan view as the thermal paper tape 55 is pulled off. The thermal paper tape 55 that has been pulled off from the first tape spool 40 is fed toward the right front corner of the cassette case 31.

As shown in FIGS. 5 to 8, a vertically oriented bending portion 533 is provided in the right front corner of the cassette case 31, that is, on the right front side of the first ribbon area 420. The bending portion 533 is a pin that is adapted to cause a feed path of the tape that passes along the bending portion 533 to bend into an acute angle along the outer circumference of the first ribbon area 420. The tape that is fed toward the left front corner of the cassette case 31 passes along the bending portion 533 and is fed toward the left front corner of the cassette case 31, being guided into an arm portion 34 that will be described later.

The bending portion 533 is inserted into a shaft hole of a roller member 535 that is a cylindrical rotating body. The bending portion 533 rotatably supports the roller member 535. The roller member 535 is rotated by making contact with the tape that passes along the bending portion 533. The rotating of the roller member 535 causes the tape that passes along the bending portion 533 to be fed smoothly toward the left front corner of the cassette case 31.

The feed pin 531 is provided to the left of the first ribbon area 420 and at a right front portion of a first cylindrical member 881B (refer to FIG. 18). The feed pin 531 is a pin that is adapted to bend a feed path of the ink ribbon 60 toward the interior of the arm portion 34. The ink ribbon 60 that has been pulled off from the ribbon spool 42 passes along the feed pin 531 and is guided into the arm portion 34.

A restraining rib 532 that rises vertically from the bottom plate 306 is provided to the right of the first ribbon area 420. In other words, the restraining rib 532 is a plate-shaped member that is provided farther upstream than the bending portion 533 in the feed direction of the tape. The restraining rib 532 extends to the left direction from the right side wall of the cassette case 31, and its left end is positioned in the vicinity of the feed path for the tape. Although the restraining rib 532 does not contact the tape that is being fed, it contacts a tape when it moves toward its back surface (the surface that is opposite the print surface) side. In other words, the restraining rib 532 is adapted to prevent the tape from moving outward in the vicinity of first ribbon area 420.

As shown in FIGS. 3 and 17, a semi-circular groove 84 that is a groove that is roughly semi-circular in a plan view is provided on the front face of the cassette case 31. The semi-circular groove 84 is provided such that it spans the up-down direction of the cassette case 31. The semi-circular groove 84 is a cut-out that serves to prevent the shaft support portion 121 of the platen holder 12 from interfering with the cassette case 31 when the tape cassette 30 is mounted in the cassette mounting portion 8.

A portion of the front face wall of the cassette case 31 that extends to the left from the semi-circular groove 84 is the arm front face wall 35. A wall portion that is provided such that it spans the up-down direction of the cassette case 31 in a position that is separated from and to the rear of the arm front face wall 35 is an arm rear face wall 37. A portion that extends to the left from the right front portion of the tape cassette 30 and that is defined by the arm front face wall 35 and the arm rear face wall 37 is the arm portion 34.

The left end portion of the arm front face wall 35 is bent toward the rear. A gap that extends in the up-down direction between the left ends of the arm front face wall 35 and the arm rear face wall 37 is an exit 341. The tape (as well as the ink ribbon 60) is discharged from the arm portion 34 through the exit 341. The left end portion of the arm front face wall 35 that is adjacent to the exit 341 is an arm tip portion 85. A portion of the arm tip portion 85 where the top case 311 and the bottom case 312 may contact and separate from one another is a contact-separate portion 86. The arm indicator portion 800 and the latch hole 820 are provided in the arm front face wall 35, but they will be described in detail later.

As shown in FIGS. 5 to 8, inside the arm portion 34, the tape that has been pulled off from one of the first tape spool 40 and the second tape spool 41 is guided along the feed path that extends approximately parallel to the arm front face wall 35 and is discharged from the exit 341. The ink ribbon 60 that has been pulled off from the ribbon spool 42 is guided within the arm portion 34 along the feed path that is different from that of the tape and is discharged from the exit 341. Note that, in the laminated type of the tape cassette 30, the film tape 59 and the ink ribbon 60 that have been guided within the arm portion 34 are superposed on one another and discharged from the exit 341. In the receptor type of the tape cassette 30, the printing tape 57 and the ink ribbon 60 that have been guided within the arm portion 34 are superposed on one another and discharged from the exit 341.

A perimeter wall that extends toward the rear from the right end of the arm rear face wall 37 and then extends parallel to the arm rear face wall 37 is a head perimeter wall 36. A space that is defined by the arm rear face wall 37 and the head perimeter wall 36, that is roughly rectangular in a plan view, and that extends through the up-down direction of the tape cassette 30 is a head insertion portion 39. The head insertion portion 39 is also connected to the outside on the front face side of the tape cassette 30 through an open portion 77 that is provided on the front face side of the tape cassette 30. The head holder 74 that supports the thermal head 10 may be inserted into the head insertion portion 39.

At the open portion 77, one surface (the back surface) of the tape that is discharged from the exit 341 is exposed in front, and the other surface (the print surface) faces the thermal head 10. The thermal head 10 performs the printing on the tape that is positioned at the open portion 77. Note that, in the laminated type of the tape cassette 30, the ink ribbon 60 is interposed between the thermal head 10 and the print surface of the film tape 59 that has been discharged into the open portion 77. In the receptor type of the tape cassette 30, the ink ribbon 60 is interposed between the thermal head 10 and the print surface of the printing tape 57 that has been discharged into the open portion 77. Using the ink ribbon 60, the thermal head 10 performs the printing on the one of the printing tape 57 and the film tape 59 that is positioned at the open portion 77.

As shown in FIGS. 5 to 8 and 17, the separator portion 61 is provided to the left of the head insertion portion 39. The separator portion 61 is a portion that is adapted to separate the tape and the ink ribbon 60 that have been used for printing on the downstream side of the open portion 77 in the tape feed direction. The separator portion 61 includes restraining members 361, 362, a ribbon guide wall 38, a separating wall 43, and the like.

The restraining members 361, 362 are an upper-lower pair of plate-shaped bodies that is adapted to guide the tape on which the printing has been performed toward the discharge guide portion 49. The ribbon guide wall 38 is a wall that is adapted to guide the used ink ribbon 60 toward the ribbon winding spool 44. The separating wall 43 is a wall that, in the laminated type of the tape cassette 30, is adapted to prevent contact between the ink ribbon 60 that is being guided along the ribbon guide wall 38 and the double-sided adhesive tape 58 that is being pulled toward the tape drive roller 46.

A separating wall 48 is provided between the ribbon guide wall 38 and the ribbon winding spool 44. The separating wall 48 is provided at the front side of the first tape area 400 and is provided along a portion of the outer circumferential edge of the first tape area 400. The separating wall 48 is a wall that is adapted to prevent the used ink ribbon 60 that is being guided from the ribbon guide wall 38 toward the ribbon winding spool 44 and the double-sided adhesive tape 58 that is wound around the first tape spool 40 from touching one another.

The roller support hole 64 is provided to the left side (that is, on the downstream side in the tape feed direction) of the separator portion 61. The tape drive roller 46 is rotatably supported on the inner side of the roller support hole 64. When the laminated type of the tape cassette 30 is mounted in the cassette mounting portion 8, as shown in FIGS. 5 and 6, the film tape 59 is pulled off from the second tape spool 41 and the double-sided adhesive tape 58 is pulled off from the first tape spool 40 by the coordinated operations of the tape drive roller 46 and the movable feed roller 14.

The printed film tape 59 is guided toward the downstream side in the tape feed direction by the restraining members 361, 362. When the printed film tape 59 passes between the tape drive roller 46 and the movable feed roller 14, the double-sided adhesive tape 58 is affixed to the print surface of the film tape 59. The film tape 59 with the double-sided adhesive tape 58 affixed to it, that is, the printed tape 50, is fed toward the discharge guide portion 49.

When the receptor type of the tape cassette 30 is mounted in the cassette mounting portion 8, as shown in FIG. 7, the printing tape 57 is pulled off from the first tape spool 40 by the coordinated operations of the tape drive roller 46 and the movable feed roller 14. The printed printing tape 57, that is, the printed tape 50, is guided downstream in the tape feed direction by the restraining members 361, 362, passes between the tape drive roller 46 and the movable feed roller 14, and is fed toward the discharge guide portion 49.

When the thermal type of the tape cassette 30 is mounted in the cassette mounting portion 8, as shown in FIG. 8, the thermal paper tape 55 is pulled off from the first tape spool 40 by the coordinated operations of the tape drive roller 46 and the movable feed roller 14. The printed thermal paper tape 55, that is, the printed tape 50, is guided downstream in the tape feed direction by the restraining members 361, 362, passes between the tape drive roller 46 and the movable feed roller 14, and is fed toward the discharge guide portion 49.

As shown in FIGS. 5 to 8, the discharge guide portion 49 is a plate-shaped member that extends between the top face 301 and the bottom face 302 and that is provided such that it is in front of and slightly separated from the front edge of the left side face of the cassette case 31. The discharge guide portion 49 is adapted to guide the printed tape 50 that has been fed past the tape drive roller 46 into a passage that is formed between the discharge guide portion 49 and the front edge of the left side face of the cassette case 31. The printed tape 50 is discharged to the outside of the tape cassette 30 from the end of the passage.

The guide hole 47, into and out of which the guide shaft 120 may be inserted and removed when the tape cassette 30 is mounted and removed is provided in the right rear corner portion of the cassette case 31. The shape of the opening of the guide hole 47 according to the present embodiment is such that two sides that are parallel to a parting line K (refer to FIG. 15) in a plan view are straight lines and two sides that are approximately orthogonal to the parting line K are curved lines on which every point is at the same distance from the center of the opening of the guide hole 47. In other words, the guide hole 47 is an oblong hole whose long dimension is parallel to the parting line K and whose opening width in the direction that is orthogonal to the parting line K is smaller.

Figure 15:
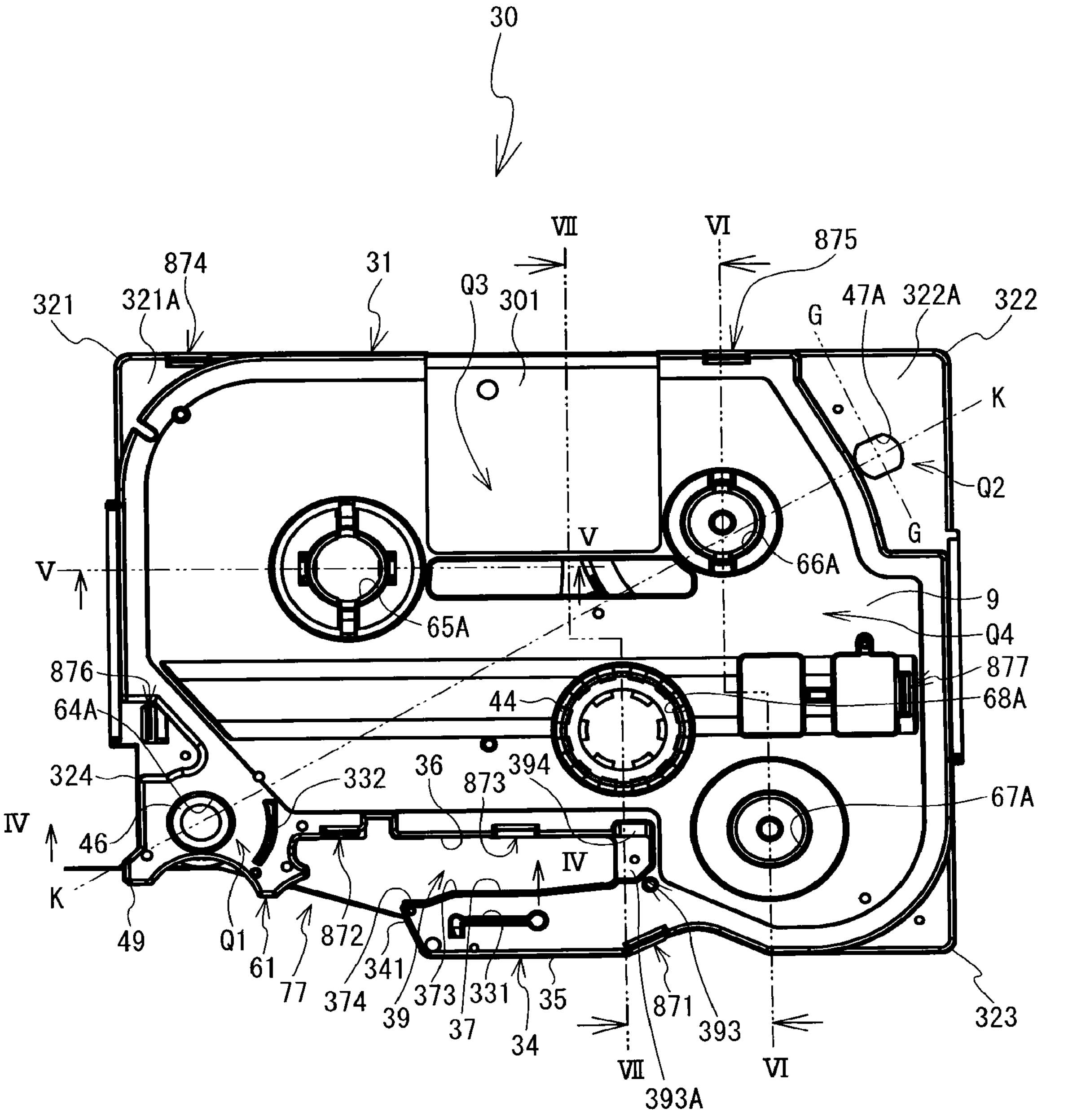
FIG. 15 is a plan view of the tape cassette 30.

The opening width of the guide hole 47 is greater than the diameter of the small diameter portion 120B of the guide shaft 120 (refer to FIG. 45) in all of the directions that pass through the center of the opening of the guide hole 47 in a plan view. Note that, the opening width of the guide hole 47 is greatest on the parting line K that passes through the center of the opening of the guide hole 47 in a plan view. The opening width of the guide hole 47 is smallest on a line (a virtual line G that is shown in FIG. 15) that passes through the center of the opening of the guide hole 47 in a plan view and that is orthogonal to the parting line K. The opening width of the guide hole 47 along the virtual line G is approximately equal to the diameter of the large diameter portion 120A of the guide shaft 120 (refer to FIG. 45).

As shown in FIGS. 16, 18, and 19, the rear recessed portion 360 is provided in a roughly central position in the left-right direction in the rear portion of the cassette case 31. The rear recessed portion 360 is a recessed portion that is a portion of the bottom plate 306 that has been recessed in an upward direction from the bottom face 302. In other words, the rear recessed portion 360 is a stepped portion that is formed between the first tape area 400, the second tape area 410, and the rear face of the cassette case 31.

The rear recessed portion 360 includes the rear stepped wall 360A, which is a flat wall portion (the bottom portion of the rear recessed portion) that is positioned higher than the bottom face 302. The rear stepped wall 360A has a shape that roughly corresponds to the rear support portion 813 (refer to FIG. 3), that is, a roughly triangular shape in a bottom view. The rear stepped wall 360A is formed at the same height position as the bottom edge of the common portion 32. Therefore, in the same manner as with the common portion 32, the distance from the center line N of the cassette case 31 to the rear stepped wall 360A remains constant, regardless of the type of the tape in the tape cassette 30. The rear indicator portion 900, which will be described later, is provided in the rear stepped wall 360A.

The structures of the top case 311 and the bottom case 312 will be explained in detail with reference to FIGS. 15 to 28. In particular, the structures for joining the top case 311 and the bottom case 312 and the structures for restraining the positions of the tape and the ink ribbon 60 in the width direction will be explained separately for the top case 311 and the bottom case 312.

The structure of the bottom case 312 will be explained with reference to FIGS. 16 to 21 and 27 to 28. As shown in FIGS. 18 and 19, the outline of the bottom case 312 is formed by the bottom plate 306 and a bottom perimeter wall 304. The bottom perimeter wall 304 is a side wall that runs around the outer edge of the bottom face 302 and extends upward from the bottom plate 306 to a specified height. Of the bottom perimeter wall 304, a wall portion that forms the bottom portion of the arm front face wall 35 is a bottom arm front face wall 35B. A wall portion that is provided such that it rises vertically from the bottom plate 306 in a position that is separated from and to the rear of the bottom arm front face wall 35B is a bottom arm rear face wall 37B that forms the bottom portion of the arm rear face wall 37. A perimeter wall that extends continuously from the bottom arm rear face wall 37B is a bottom head perimeter wall 36B that forms the bottom portion of the head perimeter wall 36.

Figure 20:
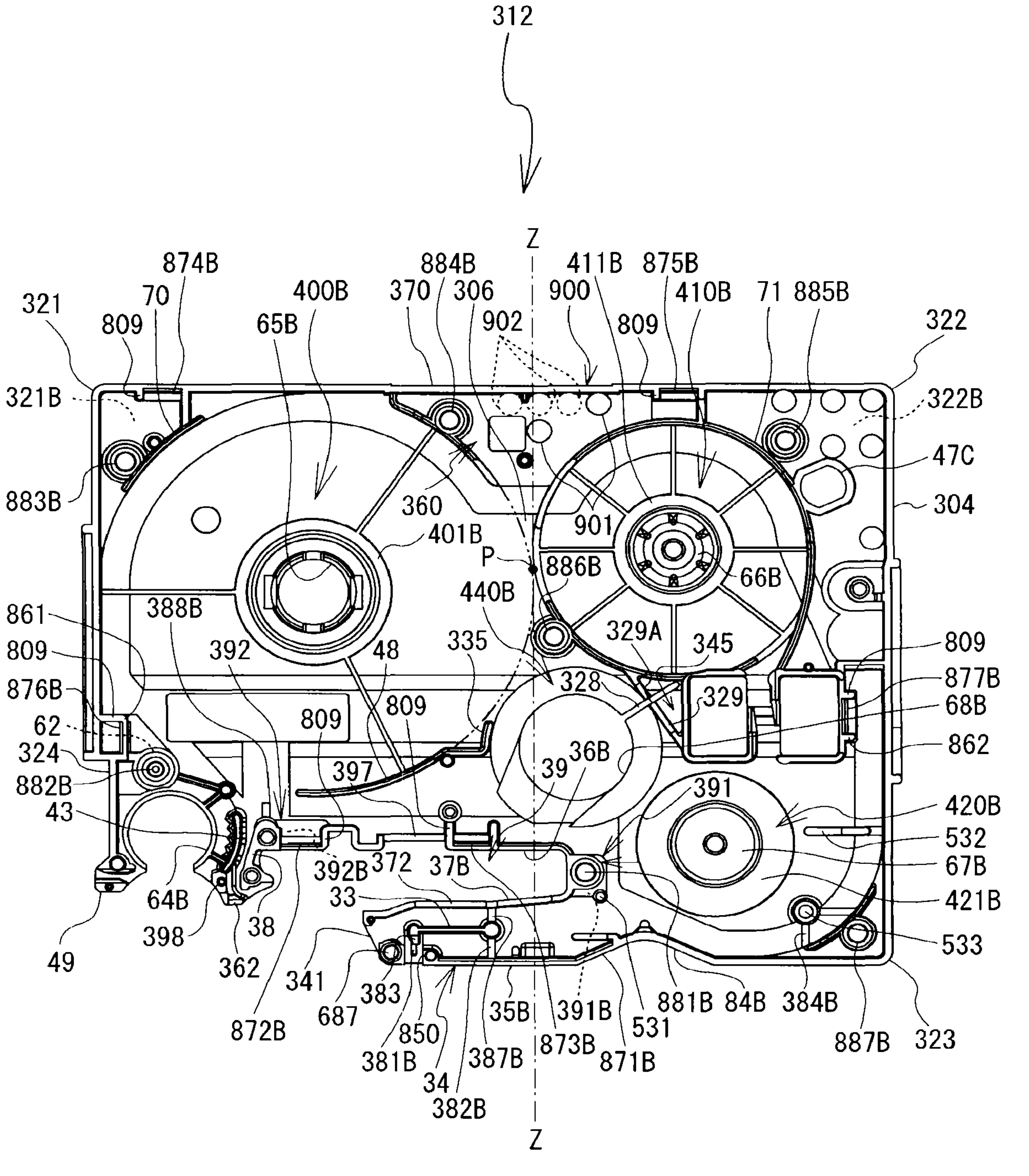
FIG. 20 is a plan view of the bottom case 312.

The structures that surround the head insertion portion 39 in the bottom case 312 will be explained in detail. As shown in FIGS. 16 and 20, a first receiving portion 391 and a second receiving portion 392 are provided on the outer perimeter of the head insertion portion 39 of the bottom case 312. In other words, the first and second receiving portions 391, 392 are provided in positions that face the head insertion portion 39. The first and second receiving portions 391, 392 may be used for positioning, in the vertical direction, the tape cassette 30 that is mounted in the cassette mounting portion 8.

Specifically, the first receiving portion 391 and the second receiving portion 392 are provided in two locations that are respectively on the upstream side and the downstream side in the tape feed direction with respect to an insertion position (more specifically, the printing position) of the thermal head 10 (refer to FIG. 5). The first receiving portion 391 is connected to an end portion of the arm portion 34 on the upstream side in the tape feed direction and to the upstream end portion of the head insertion portion 39. The second receiving portion 392 is connected to the downstream end portion of the head insertion portion 39.

The first and second receiving portions 391, 392 are recessed portions that are each a portion of the bottom plate 306 that has been recessed farther upward than the bottom face 302. Furthermore, the first receiving portion 391 is recessed from the head insertion portion 39 in a direction that is parallel to the arm front face wall 35. The second receiving portion 392 is recessed from the head insertion portion 39 in a direction that is orthogonal to the arm front surface 35. In other words, the first receiving portion 391 and the second receiving portion 392 face the head insertion portion 39 in directions that are mutually orthogonal.

The first and second receiving portions 391, 392 respectively include a first bottom flat surface portion 391B and a second bottom flat surface portion 392B. The first and second bottom flat surface portions 391B, 392B are the bottom surfaces of flat portions (the bottom portions of the recessed portions) that are roughly rectangular in a bottom view and that are positioned higher than the bottom face 302.

A distance between the height positions of the first and second bottom flat surface portions 391B, 392B (that is, their positions in the up-down direction) in the bottom case 312 and the center position in the width direction of the tape and the ink ribbon 60 that are contained in the cassette case 31 remains constant, regardless of the type of the tape in the tape cassette 30, that is, even if the height of the tape cassette 30 in the up-down direction varies. Accordingly, the greater the widths of the tape and the ink ribbon 60 that are contained in the cassette case 31 become, the greater the depth of the first receiving portion 391 becomes with respect to the height position of the first bottom flat surface portion 391B, and the greater the depth of the second receiving portion 392 becomes with respect to the height position of the second bottom flat surface portion 392B.

In the present embodiment, the first and second bottom flat surface portions 391B, 392B are in positions that are separated by the same distance in the up-down direction from the center position in the width direction of the tape and the ink ribbon 60. In other words, the first and second bottom flat surface portions 391B, 392B are in the same height position in the bottom case 312. Note that the center position in the width direction of the tape and the ink ribbon 60 matches the center position in the up-down direction of the cassette case 31.

The first and second bottom flat surface portions 391B, 392B are each reference surfaces in the bottom case 312. A reference surface is a surface that may be used as a reference in setting a dimension or measuring a dimension for a given portion. In the present embodiment, the first and second bottom flat surface portions 391B, 392B are reference surfaces in relation to various types of restraining portions that are adapted to restrain the movements of the tape and the ink ribbon 60 in the width direction. The first and second bottom flat surface portions 391B, 392B may also function as portions that are supported from below by the first and second support portions 741, 742 (refer to FIG. 5), respectively, when the tape cassette 30 is mounted in the cassette mounting portion 8.

As shown in FIGS. 16 and 20, the latch portion 397 is provided in the outer perimeter of the head insertion portion 39 of the bottom case 312 (that is, in a position that faces the head insertion portion 39). More specifically, the latch portion 397 is provided in a position that is almost in the middle in the left-right direction of the bottom head perimeter wall 36B, and it is positioned opposite the bottom arm rear face wall 37B in the front-rear direction. The latch portion 397 is formed by cutting out a portion of the bottom head perimeter wall 36B above a specified height from the bottom face 302. When the tape cassette 30 is mounted in the cassette mounting portion 8, the latch portion 397 (the upper edge of the bottom head perimeter wall 36B that has been cut out) is engaged by the hook portion 752 of the cassette hook 75 (refer to FIG. 49).

Portions of the bottom case 312 that form an area around the arm portion 34 will be explained in detail. As shown in FIGS. 17 to 20, the portions of the bottom case 312 that forms the arm portion 34 include the bottom arm front face wall 35B, the bottom arm rear face wall 37B, and a separating wall 33. The separating wall 33 is a wall that extends upward from the bottom plate 306 and is provided between the bottom arm front face wall 35B and the bottom arm surface wall 37B. A die hole 850 is provided in the vicinity of the left edge of the bottom arm front face wall 35B. The die hole 850 is a portion that is a vertical rectangle in a front view and that is cut out of the upper part of the bottom arm front face wall 35B. The die hole 850 is an escape hole for a die that is used in forming the bottom case 312, and when the bottom case 312 and the top case 311 are joined, the die hole 850 forms a through-hole in the arm front face wall 35.

The separating wall 33 is formed as the highest of the three walls in the arm portion 34 (the bottom arm front face wall 35B, the bottom arm rear face wall 37B, and the separating wall 33). The height of the separating wall 33 is slightly greater than the widths of the tapes that are contained in the cassette case 31. Of the bottom arm front face wall 35B, a portion that is on the left side of the die hole 850 has a height that is approximately half that of the separating wall 33, and a portion that is on the right side of the die hole 850 has a height that is approximately two-thirds that of the separating wall 33. The bottom arm rear face wall 37B is slightly lower than the separating wall 33 and has a height that is almost the same as the width of the ink ribbon 60. The right edge of the separating wall 33, which has a cylindrical shape in a plan view, is positioned almost in the center of the arm portion 34. The left edge of the separating wall 33 is positioned such that, in the front-rear direction of the bottom case 312, it is opposite the die hole 850 that is provided in the bottom arm front face wall 35B.

As shown in FIGS. 17 and 18, the portion that is on the left side of the die hole 850 in the bottom arm front face wall 35B is a bottom tip portion 85B that forms the bottom portion of the arm tip portion 85. The top edge of the bottom tip portion 85B is a bottom contact-separate portion 86B that forms the bottom portion of the contact-separate portion 86. A groove that is formed in the bottom case 312 to the right of the bottom arm front face wall 35B is a bottom semi-circular groove 84B that forms the bottom portion of the semi-circular groove 84.

A tip hole 687 that extends in the up-down direction is provided in the bottom tip portion 85B. The tip hole 687 is a hole that passes through the bottom plate 306 of the tape cassette 30 and is formed such that it is circular in a plan view. The tip hole 687 may also be formed as a recessed hole that does not pass through the bottom plate 306 of the tape cassette 30. The upper portion of the tip hole 687 gradually widens toward the top, such that the opening diameter is largest at the top end.

As shown in FIG. 20, in the portion of the bottom case 312 that forms the arm portion 34, the feed path for the tape is formed between the bottom arm front face wall 35B and the separating wall 33. The feed path for the ink ribbon 60 is formed between the separating wall 33 and the bottom arm rear face wall 37B. Restraining pieces that are adapted to restrain the movements of the tape and the ink ribbon 60 in the width direction (that is, in the up-down direction) are provided along the feed paths.

For the feed path for the tape, first bottom tape restraining portions 381B, 382B that are adapted to restrain the downward movement of the tape are provided at the bottom edges of the left end and the right end, respectively, of the separating wall 33. The first bottom tape restraining portions 381B, 382B each project slightly upward from the upper surface of the bottom plate 306 and extend toward the front as far as the bottom arm front face wall 35B. A separating wall restraining portion 383 that is adapted to restrain the upward movement of the tape is provided at the upper edge of the left end of the separating wall 33. The separating wall restraining portion 383 is a projecting piece that projects toward the front from the upper edge of the separating wall 33. The distance in the up-down direction between the separating wall restraining portion 383 and the first bottom tape restraining portions 381B, 382B is the same as the tape width.

The structure of the left end of the separating wall 33 will be explained in detail with reference to FIGS. 18 and 27. As shown in FIG. 27, the separating wall restraining portion 383 and the first bottom tape restraining portion 381B are respectively provided on the upper edge and the lower edge of the left end of the separating wall 33. A first print surface side restraining portion 389 is provided between the separating wall restraining portion 383 and the first bottom tape restraining portion 381B. The first print surface side restraining portion 389 is a portion that bulges such that its central portion in the left-right direction in a plan view is slightly thickened. The first print surface side restraining portion 389 also has a shape like that of a convex lens in that the central portion in the up-down direction in a side view projects slightly toward the front (toward the right in FIG. 27). In other words, a central portion of a restraining surface 389A of the first print surface side restraining portion 389 is slightly thicker than the surrounding portions in both the left-right direction and the up-down direction.

As shown in FIG. 18, the separating wall restraining portion 383 is provided in a position that is higher than the bottom arm front face wall 35B. The first bottom tape restraining portion 381B is provided to the rear of the die hole 850. In the state before the bottom case 312 and the top case 311 are joined together, the separating wall restraining portion 383 and the first bottom tape restraining portion 381B are visible from in front of the bottom arm front face wall 35B. Furthermore, in a front view, the left end of the separating wall 33, that is, the separating wall restraining portion 383 and the first bottom tape restraining portion 381B, is adjacent to the arm indicator portion 800, which will be described later (refer to FIG. 25). Therefore, a person can see the separating wall restraining portion 383, the first bottom tape restraining portion 381B, and the arm indicator portion 800 simultaneously from in front of the bottom case 312.

With regard to the feed path for the ink ribbon 60, a first bottom ribbon restraining portion 387B is provided at the lower edge of the right end of the separating wall 33, as shown in FIG. 20. The first bottom ribbon restraining portion 387B is adapted to restrain the downward movement of the ink ribbon 60. The first bottom ribbon restraining portion 387B projects slightly upward from the upper surface of the bottom plate 306 and extends toward the rear from the right end of the separating wall 33 as far as the bottom arm rear face wall 37B.

The height positions of the first bottom tape restraining portions 381B, 382B, the separating wall restraining portion 383, and the first bottom ribbon restraining portion 387B in the bottom case 312 are each set using the first and second bottom flat surface portions 391B, 392B as the reference surfaces.

More specifically, the distance in the up-down direction between the projecting edges (the upper edges) of the first bottom tape restraining portions 381B, 382B and the first and second bottom flat surface portions 391B, 392B is set in accordance with the width of the tape. The distance in the up-down direction between the lower edge of the separating wall restraining portion 383 and the first and second bottom flat surface portions 391B, 392B is also set in accordance with the width of the tape. The distance in the up-down direction between the projecting edge (the upper edge) of the first bottom ribbon restraining portion 387B and the first and second bottom flat surface portions 391B, 392B is set in accordance with the width of the ink ribbon 60. As described previously, the first and second bottom flat surface portions 391B, 392B are respectively provided in the vicinity of the upstream end and the downstream end of the head insertion portion 39. Therefore, each of the restraining portions that are provided in the arm portion 34 are in proximity to the first and second bottom flat surface portions 391B, 392B that are the reference surfaces.

In the known tape cassette, the reference positions (for example, the bottom portions of the pin holes 62, 63) that are used for setting the dimensions of the restraining portions and for measuring the dimensions after the tape cassette is manufactured are in positions that are distant from the restraining portions, so the reference positions and the restraining portions may be formed by different parts of the die. In those cases, the dimensional errors in the restraining portions of the manufactured tape cassette 30 may become greater as the distance from the part of the die for the reference positions becomes greater. Furthermore, even if the reference positions and the restraining portions are formed by the same part of the die, measurement errors may occur, and dimensional accuracy may decrease, in a case where the positions of the restraining portions are distant from the reference positions. Therefore, in the manufacturing process for the known tape cassette, the operator performs the setting of the dimensions of the restraining portions, the post-manufacturing measuring of the dimensions, and the like very precisely.

If the distances between the restraining portions and the reference surfaces are made shorter, as they are in the present embodiment, there is a strong possibility that measurement errors will be decreased and that both the restraining portions and the reference surfaces can be formed by the same part of the die. This makes it possible to define the height position of each of the restraining portions accurately, which in turn makes it possible to improve the feeding accuracy of the tape and the ink ribbon 60. The arm portion 34 is located in the vicinity of the upstream side of the position (specifically, the open portion 77) where the printing is performed by the thermal head 10 (refer to FIG. 5). Therefore, in conjunction with the improvement in the feeding accuracy of the tape and the ink ribbon 60 within the arm portion 34, the printing accuracy of the thermal head 10 can also be improved. The burden on the operator of performing the setting of the dimensions of the restraining portions and the like very precisely, as described above, can also be reduced.

After the bottom case 312 has been manufactured, the dimensional control of each of the restraining portions can be carried out easily using the first and second bottom flat surface portions 391B, 392B as references. For example, during an inspection of the bottom case 312, the dimensions of each of the restraining portions may be measured by placing the first and second bottom flat surface portions 391B, 392B, which are the reference surfaces, on mounting surfaces of a jig. An inspector can then measure the dimensions accurately, because the distance between each of the restraining portions and the reference surfaces are short.

The first and second bottom flat surface portions 391B, 392B are provided at a fixed distance in the up-down direction from the center of the width direction of the tape and the ink ribbon 60 that are contained in the cassette case 31. The positions of the tape and the ink ribbon 60 in the up-down direction in relation to the positions of the first and second bottom flat surface portions 391B, 392B in the up-down direction therefore become clearer. This makes it possible to improve the feeding accuracy of the tape and the ink ribbon 60.

In the present embodiment, the distance in the up-down direction between the first and second bottom flat surface portions 391B, 392B and the center of the width direction of the tape and the ink ribbon 60 is constant, regardless of the widths of the tape and the ink ribbon 60. It is therefore possible for the height positions of the first and second bottom flat surface portions 391B, 392B to serve as a uniform reference for a plurality of types of the tape cassette 30 that contain tapes and ink ribbons 60 with different widths. That makes it easier to perform dimension measurement and quality control for the cassette case 31.

Each of the restraining portions in the arm portion 34 is located between the first and second bottom flat surface portions 391B, 392B in the left-right direction of the bottom case 312 and is in the vicinity of both of the reference surfaces. In other words, it is possible to perform the setting of the dimensions and the measuring of the dimensions using either one of the reference surfaces, and it is also possible to do so using both of the reference surfaces. Using both of the reference surfaces makes it possible to improve the dimensional accuracy further during the manufacturing of each of the restraining portions. It is therefore possible to improve further the feeding accuracy of the tape and the ink ribbon 60. In addition, dimensional control of each of the restraining portions can be performed more accurately and easily after the bottom case 312 has been manufactured.

Furthermore, within the arm portion 34, not only is the tape restrained in the width direction, but its movement in the direction of the print surface side is also restrained by the first print surface side restraining portion 389. The center portion in the left-right direction of the first print surface side restraining portion 389 projects toward the front, so the tape that is being fed within the arm portion 34 is bent toward the head insertion portion 39. The center portion in the up-down direction of the first print surface side restraining portion 389 also projects toward the front, so the tension of the tape is concentrated in the center portion in the width direction. This causes back tension to be applied to the tape that is being fed within the arm portion 34, making it possible to stabilize the movement of the tape.

As shown in FIG. 20, the bending portion 533 is provided in the vicinity of the third corner portion 323, which is farther upstream than the arm portion 34 in the tape feed direction. A restraining portion 384B is provided at the lower end of the bending portion 533. The restraining portion 384B is adapted to restrain the downward movement of the tape in the same manner as do the first bottom tape restraining portions 381B, 382B. Accordingly, the setting of the dimensions of and the dimensional control for the restraining portion 384B may also be performed using the neighboring first bottom flat surface portion 391B as the reference surface, in the same manner as is done for the first bottom tape restraining portions 381B, 382B.

Portions of the bottom case 312 that form an area around the separator portion 61 will be explained in detail. As shown in FIGS. 18 to 20 and 28, within the bottom head perimeter wall 36B, a wall portion that extends in the front-rear direction at the left end of the head insertion portion 39 is the ribbon guide wall 38. In other words, the ribbon guide wall 38 is a wall portion that defines the downstream end of the head insertion portion 39. The ribbon guide wall 38 is adjacent to the left end of the second receiving portion 392 in a plan view.

The separating wall 43 is provided in a vertical orientation to the left of the ribbon guide wall 38 and to the right of an opening 64B that will be described later. The separating wall 43 is provided such that, in a plan view, it forms a gradual arc in the front-rear direction of the cassette case 31 along a portion of the opening 64B. The side surface of the separating wall 43 that faces the opening 64B is formed into a sawtooth pattern in a plan view in order to prevent the double-sided adhesive tape 58 from sticking to the separating wall 43. A restraining member 362 that extends upward from the bottom plate 306 is provided to the left front from the ribbon guide wall 38 and in front of the separating wall 43.

As described previously, the tape and the ink ribbon 60 that are discharged from the arm portion 34 pass through the open portion 77 and are guided into the separator portion 61. A vertically long gap that is formed between the ribbon guide wall 38 and the restraining member 362 may function as a lower portion of an inlet 61A. The inlet 61A is continuous with the open portion 77 and is a portion of the feed paths for the tape and the ink ribbon 60. The inlet 61A guides the printed tape and the used ink ribbon 60 into the separator portion 61.

A vertically long gap that is formed between the separating wall 43 and the restraining member 362 may function as a lower portion of a tape guide outlet 61B. The tape guide outlet 61B is provided such that it is continuous with the downstream side of the inlet 61A and is a portion of the tape feed path. The tape guide outlet 61B is adapted to guide the printed tape toward the front side of the tape drive roller 46 (refer to FIG. 5).

A vertically long gap that is formed between the ribbon guide wall 38 and the separating wall 43 may function as a ribbon guide outlet 61C. The ribbon guide outlet 61C is provided such that it is continuous with the downstream side of the inlet 61A and is a portion of the feed path of the ink ribbon 60. The ribbon guide outlet 61C is adapted to guide the used ink ribbon 60 toward the second ribbon area 440 (refer to FIG. 5).

At the bottom ends of the inlet 61A and the ribbon guide outlet 61C, the upper surface of the bottom plate 306 forms a continuous flat surface without any unevenness. In contrast, a second bottom tape restraining portion 363B that projects slightly upward from the upper surface of the bottom plate 306 is provided continuously from a base portion of the separating wall 43 to a base portion of the restraining member 362. Therefore, the bottom end of the tape guide outlet 61B (in other words, the projecting end of the second bottom tape restraining portion 363B) is positioned higher than the bottom end of the inlet 61A (in other words, the upper surface of the bottom plate 306). To put it differently, the second bottom tape restraining portion 363B forms a stepped portion such that the bottom end of the tape guide outlet 61B becomes higher than the bottom end of the inlet 61A.

The second bottom tape restraining portion 363B is adapted to restrain the downward movement of the tape that passes through the tape guide outlet 61B. The second bottom tape restraining portion 363B may also function as a separator rib for separating the used ink ribbon 60 from the printed tape within the separator portion 61.

A separating wall restraining portion 364 that is a projecting piece that projects toward the front is provided at the upper end of the front edge of the separating wall 43. The separating wall restraining portion 364 is adapted to restrain the upward movement of the tape that passes through the tape guide outlet 61B. A projecting portion 398 that is a pin that projects upward is provided on the top of the separating wall restraining portion 364. The distance in the up-down direction between the second bottom tape restraining portion 363B and the separating wall restraining portion 364 is the same as the tape width.

Second print surface side restraining portions 43A, 43B are provided on the front end face of the separating wall 43. The second print surface side restraining portion 43A is a stepped portion that is provided immediately below the separating wall restraining portion 364 and that projects slightly toward the front from the front end face of the separating wall 43. The second print surface side restraining portion 43B is a stepped portion that is provided at the base portion of the separating wall 43 and that projects slightly toward the front from the front end face of the separating wall 43.

The height positions of the second bottom tape restraining portion 363B and the separating wall restraining portion 364 in the bottom case 312 are each set using the neighboring second bottom flat surface portion 392B as the reference surface. More specifically, the distance in the up-down direction between the projecting edge (the upper edge) of the second bottom tape restraining portion 363B and the second bottom flat surface portion 392B, and the distance in the up-down direction between the lower edge of the separating wall restraining portion 364 and the second bottom flat surface portion 392B, are set in accordance with the width of the tape. It is therefore possible to improve the dimensional accuracy during the manufacturing of the second bottom tape restraining portion 363B and the separating wall restraining portion 364 by using the second bottom flat surface portion 392B as the reference surface. After the bottom case 312 has been manufactured, the dimensional control of the second bottom tape restraining portion 363B and the separating wall restraining portion 364 can be carried out easily.

In the present embodiment, the second bottom tape restraining portion 363B and the separating wall restraining portion 364 are provided in the vicinity of the tape drive roller 46. Within the separator portion 61, the tape may be positioned in the width direction by these restraining portions. The tape can therefore be fed from the separator portion 61 toward the tape drive roller 46 such that it is precisely parallel with respect to the center line in the width direction of the tape.

Furthermore, within the separator portion 61, the movement of the tape may be restrained not only in the width direction, but may also be restrained in the direction toward the print surface side of the tape by the second print surface side restraining portions 43A, 43B. Because the second print surface side restraining portions 43A, 43B project toward the front, the tape that passes through the tape guide outlet 61B can be bent in the direction of the tape drive roller 46. Back tension can be thus applied to the tape that passes through the tape guide outlet 61B, making it possible to stabilize the movement of the tape.

Portions of the bottom case 312 that form the first corner portion 321 and the second corner portion 322, as well as areas where the tapes and the ink ribbon 60 are contained, will be explained in detail. As shown in FIGS. 16 and 18 to 20, the bottom case 312 includes a third bottom flat surface portion 321B that is a bottom surface of the first corner portion 321 and a fourth bottom flat surface portion 322B that is a bottom surface of the second corner portion 322. The third bottom flat surface portion 321B and the fourth bottom flat surface portion 322B are both flat surface portions that are positioned higher than the bottom face 302.

The height positions of the third and the fourth bottom flat surface portions 321B, 322B in the bottom case 312 and the center position in the width direction of the tape and the ink ribbon 60 are constant, regardless of the type of the tape in the tape cassette 30. Accordingly, the greater the widths of the tape and the ink ribbon 60 that are contained in the cassette case 31 become, the greater the distance from the bottom face 302 to the third and the fourth bottom flat surface portions 321B, 322B becomes.

In the present embodiment, the third and the fourth bottom flat surface portions 321B, 322B are located in positions that are separated by the same distance in the up-down direction from the center position in the width direction of the tape and the ink ribbon 60, in the same manner as the first and the second bottom flat surface portions 391B, 392B. In other words, the first to the fourth bottom flat surface portions 391B, 392B, 321B, 322B are all at the same height position in the bottom case 312. The third and the fourth bottom flat surface portions 321B, 322B may be used as the reference surfaces for the restraining portions for restraining the downward movements of the tape and the ink ribbon 60.

As shown in FIGS. 18 to 20, the bottom case 312 includes a first bottom tape area 400B, a second bottom tape area 410B, a first bottom ribbon area 420B, and a second bottom ribbon area 440B. The first bottom tape area 400B forms the bottom portion of the first tape area 400. The second bottom tape area 410B forms the bottom portion of the second tape area 410. The first bottom ribbon area 420B forms the bottom portion of the first ribbon area 420. The second bottom ribbon area 440B forms the bottom portion of the second ribbon area 440.

As shown in FIG. 20, a projecting portion that projects slightly upward from the upper surface of the bottom plate 306 is provided in the first bottom tape area 400B. More specifically, a ring-shaped projecting portion on which the first tape spool 40 (refer to FIG. 5) is disposed is provided in the center position of the first bottom tape area 400B. Three linear projecting portions extend radially outward from the ring-shaped projecting portion to the outer edge of the first bottom tape area 400B. These projecting portions form a third bottom tape restraining portion 401B. The third bottom tape restraining portion 401B is adapted to restrain the downward movement of the tape (refer to FIGS. 5 to 8) that is contained in the first tape area 400.

The height position of the third bottom tape restraining portion 401B in the bottom case 312 is set using the neighboring third bottom flat surface portion 321B as the reference surface. More specifically, the distance in the up-down direction between the projecting edge (the upper edge) of the third bottom tape restraining portion 401B and the third bottom flat surface portion 321B is set in accordance with the tape width. It is therefore possible to improve the dimensional accuracy during the manufacturing of the third bottom tape restraining portion 401B by using the third bottom flat surface portion 321B as the reference surface. After the bottom case 312 has been manufactured, the dimensional control of the third bottom tape restraining portion 401B can be carried out easily.

A second bottom ribbon restraining portion 388B is provided at the rear edge of the ribbon guide wall 38. The second bottom ribbon restraining portion 388B is adapted to restrain the downward movement of the ink ribbon 60 that is being fed from the separator portion 61 to the second ribbon area 440. The second bottom ribbon restraining portion 388B projects slightly upward from the upper surface of the bottom plate 306 and extends toward the rear until just in front of the first bottom tape area 400B.

The height position of the second bottom ribbon restraining portion 388B in the bottom case 312 is set using the neighboring second bottom flat surface portion 392B as the reference surface. More specifically, the distance in the up-down direction between the projecting edge (the upper edge) of the second bottom ribbon restraining portion 388B and the second bottom flat surface portion 392B is set in accordance with the width of the ink ribbon 60. It is therefore possible to improve the dimensional accuracy during the manufacturing of the second bottom ribbon restraining portion 388B by using the second bottom flat surface portion 392B as the reference surface. After the bottom case 312 has been manufactured, the dimensional control of the second bottom ribbon restraining portion 388B can be carried out easily.

A projecting portion that projects slightly upward from the upper surface of the bottom plate 306 is provided in the second bottom tape area 410B, in the same manner as in the first bottom tape area 400B. More specifically, a ring-shaped projecting portion on which the second tape spool 41 (refer to FIG. 5) is disposed is provided in the center position of the second bottom tape area 410B. Eight linear projecting portions extend radially outward from the ring-shaped projecting portion to the outer edge of the second bottom tape area 410B. These projecting portions form a fourth bottom tape restraining portion 411B. The fourth bottom tape restraining portion 411B restrains the downward movement of the tape (refer to FIGS. 5 and 6) that is contained in the second tape area 410.

The height position of the fourth bottom tape restraining portion 411B in the bottom case 312 is set using the neighboring fourth bottom flat surface portion 322B as the reference surface. More specifically, the distance in the up-down direction between the projecting edge (the upper edge) of the fourth bottom tape restraining portion 411B and the fourth bottom flat surface portion 322B is set in accordance with the tape width. It is therefore possible to improve the dimensional accuracy during the manufacturing of the fourth bottom tape restraining portion 411B by using the fourth bottom flat surface portion 322B as the reference surface. After the bottom case 312 has been manufactured, the dimensional control of the fourth bottom tape restraining portion 411B can be carried out easily.

A projecting portion that projects slightly upward from the upper surface of the bottom plate 306 is provided in the first bottom ribbon area 420B. More specifically, a projecting portion that is provided in a ring shape in the center position of the first bottom ribbon area 420B and on which the ribbon spool 42 (refer to FIG. 5) is disposed is a third bottom ribbon restraining portion 421B. The third bottom ribbon restraining portion 421B is adapted to restrain the downward movement of the unused ink ribbon 60 (refer to FIGS. 5 to 7) that is contained in the first ribbon area 420.

The height position of the third bottom ribbon restraining portion 421B in the bottom case 312 is set using the neighboring first bottom flat surface portion 391B as the reference surface. More specifically, the distance in the up-down direction between the projecting edge (the upper edge) of the third bottom ribbon restraining portion 421B and the first bottom flat surface portion 391B is set in accordance with the width of the ink ribbon 60. It is therefore possible to improve the dimensional accuracy during the manufacturing of the third bottom ribbon restraining portion 421B by using the first bottom flat surface portion 391B as the reference surface. After the bottom case 312 has been manufactured, the dimensional control of the third bottom ribbon restraining portion 421B can be carried out easily.

In the present embodiment, the projecting edges of the first to the fourth bottom tape restraining portions 381B, 382B, 363B, 401B, 411B are all set to the same height position, regardless of their individual placement positions. Therefore, the downward movements of the tape that is contained in the first tape area 400 and the tape that is contained in the second tape area 410 may be each restrained at the same height position as the tape that is in the arm portion 34 and the separator portion 61.

Furthermore, the projecting edges of the first to the third bottom ribbon restraining portions 387B, 388B, 421B are all set to the same height position, regardless of their individual placement positions. Therefore, the downward movement of the ink ribbon 60 that is contained in the first ribbon area 420 may be restrained at the same height position as the ink ribbon 60 that is in the arm portion 34 and the separator portion 61.

Cylindrical members and connecting holes for joining the top case 311 and the bottom case 312 are provided in the bottom case 312.

As shown in FIGS. 18 to 20, the cylindrically shaped first cylindrical member 881B rises vertically on the upper side of the first receiving portion 391. In other words, the first cylindrical member 881B is provided above the first bottom flat surface portion 391B in the vertical direction. The first cylindrical member 881B is in contact with the bottom head perimeter wall 36B, but is separated from the bottom perimeter wall 304.

Figure 21:
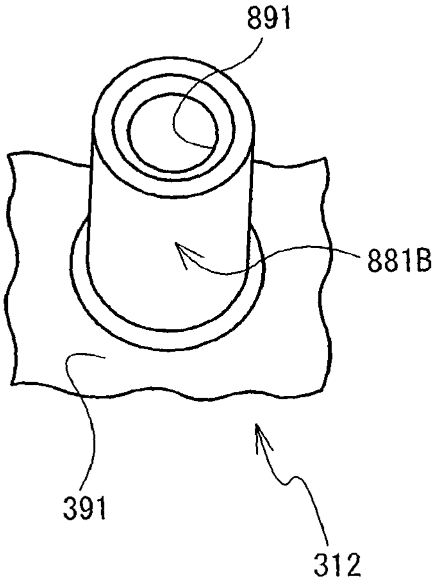
FIG. 21 is an oblique view of a first cylindrical member 881B.

As shown in FIG. 21, the first cylindrical member 881B includes a cylindrical hole 891. In a plan view, the cylindrical hole 891 is a circular recessed portion that is formed along the axis line of the first cylindrical member 881B. The diameter of the cylindrical hole 891 gradually becomes larger toward the top, such that it is at its largest at the upper end of the cylindrical hole 891. The structures of second to seventh cylindrical members 882B, 883B, 884B, 885B, 886B, 887B, which will be described later, are the same as the structure of the first cylindrical member 881B.

As shown in FIGS. 18 to 20, the second cylindrical member 882B is provided to the rear of the tape drive roller 46 (more specifically, to the rear of the opening 64B, which will be described later) and on the left front side of the first bottom tape area 400B. The fourth cylindrical member 884B is provided on the opposite side of the first bottom tape area 400B from the second cylindrical member 882B, that is, on the right rear side of the first bottom tape area 400B, such that the center of the first bottom tape area 400B (more specifically, an opening 65B, which will be described later) is between the second cylindrical member 882B and the fourth cylindrical member 884B. The third cylindrical member 883B is provided on the inner surface of the third bottom flat surface portion 321B, that is, on the left rear side of the first bottom tape area 400B.

In other words, the second to the fourth cylindrical members 882B, 883B, 884B are provided around the outer perimeter of the first bottom tape area 400B in the bottom case 312. The third and the fourth cylindrical members 883B, 884B are in contact with first perimeter walls 70 that are provided along portions of the outer edge of the first bottom tape area 400B. The second to the fourth cylindrical members 882B, 883B, 884B are provided such that they are separated from the bottom perimeter wall 304 of the bottom case 312.

The fifth cylindrical member 885B is provided on the inner surface of the fourth bottom flat surface portion 322B, that is, on the right rear side of the second bottom tape area 410B. The sixth cylindrical member 886B is provided on the opposite side of the second bottom tape area 410B from the fifth cylindrical member 885B, that is, on the left front side of the second bottom tape area 410B, such that the center of the second bottom tape area 410B (more specifically, a bottom tape support portion 66B, which will be described later) is between the fifth cylindrical member 885B and the sixth cylindrical member 886B. The seventh cylindrical member 887B is provided on the inner surface of the lower face of the third corner portion 323, that is, on the right front side of the first bottom ribbon area 420B.

In other words, the fifth and the sixth cylindrical members 885B, 886B are provided around the outer perimeter of the second bottom tape area 410B in the bottom case 312. The fifth and the sixth cylindrical members 885B, 886B are in contact with second perimeter walls 71 that are provided along portions of the outer edge of the second bottom tape area 410B. The fifth to the seventh cylindrical members 885B, 886B, 887B are provided such that they are separated from the bottom perimeter wall 304 of the bottom case 312.

A first connecting hole 871B is provided slightly below the upper edge of the left portion of the bottom semi-circular groove 84B in the bottom case 312. A second connecting hole 872B (refer to FIG. 28) and a third connecting hole 873B (refer to FIG. 30) are provided on the left and right sides, respectively, of the latch portion 397 in the bottom head perimeter wall 36B. The second connecting hole 872B is provided above the second bottom flat surface portion 392B.

A wall portion on the rear side of the bottom perimeter wall 304 of the bottom case 312 is a rear wall 370 that forms the bottom portion of the rear face of the cassette case 31. A fourth connecting hole 874B and a fifth connecting hole 875B are provided in the rear wall 370. The fourth connecting hole 874B is provided on the left rear side of the first bottom tape area 400B. The fifth connecting hole 875B is provided on the rear side of the second bottom tape area 410B. In a front view or a rear view, the first to the fifth connecting holes 871B, 872B, 873B, 874B, 875B are rectangular through-holes that are long in the left-right direction.

A left inner wall 861 is provided to the rear of the second cylindrical member 882B and on the left front side of the first bottom tape area 400B. A right inner wall 862 is provided on the right front side of the second bottom tape area 410B and on the right rear side of the first bottom ribbon area 420B. In a plan view, the left inner wall 861 and the right inner wall 862 are rectangular wall portions that are provided slightly to the inside of the bottom perimeter wall 304. A sixth connecting hole 876B that, in a side view, is a rectangular through-hole that is long in the front-rear direction is provided in the left inner wall 861. A seventh connecting hole 877B that, in a side view, is a rectangular through-hole that is long in the front-rear direction is provided in the right inner wall 862.

The structure of the top case 311 will be explained with reference to FIGS. 15, 17 to 19, 22, 23, 27, and 28. As shown in FIGS. 18 and 19, the outline of the top case 311 is formed by the top plate 305 (refer to FIG. 22) and a top perimeter wall 303. The top perimeter wall 303 is a side wall that runs around the outer edge of the top face 301 and extends downward from the top plate 305 to a specified height. Of the top perimeter wall 303, a wall portion that forms the top portion of the arm front face wall 35 is a top arm front face wall 35A. A wall portion that extends downward from the top plate 305 in a position that is separated from and to the rear of the top arm front face wall 35A is a top arm rear face wall 37A that forms the top portion of the arm rear face wall 37. A perimeter wall that extends continuously from the top arm rear face wall 37A is a top head perimeter wall 36A that forms the top portion of the head perimeter wall 36.

Figure 22:
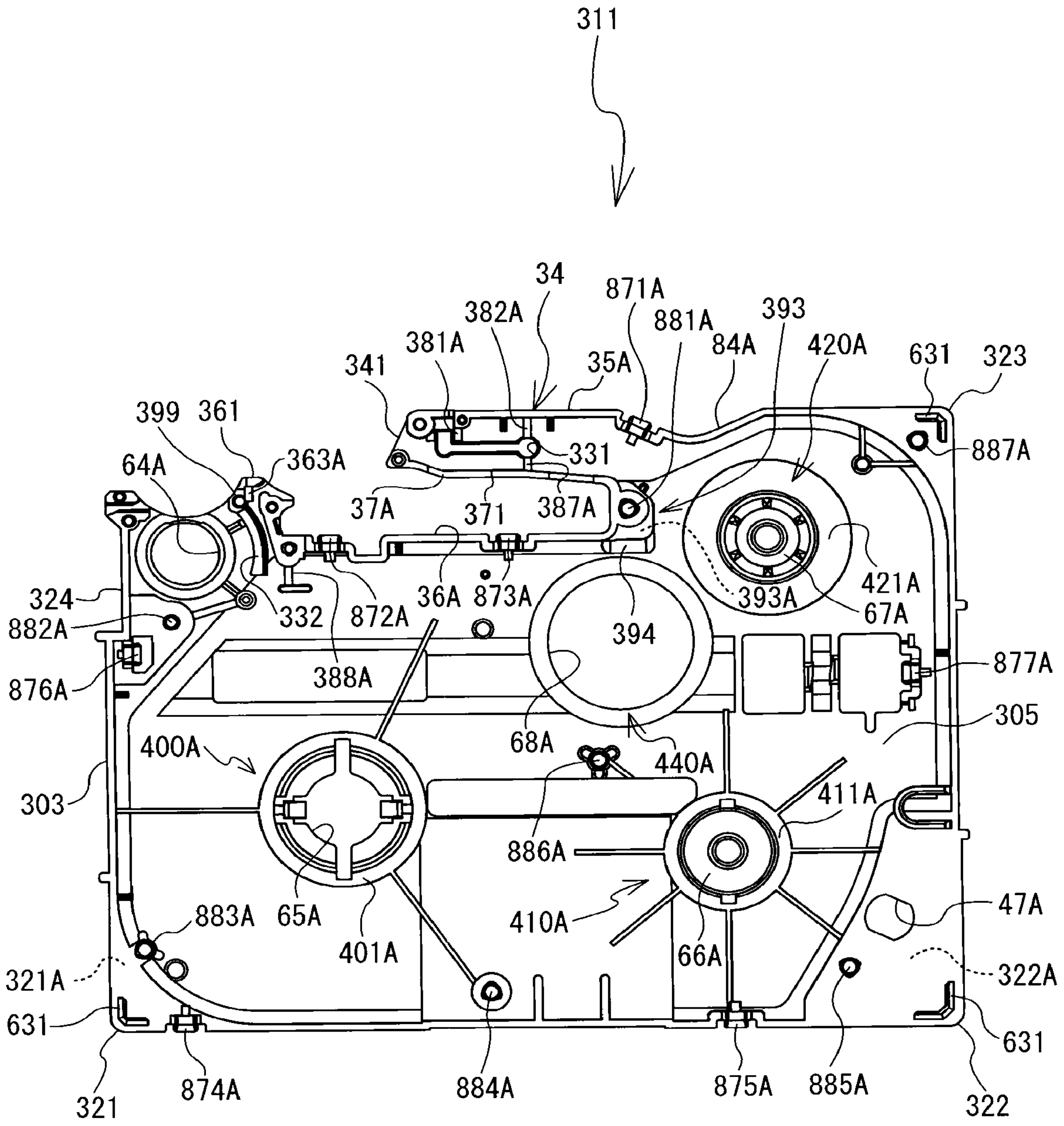
FIG. 22 is a bottom view of the top case 311.

The structure that surrounds the head insertion portion 39 in the top case 311 will be explained in detail. As shown in FIGS. 15 and 22, the press receiving portion 393 is provided such that it is connected to the upstream end, in the tape feed direction, of the head insertion portion 39 of the top case 311. When the top case 311 and the bottom case 312 are joined, the press receiving portion 393 overlaps with the first receiving portion 391 in the vertical direction. The press receiving portion 393 is a recessed portion that is a portion of the top plate 305 that has been recessed in a downward direction from the top face 301. In the same manner as the first receiving portion 391, the press receiving portion 393 is recessed from the head insertion portion 39 in the direction along the arm front face wall 35.

The press receiving portion 393 includes a first top flat surface portion 393A. The first top flat surface portion 393A is the top surface of a flat portion (the bottom portion of the recessed portion) that is roughly rectangular in a plan view and that is positioned lower than the top face 301. A distance between the height position (that is, the position in the up-down direction) of the first top flat surface portion 393A in the top case 311 and the center position in the width direction of the tape and the ink ribbon 60 that are contained in the cassette case 31 remains constant, regardless of the type of the tape in the tape cassette 30. Accordingly, the greater the widths of the tape and the ink ribbon 60 that are contained in the cassette case 31 become, the greater the depth of the press receiving portion 393 becomes with respect to the height position of the first top flat surface portion 393A.

The first top flat surface portion 393A is a reference surface in the top case 311. In the present embodiment, the first top flat surface portion 393A is provided as the reference surface in relation to various types of restraining portions that are adapted to restrain the upward movements of the tape and the ink ribbon 60. When the tape cassette 30 is mounted in the cassette mounting portion 8 and the cassette cover 6 is closed, the first top flat surface portion 393A may also function as a portion that is pressed from above by the head pressing member 7 (refer to FIG. 2).

The first bottom flat surface portion 391B of the bottom case 312 (refer to FIG. 16) is positioned directly below the first top flat surface portion 393A. In other words, the first top flat surface portion 393A and the first bottom flat surface portion 391B are at least partially opposed one another in the up-down direction of the tape cassette 30. An inclined portion 394 is provided to the rear of the first top flat surface portion 393A. The inclined portion 394 is a side face of the press receiving portion 393 that slants upward and to the rear from the rear edge of the first top flat surface portion 393A and that extends from the rear edge of the first top flat surface portion 393A to the top face 301.

Portions of the top case 311 that form an area around the arm portion 34 will be explained in detail. As shown in FIGS. 17 to 19 and 22, the portions of the top case 311 that form the arm portion 34 include a top arm front face wall 35A and a top arm rear face wall 37A. The top arm front face wall 35A and the top arm rear face wall 37A respectively correspond to the bottom arm front face wall 35B and the bottom arm rear face wall 37B in the bottom case 312. Accordingly, the height of the top arm front face wall 35A is greater than that of the top arm rear face wall 37A.

An fixing slot 331 is provided in the top plate 305 in a position that corresponds to the separating wall 33 of the bottom case 312. The fixing slot 331 is a slot that has the same shape as the separating wall 33 in a plan view. When the top case 311 and the bottom case 312 are joined, a top edge 330 of the separating wall 33 is fitted into the fixing slot 331, and the top case 311 and the bottom case 312 are fixed in place (refer to FIG. 27).

As shown in FIGS. 17 and 18, the left end of the top arm front face wall 35A is a top tip portion 85A that forms the top portion of the arm tip portion 85. The bottom edge of the top tip portion 85A is a top contact-separate portion 86A that forms the top portion of the contact-separate portion 86. A groove that is formed in the top case 311 to the right of the top arm front face wall 35A is a top semi-circular groove 84A that forms the top portion of the semi-circular groove 84. A recessed portion 684 that is formed as a recess in a plan view is provided in the left side of the top semi-circular groove 84A. The depth of the recessed portion of the recessed portion 684 is approximately equal to the thickness of the wall that forms the bottom semi-circular groove 84B of the bottom case 312.

A projecting portion 689 that projects downward is provided in the top contact-separate portion 86A. The projecting portion 689 is a roughly cylindrical body that is formed such that its diameter is smaller than that of the tip hole 687. Starting from slightly above the middle in the up-down direction, the projecting portion 689 gradually becomes thinner towards its bottom end. In other words, the shaft diameter of the projecting portion 689 gradually decreases toward the tip (the bottom end).

As shown in FIG. 22, in the portions of the top case 311 that form the arm portion 34, the feed path for the tape is formed between the top arm front face wall 35A and the fixing slot 331. The feed path for the ink ribbon 60 is formed between the fixing slot 331 and the top arm rear face wall 37A. Restraining pieces that are adapted to restrain the upward movements of the tape and the ink ribbon 60 are provided along the feed paths, in the same manner as in the bottom case 312.

For the feed path for the tape, a first top tape restraining portion 381A is provided such that it touches the left end of the fixing slot 331. A first top tape restraining portion 382A is provided such that it touches the right end of the fixing slot 331. The first top tape restraining portions 381A, 382A each project slightly downward from the bottom surface of the top plate 305 and extend toward the front as far as the top arm front face wall 35A. The first top tape restraining portions 381A, 382A are each adapted to restrain the upward movement of the tape.

For the feed path for the ink ribbon 60, a first top ribbon restraining portion 387A is provided such that it touches the right end of the fixing slot 331 for restraining the upward movement of the ink ribbon 60. The first top ribbon restraining portion 387A projects slightly downward from the bottom surface of the top plate 305 and extends toward the rear as far as the top arm rear face wall 37A.

The height positions of the first top tape restraining portions 381A, 382A and the first top ribbon restraining portion 387A in the top case 311 are each set using the first top flat surface portion 393A as the reference surface.

More specifically, the distance in the up-down direction between the projecting edges (the lower edges) of the first top tape restraining portions 381A, 382A and the first top flat surface portion 393A is set in accordance with the width of the tape. The distance in the up-down direction between the projecting edge of the first top ribbon restraining portion 387A and the first top flat surface portion 393A is set in accordance with the width of the ink ribbon 60. As described previously, the first top flat surface portion 393A is provided in the vicinity of the upstream end of the head insertion portion 39. In other words, each of the restraining portions that are provided in the arm portion 34 is in the vicinity of the first top flat surface portion 393A that is the reference surface.

Therefore, the dimensional accuracy during the manufacturing of the each of the restraining portions can be improved by using the first top flat surface portion 393A as the reference surface, which in turn makes it possible to improve the feeding accuracy of the tape and the ink ribbon 60. The arm portion 34 is located in the vicinity of the upstream side of the position (specifically, the open portion 77) where the printing is performed by the thermal head 10 (refer to FIG. 5). Therefore, in conjunction with the improvement in the feeding accuracy of the tape and the ink ribbon 60 within the arm portion 34, the printing accuracy of the thermal head 10 can also be improved.

In the present embodiment, the restraining portions in the arm portion 34 are provided not only in the bottom case 312, but also in the top case 311. Thus, within the arm portion 34, the movements of the tape and the ink ribbon 60 in the width direction may be further restrained. Therefore, the feeding accuracy of the tape and the ink ribbon 60 can be improved, which in turn makes it possible to further improve the printing accuracy of the thermal head 10. In addition, after the top case 311 has been manufactured, the dimensional control of each of the restraining portions can be carried out easily using the first top flat surface portion 393A as a reference.

The first top flat surface portion 393A is provided at a fixed distance in the up-down direction from the center of the width direction of the tape and the ink ribbon 60 that are contained in the cassette case 31. The positions of the tape and the ink ribbon 60 in the width direction in relation to the position of the first top flat surface portion 393A in the up-down direction may therefore become clearer, making it possible to improve the feeding accuracy of the tape and the ink ribbon 60.

The portions of the top case 311 that form an area around the separator portion 61 will be explained in detail. As shown in FIGS. 18 to 19, 22, and 28, an fixing slot 332 is provided in the top plate 305 in a position that corresponds to the separating wall 43 of the bottom case 312. The fixing slot 332 is a slot that has the same shape as the separating wall 43 in a plan view. An fixing hole 399 that has the same diameter as the projecting portion 398 that is provided in the separating wall 43 is provided in a position that corresponds to the projecting portion 398. When the top case 311 and the bottom case 312 are joined, the upper edge of the separating wall 43 is fitted into the fixing slot 332, and the projecting portion 398 is fitted into the fixing hole 399, such that the top case 311 and the bottom case 312 are fixed in place.

The restraining member 361, which extends downward from the top plate 305, is provided in front of the fixing slot 332. When the top case 311 and the bottom case 312 are joined, a vertically long gap that is formed between the ribbon guide wall 38 and the restraining member 361 may function as the upper part of the inlet 61A. A vertically long gap that is formed between the separating wall 43 and the restraining member 361 may function as the upper part of the tape guide outlet 61B. Note that a portion of the top plate 305 that extends to the right from the fixing slot 332 is a wall portion that forms the upper edge of the ribbon guide outlet 61C.

On the upper end of the inlet 61A and the upper end of the ribbon guide outlet 61C, the lower surface of the top plate 305 forms a continuous flat surface without any unevenness. In contrast, a second top tape restraining portion 363A that projects slightly downward from the top plate 305 is provided continuously between the fixing slot 332 and a base portion of the restraining member 361. In other words, the second top tape restraining portion 363A is provided in a position in the up-down direction that corresponds to the second bottom tape restraining portion 363B of the bottom case 312, and it may function as the upper end of the tape guide outlet 61B. The upper end of the tape guide outlet 61B (that is, the projecting edge of the second top tape restraining portion 363A) is positioned lower than the upper end of the inlet 61A (that is, the lower surface of the top plate 305). In other words, the second top tape restraining portion 363A forms a stepped portion such that the upper end of the tape guide outlet 61B is lower than the upper end of the inlet 61A.

In a state in which the top case 311 has been joined to the bottom case 312, the second top tape restraining portion 363A and the separating wall restraining portion 364 of the bottom case 312 are adjacent to one another on the right and left. At this time, the projecting edge (the lower edge) of the second top tape restraining portion 363A and the lower edge of the separating wall restraining portion 364 are aligned at the same height position. Therefore, the second top tape restraining portion 363A, together with the separating wall restraining portion 364, may restrain the upward movement of the tape that passes through the tape guide outlet 61B.

In the present embodiment, the restraining portions in the separator portion 61 are provided not only in the bottom case 312, but also in the top case 311. Thus, within the separator portion 61, the movement of the tape in the width direction may be further restrained. The tape can therefore be fed from the separator portion 61 toward the tape drive roller 46 such that it is precisely parallel to the center line in the width direction of the tape.

The portions of the top case 311 that form the first corner portion 321 and the second corner portion 322, as well as the areas where the tapes and the ink ribbon 60 are contained, will be explained in detail. As shown in FIGS. 18, 19, and 22, the top case 311 includes a second top flat surface portion 321A that is a top surface of the first corner portion 321 and a third top flat surface portion 322A that is a top surface of the second corner portion 322. The second top flat surface portion 321A and the third top flat surface portion 322A are both flat surface portions that are positioned lower than the top face 301. When the top case 311 and the bottom case 312 are joined, the second top flat surface portion 321A and the third top flat surface portion 322A are positioned vertically opposite the third bottom flat surface portion 321B and the fourth bottom flat surface portion 322B, respectively (refer to FIG. 16).

A distance between the height positions of the second and the third top flat surface portions 321A, 322A in the top case 311 and the center position in the width direction of the tape and the ink ribbon 60 remains constant, regardless of the type of the tape in the tape cassette 30. Accordingly, the greater the widths of the tape and the ink ribbon 60 that are contained in the cassette case 31 become, the greater the distance becomes from the top face 301 to the second and the third top flat surface portions 321A, 322A.

In the present embodiment, the second and the third top flat surface portions 321A, 322A are located in positions that are separated by the same distance in the up-down direction from the center position in the width direction of the tape and the ink ribbon 60 (in the present embodiment, the center position in the up-down direction of the cassette case 31), in the same manner as the first top flat surface portion 393A. In other words, the first to the third top flat surface portions 393A, 321A, 322A are all at the same height position in the top case 311. The second and the third top flat surface portions 321A, 322A may be used as the reference surfaces for the restraining portions that are adapted to restrain the upward movements of the tape and the ink ribbon 60.

The top case 311 includes a first top tape area 400A, a second top tape area 410A, a first top ribbon area 420A, and a second top ribbon area 440A. The first top tape area 400A forms the top portion of the first tape area 400. The second top tape area 410A forms the top portion of the second tape area 410. The first top ribbon area 420A forms the top portion of the first ribbon area 420. The second top ribbon area 440A forms the top portion of the second ribbon area 440.

As shown in FIG. 22, a projecting portion that projects slightly downward from the lower surface of the top plate 305 is provided in the first top tape area 400A. More specifically, a ring-shaped projecting portion on which the first tape spool 40 (refer to FIG. 5) is disposed is provided in the center position of the first top tape area 400A. Three linear projecting portions extend radially outward from the ring-shaped projecting portion to the outer edge of the first top tape area 400A. These projecting portions form a third top tape restraining portion 401A.

The third top tape restraining portion 401A is adapted to restrain the upward movement of the tape (refer to FIGS. 5 to 8) that is contained in the first tape area 400. In other words, the tape that is contained in the first tape area 400 is positioned in the width direction by the third top tape restraining portion 401A and the third bottom tape restraining portion 401B (refer to FIG. 20).

The height position of the third top tape restraining portion 401A in the top case 311 is set using the neighboring second top flat surface portion 321A as the reference surface. More specifically, the distance in the up-down direction between the projecting edge (the lower edge) of the third top tape restraining portion 401A and the second top flat surface portion 321A is set in accordance with the width of the tape. It is therefore possible to improve the dimensional accuracy during the manufacturing of the third top tape restraining portion 401A by using the second top flat surface portion 321A as the reference surface. After the top case 311 has been manufactured, the dimensional control of the third top tape restraining portion 401A can be carried out easily.

A second top ribbon restraining portion 388A that projects slightly downward from the lower surface of the top plate 305 is provided slightly to the right of the rear edge of the fixing slot 332. The second top ribbon restraining portion 388A is provided in a position that corresponds to the second bottom ribbon restraining portion 388B of the bottom case 312 in the up-down direction. The second top ribbon restraining portion 388A is adapted to restrain the upward movement of the ink ribbon 60 that is being fed from the separator portion 61 to the second ribbon area 440. In other words, the ink ribbon 60 that is being fed from the separator portion 61 to the second ribbon area 440 may be positioned in the width direction within the cassette case 31 by the second top ribbon restraining portion 388A and the second bottom ribbon restraining portion 388B (refer to FIG. 20).

A projecting portion that projects slightly downward from the lower surface of the top plate 305 is provided in the second top tape area 410A, in the same manner as in the first top tape area 400A. More specifically, a ring-shaped projecting portion on which the second tape spool 41 (refer to FIG. 5) is disposed is provided in the center position of the second top tape area 410A. Eight linear projecting portions extend radially outward from the ring-shaped projecting portion to the outer edge of the second top tape area 410A. These projecting portions form a fourth top tape restraining portion 411A.

The fourth top tape restraining portion 411A is adapted to restrain the upward movement of the tape (refer to FIGS. 5 and 6) that is contained in the second tape area 410. In other words, the tape that is contained in the second tape area 410 may be positioned in the width direction by the fourth top tape restraining portion 411A and the fourth bottom tape restraining portion 411B (refer to FIG. 20).

The height position of the fourth top tape restraining portion 411A in the top case 311 is set using the neighboring third top flat surface portion 322A as the reference surface. More specifically, the distance in the up-down direction between the projecting edge (the lower edge) of the fourth top tape restraining portion 411A and the third top flat surface portion 322A is set in accordance with the tape width. It is therefore possible to improve the dimensional accuracy during the manufacturing of the fourth top tape restraining portion 411A by using the third top flat surface portion 322A as the reference surface. After the top case 311 has been manufactured, the dimensional control of the fourth top tape restraining portion 411A can be carried out easily.

A projecting portion that projects slightly downward from the lower surface of the top plate 305 is provided in the first top ribbon area 420A. More specifically, a projecting portion that is provided in a ring shape in the center position of the first top ribbon area 420A and on which the ribbon spool 42 (refer to FIG. 5) is disposed is a third top ribbon restraining portion 421A. The third top ribbon restraining portion 421A is adapted to restrain the upward movement of the unused ink ribbon 60 (refer to FIGS. 5 to 7) that is contained in the first ribbon area 420. In other words, the ink ribbon 60 that is contained in the first ribbon area 420 may be positioned in the width direction by the third top ribbon restraining portion 421A and the third bottom ribbon restraining portion 421B (refer to FIG. 20).

The height position of the third top ribbon restraining portion 421A in the top case 311 is set using the neighboring first top flat surface portion 393A as the reference surface. More specifically, the distance in the up-down direction between the projecting edge (the lower edge) of the third top ribbon restraining portion 421A and the first top flat surface portion 393A is set in accordance with the width of the ink ribbon 60. It is therefore possible to improve the dimensional accuracy during the manufacturing of the third top ribbon restraining portion 421A by using the first top flat surface portion 393A as the reference surface. After the top case 311 has been manufactured, the dimensional control of the third top ribbon restraining portion 421A can be carried out easily.

In the present embodiment, the projecting edges of the first to the fourth top tape restraining portions 381A, 382A, 363A, 401A, 411A, as well as the lower edges of the separating wall restraining portion 364 and the separating wall restraining portion 383, are all set to the same height position, regardless of their individual placement positions. Therefore, the upward movements of the tape that is contained in the first tape area 400 and the tape that is contained in the second tape area 410 may be each restrained at the same height position as the tape that is in the arm portion 34 and the separator portion 61.

Furthermore, the projecting edges of the first to the third top ribbon restraining portions 387A, 388A, 421A are all set to the same height position, regardless of their individual placement positions. Therefore, the upward movements of the ink ribbon 60 that is contained in the first ribbon area 420 and the ink ribbon 60 that is moving from the separator portion 61 to the second ribbon area 440 may be restrained at the same height position as the ink ribbon 60 that is in the arm portion 34.

Thus, in the receptor type of the tape cassette 30 that is shown in FIG. 7, the printing tape 57 can be fed from the first tape area 400, through the arm portion 34, and to the separator portion 61 such that it is precisely parallel to the center line in the width direction of the tape. In the thermal type of the tape cassette 30 that is shown in FIG. 8, the thermal paper tape 55 can be fed from the first tape area 400, through the arm portion 34, and to the separator portion 61 such that it is precisely parallel to the center line in the width direction of the tape.

In the laminated type of the tape cassette 30 that is shown in FIGS. 5 and 6, the film tape 59 can be fed from the second tape area 410, through the arm portion 34, and to the separator portion 61 such that it is precisely parallel to the center line in the width direction of the tape. At the same time, the double-sided adhesive tape 58 that is contained in the first tape area 400 can be fed toward the tape drive roller 46 such that it is precisely parallel to the center line in the width direction of the tape. This in turn makes it possible for the positions of the double-sided adhesive tape 58 and the film tape 59 to match precisely in the width direction.

In the receptor type and the laminated type of the tape cassette 30, the ink ribbon 60 can be fed from the first ribbon area 420, through the arm portion 34, and to the second ribbon area 440 such that it is precisely parallel to the center line in the width direction of the ink ribbon 60. Therefore, whatever the type of the tape cassette 30, the feeding accuracy of the tapes and the ink ribbon 60 can be improved, which in turn makes it possible to improve the printing accuracy of the thermal head 10.

In the present embodiment, the projecting edges of the first to the fourth bottom tape restraining portions 381B, 382B, 363B, 401B, 411B, the lower edges of the separating wall restraining portion 364 and the separating wall restraining portion 383, and the projecting edges of the first to the third bottom ribbon restraining portions 387B, 388B, 421B are all set to the same height position. In other words, the downward movements of the tapes and the ink ribbon 60 are restrained at the same height position by each of the restraining portions that are provided in the bottom case 312.

Furthermore, the projecting edges of the first to the fourth top tape restraining portions 381A, 382A, 363A, 401A, 411A, as well as the projecting edges of the first to the third top ribbon restraining portions 387A, 388A, 421A, are all set to the same height position. In other words, the upward movements of the tapes and the ink ribbon 60 are restrained at the same height position by each of the restraining portions that are provided in the top case 311.

Therefore, in the receptor type of the tape cassette 30, the printing tape 57 and the ink ribbon 60 can be fed in a state in which their positions in the width direction match one another precisely. In the laminated type of the tape cassette 30, the film tape 59 and the ink ribbon 60 can be fed in a state in which their positions in the width direction match one another precisely. Accordingly, the feeding accuracy of the tapes and the ink ribbon 60 can be improved, which in turn makes it possible to improve further the printing accuracy of the thermal head 10.

Press fitting pins and connecting arms are provided in the top case 311 for joining the top case 311 and the bottom case 312.

As shown in FIGS. 18, 19, and 22, a first press fitting pin 881A that projects downward is provided on the press receiving portion 393. To put it differently, the first press fitting pin 881A is provided below the first top flat surface portion 393A in the vertical direction. The first press fitting pin 881A is provided on the first top flat surface portion 393A in a position that corresponds to the first cylindrical member 881B of the bottom case 312 (refer to FIG. 20).

Figure 23:
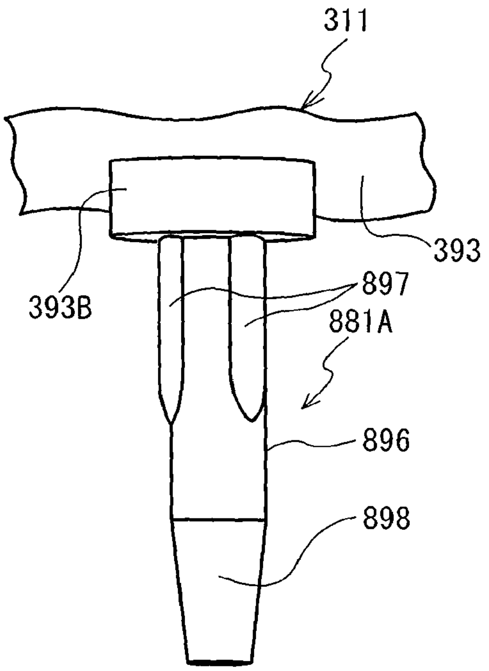
FIG. 23 is an oblique view of a first press fitting pin 881A.

As shown in FIG. 23, a cylindrical portion 393B is provided on the underside of the press receiving portion 393. The cylindrical portion 393B is a cylindrical body that projects downward from the lower surface of the press receiving portion 393 (the opposite surface of the first top flat surface portion 393A). The first press fitting pin 881A extends downward from the center of the bottom surface of the cylindrical portion 393B. The cylindrical portion 393B is adapted to determine the height of the tape cassette 30 by coming into contact with the upper end of the first cylindrical member 881B.

The first press fitting pin 881A includes a supporting column 896 and protuberances 897. The supporting column 896 is a roughly cylindrical shaft that extends downward from the center of the bottom surface of the cylindrical portion 393B. A lower portion of the supporting column 896 that is slightly below the center of the supporting column 896 in the up-down direction is a supporting column tip 898. The shaft diameter of the supporting column tip 898 gradually diminishes toward the bottom, such that it is smallest at the lower end of the supporting column tip 898. The shaft diameter at the lower end of the supporting column tip 898 is less than the diameter of the cylindrical hole 891 in the first cylindrical member 881B (refer to FIG. 21).

The protuberances 897 are provided on the perimeter of the supporting column 896 in a radial arrangement. The protuberances 897 around the perimeter surface of the supporting column 896 extend from the bottom side of the cylindrical portion 393B to approximately the center of the supporting column 896 in the up-down direction. In a plan view, each of the protuberances 897 is a circular arc that projects outward from the supporting column 896. The diameter of the first press fitting pin 881A, including the protuberances 897, is greater than the diameter of the cylindrical hole 891 (refer to FIG. 21).

In the lower portion of each of the protuberances 897, the width of the projection from the supporting column 896 gradually diminishes toward the bottom. When the first press fitting pin 881A is inserted into the cylindrical hole 891 (refer to FIG. 21), this may prevent the lower portions of the protuberances 897 from getting stuck on the top side of the first cylindrical member 881B (refer to FIG. 21). The structures of second to seventh press fitting pins 882A, 883A, 884A, 885A, 886A, 887A, which will be described later, are the same as the structure of the first press fitting pin 881A.

As shown in FIGS. 18, 19, and 22, the second press fitting pin 882A is provided to the rear of the tape drive roller 46 (more specifically, to the rear of an opening 64A, which will be described later) and on the left front side of the first top tape area 400A. The fourth press fitting pin 884A is provided on the opposite side of the first top tape area 400A from the second press fitting pin 882A, that is, on the right rear side of the first top tape area 400A, such that the center of the first top tape area 400A (more specifically, an opening 65A, which will be described later) is between the second press fitting pin 882A and the fourth press fitting pin 884A. The third press fitting pin 883A is provided on the opposite surface of the second top flat surface portion 321A, that is, on the left rear side of the first top tape area 400A.

In other words, the second to the fourth press fitting pins 882A, 883A, 884A are provided around the outer perimeter of the first top tape area 400A in the top case 311 in positions that respectively correspond to those of the second to the fourth cylindrical members 882B, 883B, 884B in the bottom case 312 (refer to FIG. 20). The second to the fourth press fitting pins 882A, 883A, 884A are provided such that they are separated from the top perimeter wall 303 of the top case 311.

The fifth press fitting pin 885A is provided on the opposite surface of the third top flat surface portion 322A, that is, on the right rear side of the second top tape area 410A. The sixth press fitting pin 886A is provided on the opposite side of the second top tape area 410A from the fifth press fitting pin 885A, that is, on the left front side of the second top tape area 410A, such that the center of the second top tape area 410A (more specifically, a top tape support portion 66A, which will be described later) is between the fifth press fitting pin 885A and the sixth press fitting pin 886A. The seventh press fitting pin 887A is provided on the opposite surface of the third corner portion 323, that is, on the right front side of the first top ribbon area 420A.

In other words, the fifth and the sixth press fitting pins 885A, 886A are provided around the outer perimeter of the second top tape area 410A in the top case 311 in positions that respectively correspond to those of the fifth and the sixth cylindrical members 885B, 886B in the bottom case 312 (refer to FIG. 20). The seventh press fitting pin 887A is provided in a position that corresponds to that of the seventh cylindrical member 887B in the bottom case 312 (refer to FIG. 20). The fifth to the seventh press fitting pins 885A, 886A, 887A are provided such that they are separated from the top perimeter wall 303 of the top case 311.

A plate-shaped piece that extends downward from the recessed portion 684 is a first connecting arm 871A. The first connecting arm 871A is provided in a position that corresponds to that of the first connecting hole 871B of the bottom case 312 (refer to FIG. 20). In a plan view, the first connecting arm 871A extends toward the upper right from the right end of the top arm front face wall 35A. The first connecting arm 871A flexes under external pressure that is applied obliquely in the front-rear direction. A hook that projects obliquely toward the right front is provided at the lower end of the first connecting arm 871A. The structures of second to seventh connecting arms 872A, 873A, 874A, 875A, 876A, 877A, which will be described later, are the same as the structure of the first connecting arm 871A, but the directions in which their hooks project are different.

The second connecting arm 872A and the third connecting arm 873A are provided on the left and right sides, respectively, in the top head perimeter wall 36A. The second and the third connecting arms 872A, 873A project downward in positions that respectively correspond to the second and the third connecting holes 872B, 873B in the bottom case 312 (refer to FIG. 20). The hooks of the second and the third connecting arms 872A, 873A project toward the front.

The fourth connecting arm 874A and the fifth connecting arm 875A are provided in the rear wall that is included in the top perimeter wall 303 of the top case 311. The fourth connecting arm 874A is provided to the left rear of the first top tape area 400A. The fifth connecting arm 875A is provided to the rear of the second top tape area 410A. The fourth and the fifth connecting arms 874A, 875A project downward in positions that respectively correspond to the fourth and the fifth connecting holes 874B, 875B in the bottom case 312 (refer to FIG. 20). The hooks of the fourth and the fifth connecting arms 874A, 875A project toward the rear.

The sixth connecting arm 876A is provided to the rear of the second press fitting pin 882A and to the left front of the first top tape area 400A. The sixth connecting arm 876A is provided slightly to the inside of the top perimeter wall 303 and projects downward in a position that corresponds to that of the sixth connecting hole 876B in the bottom case 312 (refer to FIG. 20). The seventh connecting arm 877A is provided to the right front of the second top tape area 410A and to the right rear of the first top ribbon area 420A. The seventh connecting arm 877A is provided slightly to the inside of the top perimeter wall 303 and projects downward in a position that corresponds to that of the seventh connecting hole 877B in the bottom case 312 (refer to FIG. 20). The hook of the sixth connecting arm 876A projects toward the right, and the hook of the seventh connecting arm 877A projects toward the left.

Structures of joints between the top case 311 and the bottom case 312 in the tape cassette 30 according to the present embodiment will be explained.

Figure 24:
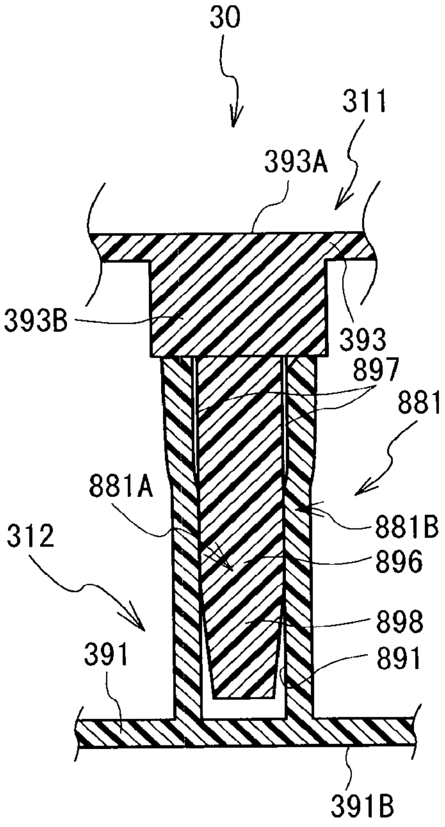
FIG. 24 is a side sectional view of a first press fitting portion 881.

Joint structures of first to seventh press fitting portions 881 to 887 will be explained with reference to FIGS. 21, 23, 24. FIG. 24 shows a form of a joint between the first cylindrical member 881B and the first press fitting pin 881A as an example, but forms of the joints between the second to the seventh cylindrical members 882B to 887B and the second to the seventh press fitting pins 882A to 887A are the same as this.

As shown in FIGS. 21 and 23, when the operator joins the top case 311 and the bottom case 312, first, the supporting column tip 898 of the first press fitting pin 881A is inserted into the cylindrical hole 891 of the first cylindrical member 881B. As described previously, the shaft diameter of the tip (the lower end) of the supporting column tip 898 is less than the diameter of the cylindrical hole 891, and the diameter of the cylindrical hole 891 is largest at the upper end of the cylindrical hole 891. Therefore, the supporting column 896 can be guided smoothly into the cylindrical hole 891.

When the first press fitting pin 881A is inserted into the cylindrical hole 891 to a specified depth, the protuberances 897 come into contact with the inner perimeter wall of the cylindrical hole 891. As described previously, the width of the projection of the protuberances 897 from the supporting column 896 is smallest at the lower ends of the protuberances 897. Therefore, the protuberances 897 can be guided smoothly into the cylindrical hole 891 without getting stuck on the top side of the first cylindrical member 881B.

The diameter of the first press fitting pin 881A, including the protuberances 897, is greater than the diameter of the cylindrical hole 891. Therefore, the first press fitting pin 881A is inserted into the cylindrical hole 891 as the protuberances 897 are pressed by the first cylindrical member 881B. As the first press fitting pin 881A is inserted into the cylindrical hole 891, the first cylindrical member 881B is slightly widened outward by the repelling force of the protuberances 897.

When the first press fitting pin 881A is inserted farther into the cylindrical hole 891, the top side of the first cylindrical member 881B and the cylindrical portion 393B of the press receiving portion 393 come into contact, as shown in FIG. 24. The first cylindrical member 881B and the first press fitting pin 881A are thus solidly joined, and the first press fitting portion 881 is formed (refer to FIGS. 5 to 8).

In the same manner, when the operator joins the top case 311 and the bottom case 312, the second press fitting pin 882A (refer to FIG. 22) is inserted into the second cylindrical member 882B (refer to FIG. 20), and the second press fitting portion 882 is formed. The third press fitting pin 883A (refer to FIG. 22) is inserted into the third cylindrical member 883B (refer to FIG. 20), and the third press fitting portion 883 is formed. The fourth press fitting pin 884A (refer to FIG. 22) is inserted into the fourth cylindrical member 884B (refer to FIG. 20), and the fourth press fitting portion 884 is formed.

The fifth press fitting pin 885A (refer to FIG. 22) is inserted into the fifth cylindrical member 885B (refer to FIG. 20), and the fifth press fitting portion 885 is formed. The sixth press fitting pin 886A (refer to FIG. 22) is inserted into the sixth cylindrical member 886B (refer to FIG. 20), and the sixth press fitting portion 886 is formed. The seventh press fitting pin 887A (refer to FIG. 22) is inserted into the seventh cylindrical member 887B (refer to FIG. 20), and the seventh press fitting portion 887 is formed. The bottom case 312 and the top case 311 are joined by the first to the seventh press fitting portions 881 to 887.

As shown in FIGS. 5 to 8, four of the press fitting portions (that is, the second press fitting portion 882, the third press fitting portion 883, the fourth press fitting portion 884, and the sixth press fitting portion 886) are provided around the first tape area 400, which contains the heaviest tape. The second and the fourth press fitting portions 882, 884 are positioned opposite one another, with the center of the first tape area 400 approximately between them. The third and the sixth press fitting portions 883, 886 are also positioned opposite one another, with the center of the first tape area 400 approximately between them. Two of the press fitting portions (that is, the fifth press fitting portion 885 and the sixth press fitting portion 886) are provided around the second tape area 410, which contains the second heaviest tape. The fifth and the sixth press fitting portions 885, 886 are positioned opposite one another, with the center of the second tape area 410 approximately between them.

Two of the press fitting portions (that is, the first press fitting portion 881 and the sixth press fitting portion 886) are provided around the second ribbon area 440. The first and the sixth press fitting portions 881, 886 are positioned opposite one another, with the center of the second ribbon area 440 approximately between them. Furthermore, in a plan view of the tape cassette 30, four of the press fitting portions (that is, the second press fitting portion 882, the third press fitting portion 883, the fifth press fitting portion 885, and the seventh press fitting portion 887) are respectively provided in the vicinity of the four corner portions 321 to 324.

The bottom case 312 and the top case 311 are thus solidly joined around the tapes and the ink ribbon 60 that are contained in the cassette case 31 and at the four corners of the cassette case 31. This makes it easier to maintain the bottom case 312 and the top case 311 in the joined state even if a large physical shock is applied to the cassette case 31, as in a case where the tape cassette 30 has been dropped, for example. In other words, occurrence of loosening and gaps between the bottom case 312 and the top case 311 can be inhibited.

In addition, the sixth press fitting portion 886 fixes the bottom case 312 and the top case 311 in place in the area around the first tape area 400, the second tape area 410, and the second ribbon area 440, as well as in the center of the tape cassette 30. Among the press fitting portions that fix the four corners of the tape cassette 30 in place, the fifth press fitting portion 885 fixes the bottom case 312 and the top case 311 in place in the area around the second tape area 410. The second press fitting portion 882 and the third press fitting portion 883 fix the bottom case 312 and the top case 311 in place in the area around the first tape area 400. The seventh press fitting portion 887 fixes the bottom case 312 and the top case 311 in place in the area around the first ribbon area 420. The bottom case 312 and the top case 311 can thus be fixed in place efficiently, because each of the first to the seventh press fitting portions 881 to 887 has at least two fixing functions.

In a known tape cassette, in a case where the dimensional relationship between the first cylindrical member 881B and the first press fitting pin 881A exceeds its proper range, externally visible deformation and whitening may occur in the first cylindrical member 881B that is widened by the protuberances 897 when the first press fitting pin 881A is inserted into the first cylindrical member 881B (the same also being true for the second to the seventh cylindrical members 882B to 887B). Therefore, in a manufacturing process for the known tape cassette, an operator need to strictly control the respective dimensional relationships between the first to the seventh cylindrical members 881B to 887B and the first to the seventh press fitting pins 881A to 887A.

In the tape cassette 30 according to the present embodiment, all of the first to the seventh cylindrical members 881B to 887B are separated from the bottom perimeter wall 304. Accordingly, even if deformation and whitening were to occur in the first to the seventh cylindrical members 881B to 887B, those effects would tend not to be visible from outside the tape cassette 30. Furthermore, increasing the pressure at which the first to the seventh press fitting pins 881A to 887A are inserted (for example, by making the first to the seventh press fitting pins 881A to 887A thicker or the like) would make it possible to fix the bottom case 312 and the top case 311 in place even more firmly, while a worsening of the external appearance of the tape cassette 30 is inhibited. This in turn would reduce the burden on the operator of performing the dimensional control that is described above.

In the known tape cassette, the cylindrical members that are provided in the cassette case 31 are in contact with the bottom perimeter wall 304, so the synthetic resin of which the cassette case 31 is made tends to become thicker in areas on the inner side of the cassette case 31 where the cylindrical members and the bottom perimeter wall 304 are in contact. Therefore, when the cassette case 31 is molded, sink marks tend to appear in the outer surface of the bottom perimeter wall 304. Therefore, in the manufacturing process for the known tape cassette, a high level of operating precision is necessary in order to prevent the sink marks from occurring during the molding of the cassette case 31.

In the tape cassette 30 according to the present embodiment, all of the first to the seventh cylindrical members 881B to 887B are separated from the bottom perimeter wall 304. Accordingly, the thickening of the bottom perimeter wall 304 during the molding of the bottom case 312 can be inhibited. In other words, because the occurrence of the sink marks during the molding of the bottom case 312 can be inhibited, it is possible to inhibit the worsening of the external appearance of the tape cassette 30. This in turn would reduce the burden on the operator of performing the molding of the cassette case 31 at the high level of operating precision that is described above.

Structures of joints in the area around the arm portion 34 will be explained with reference to FIGS. 17, 18, and 25 to 27. As shown in FIG. 18, when the operator joins the top case 311 and the bottom case 312, first, the lower portion of the projecting portion 689 is inserted into the tip hole 687. As described previously, the projecting portion 689 becomes thinner towards its tip (its bottom end), and the diameter of the tip hole 687 is greatest at its upper end. Therefore, the projecting portion 689 can be guided smoothly into the tip hole 687.

When the projecting portion 689 is inserted into the tip hole 687 to a specified depth, the hook of the first connecting arm 871A comes into contact with the rear surface of the bottom semi-circular groove 84B, and the first connecting arm 871A bends slightly toward the rear. As the projecting portion 689 is inserted farther into the tip hole 687, the hook of the first connecting arm 871A moves downward along the rear surface of the bottom semi-circular groove 84B. When the hook of the first connecting arm 871A reaches the position of the first connecting hole 871B, the hook of the first connecting arm 871A is fitted into the first connecting hole 871B by the elastic force of the first connecting arm 871A.

Figure 25:
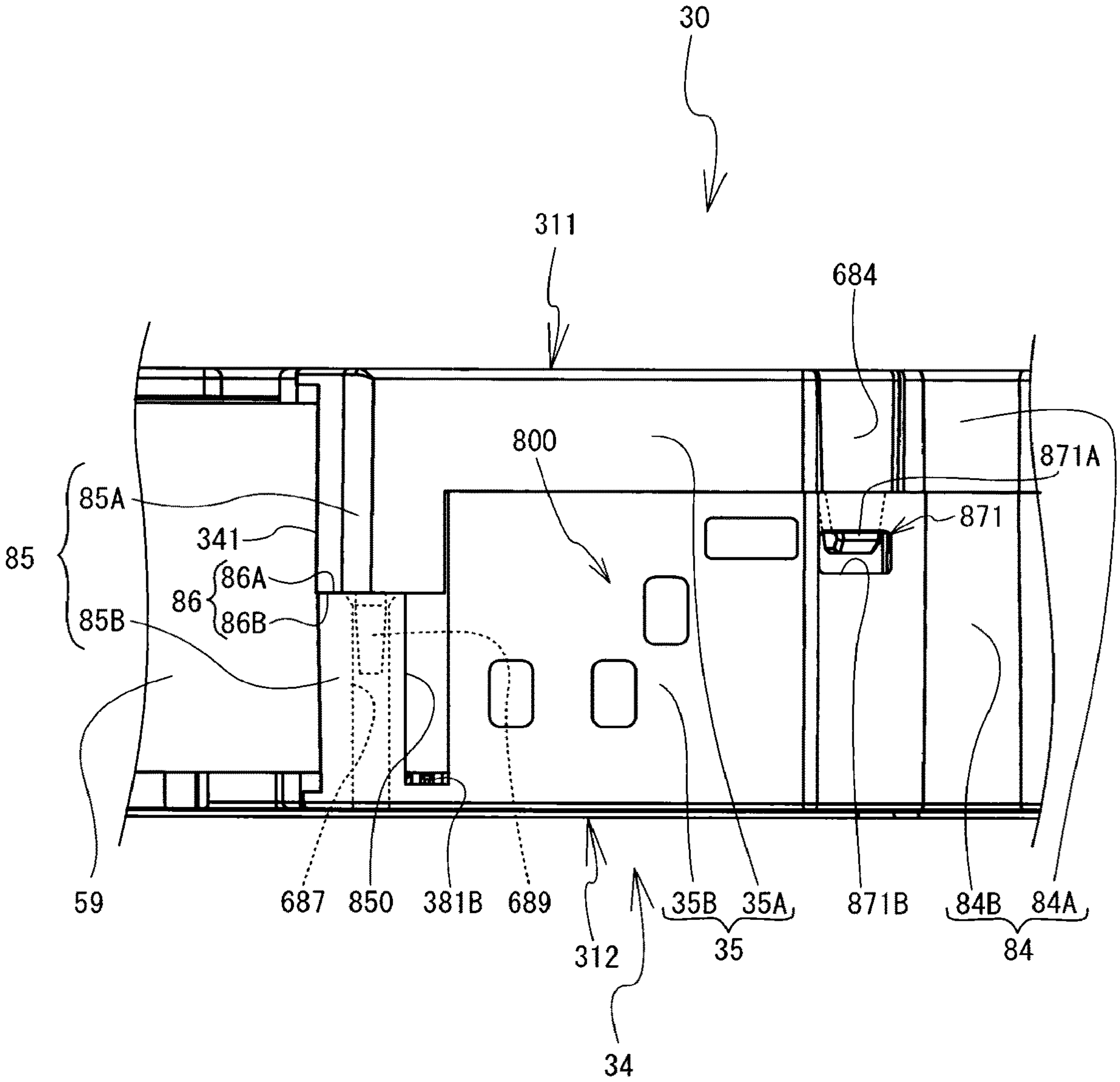
FIG. 25 is an enlarged front view of an area around an arm front face wall 35 of the tape cassette 30.
Figure 26:
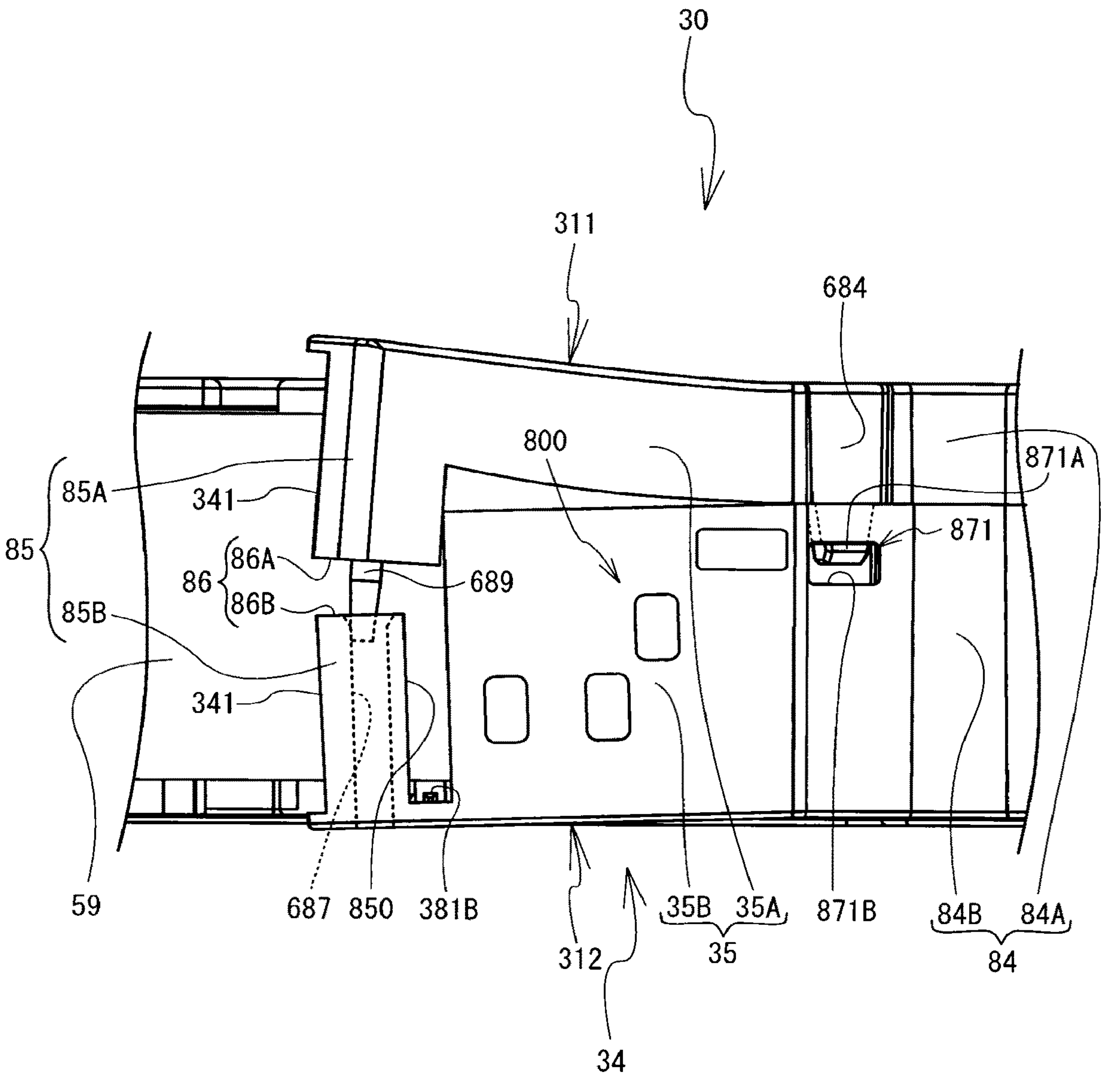
FIG. 26 is another enlarged front view of the area around the arm front face wall 35 of the tape cassette 30.

A first connecting portion 871 is thus formed, as shown in FIGS. 17 and 25. The bottom case 312 and the top case 311 are fixed in place by the first connecting portion 871 in the vicinity of the upstream end of the arm portion 34 in the tape feed direction. At the same time, the top contact-separate portion 86A and the bottom contact-separate portion 86B come into contact, and the contact-separate portion 86 is formed. Because the shaft diameter of the projecting portion 689 is smaller than the diameter of the tip hole 687, the top case 311 and the bottom case 312 are not fixed at the arm tip portion 85. Therefore, in response to external pressure, the projecting portion 689 that has been inserted into the tip hole 687 is able to move in a direction in which the projecting portion 689 separates from inside the tip hole 687 (in other words, in an upward direction), as shown in FIG. 26. In other words, the top contact-separate portion 86A and the bottom contact-separate portion 86B can contact with and separate from each other in the contact-separate portion 86.

As shown in FIG. 27, the top edge 330 of the separating wall 33 is fitted into the fixing slot 331 of the top case 311, and the separating wall 33 is fixed in place within the arm portion 34. Within the arm portion 34, the positions of the tape and the ink ribbon 60 in the width direction may be restrained by the various restraining portions (specifically, the first bottom tape restraining portions 381B, 382B, the separating wall restraining portion 383, the first bottom ribbon restraining portion 387B, the first top tape restraining portions 381A, 382A, and the first top ribbon restraining portion 387A). The movement of the tape toward the print surface side may be restrained by the first print surface side restraining portion 389.

Of the various restraining portions in the arm portion 34, the restraining portions that are adapted to restrain the tape in the vicinity of the exit 341 (the first bottom tape restraining portion 381B, the separating wall restraining portion 383, and the first print surface side restraining portion 389) are each provided in the bottom case 312. It is therefore possible for the movements of the tape in the width direction and toward the print surface side to be appropriately restrained at a stage immediately prior to the printing, regardless of the joined state of the top case 311 and the bottom case 312. It is also possible for the center position of the tape in the width direction to be precisely matched to the center position of the thermal head 10 in the up-down direction within the printing range.

As shown in FIGS. 20 and 22, the first top tape restraining portions 381A, 382A and the first bottom tape restraining portions 381B, 382B are provided along the tape feed path inside the arm portion 34. The position in the width direction of the tape that is being fed within the arm portion 34 may be therefore restrained on both the upstream side and the downstream side in the tape feed direction (that is, at two locations in a plan view).

On the other hand, the first top ribbon restraining portion 387A and the first bottom ribbon restraining portion 387B are provided on the feed path for the ink ribbon 60 inside the arm portion 34. The position in the width direction of the ink ribbon 60 that is being fed within the arm portion 34 is therefore restrained only on the upstream side in the feed direction (that is, at one location in a plan view). In other words, in the vicinity of the exit 341 of the arm portion 34, the position of the tape in the width direction is restrained, but the position of the ink ribbon 60 in the width direction is not restrained.

The ink ribbon 60 is thinner than the tape, so if it is restrained too much in the width direction, wrinkling tends to occur. In the present embodiment, the ink ribbon 60 may be restrained in the width direction on the upstream side inside the arm portion 34, but it is not restrained in the width direction on the downstream side inside the arm portion 34. In other words, while the ink ribbon 60 is restrained in the width direction inside the arm portion 34, it is allowed to deviate in the width direction in the vicinity of the exit 341. Therefore, the position of the ink ribbon 60 in the width direction may be maintained within an appropriate range, and the occurrence of wrinkling in the ink ribbon 60 can be inhibited.

In a case where the tape cassette 30 has been dropped or the like, for example, as the physical shock is applied to the cassette case 31, an external force may also be applied to the arm portion 34 in the up-down direction. In that case, the top contact-separate portion 86A and the bottom contact-separate portion 86B that form the contact-separate portion 86 may separate from one another, as shown in FIG. 26. Thereafter, the top contact-separate portion 86A and the bottom contact-separate portion 86B may be once again brought into contact by the elastic force of the top case 311 and the bottom case 312 that are joined at the first connecting portion 871 (refer to FIG. 25). In other words, even in a case where an external force has been applied to the arm portion 34 in the up-down direction, the arm tip portion 85 may return to its normal state.

When the arm tip portion 85 returns to its normal state, the positions of the tape and the ink ribbon 60 in the width direction inside the arm portion 34 may be once again appropriately restrained by the various restraining portions. Therefore, even in a case where a physical shock has been applied to the cassette case 31, the tape and the ink ribbon 60 can be fed appropriately, and good printing quality can be preserved. Thus the top contact-separate portion 86A momentarily separates from the bottom contact-separate portion 86B in response to the external pressure, thereby enabling mitigating of the external pressure. This in turn makes it possible to improve the physical durability performance of the arm portion 34.

As shown in FIG. 17, the first connecting portion 871 is provided in the semi-circular groove 84. In a plan view, the semi-circular groove 84 is a curved surface portion with a roughly semi-circular shape, so its resistance to deflection is greater than that of the arm front face wall 35, which is shaped like a flat plate. Therefore, even in a case where a physical shock has been applied to the cassette case 31, the coupling of the first connecting arm 871A with the first connecting hole 871B is not readily released. Accordingly, even in a case where the tape cassette 30 has been dropped or the like, for example, the top case 311 and the bottom case 312 can be firmly fixed in place by the first connecting portion 871.

As shown in FIG. 18, when the top case 311 is joined to the bottom case 312, the top tip portion 85A is guided toward the bottom tip portion 85B as the projecting portion 689 is inserted into the tip hole 687. Therefore, the top tip portion 85A and the bottom tip portion 85B may be prevented from touching the tape and the ink ribbon 60 inside the arm portion 34. Accordingly, it is possible to inhibit worsening of the printing quality that is due to damage to the tape or the like.

As shown in FIGS. 19, 20, 22, and 32, a notch 372 that is cut out in a downward-pointing V shape is provided in the bottom arm rear face wall 37B in the bottom case 312. A part of the separating wall 33 is exposed to the rear of the bottom arm rear face wall 37B through the notch 372. A projecting portion 371A that corresponds to the notch 372 and that projects downward in a V shape is provided in the top arm rear face wall 37A in the top case 311.

When the top case 311 is joined to the bottom case 312, the projecting portion 371A is fitted into the notch 372 without any gaps. The top arm rear face wall 37A and the bottom arm rear face wall 37B are thus joined, and the arm rear face wall 37 is formed (refer to FIG. 17). The joined state of the arm rear face wall 37 can therefore be made more solid than it would be in a case where the top edge of the bottom arm rear face wall 37B and the bottom edge of the top arm rear face wall 37A are each in the shape of straight lines, for example.

In a known tape cassette, problems in die molding may occur in a case where a gap between the separating wall 33 and the bottom arm rear face wall 37B in the bottom case 312 is narrow and the bottom arm rear face wall 37B is a wall portion that has approximately the same height as the separating wall 33. Specifically, in order to mold the two walls that are approximately the same height and are separated by only the narrow gap, a die is required that will fit between the two walls, but such a die would be thin, so it would be weak. Therefore, in a manufacturing process for the known tape cassette, adaptive procedures may be required, such as die maintenance, for example.

In the present embodiment, the notch 372 that is provided in the bottom arm rear face wall 37B exposes the separating wall 33 in a rear view. Therefore, a die that fits into the head insertion portion 39 (refer to FIG. 17) and a die that fits between the bottom arm rear face wall 37B and the separating wall 33 can be manufactured as a single unit by connecting them through a part of the die that fits into the notch 372, making it possible to improve the strength of the die. This in turn may reduce the burden on the operator of performing the adaptive procedures such as die maintenance and the like that are described above.

As shown in FIGS. 15 and 16, the arm rear face wall 37 is a wall portion that, as a whole, extends in the left-right direction. A bent portion 373 is provided slightly to the right of the left end of the arm rear face wall 37. The arm rear face wall 37 is bent slightly toward the rear at the bent portion 373. In other words, the arm rear face wall 37 bulges slightly toward the head insertion portion 39 on the downstream side in the tape feed direction in the arm portion 34.

The space between the arm rear face wall 37 and the separating wall 33 (that is, the distance in the front-rear direction) becomes slightly greater in the vicinity of the bent portion 373 (refer to FIG. 20). It is thus possible to ensure that the feed path for the ink ribbon 60 in the arm portion 34 will be fairly wide, so the movement performance of the ink ribbon 60 may be improved. The physical strength of the arm portion 34 can also be improved, compared to what it would be if the arm rear face wall 37 were a straight line in a plan view, for example.

A wall portion in the arm rear face wall 37 that extends toward the left front from the bent portion 373 is a tip end rear face wall 374. In other words, the tip end rear face wall 374 is the portion of the arm rear face wall 37 that is adjacent to the exit 341. In a plan view, the tip end rear face wall 374 slants toward the left front, so the length of the head insertion portion 39 in the front-rear direction becomes larger in the vicinity of the exit 341. Accordingly, the possibility can be reduced that the tip end of the arm portion 34 will touch the thermal head 10 when the head holder 74 is moved into and out of the head insertion portion 39.

Structures of joints of second to seventh connecting portions 872 to 877 will be explained with reference to FIG. 15. When the operator joins the top case 311 to the bottom case 312, a hook of the second connecting arm 872A (refer to FIG. 22) is fitted into the second connecting hole 872B (refer to FIG. 20), and the second connecting portion 872 is formed, in the same manner as the first connecting portion 871. A hook of the third connecting arm 873A (refer to FIG. 22) is fitted into the third connecting hole 873B (refer to FIG. 20), and the third connecting portion 873 is formed. A hook of the fourth connecting arm 874A (refer to FIG. 22) is fitted into the fourth connecting hole 874B (refer to FIG. 20), and the fourth connecting portion 874 is formed.

A hook of the fifth connecting arm 875A (refer to FIG. 22) is fitted into the fifth connecting hole 875B (refer to FIG. 20), and the fifth connecting portion 875 is formed. A hook of the sixth connecting arm 876A (refer to FIG. 22) is fitted into the sixth connecting hole 876B (refer to FIG. 20), and the sixth connecting portion 876 is formed. A hook of the seventh connecting arm 877A (refer to FIG. 22) is fitted into the seventh connecting hole 877B (refer to FIG. 20), and the seventh connecting portion 877 is formed. The bottom case 312 and the top case 311 are joined by these first to the seventh connecting portions 871 to 877.

More specifically, the first connecting portion 871 fixes the bottom case 312 and the top case 311 in place in the front face of the tape cassette 30. The second connecting portion 872 and the third connecting portion 873 fix the bottom case 312 and the top case 311 in place in the vicinity of the front face of the tape cassette 30. The fourth connecting portion 874 and the fifth connecting portion 875 fix the bottom case 312 and the top case 311 in place in the rear face of the tape cassette 30. The sixth connecting portion 876 fixes the bottom case 312 and the top case 311 in place in the vicinity of the left face of the tape cassette 30. The seventh connecting portion 877 fixes the bottom case 312 and the top case 311 in place in the vicinity of the right face of the tape cassette 30. In other words, the bottom case 312 and the top case 311 can be reliably fixed in place by the first to the seventh connecting portions 871 to 877 on every side face of the tape cassette 30 (the outer faces that the top perimeter wall 303 and the bottom perimeter wall 304 form, as shown in FIG. 18).

Figure 30:
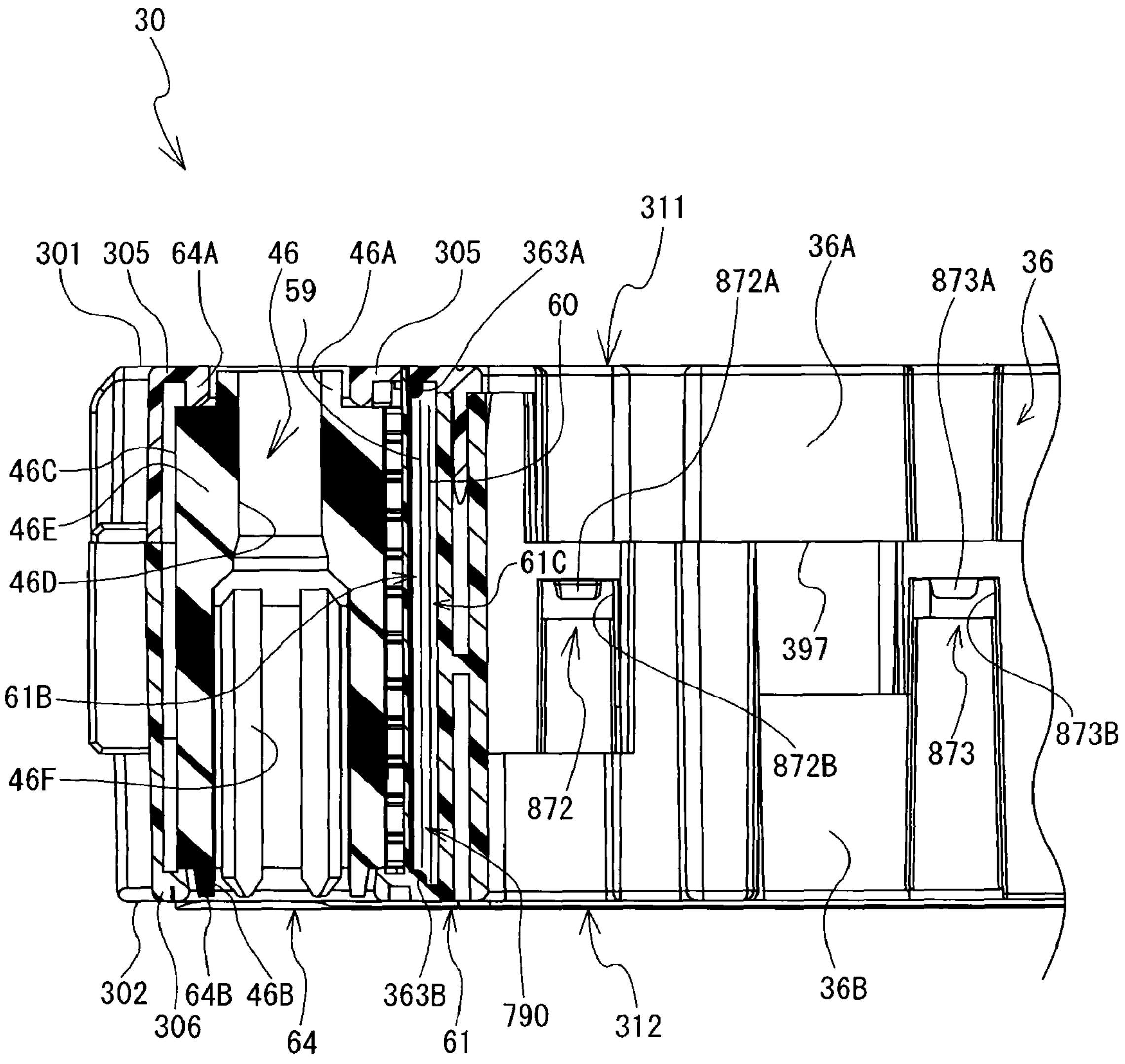
FIG. 30 is a sectional view along a line IV-IV in FIG. 15 as seen in the direction of the arrows.

The second connecting portion 872 and the third connecting portion 873 fix the bottom case 312 and the top case 311 in place in the vicinity of the head perimeter wall 36 (refer to FIG. 30). The second connecting portion 872 is provided in the vicinity of the tape drive roller 46 (refer to FIG. 5). The third connecting portion 873 is provided in the vicinity of the ribbon winding spool 44 (refer to FIG. 5). Therefore, vibrations that occur when the tape drive roller 46 and the ribbon winding spool 44 are rotationally driven may be inhibited by the second and the third connecting portion 872, 873. The movements of the tape and the ink ribbon 60 can therefore be stabilized, which in turn makes it possible to improve the printing quality.

The first tape spool 40 on which the heaviest tape is wound is contained in the first tape area 400. When the tape cassette 30 is dropped or the like, for example, the bottom case 312 and the top case 311 tend to separate in the vicinity of the first tape area 400, due to the weight of the tape that is wound around the first tape spool 40. In the present embodiment, the second, the fourth, and the sixth connecting portions 872, 874, 876 are provided in the vicinity of the first tape area 400. Accordingly, even in a case where a physical shock has been applied to the cassette case 31, the opening of the cassette case 31 in the vicinity of the first tape area 400 may be inhibited, which in turn makes it possible to improve the physical strength of the cassette case 31.

As described previously, when the bottom case 312 and the top case 311 are joined, the lower portion of the projecting portion 689 is inserted into the tip hole 687 before the hook of the first connecting arm 871A comes into contact with the bottom semi-circular groove 84B. It is therefore possible for the hook of the first connecting arm 871A to be fitted precisely into the first connecting hole 871B in a state in which the projecting portion 689 has been guided into the tip hole 687.

Furthermore, in the top case 311 according to the present embodiment, each of the first to the seventh press fitting pins 881A to 887A extends farther downward than does the corresponding one of the first to the seventh connecting arms 871A to 877A (refer to FIGS. 18 and 19). Therefore, when the bottom case 312 and the top case 311 are joined, the first to the seventh press fitting pins 881A to 887A are inserted into the first to the seventh cylindrical members 881B to 887B before the individual hooks of the first to the seventh connecting arms 871A to 877A come into contact with the bottom perimeter wall 304 and the like of the bottom case 312.

It is therefore possible for the hook of each of the first to the seventh connecting arms 871A to 877A to be fitted precisely into the corresponding one of the first to the seventh connecting holes 871B to 877B in a state in which each of the first to the seventh press fitting pins 881A to 887A has been guided into the corresponding one of the first to the seventh cylindrical members 881B to 887B. In other words, when the operator joins the top case 311 to the bottom case 312, the operator can join them precisely without tilting the top case 311.

As shown in FIG. 20, guide ribs 809 that extend upward as far as the top edge of the bottom perimeter wall 304 are provided on both the left and right edges of each of the second to the fifth connecting holes 872B to 875B. When the top case 311 is joined to the bottom case 312, the movements of the second to the fifth connecting arms 872A to 875A in the left-right direction may be restrained by the guide ribs 809 as the second to the fifth connecting arms 872A to 875A are guided toward the second to the fifth connecting holes 872B to 875B, respectively.

In the same manner, guide ribs 809 that extend upward as far as the top edges of the left inner wall 861 and the right inner wall 862 are provided on both the front and rear edges of each of the sixth and the seventh connecting holes 876B, 877B. The movements of the sixth and the seventh connecting arms 876A, 877A in the front-rear direction may be restrained by the guide ribs 809 as the sixth and the seventh connecting arms 876A, 877A are guided toward the sixth and the seventh connecting holes 876B, 877B, respectively. This makes it possible for the operator to join the bottom case 312 and the top case 311 more precisely.

As shown in FIG. 15, the third connecting portion 873 is provided in the right portion of the head perimeter wall 36, so it is positioned to the rear of the arm rear face wall 37 in a front view. The arm rear face wall 37 may prevent a finger or a foreign object from being inserted into the head insertion portion 39. It is therefore difficult for the hook of the third connecting arm 873A that is fitted into the third connecting hole 873B to be pressed directly from the outside.

Furthermore, in the state in which the bottom case 312 and the top case 311 have been joined, the sixth connecting portion 876 and the seventh connecting portion 877 are provided in the interior of the cassette case 31. It is therefore difficult for the hooks of the sixth and the seventh connecting arms 876A, 877A that are fitted into the sixth and the seventh connecting holes 876B, 877B to be pressed directly from the outside. Accordingly, the possibility is reduced that the connected states of the third, the sixth, and the seventh connecting portions 873, 876, 877 will be released by their hooks being pressed from the outside, for example.

The relationships between the joint structures and the reference surfaces of the tape cassette 30 will be explained with reference to FIGS. 5 to 8, 15, 16, 20, and 22. The first press fitting portion 881 is provided at the upstream end of the head insertion portion 39 between two of the reference surfaces (the first top flat surface portion 393A and the first bottom flat surface portion 391B) that are positioned opposite one another in the up-down direction. The first top flat surface portion 393A and the first bottom flat surface portion 391B may be held in appropriate height positions by the first press fitting portion 881.

In other words, the height positions of the various restraining portions (specifically, the first bottom tape restraining portions 381B, 382B, the separating wall restraining portion 383, the first bottom ribbon restraining portion 387B, the third bottom ribbon restraining portion 421B, the first top tape restraining portions 381A, 382A, and the first top ribbon restraining portion 387A) that are each provided in the vicinity of one of the first top flat surface portion 393A and the first bottom flat surface portion 391B may be appropriately maintained. It is therefore possible to improve the feeding accuracy of the tape and the ink ribbon 60, which in turn makes it possible to improve the printing accuracy of the thermal head 10.

The second connecting portion 872 is provided above the second bottom flat surface portion 392B in the vertical direction that is provided in the second receiving portion 392. The second bottom flat surface portion 392B may be held in an appropriate height position by the second connecting portion 872. In other words, the height positions of the various restraining portions (specifically, the second bottom tape restraining portion 363B, the second top tape restraining portion 363A, the separating wall restraining portion 364, the second bottom ribbon restraining portion 388B, and the second top ribbon restraining portion 388A) that are provided in the vicinity of the second bottom flat surface portion 392B are may be appropriately maintained. It is therefore possible to improve the feeding accuracy of the tape and the ink ribbon 60, which in turn makes it possible to improve the printing accuracy of the thermal head 10.

The third press fitting portion 883 is provided in the first corner portion 321 between two of the reference surfaces (the second top flat surface portion 321A and the third bottom flat surface portion 321B) that are positioned opposite one another in the up-down direction. The second top flat surface portion 321A and the third bottom flat surface portion 321B may be held in appropriate height positions by the third press fitting portion 883. In other words, the height positions of the various restraining portions (specifically, the third bottom tape restraining portion 401B and the third top tape restraining portion 401A) that are each provided in the vicinity of one of the third bottom flat surface portion 321B and the second top flat surface portion 321A may be appropriately maintained. It is therefore possible to improve the feeding accuracy of the tape, which in turn makes it possible to improve the printing accuracy of the thermal head 10.

The fifth press fitting portion 885 is provided in the second corner portion 322 between two of the reference surfaces (the third top flat surface portion 322A and the fourth bottom flat surface portion 322B) that are positioned opposite one another in the up-down direction. The third top flat surface portion 322A and the fourth bottom flat surface portion 322B may be held in appropriate height positions by the fifth press fitting portion 885. In other words, the height positions of the various restraining portions (specifically, the fourth bottom tape restraining portion 411B and the fourth top tape restraining portion 411A) that are each provided close to one of the third top flat surface portion 322A and the fourth bottom flat surface portion 322B may be appropriately maintained. It is therefore possible to improve the feeding accuracy of the tape, which in turn makes it possible to improve the printing accuracy of the thermal head 10.

When the top case 311 and the bottom case 312 are joined, the operator first supports the bottom case 312 on a jig. At this time, the operator places the first to the fourth bottom flat surface portions 391B, 392B, 321B, 322B, which are the reference surfaces, on mounting surfaces of the jig. The operator then joins the top case 311 from above to the bottom case 312 that is supported by the jig. The first to the seventh press fitting portions 881 to 887 and the first to the seventh connecting portions 871 to 877 are thus formed, as described previously, and the top case 311 and the bottom case 312 are joined. It is preferable for the height positions of the mounting surfaces of the jig to correspond precisely to the height positions of the first to the fourth bottom flat surface portions 391B, 392B, 321B, 322B.

In the present embodiment, the first to the fourth bottom flat surface portions 391B, 392B, 321B, 322B are all provided at the same height position in the bottom case 312. Correspondingly, the mounting surfaces of the jig are also all provided at the same height position. When forming the mounting surfaces of the jig, forming the mounting surfaces at the same height position makes it possible to form them more accurately and easily than in a case where the mounting surfaces are formed at different height positions. It is therefore possible to make the height position of the mounting surfaces of the jig correspond precisely to the height position of the first to the fourth bottom flat surface portions 391B, 392B, 321B, 322B.

Structures of joints in the area around the separator portion 61 will be explained with reference to FIGS. 15, 18, 19, and 28 to 30. As shown in FIGS. 18, 19, and 28, when the top case 311 is joined to the bottom case 312, the top edge of the separating wall 43 is fitted into the fixing slot 332 and the projecting portion 398 is fitted into the fixing hole 399, fixing the top case 311 and the bottom case 312 to one another. In this manner, the separator portion 61 that is adapted to separate the tape and the ink ribbon 60 that have been used for the printing in the open portion 77 is formed on the upstream side of the tape drive roller 46.

As shown in FIGS. 15 and 28 to 30, the printed tape and the ink ribbon 60 enter the separator portion 61 in a state of being superposed on one another, passing through the inlet 61A, which is a common feed path for the tape and the ink ribbon 60, and are fed to a separator outlet 790. The separator outlet 790 is a portion in which the tape guide outlet 61B and the ribbon guide outlet 61C are connected to the inlet 61A. In the separator outlet 790, the printed tape that has entered the separator portion 61 is separated from the used ink ribbon 60. After being separated, the ink ribbon 60 enters the ribbon guide outlet 61C and is guided to the second ribbon area 440. The tape from which the ink ribbon 60 has been separated enters the tape guide outlet 61B and is guided toward the front of the tape drive roller 46.

The separator outlet 790 according to the present embodiment is a single feed path in which an entrance to the tape guide outlet 61B and an entrance to the ribbon guide outlet 61C are lined up in the left-right direction. However, as described previously, the second top tape restraining portion 363A and the second bottom tape restraining portion 363B are provided on the top and bottom sides, respectively, of the tape guide outlet 61B. Accordingly, in the separator outlet 790, the length of the tape guide outlet 61B in the up-down direction is slightly smaller than the length of the ribbon guide outlet 61C in the up-down direction.

As described previously, although the position of the tape in the width direction may be restrained in the vicinity of the exit 341 of the arm portion 34, the position of the ink ribbon 60 in the width direction is not restrained. Therefore, after the tape that has been discharged from the arm portion 34 and printing has been performed on the tape by the thermal head 10, the tape tends to enter the separator portion 61 while maintaining its proper position in the width direction. In this case, the position in the width direction of the tape that has been fed as far as the separator outlet 790 may match almost perfectly the position in the up-down direction that is defined by the second top tape restraining portion 363A and the second bottom tape restraining portion 363B. Accordingly, the printed tape may not be interfered by the stepped portions (that is, the second top tape restraining portion 363A and the second bottom tape restraining portion 363B) that are formed between the inlet 61A and the tape guide outlet 61B, and the printed tape may enter the tape guide outlet 61B along the direction in which the tape drive roller 46 pulls the tape.

On the other hand, after being used for the printing by the thermal head 10, the ink ribbon 60 that has been discharged from the arm portion 34 tends to enter the separator portion 61 in a state in which it has deviated slightly from its proper position in the width direction. In this case, the position in the width direction of the ink ribbon 60 that has been fed as far as the separator outlet 790 deviates from the position in the up-down direction that is defined by the second top tape restraining portion 363A and the second bottom tape restraining portion 363B. Therefore, the used ink ribbon 60 tends to be interfered by the stepped portions that are formed between the inlet 61A and the tape guide outlet 61B.

In particular, before the ink ribbon 60 arrives at the separator portion 61 from the exit 341, the ink ribbon 60, due to its own weight, tends to deviate slightly downward from its proper position in the width direction. Therefore, the ink ribbon 60 that has been fed into the separator outlet 790 tends to come into contact with the stepped portion that is formed on the bottom side between the inlet 61A and the tape guide outlet 61B (that is, the second bottom tape restraining portion 363B). Accordingly, instead of entering the tape guide outlet 61B, the ink ribbon 60 enters the ribbon guide outlet 61C, whose length in the up-down direction is larger than that of the tape guide outlet 61B, along the winding direction of the ribbon winding spool 44.

Before the ink ribbon 60 arrives at the separator portion 61 from the exit 341, the ink ribbon 60 may also deviate slightly upward from its proper position in the width direction, due to vibration or the like that is caused by the printing operation. In that case, the ink ribbon 60 that has been fed into the separator outlet 790 comes into contact with the stepped portion that is formed on the top side between the inlet 61A and the tape guide outlet 61B (that is, the second top tape restraining portion 363A), so it enters the ribbon guide outlet 61C in the same manner as described above.

Thus, in the separator outlet 790, the ink ribbon 60 is guided from the inlet 61A to the ribbon guide outlet 61C by utilizing the fact that the ink ribbon 60 that is discharged from the arm portion 34 is allowed to move in the width direction. It is therefore possible to prevent the ink ribbon 60 from erroneously entering the tape guide outlet 61B by being dragged by the tape that is superposed on the ink ribbon 60, even in a case where the tape and the ink ribbon 60 have the same length (width) in the up-down direction. Note that, in the same manner as described above, it is also possible to prevent the ink ribbon 60 from erroneously entering the tape guide outlet 61B in a case where the width of the tape is less than the width of the ink ribbon 60.

Two stepped portions that are positioned opposite one another in the up-down direction (specifically, the second top tape restraining portion 363A and the second bottom tape restraining portion 363B) are provided between the inlet 61A and the tape guide outlet 61B. The center position of the inlet 61A in the up-down direction and the center position of the tape guide outlet 61B in the up-down direction are approximately the same as the center position of the tape in the width direction. It is therefore possible to separate the ink ribbon 60 appropriately from the tape and to guide the ink ribbon 60 to the ribbon guide outlet 61C, even in a case where the ink ribbon 60 has deviated from its proper position in the width direction in one of the upward direction and the downward direction.

In addition, the movement in the width direction of the tape that has passed through the inlet 61A is restrained in the tape guide outlet 61B as the tape is fed to the downstream side. In contrast, the ink ribbon 60 that has passed through the inlet 61A is allowed to move in the width direction in the ribbon guide outlet 61C as the ink ribbon 60 is fed to the downstream side. In conjunction with the movement of the ink ribbon 60 in the width direction within the ribbon guide outlet 61C, the ink ribbon 60 that is being fed through the inlet 61A also tends to move in the width direction. This may cause the ink ribbon 60 that has moved in the width direction in the inlet 61A to come into contact with the stepped portions that are provided on the downstream edge of the inlet 61A (that is, the second top tape restraining portion 363A and the second bottom tape restraining portion 363B), thus promoting the separation of the ink ribbon 60 from the tape.

The ink ribbon 60 can be thus inhibited by the stepped portions from entering the tape guide outlet 61B, and its separation from the tape that enters the tape guide outlet 61B can be promoted. The ink ribbon 60 that has come into contact with the stepped portions enters the ribbon guide outlet 61C, whose length in the up-down direction is longer than that of the tape guide outlet 61B. Therefore, in the separator portion 61, the tape and the ink ribbon 60 can be reliably separated, and the ink ribbon 60 can be inhibited from entering the tape guide outlet 61B. The ink ribbon 60 that has been separated from the tape enters the ribbon guide outlet 61C, so the ink ribbon 60 can be fed along the proper path.

As described previously, the movement in the width direction of the tape that passes through the tape guide outlet 61B may be restrained by the second bottom tape restraining portion 363B, the second top tape restraining portion 363A, and the separating wall restraining portion 364. The movement toward the print surface side of the tape that passes through the tape guide outlet 61B may be restrained by the second print surface side restraining portions 43A, 43B, and back tension may be applied to the tape as the tape is bent slightly toward the rear. However, as a whole, the feed path of the tape that is fed from the exit 341 through the separator portion 61 and runs as far as in front of the tape drive roller 46 is a straight line that extends almost straight to the left in a plan view. Accordingly, the tape that has been discharged from the exit 341 can be fed smoothly as far as in front of the tape drive roller 46.

Of the various restraining portions in the separator portion 61, the restraining portions that are adapted to restrain the tape in the area in the vicinity of the tape drive roller 46 (specifically, the second bottom tape restraining portion 363B, the separating wall restraining portion 364, and the second print surface side restraining portions 43A, 43B) are each provided in the bottom case 312. Therefore, regardless of the joined state of the top case 311 and the bottom case 312, the movements in the width direction and toward the print surface side of the tape that passes through the tape guide outlet 61B can be appropriately restrained. Furthermore, because the second print surface side restraining portions 43A, 43B are provided only at the upper edge and the lower edge of the front end face of the separating wall 43, the surface area that comes into contact with the printed part of the tape can be kept to a minimum, and the possibility of impairing the printing quality can be reduced.

As described previously, the ink ribbon 60 that passes through the ribbon guide outlet 61C is guided toward the second ribbon area 440 and is wound onto the ribbon winding spool 44. The ink ribbon 60 that passes through the ribbon guide outlet 61C is fed in the right rear direction, which takes the ink ribbon 60 away from the tape that passes through the tape guide outlet 61B, and the ink ribbon 60 is then fed to the right, which is almost completely the opposite direction from the direction in which the tape is fed. Therefore, at the separator portion 61, the feed path for the ink ribbon 60 that is fed from the exit 341 and through the separator portion 61 to the ribbon winding spool 44 is bent at a sharp angle in a plan view. The tape and the ink ribbon 60 can thus be reliably separated in the separator portion 61. This in turn can inhibit the tape and the ink ribbon 60 from dragging on one another and makes it possible for the movements of the tape and the ink ribbon 60 to be stabilized.

As shown in FIGS. 17 to 19, the lengths of the separating wall 33 and the separating wall 43 in the up-down direction are almost the same as the length of the cassette case 31 in the up-down direction. Therefore, when the top case 311 is joined to the bottom case 312, the separating wall 33 and the separating wall 43 are respectively fitted into the fixing slots 331, 332, as described previously. This makes it easy for the operator to check whether or not the separating wall 33 and the separating wall 43 have each been properly joined to the top case 311 by looking at the fixing slots 331, 332.

For example, in a case where the tape cassette 30 has been dropped or the like, even if the separating wall 33 and the separating wall 43 momentarily come out their respective fixing slots 331, 332 due to the physical shock that is applied to the cassette case 31, they can automatically return to their original states. In other words, because the separating wall 33 and the separating wall 43 easily fit into their respective fixing slots 331, 332, the separating wall 33 and the separating wall 43 can return to those states. Moreover, because the separating wall 33 and the separating wall 43 are fitted into their respective fixing slots 331, 332, which are slots whose shapes are matched to the respective shapes of the separating wall 33 and the separating wall 43 in a plan view, the separating wall 33 and the separating wall 43 can be fixed in place more stably than if the connections were made by pins and holes, for example.

As shown in FIGS. 20 and 22, corner portion projections 631 are provided in each of the first to the third corner portions 321 to 323 in the top case 311, projecting downward from the top plate 305 in shapes that follow the contours of the respective corner portions. When the top case 311 is joined to the bottom case 312, the three corner portion projections 631 that are provided in the top case 311 are respectively fitted into the first to the third corner portions 321 to 323 in the bottom case 312. In other words, in the interior of the cassette case 31, each of the corner portion projections 631 makes contact, without any gaps, with the inner wall of the corresponding one of the corner portions of the bottom perimeter wall 304 that form the contours of the first to the third corner portions 321 to 323.

Each of the first to the third corner portions 321 to 323 is thus in a state of being reinforced in the interior of the cassette case 31 by the corresponding one of the corner portion projections 631. In other words, the top case 311 and the bottom case 312 may be firmly joined at the first to the third corner portions 321 to 323. The first to the third corner portions 321 to 323 are portions with high structural rigidity in the box-shaped cassette case 31. The physical strength of the cassette case 31 can thus be increased.

For example, when the tape cassette 30 is dropped or the like, a strong physical shock tends to be applied to one of the first to the third corner portions 321 to 323 in the box-shaped cassette case 31. In the present embodiment, the first to the third corner portions 321 to 323 are each reinforced by one of the corner portion projections 631. Therefore even if a strong physical shock is applied to the first to the third corner portions 321 to 323, the physical shock may be mitigated by the corner portion projections 631, so damage to the cassette case 31 can be inhibited.

In a plan view, the first corner portion 321 and the third corner portion 323 are positioned diagonally opposite one another in the cassette case 31 and are each reinforced by one of the corner portion projections 631. Therefore, in a case where a physical shock is applied to one of the first corner portion 321 and the third corner portion 323, the physical shock can be dispersed to the other opposite corner portion. For example, in a case where a physical shock is applied to the first corner portion 321, the physical shock may be mitigated by the corner portion projection 631 that reinforces the first corner portion 321 and the corner portion projection 631 that reinforces the third corner portion 323.

As described previously, the width T of the common portion 32 (refer to FIG. 39) remains constant, regardless of the width of the tape. In other words, the height positions of the top surfaces of the corner portions 321 to 324 in the top case 311 and the center position in the width direction of the tape that is contained in the cassette case 31 remain fixed, regardless of the type of the tape in the tape cassette 30. Therefore, even if the width dimensions of the top case 311 and the bottom case 312 are different, the distance from the corner portion projections 631 to the center position in the width direction of the tape is always the same.

It is therefore possible to provide the corner portion projections 631 at common height positions and common projection widths, regardless of the type of the tape in the tape cassette 30 and regardless of the width dimensions of the top case 311 and the bottom case 312. It is also possible to commonize the strength design of the cassette case 31 even if the width dimensions of the top case 311 and the bottom case 312 are different.

Other individual portions that form the tape cassette 30 will be explained in detail with reference to FIGS. 15 to 17 and 29 to 36. Hereinafter, using the laminated type of the tape cassette 30 as an example, the holes that are provided in the cassette case 31 (the roller support hole 64, the first tape support hole 65, the second tape support hole 66, the ribbon support hole 67, the winding spool support hole 68, and the guide hole 47) and the members that are related to the holes will be explained.

The roller support hole 64 and the tape drive roller 46 will be explained with reference to FIGS. 15 to 17, 29, and 30. As shown in FIGS. 15 to 17 and 29, the tape drive roller 46 is rotatably supported by the roller support hole 64. The roller support hole 64 includes the opening 64A that is provided in the top plate 305 and the opening 64B that is provided in the bottom plate 306. The opening 64A and the opening 64B are through-holes that are provided in corresponding positions in the up-down direction of the cassette case 31.

As shown in FIG. 30, the tape drive roller 46 is a cylindrical body that has a height that is almost equal to the height of the cassette case 31. The outside diameter of a main body 46E of the tape drive roller 46 is larger than the diameters of the openings 64A, 64B. The outer perimeter surface of the main body 46E is a roller surface 46C that is adapted to come into contact with the tape. The length of the roller surface 46C in the up-down direction (that is, a tape feed width) is the same as the tape width.

An upper end portion 46A of the tape drive roller 46 is a cylindrical portion that projects upward from the center of the top end surface of the main body 46E. A lower end portion 46B of the tape drive roller 46 is a cylindrical portion that projects downward from the center of the bottom end surface of the main body 46E. The outside diameters of the upper end portion 46A and the lower end portion 46B are slightly smaller than the diameters of the openings 64A, 64B, respectively. A shaft hole 46D that passes completely through the main body 46E, the upper end portion 46A, and the lower end portion 46B in the up-down direction is provided in the interior of the tape drive roller 46.

In the interior of the cassette case 31, the upper end portion 46A is fitted into the opening 64A in the top plate 305, and the lower end portion 46B is fitted into the opening 64B in the bottom plate 306. More specifically, the upper end portion of the main body 46E is in contact with a support piece that projects downward from the top plate 305 around the edge of the opening 64A. The lower end portion of the main body 46E is in contact with a support piece that projects upward from the bottom plate 306 around the edge of the opening 64B. The tape drive roller 46 is thus rotatably supported by the upper end portion 46A and the lower end portion 46B as its movement in the up-down direction is restrained by the main body 46E.

A plurality of ribs 46F that extend upward from the lower end portion of the tape drive roller 46 are provided on the inner perimeter wall of the tape drive roller 46 (that is, on the inner wall that forms the shaft hole 46D). When the tape cassette 30 is mounted in the cassette mounting portion 8, the tape drive shaft 100 (refer to FIG. 45) is inserted into the shaft hole 46D through the opening 64B. Inside the shaft hole 46D, the plurality of cam members 100A (refer to FIG. 45) engage with the plurality of ribs 46F. Note that the diameter of the shaft hole 46D is slightly larger than the shaft diameter of the tape drive shaft 100. Therefore, the tape drive shaft 100 that has been inserted into the interior of the shaft hole 46D has a slightly large amount of play in the circumferential direction.

In the known tape cassette, a recessed portion (what is called a thinned portion) is sometimes formed on the inner side of the bottom case 312 (that is, on the upper surface of the bottom plate 306) during the molding of the bottom case 312, in order to reduce the thickness in an area around the opening 64B. In this case, when the operator attaches the tape drive roller 46 to the opening 64B in the bottom case 312, the lower end portion 46B of the tape drive roller 46 may get caught on the thinned portion in the area around the opening 64B, impairing the rotation of the tape drive roller 46. Therefore, in the manufacturing process for the known tape cassette, the operator needs to be careful so that the tape drive roller 46 does not get caught on the thinned portion.

In the present embodiment, thinned portions 990 for reducing the thickness in the area around the opening 64B are formed on the outer side of the bottom case 312 (that is, on the bottom surface of the bottom plate 306) during the molding of the bottom case 312 (refer to FIG. 16). This makes it possible to make the area around the opening 64B on the inner side of the bottom case 312 flat, so that impairment of the rotation of the tape drive roller 46 due to the thinned portions can be inhibited. This in turn can reduce the burden on the operator of being careful of the thinned portion, as described above.

The first tape support hole 65 and the first tape spool 40 will be explained with reference to FIGS. 15 to 17, 29, and 31. As shown in FIGS. 17 and 29, the first tape spool 40 that is contained in the first tape area 400 is rotatably supported by the first tape support hole 65.

Figure 31:
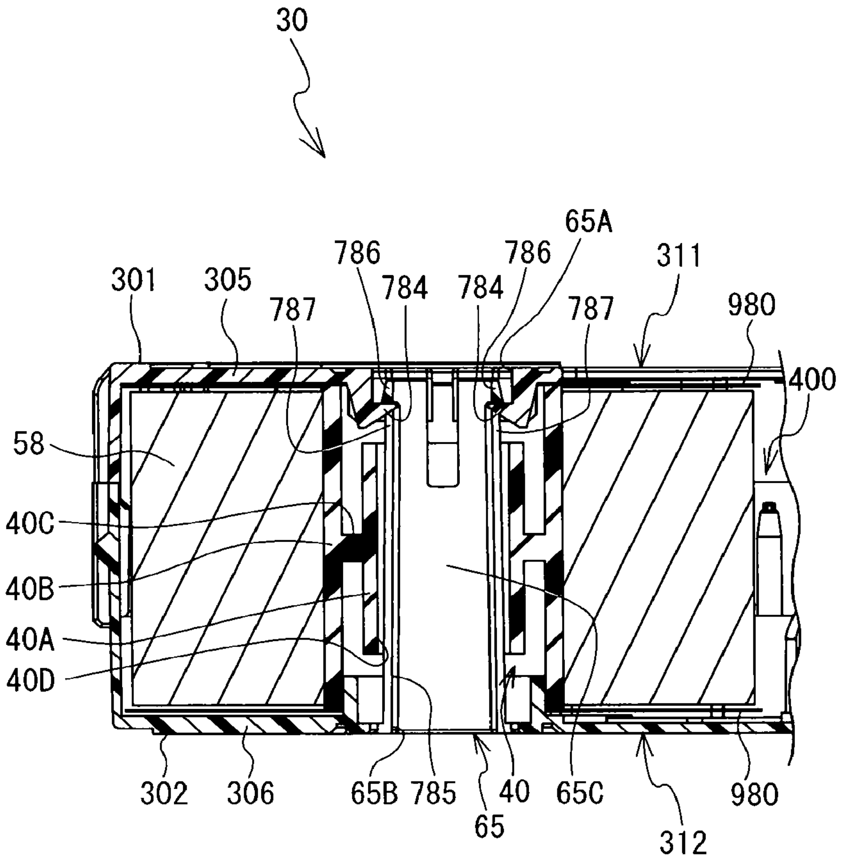
FIG. 31 is a sectional view along a line V-V in FIG. 15 as seen in the direction of the arrows.
Figure 32:
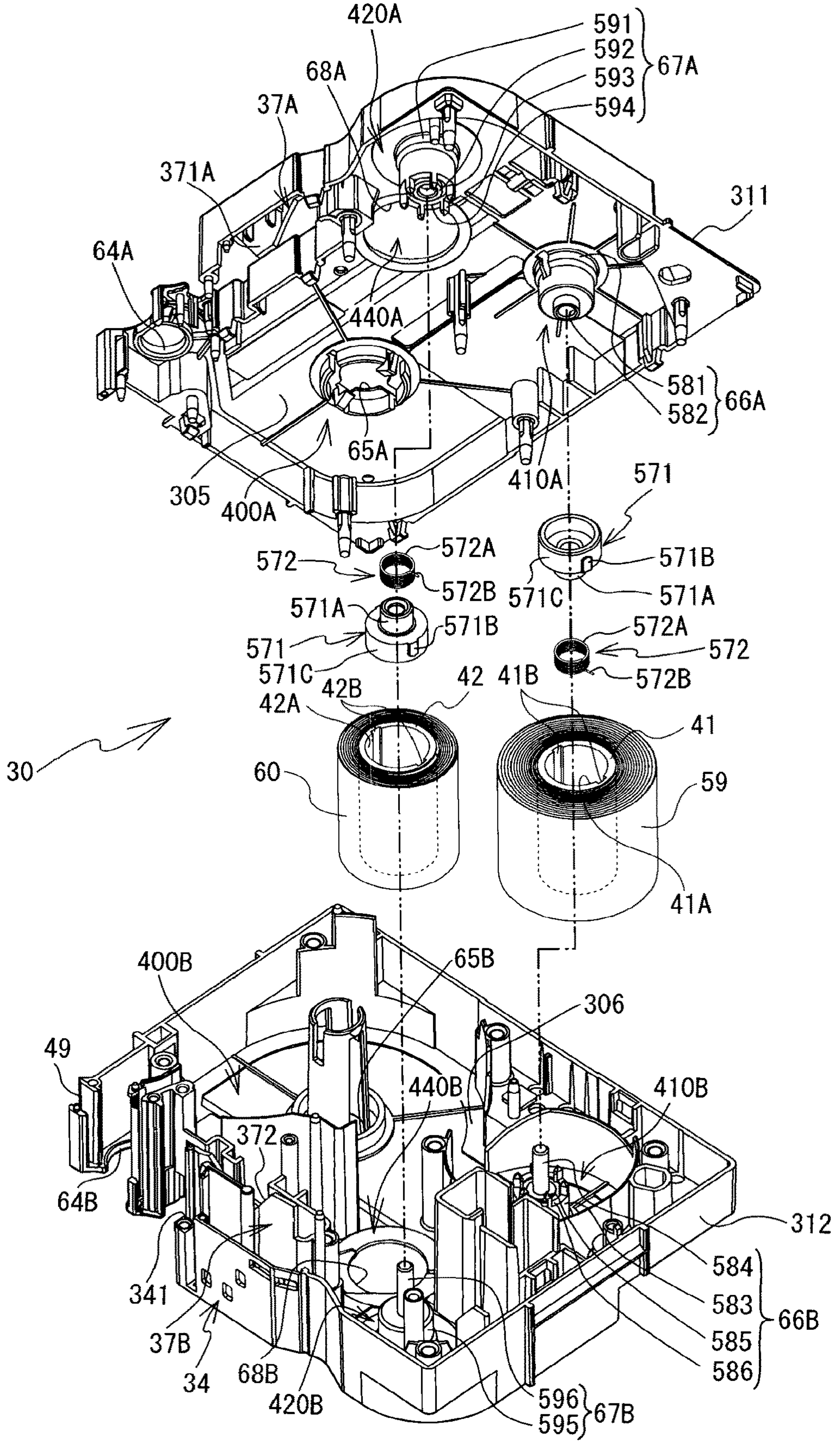
FIG. 32 is an exploded oblique view of the tape cassette 30.

As shown in FIGS. 15, 16, and 31, the first tape support hole 65 includes the opening 65A that is provided in the top plate 305, the opening 65B that is provided in the bottom plate 306, and a shaft hole 65C that connects the openings 65A, 65B. The opening 65A and the opening 65B are through-holes that are provided in corresponding positions in the up-down direction of the cassette case 31.

As shown in FIG. 31, the top case 311 is provided with a plurality of latching ribs 784 that extend downward from the opening 65A. The tips of the individual latching ribs 784 are hook-shaped pieces that project in mutually opposite directions in the interior of the cassette case 31. The bottom case 312 is provided with a cylindrical tube wall 785 that extends upward from the opening 65B.

A plurality of slits 787 that are cut out in the up-down direction are provided in the tube wall 785. Openings at the upper ends of the respective slits 787 are each closed by a head 786. In the interior of the cassette case 31, each of the latching ribs 784 is fitted into one of the slits 787 and engages with the head 786. The shaft hole 65C, which is a through-hole in the up-down direction, is provided in the interior of the tube wall 785. The openings 65A, 65B are connected by the shaft hole 65C.

The first tape spool 40 has a double wall structure that includes an inner wall 40A and an outer wall 40B. The inner wall 40A is a cylindrical body with an inside diameter that is slightly larger than the outside diameter of the tube wall 785, and it has a height that is less than the tape width. A shaft hole 40D that is a through-hole in the up-down direction is provided inside the inner wall 40A. The outer wall 40B is a cylindrical body that encloses the entire circumference of the inner wall 40A, and it has a height that is almost the same as the tape width. The double-sided adhesive tape 58 is wound around the outer perimeter surface of the outer wall 40B. Note that in the receptor type of the tape cassette 30, the printing tape 57 is wound around the outer wall 40B (refer to FIG. 7). In the thermal type of the tape cassette 30, the thermal paper tape 55 is wound around the outer wall 40B (refer to FIG. 8).

The first tape spool 40 includes a plurality of connecting pieces 40C that are provided between the inner wall 40A and the outer wall 40B. In the first tape spool 40, the inner wall 40A and the outer wall 40B are formed by the plurality of connecting pieces 40C into a coaxial double cylindrical shape. The first tape spool 40 is rotatably supported by the tube wall 785, which is inserted into the shaft hole 40D. The diameter of shaft hole 65C is one of approximately equal to and slightly larger than the shaft diameter of the auxiliary shaft 110.

As shown in FIGS. 29 and 31, spacers 980 that are made from a PET (polyethylene terephthalate resin film) are provided on both end faces in the width direction of the double-sided adhesive tape 58 that is wound around the first tape spool 40. The spacers 980 are disks that have diameters that are larger than a wound diameter of the double-sided adhesive tape 58 that is wound around the first tape spool 40 when the wound diameter of the double-sided adhesive tape 58 is at its largest. The spacers 980 according to the present embodiment have almost the same diameter as the first tape area 400, and their diameters are slightly greater than the largest wound diameter of the double-sided adhesive tape 58.

The spacers 980 are adapted to prevent the adhesive from seeping out from the double-sided adhesive tape 58 that is wound around the first tape spool 40. This makes it possible to inhibit the first tape spool 40 from getting stuck to the top plate 305 and the bottom plate 306 by the adhesive that has seeped out from the double-sided adhesive tape 58, for example. This in turn makes it possible to inhibit the smooth rotation of the first tape spool 40 from being impeded.

The second tape support hole 66 and the second tape spool 41 will be explained with reference to FIGS. 15 to 17, 29, and 32 to 34. As shown in FIGS. 17 and 29, the second tape spool 41 that is contained in the second tape area 410 is rotatably supported by the second tape support hole 66.

As shown in FIGS. 15, 16, and 32, the second tape spool 41 is a cylindrical body that has a height that is almost the same as the tape width. The film tape 59 is wound around the outer perimeter surface of the second tape spool 41. The second tape support hole 66 includes the top tape support portion 66A, which is provided on the bottom surface side of the top plate 305, and the bottom tape support portion 66B, which is provided on the top surface side of the bottom plate 306. The top tape support portion 66A and the bottom tape support portion 66B are provided in corresponding positions in the up-down direction of the cassette case 31 and are connected to one another.

As shown in FIG. 32, the top tape support portion 66A includes an upper base portion 581 and a cylindrical portion 582. The upper base portion 581 is a cylindrical body that projects downward from the top plate 305 and includes a lower end face. The upper base portion 581 is inserted into a shaft hole 41A of the second tape spool 41 from above. The cylindrical portion 582 is a cylindrical body that has a small diameter and projects downward from the center of the lower end face of the upper base portion 581, and it includes a shaft hole that is a through-hole in the up-down direction.

Figure 34:
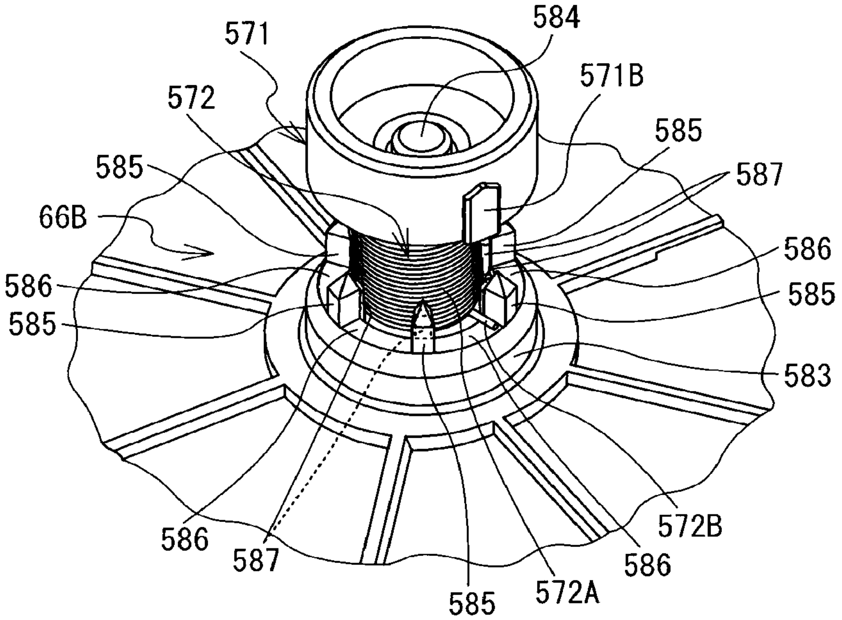
FIG. 34 is an oblique view of a rotating member 571, a clutch spring 572, and a bottom tape support portion 66B.

The bottom tape support portion 66B includes a lower base portion 583, a support shaft 584, a plurality of latching projections 585, a plurality of latching slots 586, and a plurality of diameter enlargement prevention pieces 587 (refer to FIG. 34). The lower base portion 583 is a cylindrical body that projects upward from the bottom plate 306 and includes an upper end face. The lower base portion 583 is inserted into the shaft hole 41A of the second tape spool 41 from below. The support shaft 584 is a shaft that has a small diameter and is provided in the center of the upper end face of the lower base portion 583, and its upper end portion is fitted into the shaft hole in the cylindrical portion 582. The plurality of latching projections 585 are a plurality of square columns that are arranged in a radial pattern around the outer edge of the upper end face of the lower base portion 583, with the support shaft 584 in the center in a plan view. The plurality of latching slots 586 are a plurality of slots, each of which is formed between two of the neighboring latching projections 585. The diameter enlargement prevention pieces 587 will be explained separately later.

A rotating member 571 includes a cylindrical projection 571A, a pair of ribs 571B, and a main body 571C. The main body 571C is a cylindrical body that has approximately the same diameter as the shaft hole 41A. The pair of ribs 571B are provided on the outer perimeter surface of the main body 571C and project radially outward in positions that are on opposite sides of the main body 571C. The cylindrical projection 571A is a cylindrical body with a smaller diameter than the main body 571C that projects from one end of the main body 571C. A clutch spring 572 is mounted on the outer perimeter surface of the cylindrical projection 571A.

The clutch spring 572 is a coil spring that includes a circular portion 572A and a latching portion 572B. The circular portion 572A is a coil that is mounted on the outer perimeter surface of the cylindrical projection 571A. The latching portion 572B is an end portion of the coil that extends radially outward from the rear end (in FIG. 32, the lower end) of the circular portion 572A. The circular portion 572A is wound in a clockwise direction from the front end (in FIG. 32, the upper end) of the circular portion 572A to the rear end (that is, the latching portion 572B). The clutch spring 572 is wound such that its diameter is slightly smaller than the outside diameter of the cylindrical projection 571A.

The cylindrical projection 571A is inserted into the circular portion 572A, the diameter of which has been slightly enlarged, such that the cylindrical projection 571A passes through from the front end to the rear end of the circular portion 572A. Thus, the elastic force of the circular portion 572A causes the circular portion 572A to adhere tightly to the outer perimeter surface of the cylindrical projection 571A, and the latching portion 572B is disposed at the tip end of the cylindrical projection 571A. In a plan view, the winding direction of the circular portion 572A (that is, the clockwise direction from the front end to the rear end of the circular portion 572A) matches the direction in which the film tape 59 is pulled off of the second tape spool 41.

The rotating member 571 on which the clutch spring 572 is mounted is mounted in the shaft hole 41A of the second tape spool 41 such that the cylindrical projection 571A is opposed to the bottom tape support portion 66B. A pair of sliding grooves 41B that extend in the up-down direction are provided in the inner perimeter surface of the shaft hole 41A in positions that are opposite one another. Within the shaft hole 41A, each of the ribs 571B of the rotating member 571 fits into the corresponding one of the sliding grooves 41B in the second tape spool 41.

The ribs 571B and the sliding grooves 41B thus work together, such that the rotating member 571 is able to rotate as a single unit with the second tape spool 41. Furthermore, the support shaft 584 of the bottom tape support portion 66B is inserted into the rotating member 571 (more specifically, into the shaft hole of the cylindrical projection 571A) that has been mounted in the second tape spool 41. This makes it possible for the second tape spool 41 to rotate through the rotating member 571, with the support shaft 584 as the center of rotation.

Figure 33:
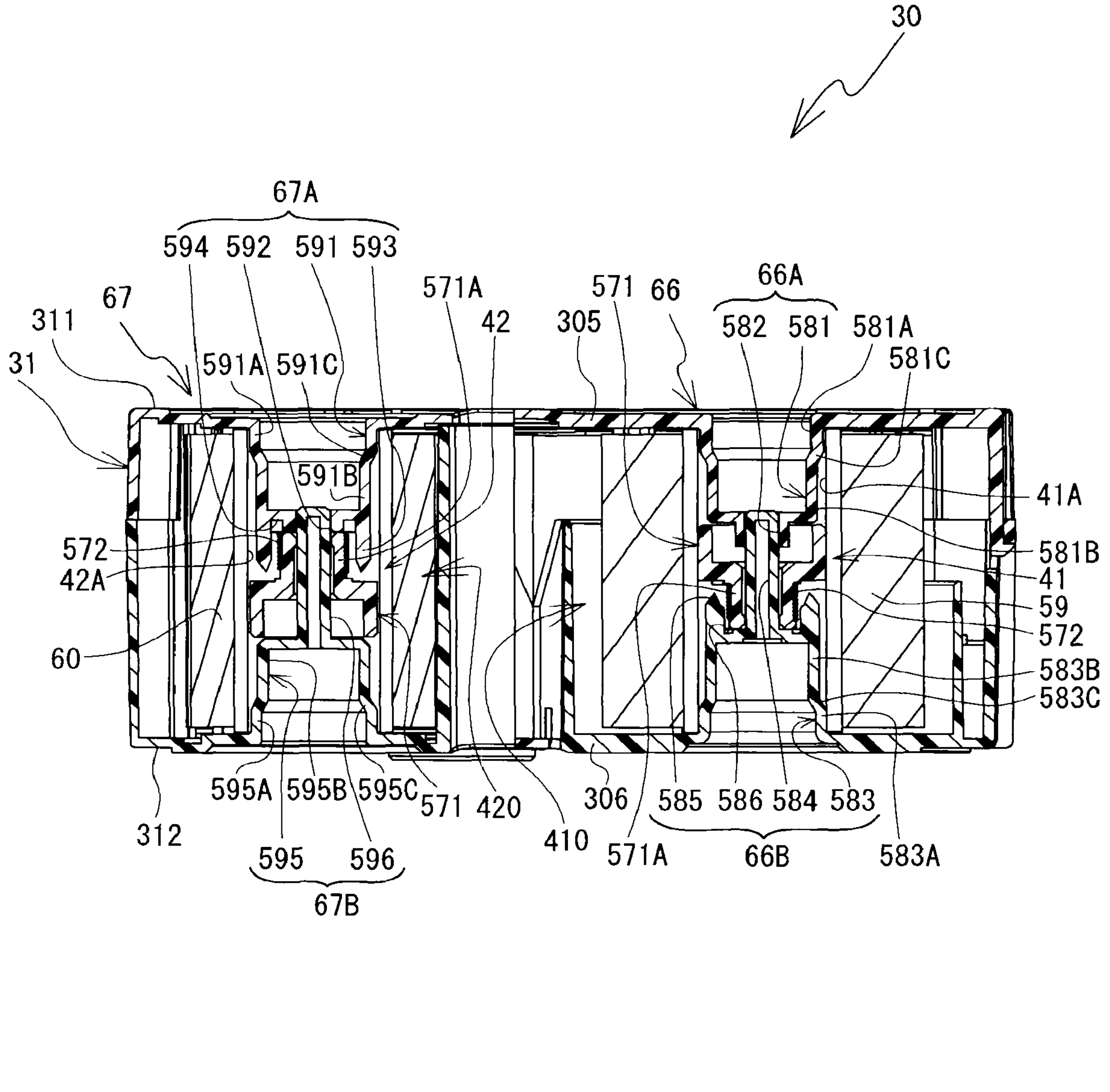
FIG. 33 is a sectional view along a line VI-VI in FIG. 15 as seen in the direction of the arrows.

As shown in FIGS. 33 and 34, the cylindrical projection 571A is opposed to the upper end face of the lower base portion 583 in the state in which the support shaft 584 has been inserted into the rotating member 571. The clutch spring 572 is positioned between the cylindrical projection 571A, to which the circular portion 572A is adhering tightly, and the plurality of latching projections 585. The latching portion 572B is engaged in one of the plurality of latching slots 586. As described previously, the winding direction of the circular portion 572A matches the direction (the clockwise direction) in which the film tape 59 is pulled off of the second tape spool 41. Therefore, in a case where the rotational force acts on the circular portion 572A in the clockwise direction in a plan view, the diameter of the circular portion 572A is enlarged, and in a case where the rotational force acts in the counterclockwise direction in a plan view, the diameter of the circular portion 572A is reduced.

The plurality of diameter enlargement prevention pieces 587 are provided on the upper end face of the lower base portion 583. The diameter enlargement prevention pieces 587 are roughly cylindrical pieces with small diameters that are respectively provided on the faces of the latching projections 585 that face the support shaft 584. In other words, in a plan view, the plurality of diameter enlargement prevention pieces 587 are provided in a radial pattern with the support shaft 584 at the center, and they are provided slightly to the inside of the plurality of latching projections 585. In a plan view, the circular portion 572A is positioned to the inside of the plurality of diameter enlargement prevention pieces 587. When the diameter of the circular portion 572A is enlarged to a specified width, the circular portion 572A comes into contact with the plurality of diameter enlargement prevention pieces 587, so the diameter is restrained from being enlarged to greater than the specified width. When the diameter of the circular portion 572A is enlarged to the size where the circular portion 572A comes into contact with the plurality of diameter enlargement prevention pieces 587, the state of close contact between the circular portion 572A and the cylindrical projection 571A ceases to exist.

When the second tape spool 41 is rotated in a clockwise direction by the pulling of the film tape 59 off of the second tape spool 41, a rotational force in a clockwise direction acts on the rotating member 571 through the second tape spool 41. At this time, because the latching portion 572B is engaged in one of the plurality of latching slots 586, a sliding friction arises between the cylindrical projection 571A and the circular portion 572A, such that torque is applied to the circular portion 572A in a clockwise direction. This causes the circular portion 572A to be wound back, enlarging its diameter and decreasing the sliding friction that has arisen between the cylindrical projection 571A and the circular portion 572A. When the diameter of the circular portion 572A is enlarged to the specified width at which the circular portion 572A comes into contact with the plurality of diameter enlargement prevention pieces 587, the clutch spring 572 and the second tape spool 41 are decoupled. At this time, the rotational load that the clutch spring 572 imparts to the second tape spool 41 is relatively small, so the second tape spool 41 is able to rotate smoothly.

Thus, when the second tape spool 41 is rotating in the direction in which the film tape 59 is being pulled off of the second tape spool 41, a quantitative and stable rotational load (that is, a load torque) can be imparted by the clutch spring 572. A stable back tension can therefore be imparted to the film tape 59, making it possible to stabilize the amount of the film tape 59 that is pulled off of the second tape spool 41 per unit time. This in turn can stabilize the movement of the film tape 59 during the printing operation, making it possible to inhibit deterioration in the printing quality that is caused by faulty movement of the film tape 59.

On the other hand, if an external force is applied that rotates the second tape spool 41 in the opposite direction from the direction in which the film tape 59 is pulled off of the second tape spool 41 (in other words, in a counterclockwise direction), a rotational force in a counterclockwise direction acts on the rotating member 571 through the second tape spool 41. At this time, a sliding friction arises between the cylindrical projection 571A and the circular portion 572A, such that torque is applied to the circular portion 572A in a counterclockwise direction. This causes the circular portion 572A to be wound more tightly, reducing its diameter and increasing the sliding friction that has arisen between the cylindrical projection 571A and the circular portion 572A. In other words, the clutch spring 572 and the second tape spool 41 are coupled, and a relatively large rotational load is imparted to the second tape spool 41. Rotation of the film tape 59 in the opposite direction from the direction in which the film tape 59 is pulled off is thus restrained.

The diameter of the circular portion 572A can be enlarged to the specified width at which the circular portion 572A comes into contact with the plurality of diameter enlargement prevention pieces 587 (the specified width being a diameter that satisfies the condition that the rotation of the second tape spool 41 becomes smooth). Excessive enlargement of the diameter of circular portion 572A may be restrained by the plurality of diameter enlargement prevention pieces 587. In this case, when the circular portion 572A has returned to the reduced diameter state from the enlarged diameter state, the extent to which the circular portion 572A rotates in reverse may decrease, so the action by which the second tape spool 41 rotates in reverse may also decrease. Therefore, when the circular portion 572A has returned to the reduced diameter state from the enlarged diameter state, the film tape 59 that has already been pulled off of the second tape spool 41 tends not to be wound back into the cassette case 31.

As shown in FIG. 33, the upper base portion 581 of the top tape support portion 66A includes a first diameter portion 581A, a second diameter portion 581B, and a tapered portion 581C. The first diameter portion 581A is a cylindrical portion that projects downward from the top plate 305 and has an outside diameter that is slightly smaller than the diameter of the shaft hole 41A in the second tape spool 41. The tapered portion 581C is a conical cylindrical portion that extends downward from the first diameter portion 581A, and its outside diameter gradually diminishes in the downward direction. The second diameter portion 581B is a bottomed cylindrical portion that extends downward from the tapered portion 581C, and its diameter is smaller than the outside diameter of the first diameter portion 581A. The previously described cylindrical portion 582 is formed on the bottom end face of the second diameter portion 581B.

The lower base portion 583 of the bottom tape support portion 66B includes a first diameter portion 583A, a second diameter portion 583B, and a tapered portion 583C. The first diameter portion 583A is a cylindrical portion that projects upward from the bottom plate 306 and has an outside diameter that is almost the same as the diameter of the shaft hole 41A in the second tape spool 41. The tapered portion 583C is a conical cylindrical portion that extends upward from the first diameter portion 583A, and its outside diameter gradually diminishes in the upward direction. The second diameter portion 583B is a bottomed cylindrical portion that extends upward from the tapered portion 583C, and its diameter is smaller than the outside diameter of the first diameter portion 583A. The previously described support shaft 584 is formed on the top end face of the second diameter portion 583B.

As explained above, the diameter of the first diameter portion 583A in the lower base portion 583 is almost the same as that of the shaft hole 41A in the second tape spool 41. Therefore, within the bottom tape support portion 66B that is inserted into the shaft hole 41A in the second tape spool 41, only the first diameter portion 583A comes into contact with the inner wall of the second tape spool 41 and rotatably supports the lower end of the second tape spool 41. In contrast, the diameter of the first diameter portion 581A in the upper base portion 581 is slightly smaller than that of the shaft hole 41A in the second tape spool 41. Therefore, when the top tape support portion 66A is inserted into the shaft hole 41A in the second tape spool 41, the entire top tape support portion 66A does not come into contact with the inner wall of the second tape spool 41. However, in a case where the rotation has shifted the second tape spool 41 toward the outer perimeter side, only the first diameter portion 581A within the top tape support portion 66A comes into contact with the inner wall of the second tape spool 41 and rotatably supports the upper end of the second tape spool 41.

This makes it possible to minimize the contact surface area between the second tape spool 41 and top tape support portion 66A and the bottom tape support portion 66B, such that the rotational load on the second tape spool 41 can be reduced. Because it is not necessary to apply grease in order to reduce the rotational load on the second tape spool 41, the recyclability of the second tape spool 41 can be improved.

Incidentally, because the top case 311 and the bottom case 312 are separate parts, they are joined by the operator after being molded by separate dies. In this process, it may happen that the axis line of the first diameter portion 581A and the axis line of the first diameter portion 583A do not match precisely, due to an error in the manufacturing precision, the assembly, or the like of the top tape support portion 66A and the bottom tape support portion 66B. In other words, in the cassette case 31, it may happen that the first diameter portion 581A and the first diameter portion 583A are not positioned precisely opposite one another in the up-down direction.

In this case, a difference may arise between the rotational load that the first diameter portion 581A imparts to the upper end side of the second tape spool 41 and the rotational load that the first diameter portion 583A imparts to the lower end side of the second tape spool 41, which may cause uneven rotation of the second tape spool 41. The countermeasure for addressing this problem in the manufacturing process for the known tape cassette is that the operator exercises strict control over errors in the manufacturing precision, the assembly, and the like of the top tape support portion 66A and the bottom tape support portion 66B.

In the present embodiment, the outside diameter of the first diameter portion 581A in the top tape support portion 66A is slightly smaller than that of the first diameter portion 583A in the bottom tape support portion 66B. In other words, within the shaft hole 41A in the second tape spool 41, the first diameter portion 581A has some play in the circumferential direction. Even in a case where the axis line of the first diameter portion 581A and the axis line of the first diameter portion 583A do not match precisely, the sliding friction that the first diameter portion 581A imparts to the upper end of the second tape spool 41 may be small.

Accordingly, the first diameter portion 583A can support the rotation of the second tape spool 41 appropriately even in a case where an error has occurred in the manufacturing precision, the assembly, or the like of the top tape support portion 66A and the bottom tape support portion 66B. This in turn makes it possible to inhibit the occurrence of uneven rotation in the second tape spool 41 and to reduce the burden on the operator of exercising strict control over errors in the manufacturing precision and the assembly, as described above.

Because the diameter of the first diameter portion 583A in the lower base portion 583 is almost the same as that of the shaft hole 41A in the second tape spool 41, the vibration that occurs in the bottom tape support portion 66B when the second tape spool 41 rotates may be small. In contrast, because the diameter of the first diameter portion 581A in the upper base portion 581 is smaller than that of the shaft hole 41A in the second tape spool 41, the vibration that occurs in the top tape support portion 66A when the second tape spool 41 rotates may be larger. Accordingly, it is preferable for the clutch spring 572 for the rotating member 571 that is mounted in the second tape spool 41 to be coupled to the bottom tape support portion 66B, rather than to the top tape support portion 66A.

The support shaft 584, the latching projections 585, and the latching slots 586 are provided in the lower base portion 583 of the bottom tape support portion 66B. The clutch spring 572 for the rotating member 571 that is mounted in the second tape spool 41 is coupled to the bottom tape support portion 66B. This makes it possible to inhibit the vibration that arises in the rotating member 571 when the second tape spool 41 rotates, so the occurrence of unevenness in the rotational load that the clutch spring 572 imparts can be inhibited. This in turn makes it possible to stabilize the rotation of the second tape spool 41.

The ribbon support hole 67 and the ribbon spool 42 will be explained with reference to FIGS. 15 to 17, 29, and 32 to 34. As shown in FIGS. 17 and 29, the ribbon spool 42 that is contained in the first ribbon area 420 is rotatably supported by the ribbon support hole 67. The ribbon spool 42 is a cylindrical body that has a height that is almost the same as the tape width. The unused ink ribbon 60 is wound around the outer perimeter surface of the ribbon spool 42.

As shown in FIGS. 15, 16, and 32, the ribbon support hole 67 includes a top ribbon support portion 67A that is provided on the bottom surface side of the top plate 305 and a bottom ribbon support portion 67B that is provided on the top surface side of the bottom plate 306. The top ribbon support portion 67A and the bottom ribbon support portion 67B are provided in corresponding positions in the up-down direction of the cassette case 31 and are connected to one another.

As shown in FIG. 32, the top ribbon support portion 67A include an upper base portion 591, a cylindrical portion 592, a plurality of latching projections 593, and a plurality of latching slots 594. The upper base portion 591 is a cylindrical body that projects downward from the top plate 305 and includes a lower end face. The upper base portion 591 is inserted into a shaft hole 42A of the ribbon spool 42 from above. The cylindrical portion 592 is a cylindrical body that has a small diameter and projects downward from the center of the lower end face of the upper base portion 591, and it includes a shaft hole that is a through-hole in the up-down direction. The plurality of latching projections 593 are a plurality of square columns that are arranged in a radial pattern around the outer edge of the lower end face of the upper base portion 591, with the cylindrical portion 592 in the center in a plan view. The plurality of latching slots 594 are a plurality of slots, each of which is formed between two of the neighboring latching projections 593.

The bottom ribbon support portion 67B includes a lower base portion 595 and a support shaft 596. The lower base portion 595 is a cylindrical body that projects upward from the bottom plate 306 and includes an upper end face. The lower base portion 595 is inserted into the shaft hole 42A of the ribbon spool 42 from below. The support shaft 596 is a shaft that has a small diameter and is provided in the center of the upper end face of the lower base portion 595, and its upper end portion is fitted into the shaft hole in the cylindrical portion 592.

In the present embodiment, the second tape support hole 66 and the ribbon support hole 67 have connecting structures that are almost the same. Therefore, the shaft diameters of the support shafts 584 and 596, the hole diameters of the cylindrical portions 582 and 592, and the quantities, the shapes, the positional relationships, and the like of the pluralities of the latching projections 585 and 593 (that is, the latching slots 586 and 594) are all the same. The ribbon spool 42 and the second tape spool 41 have almost identical structures. Therefore, the shapes and the hole diameters of the shaft holes 41A and 42A are the same, and sliding grooves 42B that are the same as the sliding grooves 41B are provided in the inner perimeter surface of the shaft hole 42A. However, one point of difference is that in the second tape support hole 66, the latching projections 585 and the latching slots 586 are provided in the bottom case 312, while in the ribbon support hole 67, the latching projections 593 and the latching slots 594 are provided in the top case 311.

A rotating member 571 and a clutch spring 572 that are mounted in the ribbon spool 42 are parts that are identical to the rotating member 571 and the clutch spring 572 that are mounted in the second tape spool 41. In the same manner as when they are mounted in the second tape spool 41, the rotating member 571 on which the clutch spring 572 is mounted is mounted in the shaft hole 42A of the ribbon spool 42. Inside the shaft hole 42A, each of the ribs 571B of the rotating member 571 is fitted into the corresponding one of the sliding grooves 42B of the ribbon spool 42. The support shaft 596 of the bottom ribbon support portion 67B is inserted into the rotating member 571 (more specifically, into the shaft hole of the cylindrical projection 571A) that has been mounted in the ribbon spool 42.

However, the rotating member 571 on which the clutch spring 572 is mounted is mounted in the shaft hole 42A such that the cylindrical projection 571A is opposed to the top ribbon support portion 67A. In other words, the orientations in the up-down direction of the rotating member 571 and the clutch spring 572 that are mounted in the ribbon spool 42 are the inverse of their orientations in the case where they are mounted in the second tape spool 41. The winding direction of the circular portion 572A (that is, the clockwise direction from the front end to the rear end of the circular portion 572A) thus matches the direction in which the ink ribbon 60 is pulled off of the ribbon spool 42 (the clockwise direction) in a bottom view. In other words, the winding direction of the circular portion 572A matches the direction in which the ink ribbon 60 is pulled off of the ribbon spool 42 (the counterclockwise direction) in a plan view.

In the state in which the support shaft 596 has been inserted into the rotating member 571, the cylindrical projection 571A is opposed to the lower end face of the upper base portion 591. The clutch spring 572 is positioned between the cylindrical projection 571A, to which the circular portion 572A is adhering tightly, and the plurality of latching projections 593. The latching portion 572B is engaged in one of the plurality of latching slots 594. As described previously, the winding direction of the circular portion 572A matches the direction (the counterclockwise direction) in which the ink ribbon 60 is pulled off of the ribbon spool 42. Therefore, in a case where the rotational force of the circular portion 572A acts in the counterclockwise direction in a plan view, the diameter of the circular portion 572A is enlarged, and in a case where the rotational force acts in the clockwise direction in a plan view, the diameter of the circular portion 572A is reduced.

When the ribbon spool 42 is rotated in a counterclockwise direction by the pulling of the ink ribbon 60 off of the ribbon spool 42, the enlarging of the diameter of the circular portion 572A makes it possible for the ribbon spool 42 to rotate smoothly, in the same manner as when the second tape spool 41 is rotated in a clockwise direction. On the other hand, if an external force is applied that rotates the ribbon spool 42 in the opposite direction from the direction in which the ink ribbon 60 is pulled off of the ribbon spool 42 (in other words, in a clockwise direction), a large rotational load is imparted to the ribbon spool 42 by the reducing of the diameter of the circular portion 572A, in the same manner as when the second tape spool 41 is rotated in a counterclockwise direction.

In the present embodiment, the upper base portion 591 of the top ribbon support portion 67A has the same structure as does the upper base portion 581 that was described previously, and it includes a first diameter portion 591A, a second diameter portion 591B, and a tapered portion 591C (refer to FIG. 33). The lower base portion 595 of the bottom ribbon support portion 67B has the same structure as does the lower base portion 583 that was described previously, and it includes a first diameter portion 595A, a second diameter portion 595B, and a tapered portion 595C (refer to FIG. 33). However, the first diameter portion 591A of the upper base portion 591 is a cylindrical portion that has an outside diameter that is almost the same as the diameter of the shaft hole 42A in the ribbon spool 42. The first diameter portion 595A of the lower base portion 595 is a cylindrical portion that has an outside diameter that is slightly smaller than the diameter of the shaft hole 42A in the ribbon spool 42.

Within the top ribbon support portion 67A that is inserted into the shaft hole 42A in the ribbon spool 42, only the first diameter portion 591A comes into contact with the inner wall of the ribbon spool 42 and rotatably supports the upper end side of the ribbon spool 42. In contrast, the entire bottom ribbon support portion 67B that is inserted into the shaft hole 42A in the ribbon spool 42 does not come contact with the inner wall of the ribbon spool 42. However, in a case where the rotation has shifted the ribbon spool 42 toward the outer perimeter side, only the first diameter portion 595A within the bottom ribbon support portion 67B comes into contact with the inner wall of the ribbon spool 42 and rotatably supports the lower end side of the ribbon spool 42.

This makes it possible to minimize the contact surface area between the ribbon spool 42 and top ribbon support portion 67A and the bottom ribbon support portion 67B, such that the rotational load on the ribbon spool 42 can be reduced. Because it is not necessary to apply grease in order to reduce the rotational load on the ribbon spool 42, the recyclability of the ribbon spool 42 can be improved.

Because the diameter of the first diameter portion 591A in the upper base portion 591 is almost the same as that of the shaft hole 42A in the ribbon spool 42, the vibration that occurs in the top ribbon support portion 67A when the ribbon spool 42 rotates may be small. In contrast, because the diameter of the first diameter portion 595A in the lower base portion 595 is smaller than that of the shaft hole 42A in the ribbon spool 42, the vibration that occurs in the bottom ribbon support portion 67B when the ribbon spool 42 rotates may be large. Accordingly, it is preferable for the clutch spring 572 for the rotating member 571 that is mounted in the ribbon spool 42 to be coupled to the top ribbon support portion 67A, rather than to the bottom ribbon support portion 67B.

The cylindrical portion 592, the latching projections 593, and the latching slots 594 are provided in the upper base portion 591 of the top ribbon support portion 67A. The clutch spring 572 for the rotating member 571 that is mounted in the ribbon spool 42 is coupled to the top ribbon support portion 67A. This makes it possible to inhibit the vibration that arises in the rotating member 571 when the ribbon spool 42 rotates, so the occurrence of unevenness in the rotational load that the clutch spring 572 imparts can be inhibited. This in turn makes it possible to stabilize the rotation of the ribbon spool 42.

A method for joining the second tape spool 41 and the ribbon spool 42 to the cassette case 31 during the manufacturing of the tape cassette 30 will be explained with reference to FIGS. 32 to 34. First, the operator puts the second tape spool 41, around which the film tape 59 is wound, into the second bottom tape area 410B. At this time, the operator inserts the support shaft 584 of the bottom case 312 into the shaft hole 41A of the second tape spool 41.

Next, the operator mounts the rotating member 571, on which the clutch spring 572 has been mounted, in the shaft hole 41A of the second tape spool 41. At this time, the operator inserts each of the ribs 571B into the corresponding one of the sliding grooves 41B and inserts the support shaft 584 into the shaft hole in the cylindrical projection 571A. Note that, the operator mounts the rotating member 571 in the shaft hole 41A such that the cylindrical projection 571A (that is, the clutch spring 572) is facing downward. Doing this causes the latching portion 572B to be engaged in one of the latching slots 586 inside the shaft hole 41A, so back tension is imparted to the film tape 59. This makes it possible to inhibit the film tape 59 that is wound around the second tape spool 41 from bulging toward the outer perimeter side, even before the top case 311 is joined to the bottom case 312.

The operator also puts the ribbon spool 42, around which the ink ribbon 60 is wound, into the first bottom ribbon area 420B. At this time, the operator inserts the support shaft 596 of the bottom case 312 into the shaft hole 42A of the ribbon spool 42.

Next the operator mounts the rotating member 571, on which the clutch spring 572 is mounted, in the shaft hole 42A of the ribbon spool 42. At this time, the operator inserts each of the ribs 571B into the corresponding one of the sliding grooves 42B and inserts the support shaft 596 into the shaft hole in the cylindrical projection 571A. Note that, the operator mounts the rotating member 571 in the shaft hole 42A such that the cylindrical projection 571A (that is, the clutch spring 572) is facing upward. In other words, the operator mounts the rotating members 571 on which the clutch springs 572 are mounted such that the rotating member 571 on the second tape spool 41 and the rotating member 571 on the ribbon spool 42 are inverted in relation to one another in the up-down direction.

In the state before the top case 311 is joined to the bottom case 312, the latching portion 572B is not engaged in one of the latching slots 594, so back tension is not imparted to the ink ribbon 60. However, the thickness of the ink ribbon 60 is less than the thicknesses of the film tape 59 and the like, and the ink ribbon 60 contains a magnetic substance as a material component. Therefore, the ink ribbon 60 is subject to electrostatic effects and the like, and the wound state of the ink ribbon 60 is likely to be maintained. In other words, the ink ribbon 60 that is wound around the ribbon spool 42 tends not to bulge toward the outer perimeter side, even if back tension is not imparted to it.

In a final step, the operator joins the top case 311 to the bottom case 312 by fitting the upper ends of the support shafts 584, 596 of the bottom case 312 into the shaft holes of the cylindrical portions 582, 592, respectively, of the top case 311. Inside the shaft hole 42A, the latching portion 572B becomes engaged in one of the latching slots 594, so back tension is also imparted to the ink ribbon 60. Thus, when the top case 311 and the bottom case 312 are joined, the film tape 59 and the ink ribbon 60 tend not to be loosened, so it is possible to make the cassette case 31 easier to assemble.

The design and the manufacturing of the tape cassette 30 can be made easier by using a common structure for brake members (the rotating members 571 and the clutch springs 572) that respectively impart the back tension to the film tape 59 and the ink ribbon 60. In particular, parts management for the brake members can be made easier by using the same parts for the brake members. This makes it possible to inhibit errors in the assembly of the brake members for the second tape spool 41 and the ribbon spool 42. The parts assembly for the brake members can be made easier because the brake members are simple structures that are formed from the rotating members 571 and the clutch springs 572.

When the second tape spool 41 is rotated in the direction in which the film tape 59 is pulled off of the second tape spool 41, the film tape 59 is pulled off smoothly. At this time, a weak back tension is imparted to the film tape 59 such that not too much of the film tape 59 is pulled off. When the second tape spool 41 is rotated in the opposite direction from the direction in which the film tape 59 is pulled off of the second tape spool 41, a strong back tension is imparted to the film tape 59 such that the rotation of the second tape spool 41 is restrained. This makes it possible to feed the film tape 59 in a stable manner and to inhibit the occurrence of wrinkling and slackening in the film tape 59.

When the ribbon spool 42 is rotated in the direction in which the ink ribbon 60 is pulled off of the ribbon spool 42, the ink ribbon 60 is pulled off smoothly. At this time, a weak back tension is imparted to the ink ribbon 60 such that not too much of the ink ribbon 60 is pulled off. When the ribbon spool 42 is rotated in the opposite direction from the direction in which ink ribbon 60 is pulled off of the ribbon spool 42, a strong back tension is imparted to the ink ribbon 60 such that the rotation of the ribbon spool 42 is restrained. This makes it possible to feed the ink ribbon 60 in a stable manner and to inhibit the occurrence of wrinkling and slackening in the ink ribbon 60.

In the present embodiment, the roller member 535 is provided in the bending portion 533 (refer to FIGS. 5 to 8, 29), so the load that is applied to the tape on the tape feed path may be reduced. Therefore, the back tension that is generated by the brake members can be imparted to the film tape 59 in a stable manner. Moreover, the feed directions for the film tape 59 and the ink ribbon 60 are opposite directions, and they are fed to the printing position in a separated state.

Therefore, each of the film tape 59 and the ink ribbon 60 tends not to be dragged by the feeding of the other, even in a case where the second tape area 410 and the first ribbon area 420 are adjacent to one another. The back tensions that are imparted to the film tape 59 and the ink ribbon 60 can be inhibited from interfering with one another, which in turn makes it possible for the film tape 59 and the ink ribbon 60 to be fed in a stable manner.

Incidentally, due to improper operation by the user, for example, it may happen that the tape that is discharged from the exit 341 of the arm portion 34 is erroneously pushed into the arm portion 34 from the exit 341. In that case, if the amount of the tape that has been pushed from the exit 341 exceeds a permissible amount, the tape may travel in reverse inside the cassette case 31. If that happens, there is a possibility that a jam will occur, because the tape that has traveled in reverse may extend to the vicinity of the first ribbon area 420 or enter the second tape area 410.

In the present embodiment, the previously described restraining rib 532 is provided in the vicinity of the first ribbon area 420 (refer to FIGS. 5 to 8, 29). In a case where the tape has been pushed from the exit 341, the tape that has traveled in reverse can be inhibited from extending to the vicinity of the first ribbon area 420 by the restraining rib 532. Thus, the tape that has traveled in reverse can also be inhibited from entering the second tape area 410. Therefore, the occurrence of a jam that is due to the tape being pushed from the exit 341 can be inhibited.

Figure 35:
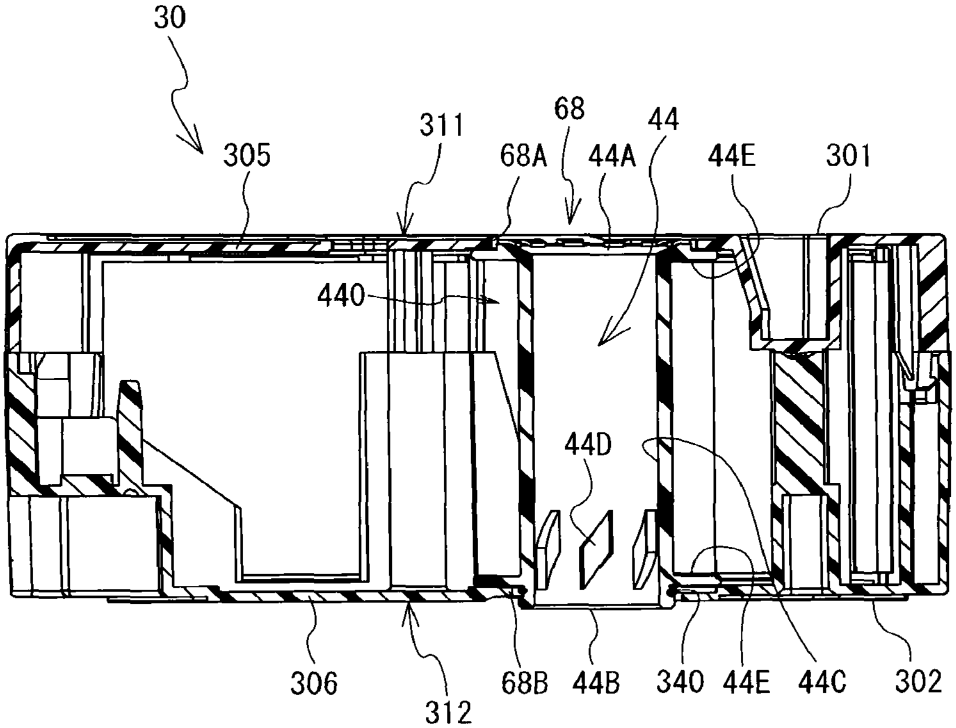
FIG. 35 is a sectional view along a line VII-VII in FIG. 15 as seen in the direction of the arrows.

The winding spool support hole 68 and the ribbon winding spool 44 will be explained with reference to FIGS. 15 to 17, 29, and 35. As shown in FIGS. 17 and 29, in the state in which the ribbon winding spool 44 is contained in the second ribbon area 440, the ribbon winding spool 44 is rotatably supported by the winding spool support hole 68. As shown in FIGS. 15, 16, and 35, the winding spool support hole 68 includes an opening 68A that is formed in the top plate 305 and an opening 68B that is formed in the bottom plate 306. The opening 68A and the opening 68B are through-holes that are provided in corresponding positions in the up-down direction of the cassette case 31.

As shown in FIG. 35, the ribbon winding spool 44 is a cylindrical body that has a height that is almost equal to the height of the cassette case 31. Flange-shaped support portions 44E are provided on the edge of the upper end and on the edge of the lower end of the ribbon winding spool 44, projecting radially outward around the entire circumference of the ribbon winding spool 44. The distance in the up-down direction between the support portion 44E on the upper end and the support portion 44E on the lower end is almost equal to the width of the ink ribbon 60. The used ink ribbon 60 is wound around the outer perimeter surface of the ribbon winding spool 44 between the support portion 44E on the upper end and the support portion 44E on the lower end.

In the interior of the cassette case 31, an upper end portion 44A of the ribbon winding spool 44 is fitted into the opening 68A, and a lower end portion 44B is fitted into the opening 68B. At the edge of the upper end of the ribbon winding spool 44, the support portion 44E comes into contact with the bottom surface of the top plate 305, so the upward movement of the ribbon winding spool 44 is restrained. At the edge of the lower end of the ribbon winding spool 44, the support portion 44E comes into contact with the top surface of the bottom plate 306, so the downward movement of the ribbon winding spool 44 is restrained. Thus the ribbon winding spool 44 is rotatably supported at the upper end portion 44A and the lower end portion 44B.

A shaft hole 44C that is a through-hole in the up-down direction is formed in the interior of the ribbon winding spool 44. A plurality of ribs 44D that extend upward from the lower end portion of the ribbon winding spool 44 are provided on the inner perimeter wall of the ribbon winding spool 44 (that is, on the inner wall of the shaft hole 44C). When the tape cassette 30 is mounted in the cassette mounting portion 8, the ribbon winding shaft 95 (refer to FIG. 45) is inserted into the shaft hole 44C through the opening 68B. Inside the shaft hole 44C, the plurality of cam members 95A (refer to FIG. 45) engage with the plurality of ribs 44D. The rotation of the ribbon winding shaft 95 is thus transmitted to the ribbon winding spool 44. Note that the diameter of the shaft hole 44C is slightly larger than the shaft diameter of the ribbon winding shaft 95. Therefore, the ribbon winding shaft 95 that has been inserted into the interior of the shaft hole 44C has a slightly large amount of play in the circumferential direction.

As shown in FIGS. 16 and 35, the clutch spring 340 is provided in the lower end portion of the ribbon winding spool 44. The clutch spring 340 is wound directly below the support portion 44E on the lower end. A coil end portion that projects radially outward from the clutch spring 340 is a spring end 340A. The spring end 340A is fitted into a spring mounting slot 328 in the bottom case 312. The spring mounting slot 328 is a slot that is formed in the bottom plate 306, and it extends toward the right rear (the upper left direction in FIG. 35) from the opening 68B.

As shown in FIGS. 18 and 20, a spring fixing wall 329 that extends upward from the bottom plate 306 and straddles the spring mounting slot 328 is provided on the inner side of the bottom case 312. A slot 329A that extends upward from the spring mounting slot 328 is provided in the spring fixing wall 329. An area that is triangular in a plan view and that is bounded by the spring fixing wall 329, a wall portion that extends to the rear from the right end of the spring fixing wall 329, and a wall portion that extends to the right from the left end of the spring fixing wall 329 is a spring fixing portion 345.

When the ribbon winding spool 44 is attached, the spring end 340A is mounted in the spring mounting slot 328 from above through the slot 329A. The tip of the spring end 340A is bent upward. The bent tip of the spring end 340A is fixed inside the spring fixing portion 345. When an external force is applied that rotates the ribbon winding spool 44 in the opposite direction (the clockwise direction) from the winding direction of the ink ribbon 60, the clutch spring 340 imposes a strong rotational load on the ribbon winding spool 44.

The spring fixing portion 345 is provided to the rear of the first bottom ribbon area 420B and to the right rear of the second bottom ribbon area 440B. In other words, the spring fixing portion 345 is provided in a position that is different from the feed path for the ink ribbon 60 that has been pulled off of the ribbon spool 42 (that is, the leftward direction from the first bottom ribbon area 420B) and is different from the feed path for the ink ribbon 60 that is wound onto the ribbon winding spool 44 (that is, the lower left direction from the second bottom ribbon area 440B). Therefore, the possibility that the spring end 340A will come into contact with and damage the ink ribbon 60 when the operator mounts the ribbon winding spool 44 in and removes the ribbon winding spool 44 from the bottom case 312 can be reduced.

When the ribbon winding spool 44 is attached to the bottom case 312, the tip of the spring end 340A is fixed by the spring fixing portion 345. This makes it possible to stabilize the upright state of the ribbon winding spool 44 that is mounted in the bottom case 312, even in a state in which the top case 311 has not been joined to the bottom case 312. It is therefore possible to inhibit the ribbon winding spool 44 that has been attached to the second bottom ribbon area 440B from toppling over before the top case 311 is joined to the bottom case 312.

In addition, as shown in FIGS. 18 to 20 and 29, a mounting guide wall 335 that is continuous with the right end of the separating wall 48 is provided in a vertical orientation. The mounting guide wall 335 extends upward from the bottom plate 306 and is adjacent to the left side of the second bottom ribbon area 440B. The mounting guide wall 335 extends to a height position where it will come into contact with the top plate 305 in the state in which the bottom case 312 and the top case 311 are joined. In a state in which the ribbon winding spool 44 has been attached to the second ribbon area 440, the mounting guide wall 335 extends along a portion of the outer perimeter edge of the ribbon winding spool 44 (more specifically, portions of the support portions 44E).

When the operator attaches the ribbon winding spool 44 to the bottom case 312, the ribbon winding spool 44 may be guided along the mounting guide wall 335 and into the second bottom ribbon area 440B. The upright state of the ribbon winding spool 44 having been attached to the second bottom ribbon area 440B may be stabilized by the mounting guide wall 335, even in a state in which the top case 311 has not been joined to the bottom case 312. It is therefore possible to further inhibit the ribbon winding spool 44 that has been attached to the second bottom ribbon area 440B from toppling over before the top case 311 is joined to the bottom case 312.

Furthermore, the mounting guide wall 335 is provided adjacent to the right front side of the first bottom tape area 400B. The previously described spacers 980 are affixed to both end faces of the double-sided adhesive tape 58 that is wound around the first tape spool 40. Within the first tape area 400, the mounting guide wall 335 is adjacent to the outer edges of the spacers 980. When the double-sided adhesive tape 58 that is wound around the first tape spool 40 moves in the front-rear and the left-right directions within the first tape area 400, the mounting guide wall 335 may come into contact with the outer edges of the spacers 980.

Thus, even in a case where vibration or tilting, for example, occurs in the tape cassette 30, positional deviations of the spacers 980 that are affixed to the double-sided adhesive tape 58 may be inhibited. The spacers 980 may also be inhibited from entering other areas (specifically, the second ribbon area 440, the second tape area 410, and the like). In other words, the spacers 980 can be inhibited from coming into contact with other spools (specifically, the ribbon winding spool 44, the second tape spool 41, and the like). This in turn makes it possible to inhibit impairment of the rotation of the ribbon winding spool 44 and the like.

The previously described first perimeter wall 70 is provided on the opposite side of the first bottom tape area 400B from the mounting guide wall 335, such that the center of the first bottom tape area 400B (more specifically, the opening 65B) is between the first perimeter wall 70 and the mounting guide wall 335. In other words, the first perimeter wall 70 is provided on the left rear side of the first bottom tape area 400B. The first perimeter wall 70 is provided along a portion of the outer perimeter edge of the first bottom tape area 400B and extends to a height position where it will come into contact with the top plate 305 in the state in which the bottom case 312 and the top case 311 are joined. When the double-sided adhesive tape 58 that is wound around the first tape spool 40 moves in the front-rear and the left-right directions within the first tape area 400, the first perimeter wall 70 may also come into contact with the outer edges of the spacers 980.

In other words, in the first tape area 400, positional deviations of the spacers 980 that are affixed to the double-sided adhesive tape 58 may be inhibited by the mounting guide wall 335 and the first perimeter wall 70. Impairment of the rotation of the ribbon winding spool 44 and the like can therefore be more reliably inhibited. Furthermore, the operator can place the first tape spool 40, around which the double-sided adhesive tape 58 is wound, in the proper position in the first tape area 400 simply by moving the spacers 980, which are affixed to the double-sided adhesive tape 58, along the mounting guide wall 335 and the first perimeter wall 70.

Figure 36:
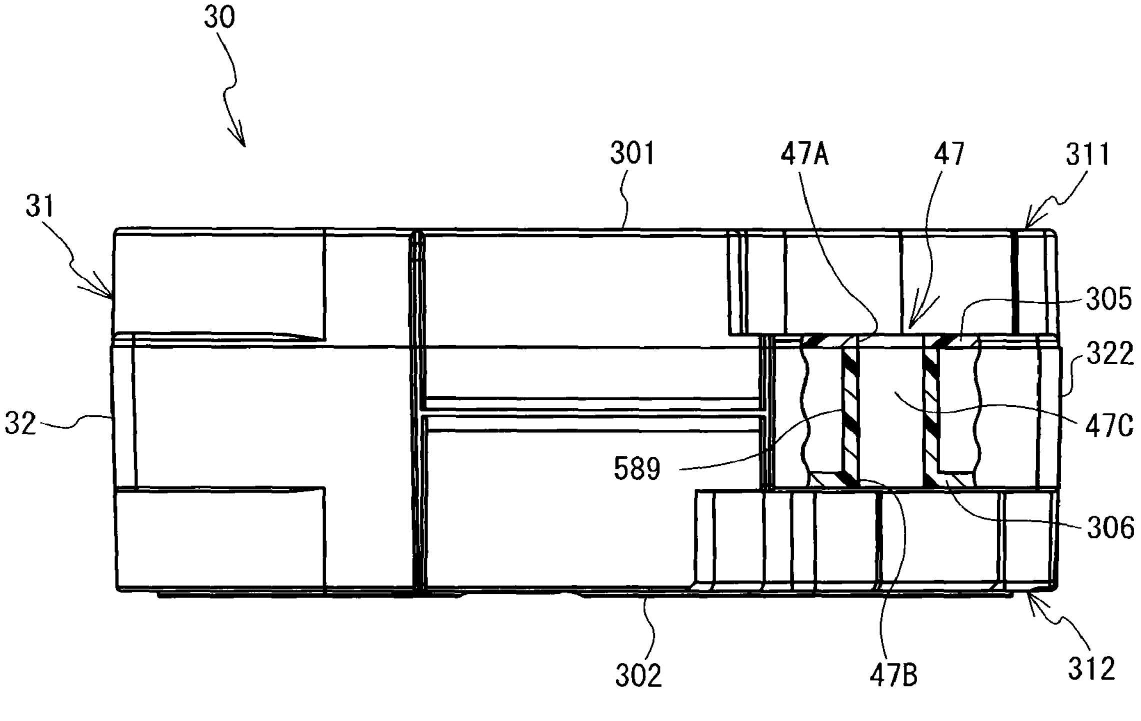
FIG. 36 is a right side view of the tape cassette 30 that shows a partial cross section of a guide hole 47.

The guide hole 47 will be explained with reference to FIGS. 15, 16, and 36. As shown in FIGS. 15, 16, and 36, the guide hole 47 is a through-hole in the up-down direction of the cassette case 31 that is provided in the second corner portion 322 of the cassette case 31. The guide hole 47 includes an opening 47A, and opening 47B, and a shaft hole 47C. The opening 47A and the opening 47B are through-holes that are provided in corresponding positions in the up-down direction of the cassette case 31.

As shown in FIG. 36, the opening 47A is formed in the upper surface of the second corner portion 322 (that is, in the top plate 305 in the second corner portion 322). The opening 47B is formed in the lower surface of the second corner portion 322 (that is, in the bottom plate 306 in the second corner portion 322). A cylindrical tube wall 589 that extends upward from the opening 47B is provided in the bottom case

312. In the interior of the cassette case 31, the upper end of the tube wall 589 is connected to the opening 47A. The shaft hole 47C extends in the up-down direction inside the tube wall 589 and links the openings 47A, 47B.

As described previously, the guide hole 47 according to the present embodiment is an oblong hole in which, in a plan view, the opening width along the parting line K is the long dimension and the opening width along the virtual line G is the short dimension (refer to FIG. 15). However, the guide hole 47 may also be configured with any opening shape, such as a round hole, an elliptical hole, an oblong hole, or the like, for example.

The positional relationships of various portions that are provided in the tape cassette 30 will be explained with reference to FIGS. 15 and 17. The diagonal two-dot chain line in FIG. 15 indicates the parting line K, which will be described later. The previously described roller support hole 64, guide hole 47, first tape support hole 65, winding spool support hole 68, and head insertion portion 39 are provided in positions that respectively oppose the tape drive shaft 100, the guide shaft 120, the auxiliary shaft 110, the ribbon winding shaft 95, and the head holder 74 in the cassette mounting portion 8.

More specifically, the roller support hole 64 is formed in an area Q1 that includes the fourth corner portion 324 of the tape cassette 30. The area Q1 is adjacent to the left end of the head insertion portion 39 that is provided in the middle of the front part of the tape cassette 30. In other words, the area Q1 is positioned farther to the downstream side in the tape feed direction than is the head insertion portion 39. When the tape cassette 30 is mounted in its proper position in the cassette mounting portion 8, the fourth corner portion 324 is positioned opposite the area P1 in the cassette mounting portion 8 (refer to FIG. 4).

The guide hole 47 is formed in an area Q2 that includes the second corner portion 322 of the tape cassette 30. In a case where the tape cassette 30 is seen in a plan view, the second corner portion 322 that is contained in the area Q2 and the fourth corner portion 324 that is contained in the area Q1 are positioned diagonally opposite one another. When the tape cassette 30 is mounted in its proper position in the cassette mounting portion 8, the second corner portion 322 is positioned opposite the area P2 in the cassette mounting portion 8 (refer to FIG. 4).

In a case where the tape cassette 30 is divided in a plan view along the parting line K that links the roller support hole 64 and the guide hole 47 in a plan view, the area to the rear of the parting line K is an area Q3, and the area to the front of the parting line K is an area Q4. The first tape support hole 65 is formed at or in the vicinity of the center of gravity of the area Q3 (that is, at the point where the median lines for the three sides that form the area Q3 intersect), which forms a triangular shape in a plan view. The winding spool support hole 68 is formed at or in the vicinity of the center of gravity of the area Q4 (that is, at the point where the median lines for the three sides that form the area Q4 intersect), which forms a triangular shape in a plan view. In a plan view, the first tape support hole 65 and the winding spool support hole 68 are positioned almost symmetrically in relation to the parting line K.

In a plan view, the second tape support hole 66 is formed on the parting line K, or more specifically, is positioned at the approximate midpoint between the center of the tape cassette 30 and the guide hole 47 in a plan view. The ribbon support hole 67 is formed in the area Q4, or more specifically, is positioned toward the right front of the tape cassette 30 from the winding spool support hole 68.

Due to the positional relationships that are described above, the weight distribution in the laminated type of the tape cassette 30 (refer to FIGS. 5 and 6) is as hereinafter described. In the interior of the cassette case 31, the first tape spool 40 is rotatably supported by the first tape support hole 65. This means that the rotational center of the first tape spool 40 (that is, the shaft hole 40D) is provided within the range of the area Q3 in a plan view. In other words, the center of gravity of the double-sided adhesive tape 58 that is wound around the first tape spool 40 is positioned within the range of the area Q3 in a plan view.

The ribbon spool 42, around which the unused ink ribbon 60 is wound, is rotatably supported by the ribbon support hole 67. The ribbon winding spool 44, around which the used ink ribbon 60 is wound, is rotatably supported by the winding spool support hole 68. Therefore, the center of gravity of the ink ribbon 60 is positioned within the range of the area Q4 in a plan view. The second tape spool 41, around which the film tape 59 is wound, is rotatably supported by the second tape support hole 66. Therefore, the center of gravity of the film tape 59 is positioned on the parting line K in a plan view.

Given the weight distribution that is described above, in the laminated type of the tape cassette 30, the weight in the area Q3 and the weight in the area Q4 on either side of the parting line K are approximately equal. In addition, the center of gravity of the tape cassette 30 is positioned on or in the vicinity of the parting line K in a plan view. This sort of weight distribution can make the tape cassette 30 easier to handle, so the user can perform the positioning of the tape cassette 30 accurately.

For example, the user may push the tape cassette 30 that has the weight distribution that is described above into the cassette mounting portion 8 from above while holding the left and right ends of the cassette case 31 with his fingers and keeping the top face 301 and the bottom face 302 approximately horizontal. In that situation, the fact that there is little weight imbalance in the tape cassette 30 and the fact that the center of gravity of the tape cassette 30 is positioned on or in the vicinity of the parting line K may together inhibit tilting of the tape cassette 30 with the parting line K as the center of rotation. Moreover, even in a case where the weight of the double-sided adhesive tape 58 is greater than that of the ink ribbon 60, the weight difference between the area Q3 and the area Q4 is further reduced (that is, the weight imbalance of the tape cassette 30 is reduced) by the weight of the ribbon winding spool 44.

The weight distribution in the receptor type of the tape cassette 30 (refer to FIG. 7) is as hereinafter described. The first tape spool 40, around which the printing tape 57 is wound, is rotatably supported by the first tape support hole 65. Therefore, the center of gravity of the printing tape 57 is positioned within the range of the area Q3 in a plan view. In contrast, the center of gravity of the ink ribbon 60 is positioned within the range of the area Q4 in a plan view, in the same manner as in the laminated type of the tape cassette 30 (refer to FIGS. 5 and 6).

Therefore, in the receptor type of the tape cassette 30, the weights in the area Q3 and the area Q4 on either side of the parting line K are approximately equal. Moreover, even in a case where the weight of the printing tape 57 is greater than that of the ink ribbon 60, the weight difference between the area Q3 and the area Q4 is further reduced by the weight of the ribbon winding spool 44. This can make the tape cassette 30 easier to handle, in the same manner as with the laminated type that is described above.

In addition, when the tape cassette 30 is mounted in the cassette mounting portion 8, a guide shaft of the tape printer 1 may be inserted into a cavity in the tape cassette 30. The guide shaft is a shaft that is provided in the cassette mounting portion 8, and the guide shaft is adapted to guide the tape cassette 30 in a mounting and removal direction (the up-down direction in the present embodiment) in the state where the guide shaft has been inserted into the cavity in the tape cassette 30. The cavity may be any one of an opening, a hole, and a recessed portion that is provided in the cassette case 31, and the cavity is adapted to guide the tape cassette 30 in the mounting and removal direction in the state where the guide shaft of the tape printer 1 has been inserted into the cavity.

In the present embodiment, the tape drive shaft 100, the guide shaft 120, and the auxiliary shaft 110 are examples of the guide shaft. The roller support hole 64, the guide hole 47, and the first tape support hole 65 are examples of the cavity. The tape cassette 30 may be guided into the proper position in the cassette mounting portion 8 by the insertion of at least one of a plurality of guide shafts into the corresponding cavity, but this will be described in detail later.

Figure 37:
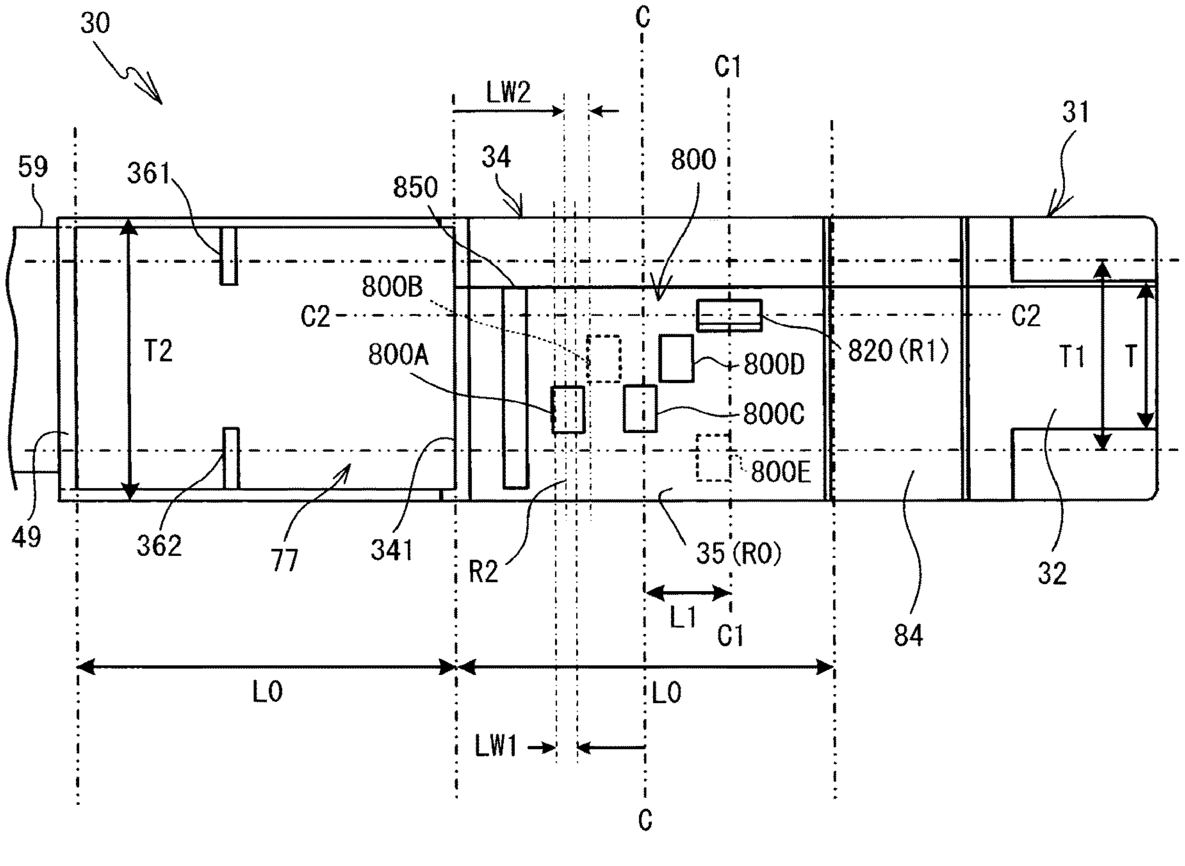
FIG. 37 is an explanatory figure that is a front view of the tape cassette 30 and that shows positional relationships of various types of structural elements that are provided in the arm front face wall 35.
Figure 38:
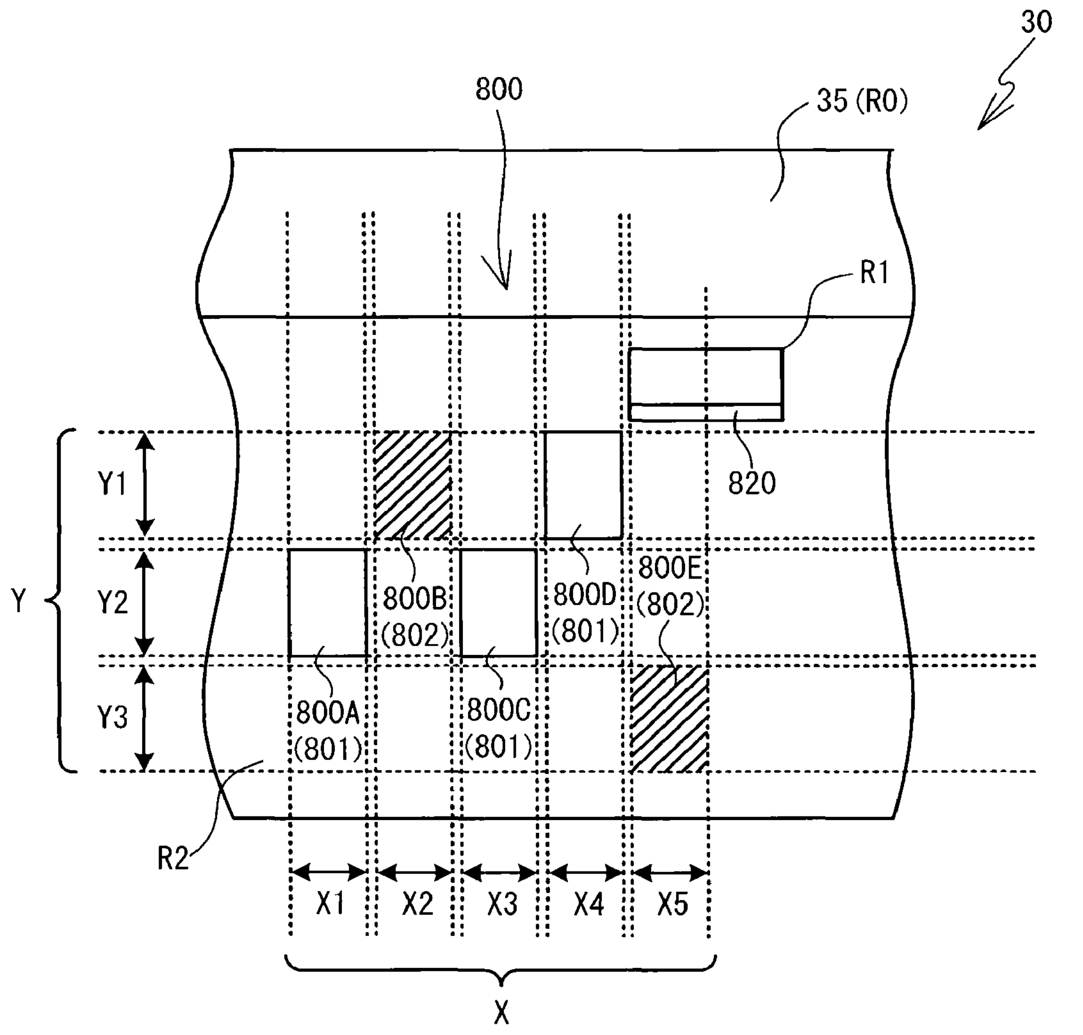
FIG. 38 is an explanatory figure of a specific area R0 that is included in the arm front face wall 35.
Figure 39:
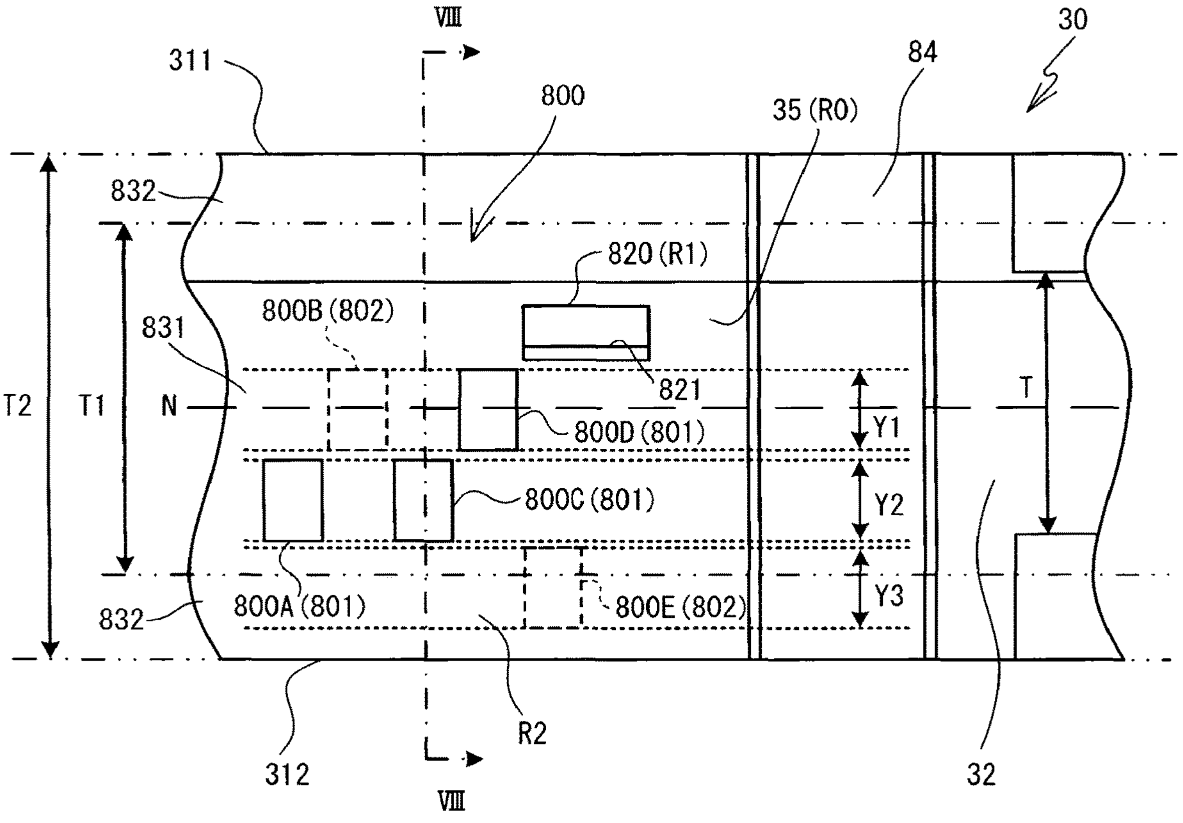
FIG. 39 is an enlarged front view of the area around the arm front face wall 35 of the tape cassette 30.

The arm front face wall 35 will be explained in detail with reference to FIGS. 37 to 40. In the explanation that follows, the tape cassette 30 in which the tape width is not less than a specified width (for example, 18 millimeters) is called a wide cassette 30. The tape cassette 30 in which the tape width is less than the specified width is called a narrow cassette 30. As shown in FIGS. 37 to 39, the tape cassette 30 according to the present embodiment is the wide cassette 30.

As shown in FIG. 37, the arm front face wall 35 includes the arm indicator portion 800 and the latch hole 820. The arm indicator portion 800 includes at least one hole and indicates the type of the tape in the tape cassette 30. A person can specify the type of the tape by looking at the arm indicator portion 800. In a case where the tape cassette 30 has been mounted in the cassette mounting portion 8, the tape printer 1 is able to specify the tape type by using the arm detection portion 200 to detect information that is indicated by the arm indicator portion 800.

In the present embodiment, the arm indicator portion 800 and the latch hole 820 are provided in the bottom arm front face wall 35B within the arm front face wall 35. The tape type that the arm indicator portion 800 specifies may be information (printing information) that is required in order for the tape printer 1 to perform the printing properly. Hereinafter, areas that are included in the arm front face wall 35 and the structures within those areas will be explained.

The arm front face wall 35 includes a specific area R0 that is positioned on the upstream side of the exit 341 in the tape feed direction. The length of the specific area R0 in the left-right direction is not greater than a distance L0 between the exit 341 and the discharge guide portion 49. Between the exit 341 and the discharge guide portion 49, the tape that has been discharged from the exit 341 is fed toward the discharge guide portion 49 while the surface of the tape on the opposite side from the print surface is exposed to the front. In other words, the distance L0 is the same as an exposed tape length, which is the length of the tape that is exposed. In the present embodiment, the entire arm front face wall 35 from the exit 341 to the left side of the semi-circular groove 84 is the specific area R0.

The specific area R0 includes a first area R1, in which the latch hole 820 is formed, and a second area R2 that is outside the first area R1 and includes the arm indicator portion 800. Hereinafter, the second area R2 and the first area R1 will be explained in that order.

As shown in FIG. 38, the second area R2 includes vertical information sections X and horizontal information sections Y. The vertical information sections X are a plurality of strip-shaped sections that extend in the direction (the up-down direction in FIG. 38) that is orthogonal to the feed direction of the tape. The horizontal information sections Y are a plurality of strip-shaped sections that extend in the direction (the left-right direction in FIG. 38) that is parallel to the feed direction of the tape.

The vertical information sections X according to the present embodiment include five vertical information sections X1 to X5. The vertical information sections X1 to X5 are disposed such that there is an interval between them and the exit 341, and in a front view, they are disposed at equal intervals from the left to the right. Of the vertical information sections X1 to X5, the vertical information section X1 is positioned the farthest to the downstream side in the tape feed direction (that is, the farthest to the left). Moving upstream in the tape feed direction (that is, toward the right) from the vertical information section X1, the vertical information sections X2, X3, X4, X5 are provided in that order. The widths (that is the lengths in the left-right direction) of the vertical information sections X1 to X5 are approximately equal, and among the vertical information sections X1 to X5, the adjacent vertical information sections are disposed at equal intervals.

The horizontal information sections Y according to the present embodiment include three horizontal information sections Y1 to Y3. The horizontal information sections Y1 to Y3 disposed from top to bottom in a front view. Of the horizontal information sections Y1 to Y3, the horizontal information section Y1, which is positioned the highest, is provided in such a position that its center in the up-down direction is approximately in the center of height direction of the arm front face wall 35. Moving downward from the horizontal information section Y1, the horizontal information sections Y2, Y3 are provided in that order. The widths (that is the lengths in the up-down direction) of the horizontal information sections Y1 to Y3 are approximately equal, and among the horizontal information sections Y1 to Y3, the adjacent horizontal information sections are disposed at approximately equal intervals.

As shown in FIG. 39, of the horizontal information sections Y1 to Y3 according to the present embodiment, the upper two horizontal information sections Y1, Y2 are provided within the range of a specified height dimension (hereinafter called the specified height) T1 in the arm front face wall 35. Hereinafter, the area within the range of the specified height T1 will be called the common indicator portion 831. More preferably, the common indicator portion 831 is an area that is symmetrical in the up-down direction in relation to the center line N that describes the center of the cassette case 31 in the up-down direction (that is, the height direction). The specified height T1 is equal to the lowest height among the heights of a plurality of tape cassettes 30 that have different tape widths. Areas that are outside the common indicator portion 831 and within the range of a specified height T2 (that is greater than the specified height T1) are called expansion portions 832.

The position of the horizontal information section Y3 that is positioned the lowest of the horizontal information sections Y1 to Y3 is different in the wide cassette 30 and the narrow cassette 30. In the wide cassette 30, the horizontal information section Y3 is disposed such that it straddles the line between the common indicator portion 831 and the expansion portion 832 that is below the common indicator portion 831. In the narrow cassette 30, the height of the tape cassette 30 is equal to the specified height T1, so the expansion portions 832 do not exist. Accordingly, in the narrow cassette 30, the horizontal information section Y3 is disposed at the bottom edge of the common indicator portion 831, that is, along the bottom edge of the arm front face wall 35.

The second area R2 is an area that is positioned opposite the arm detection switches 210 when the tape cassette 30 is mounted in the cassette mounting portion 8. The arm indicator portion 800, which includes the vertical information sections X1 to X5, is provided in the second area R2. A hole is formed in at least one of the vertical information sections X1 to X5. Whether or not a hole will be formed in each one of the vertical information sections X1 to X5 is determined in advance in accordance with the printing information. The arm indicator portion 800 is adapted to specify the printing information using various combinations of a hole or holes being formed and not formed in the individual vertical information sections X1 to X5. A person can recognize the printing information by looking at the combination of a hole or holes that are formed in the vertical information sections X1 to X5.

In a case where the vertical information sections X1 to X5 are disposed at equal intervals, as they are in the present embodiment, even if there is a section among the vertical information sections X1 to X5 in which no hole is formed, a person can easily specify the section. In other words, by looking, a person can accurately specify, among the vertical information sections X1 to X5, the section in which the hole is formed and the section in which the hole is not formed.

The positions in the up-down direction in which the hole(s) may be formed in the vertical information sections X1 to X5 may be determined separately for each of the vertical information sections X1 to X5. For example, among the plurality of areas (hereinafter called the overlap areas) where the vertical information sections X1 to X5 and the horizontal information sections Y1 to Y3 intersect and overlap, one of the overlap areas in each of the vertical information sections X1 to X5 may be defined as an indicator portion. The arm indicator portion 800 may be adapted to specify the printing information by using combinations of the hole(s) being formed and not formed in the individual indicator portions. In that case, if the positions that correspond to the arm detection switches 210 (refer to FIG. 11) are defined as the indicator portions, the tape printer 1 is also able to specify the printing information.

In the present embodiment, the five overlap areas that respectively oppose the five arm detection switches 210A to 210E (refer to FIG. 11) when the tape cassette 30 is mounted in the cassette mounting portion 8 function as indicator portions 800A to 800E. More specifically, as shown in FIG. 38, the area where the vertical information section X1 and the horizontal information section Y2 intersect and overlap functions as the indicator portion 800A that is positioned opposite the arm detection switch 210A.

The area where the vertical information section X2 and the horizontal information section Y1 intersect and overlap functions as the indicator portion 800B that is positioned opposite the arm detection switch 210B. The area where the vertical information section X3 and the horizontal information section Y2 intersect and overlap functions as the indicator portion 800C that is positioned opposite the arm detection switch 210C. The area where the vertical information section X4 and the horizontal information section Y1 intersect and overlap functions as the indicator portion 800D that is positioned opposite the arm detection switch 210D. The area where the vertical information section X5 and the horizontal information section Y3 intersect and overlap functions as the indicator portion 800E that is positioned opposite the arm detection switch 210E.

Thus, one of the indicator portions is disposed in each of the vertical information sections X1 to X5. In addition, the indicator portions in the adjacent vertical information sections are not lined up in the left-right direction. In other words, the indicator portions 800A to 800E are arranged in a zigzag pattern. In a case where this sort of arrangement is utilized, an indicator portion in any one of the vertical information sections can easily be distinguished from another indicator portion in the adjacent vertical information section, even in a case where holes are formed in the both indicator portions in the adjacent vertical information sections.

In the example in FIG. 38, holes are formed in the indicator portions 800A, 800C, 800D, respectively. The indicator portions 800B, 800E, are parts of the surface portions included in the arm front face wall 35 where holes are not formed. Thus, each of the indicator portions 800A to 800E is formed as one of a hole and a surface portion that a person can recognize by looking. The hole and the surface portion also function respectively as a non-pressing portion 801 and a pressing portion 802, which will be described later. The relationships between the indicator portions 800A to 800E and the arm detection switches 210 will be described in detail later.

The first area R1 is the area that is positioned opposite the latch piece 225 (refer to FIG. 11) when the tape cassette 30 has been mounted in the cassette mounting portion 8 and the platen holder 12 has moved to the printing position (refer to FIGS. 6 to 8). As shown in FIG. 39, the first area R1 is provided within the common indicator portion 831. The latch hole 820, into which the latch piece 225 will be inserted, is formed in the first area R1. The first area R1 is larger than an area that corresponds to at least the shape of the latch piece 225 in a rear view.

The first area R1 is disposed such that there is an interval between the first area R1 and the exit 341 of the arm portion 34, and at least the right edge of the first area R1 is positioned to the upstream side in the tape feed direction (that is, to the right side) from the vertical information section X1. In the example in FIG. 38, the right edge of the vertical information section X5, which is the one of the vertical information sections X1 to X5 that is positioned the farthest to the upstream side in the tape feed direction, is positioned approximately on the center line of the first area R1 in the left-right direction. Accordingly, the right edge of the latch hole 820 is positioned to the upstream side in the tape feed direction (that is, to the right side) from all of the vertical information sections X1 to X5. The length of the first area R1 in the left-right direction is almost two times the width of any one of the vertical information sections X1 to X5.

The first area R1 is provided adjacent to and higher than the horizontal information section Y1, which is positioned the highest of the horizontal information sections Y1 to Y3. In other words, the upper edge of the latch hole 820 is positioned higher than all of the horizontal information sections Y1 to Y3. In the example in FIG. 38, the length of the first area R1 in the up-down direction is approximately two-thirds the width of any one of the horizontal information sections Y1 to Y3.

The latch hole 820 is a slit-shaped through-hole that extends in the left-right direction. In the state in which the tape cassette 30 has been mounted in the cassette mounting portion 8, the latch piece 225 may be inserted into and removed from the latch hole 820 as the platen holder 12 moves between the stand-by position (refer to FIG. 5) and the printing position (refer to FIGS. 6 to 8). The latch hole 820 may be a hole that is the same shape as the first area R1, and it may be a hole of a size that contains the first area R1. The latch hole 820 may also be formed as a recessed portion instead of as a through-hole. The bottom wall of the latch hole 820 is an inclined portion 821 that is inclined in relation to the horizontal direction (refer to FIG. 50). The width of the opening of the latch hole 820 in the up-down direction is decreased toward the rear by the inclined portion 821.

The positional relationships among the various structural elements in the arm front face wall 35 will be explained with reference to FIG. 37. In FIG. 37, a center line C is a line that demarcates the center of the cassette case 31 in the left-right direction. The arm indicator portion 800 according to the present embodiment is provided in a central position in the left-right direction of the cassette case 31, that is, on the center line C. The distance L0 indicates the distance between the exit 341 and the discharge guide portion 49 (the exposed tape length). A distance L1 indicates the distance from the center line C to a left-right reference line C1.

The left-right reference line C1 is a virtual line that specifies the position in the left-right direction at which the latch hole 820 is provided. A line on which the latch hole 820 will be definitely positioned may be used as the left-right reference line C1. For example, a line that demarcates the center of the first area R1 in the left-right direction can be used as the left-right reference line C1. An up-down reference line C2 is a virtual line that specifies the position in the up-down direction at which the latch hole 820 is provided. A line on which the latch hole 820 will be definitely positioned may be used as the up-down reference line C2. For example, a line that demarcates the center of the first area R1 in the up-down direction can be used as the up-down reference line C2.

A range LW1 indicates a range on the downstream side (in FIG. 37, to the left) of the center line C in the tape feed direction that is 14% to 20% of the exposed tape length L0. A range LW2 indicates a range on the upstream side of the exit 341 of the arm portion 34 in the tape feed direction that is 30% to 36% of the exposed tape length L0.

As shown in FIG. 37, the length of the specific area R0 in the left-right direction is not greater than the exposed tape length L0. The distance L1 is within a range on the upstream side (in FIG. 37, to the right) in the tape feed direction that is 18% to 24% of the exposed tape length L0. The up-down reference line C2 is within the common indicator portion 831. At least a portion of the vertical information section X1 is within the range LW1. At least a portion of the vertical information section X1 is within the range LW2. The interval in the left-right direction between the center lines of adjacent vertical information sections is in a range that is 7% to 10% of the exposed tape length L0.

The positional relationships among the various structural elements in the arm front face wall 35 are defined as described above for reasons that are hereinafter explained.

The first reason is that it is desirable for the distance L1 to be in the range of 18% to 24% of the exposed tape length L0. If the distance L1 is greater than 18% to 24% of the exposed tape length L0, the latch hole 820 might be positioned outside the range of the specific area R0. Conversely, if the distance L1 is less than 18% to 24% of the exposed tape length L0, the range of the specific area R0 becomes shorter in the left-right direction, and it might become so short that the five vertical information sections X1 to X5 cannot be disposed within it, for example.

Assume, for example, a case in which a person looks at the bottom case 312 by itself and specifies a tape that should be housed in the cassette case 31. In this case, the person can specify the length of the exposed tape length L0 and the position of the center line C by looking, even in a state in which the tape has not been mounted in the bottom case 312. The person can also specify the position of the latch hole 820 by using the exposed tape length L0 and the center line C as references.

The second reason is that it is desirable for at least a portion of the vertical information section X1 to be within the range LW1. The third reason is that it is desirable for at least a portion of the vertical information section X1 to be within the range LW2. If the vertical information section X1 is outside the ranges LW1, LW2, the vertical information section X1 will be too close to the exit 341, and a short shot may occur during the molding of the bottom case 312. Conversely, if the vertical information section X1 is too far from the exit 341, it might become impossible for the five vertical information sections X1 to X5 to be disposed within the specific area R0, for example.

In this case, a person can specify the position of the vertical information section X1 by using the ranges LW1, LW2 as references. In particular, by looking, the person can specify the position of the vertical information section X1 easily and accurately by using as references the center line C and the exit 341, which are portions that are easily specified. Furthermore, because the position of the vertical information section X1 can be specified by looking only at a fixed, limited range, the burden on the user can be reduced.

The fourth reason is that it is desirable for the vertical information sections X1 to X5 to be positioned in the left-right direction such that the interval in the left-right direction between the center lines of adjacent vertical information sections is in a range that is 7% to 10% of the exposed tape length L0. This is because it becomes difficult to distinguish between the adjacent vertical information sections if the interval in the left-right direction between the center lines of adjacent vertical information sections is shorter than this. Conversely, if the interval in the left-right direction between the center lines of adjacent vertical information sections is longer than this, it might become impossible for the five vertical information sections X1 to X5 to be disposed within the specific area R0, for example. Thus, a person can specify the positions of the vertical information sections X2 to X5 by using the vertical information section X1 as a reference.

Defining the various types of positional relationships in the arm front face wall 35 as described above makes it possible for a person to easily specify the positions of the vertical information sections X1 to X5 and the indicator portions 800A to 800E by looking. The reasons for this will be explained below.

In a case where a person already knows the positions of all of the vertical information sections X1 to X5 in the left-right direction, the person can specify the printing information simply by checking whether or not a hole is formed in each of the vertical information sections X1 to X5. In contrast, in a case where a person does not know the positions of all of the vertical information sections X1 to X5 in the left-right direction, the positions can be specified by looking, as described below.

First, the person can narrow down the possible positions of the vertical information sections X1 to X5 by using the latch hole 820 as an indicator. As described previously, the right edge of the latch hole 820 is positioned to the upstream side in the tape feed direction (that is, to the right side) from at least the vertical information section X1. The person can therefore narrow down the range within the arm front face wall 35 in which it is possible for the vertical information section X1 to be located to the downstream side (that is, the left side) of the right edge of the latch hole 820 in the tape feed direction. The right edge of the latch hole 820 is also positioned to the upstream side of all of the vertical information sections X1 to X5 in the tape feed direction. The person can therefore narrow down the range in which it is possible for the vertical information sections X1 to X5 to be located to the left side of the right edge of the latch hole 820.

A person can specify the position of the vertical information section X1 as hereinafter described. First, the vertical information sections X1 to X5 are disposed such that there is an interval between them and the exit 341 of the arm portion 34. As long as the person knows in advance the distance that separates the vertical information section X1 from the exit 341, the person can specify the position of the vertical information section X1 in the left-right direction by using the exit 341 as a reference. Second, at least a portion of the vertical information section X1 is within the range LW1. Third, at least a portion of the vertical information section X1 is within the range LW2. The position of the vertical information section X1 in the left-right direction can thus be specified by using as a reference one of the exit 341 and the center line C, which can be recognized easily by looking.

In a front view, the vertical information sections X1 to X5 are disposed at equal intervals from the left side toward the right side of the arm front face wall 35. As long as a person knows in advance that either the intervals between the adjacent vertical information sections in the vertical information sections X1 to X5 or the fact that the intervals in the left-right direction between the center lines of the adjacent vertical information sections are in the range of 7% to 10% of the exposed tape length L0, the person can specify the positions of the other vertical information sections X2 to X5 in the left-right direction by using the vertical information section X1 as a reference.

Further, in a case where the printing information can be specified based on whether or not a hole is formed in each of the indicator portions 800A to 800E, as shown in FIG. 38, it is also necessary to specify the positions of the indicator portions 800A to 800E. As long as a person knows all of the positions in the up-down direction in which the horizontal information sections Y1 to Y3 are disposed, the person can specify the positions in the up-down direction of the indicator portions 800A to 800E in the vertical information sections X1 to X5 by using the horizontal information sections Y1 to Y3 as references. In other words, by looking, the person can specify the prescribed positions (the positions in the left-right direction and the positions in the up-down direction) of the indicator portions 800A to 800E that are provided in the areas where the vertical information sections X1 to X5 and the horizontal information sections Y1 to Y3 overlap.

The upper edge of the latch hole 820 is positioned higher than all of the horizontal information sections Y1 to Y3 within the range of the height dimension of the arm front face wall 35. Therefore, even in a case where a person does not know the positions of the horizontal information sections Y1 to Y3 in the up-down direction, the person can narrow down the range in which it is possible for the horizontal information sections Y1 to Y3 to be disposed to the range below the upper edge of the latch hole 820.

The horizontal information sections Y1, Y2 are disposed within the common indicator portion 831. The specified height T1 of the common indicator portion 831 is slightly greater than the width T of the common portion 32. A person can specify the range of the common indicator portion 831 by using the common portion 32 as a reference. In the wide cassette 30, the horizontal information section Y3 extends in the left-right direction and straddles the line between the common indicator portion 831 and the expansion portion 832 that is below the common indicator portion 831. In the narrow cassette 30, the horizontal information section Y3 extends along the lower edge of the arm front face wall 35. Accordingly, a person can easily specify the position of the horizontal information section Y3.

The horizontal information sections Y1 to Y3 are arrayed in the second area R2 at almost equal intervals in the up-down direction. Therefore, even in a case where a person does not know the positions of the horizontal information sections Y1 to Y3 in the up-down direction, the person can specify the positions of the horizontal information sections Y1, Y2 by using as a reference one of the common portion 32 and the center line N of the cassette case 31, which can be recognized easily by looking.

In this manner, the tape cassette 30 according to the present embodiment is structured such that it is possible for a person to specify the vertical information sections X1 to X5 of the arm indicator portion 800 and the prescribed positions of the indicator portions 800A to 800E by looking at the arm front face wall 35.

Next, the specifying of the printing information based on the various combinations of whether or not a hole is formed in each of the vertical information sections X1 to X5 of the arm indicator portion 800 or in each of the indicator portions 800A to 800E will be explained. Various elements may be included in the printing information, but in the present embodiment, an example will be explained in which three of the elements, the tape width, a printing mode, and a color table, are specified.

The elements of printing information that are respectively specified by the vertical information sections X1 to X5 are determined in advance. In the present embodiment, the vertical information sections X1, X2, X5 are defined as the sections that indicate the information about the tape width. The vertical information section X3 is defined as the section that indicates the information about the printing mode. The vertical information section X4 is defined as the section that indicates the information about the color table.

In addition, in a case where the specific overlap areas in the vertical information sections X1 to X5 function as the indicator portions 800A to 800E, as shown in FIG. 38, the printing information elements that the indicator portions 800A to 800E respectively specify are determined in accordance with the vertical information sections X1 to X5 in which the indicator portions 800A to 800E are provided. In the present embodiment, the indicator portions 800A, 800B, 800E are the indicator portions that specify the tape width. The indicator portion 800C is the indicator portion that specifies the printing mode. The indicator portion 800D is the indicator portion that specifies the color table.

The vertical information sections X1, X2, X5 and the indicator portions 800A, 800B, 800E each function as the tape width specifying portion. The vertical information section X3 and the indicator portion 800C each function as the printing mode specifying portion. The vertical information section X4 and the indicator portion 800D each function as the color table specifying portion. In the tape cassette 30, it is possible to specify one of the elements of the printing information using only one of the specifying portions, regardless of the configuration of the other specifying portions. Hereinafter, a method for specifying of the printing information will be explained using as an example a method in which the printing information is specified by the indicator portions 800A to 800E.

The printing information (the tape width, the printing mode, and the color table) that is specified by the individual specifying portions will be explained with reference to Tables 1 to 3. For the sake of convenience, a case where a hole is formed in one of the indicator portions 800A to 800E is indicated by “0” in the tables. A case where a hole is not formed in one of the indicator portions 800A to 800E (that is, where the indicate portion is a surface portion) is indicated by “1”. Note that in a case where the printing information is specified according to whether or not a hole is formed in each of the vertical information sections X1 to X5, the printing information can be specified in the same manner as in the explanation below by replacing the indicator portions 800A to 800E in Tables 1 to 3 with the corresponding vertical information sections X1 to X5.

TABLE 1

| Tape Width | 800A (X1) | 800B (X2) | 800E (X5) |
|---|---|---|---|
| 3.5 mm | 1 | 1 | 0 |
| 6 mm | 0 | 0 | 0 |
| 9 mm | 1 | 0 | 0 |
| 12 mm | 0 | 1 | 0 |
| 18 mm | 0 | 0 | 1 |
| 24 mm | 1 | 0 | 1 |
| 36 mm | 0 | 1 | 1 |

TABLE 2

| Tape Type | 800C (X3) |
|---|---|
| Receptor Type (normal image printing mode) | 1 |
| Laminated Type (mirror image printing mode) | 0 |

TABLE 3

| Color Table | 800D (X4) |
|---|---|
| First Color Table | 0 |
| Second Color Table | 1 |

As shown in Table 1, seven types of tape widths, from 3.5 millimeters to 36 millimeters, are defined according to the combinations of whether each of the indicator portions 800A, 800B, 800E, which form the tape width specifying portion, is a hole or a surface portion. A person can identify the tape width for the tape cassette 30 simply by looking at the indicator portions 800A, 800B, 800E, which, within the arm indicator portion 800, are located in the vertical information sections X1, X2, X5, respectively.

As shown in Table 1, in a case where the tape width is not less than a specified width (18 millimeters), the indicator portion 800E is defined as a surface portion. In a case where the tape width is less than the specified width, the indicator portion 800E is defined as a hole. A person can therefore recognize whether or not the tape width is not less than the specified width (18 millimeters), simply by visually identifying the position of the indicator portion 800E and recognizing whether or not a hole is provided there.

Furthermore, based on the indicator portions 800A, 800B, a person can specify size relationships among different tape widths according to whether the tape width is within a range where it is not less than the specified width (18 millimeters) or within a range where it is less than the specified value. More specifically, a case in which the indicator portions 800A, 800B are respectively a hole and a surface portion (the combination “0, 1” in Table 1) indicates the maximum tape width (36 millimeters or 12 millimeters in Table 1) within a range of not less than the specified width or less than a specified value.

In a case where the indicator portions 800A, 800B are respectively a surface portion and a hole (the combination “1, 0” in Table 1), the indicated tape width is one of the second-largest tape widths (24 millimeters or 9 millimeters in Table 1) within the ranges where the tape width is not less than the specified width or is less than the specified value. In a case where the indicator portions 800A, 800B are both holes (the combination “0, 0” in the table), the indicated tape width is one of the third-largest tape widths (6 millimeters or 18 millimeters in Table 1) within the ranges where the tape width is not less than the specified width or is less than the specified value. Note that in a case where the indicator portions 800A, 800B are both surface portions (the combination “1, 1” in the table), the indicated tape width is the smallest tape width (3.5 millimeters in Table 1).

A person can determine whether the tape width is not less than the specified width or is less than the specified width by visually identifying the positions of the indicator portions 800A, 800B, 800E and checking whether or not a hole is formed in the indicator portion 800E. A person can also identify the tape width more specifically by checking whether or not a hole is formed in each of the indicator portions 800A, 800B. For example, in the wide cassette 30 that is shown in FIGS. 37 to 39, the indicator portion 800E is a surface portion, the indicator portion 800A is a hole, and the indicator portion 800B is a surface portion. In this case, by looking at the arm indicator portion 800, a person can specify that the tape width is the maximum width that is not less than the specified width of 18 millimeters, that is, that the tape width is “36 millimeters”.

In a case where a person already knows the numerical value of the specified width, the person can determine whether or not the tape width of the tape cassette 30 is less than the specified width simply by looking at the tape cassette 30 as a whole. Therefore, the vertical information sections X1, X2 may be defined as the tape width specifying portion that are included in the arm indicator portion 800, and the two indicator portions 800A, 800B may be disposed. In this case, a person can visually recognize the width of the tape that is discharged from the exit 341 into the open portion 77 and the vertical information sections X1, X2, which are adjacent to the exit 341, at the same time. The person can accurately compare the width of the tape that is exposed in the open portion 77 to the tape width that is indicated by the tape width specifying portion.

On the other hand, in a case where the tape width specifying portion includes another vertical information section in addition to the vertical information sections X1, X2, it is desirable for the other vertical information section to indicate whether or not the tape width is less than the specified width. In the present embodiment, the vertical information section X5 includes one of a hole and a surface portion, depending on whether the tape width is less than the specified width or not. A person can specify whether or not the tape width is less than the specified width by checking whether the vertical information section X5 includes a hole or a surface portion. Furthermore, the vertical information section X5 is provided in a position that is separated from the vertical information sections X1, X2. A person can accurately determine whether the tape width is less than the specified width or is not less than the specified width without confusing the vertical information section X5 with the vertical information sections X1, X2.

As shown in Table 2, the printing mode is defined as one of mirror image printing (the laminated type) and normal image printing (the receptor type), depending on whether the indicator portion 800C, which forms the printing mode specifying portion, is a hole or a surface portion. More specifically, in a case where the indicator portion 800C is a hole ("0" in the table), the printing mode is defined as being for the laminated type. In a case where the indicator portion 800C is a surface portion ("1" in the table), the printing mode is defined as being for the receptor type.

A person can recognize the printing mode for the tape cassette 30 simply by looking at the indicator portion 800C, which is located in the vertical information section X3, within the arm indicator portion 800. More specifically, a person can determine whether the printing mode is for the laminated type or the receptor type simply by visually identifying the position of the indicator portion 800C and checking whether or not a hole is formed there. For example, in the wide cassette 30 that is shown in FIGS. 37 to 39, the indicator portion 800C is a hole. In this case, by looking at the arm indicator portion 800, a person can specify that the printing mode is for the "laminated type".

The "receptor type" printing mode includes the receptor type, in which the ink is transferred from the ink ribbon to the tape, the thermal type, in which a color is produced on a thermal tape without using an ink ribbon, and all other types of printing other than the mirror image printing. Therefore, by specifying the printing mode, a person can specify one of the tape cassette 30 for the normal image printing (or, the cassette case 31 that has been prepared for the normal image printing in the manufacturing process) and the tape cassette 30 for the mirror image printing (or, the cassette case 31 that has been prepared for the mirror image printing in the manufacturing process).

As shown in Table 3, a color information table 520 (refer to FIG. 44) that is to be used when the tape printer 1 specifies color information is defined according to whether the indicator portion 800D, which forms the color table specifying portion, is a hole or a surface portion. More specifically, in a case where the indicator portion 800D is a surface portion ("1" in the table), a second color table is defined as the color table that will be used. In a case where the indicator portion 800D is a hole ("0" in the table), a first color table is defined as the color table that will be used.

A person can recognize the color table that will be used when the color information is specified simply by looking at the indicator portion 800D, which is located in the vertical information section X4, within the arm indicator portion 800. More specifically, a person can determine which of the first color table and the second color table will be used simply by visually identifying the position of the indicator portion 800D and checking whether or not a hole is formed there. For example, in the wide cassette 30 that is shown in FIGS. 37 to 39, the indicator portion 800D is a hole. In this case, by looking at the arm indicator portion 800, a person can specify that the first color table will be used when the color information is specified. The color information table 520 will be explained in detail later.

The tape width and the printing mode may be important pieces of information for the printing to be performed properly by the tape printer 1. Accordingly, the arm indicator portion 800 may be provided with only one of the tape width specifying portion and the printing mode specifying portion, and it may be provided with both the tape width specifying portion and the printing mode specifying portion. In contrast, it may be acceptable for the arm indicator portion 800 not to be provided with the color table specifying portion. It is also acceptable for the one of the vertical information section X4 and the indicator portion 800D to be used to specify an element of the tape type (for example, whether the character color is black or a color other than black) other than the color table.

The particulars of the tape widths, the printing modes, and the color tables that the arm indicator portion 800 specifies are not limited to what is shown in Tables 1 to 3 and may be modified as desired. The number of combinations of the tape width, the printing mode, and the color table that are defined by the Tables 1 to 3 is twenty-eight, but it is not necessary to use all of the combinations. For example, as will be described later, in a case where the tape printer 1 is adapted to detect a state in which the tape cassette 30 has been mounted improperly, a combination that corresponds to the improperly mounted state will not be used.

Thus far, the configuration of the arm indicator portion 800 for specifying the printing information, and the methods by which a person specifies the printing information by looking at the arm indicator portion 800, have been explained. Hereinafter, the configuration of the arm indicator portion 800 as seen in terms of its relationship to the arm detection switches 210, and the form in which the tape printer 1 specifies the printing information, will be explained.

First, the configuration of the arm indicator portion 800 as seen in terms of its relationship to the arm detection switches 210 will be explained. As explained previously, the tape printer 1 according to the present embodiment includes the five arm detection switches 210A to 210E (refer to FIG. 11). In the tape cassette 30 that has been mounted in the cassette mounting portion 8, the overlap areas that are positioned opposite the arm detection switches 210A to 210E are the indicator portions 800A to 800E, respectively (refer to FIG. 38). In the example of the wide cassette 30 that is shown in FIG. 38, the indicator portions 800A, 800C, 800D are holes, and the indicator portions 800B, 800E are surface portions.

In a case where a hole is positioned opposite one of the arm detection switches 210, the hole functions as the non-pressing portion 801 that does not depress the switch terminal 222 (refer to FIG. 12). The non-pressing portion 801 has an opening with a vertically long shape in a front view that corresponds to the shape of the indicator portion (the overlap area). For example, the non-pressing portion 801 may be a hole that passes through the arm front face wall 35 approximately orthogonally to the arm front face wall 35 (that is, parallel to the top face 301 and the bottom face 302). The direction in which the non-pressing portion 801 is formed is almost orthogonal to the path along which the tape moves in the arm portion 34. The switch terminal 222 of the arm detection switch 210 that is positioned opposite the non-pressing portion 801 is inserted into the non-pressing portion 801 and enters the off state.

In a case where a surface portion is positioned opposite one of the arm detection switches 210, the surface portion functions as the pressing portion 802 that depresses the switch terminals 222. The pressing portion 802 is a portion of the arm front face wall 35 and has a surface with a vertically long shape in a front view that corresponds to the shape of the indicator portion (the overlap areas). The switch terminal 222 of the arm detection switch 210 that is positioned opposite the pressing portion 802 comes into contact with the pressing portion 802 and enters the on state. In the wide cassette 30 that is shown in FIG. 38, the indicator portions 800A, 800C, 800D are the non-pressing portions 801, and the indicator portions 800B, 800E are the pressing portions 802.

The indicator portion 800E is provided in the horizontal information section Y3. As described previously, in the wide cassette 30, the horizontal information section Y3 is provided such that it straddles the line between the common indicator portion 831 and the expansion portion 832 that is below the common indicator portion 831. In the narrow cassette 30, the horizontal information section Y3 is provided along the bottom edge of the arm front face wall 35. The length in the up-down direction of the indicator portion 800E in the narrow cassette 30 is approximately one-third the length in the up-down direction of the indicator portion 800E in the wide cassette 30 (refer to FIG. 39).

In the present embodiment, in the case of the wide cassette 30, the indicator portion 800E is a surface portion, that is, the pressing portion 802. In the case of the narrow cassette 30, the indicator portion 800E is a hole, that is, the non-pressing portion 801. The reasons for this will now be explained. In a case where the tape printer 1 is a specialized device in which only the narrow cassette 30 can be used, the arm detection switch 210E that is positioned opposite the indicator portion 800E is not needed. On the other hand, in a case where the tape printer 1 is a general-purpose device in which both the narrow cassette 30 and the wide cassette 30 can be used, the arm detection switch 210E that is positioned opposite the indicator portion 800E is required. Therefore, in a case where the narrow cassette 30 is mounted in the general-purpose device, the indicator portion 800E of the narrow cassette 30 functions as an escape hole such that the arm detection switch 210E is not pressed.

As explained previously, one of the hole (the non-pressing portion 801) and the surface portion (the pressing portion 802) is formed in each of the indicator portions 800A to 800E in the prescribed patterns in accordance with the printing information (refer to Tables 1 to 3). The tape printer 1 is able to specify the printing information based on the combination of the on and off states of the arm detection switches 210 that are selectively depressed by the arm indicator portion 800.

More specifically, the tape printer 1 specifies the printing information that corresponds to the combination of the on and off states of the five arm detection switches 210A to 210E by referencing a table. In the table, the prescribed patterns (the combinations of the hole(s) and the surface portion(s)) that have been determined in advance for the indicator portions 800A to 800E are associated with the printing information by being replaced by the corresponding detection patterns (the combinations of the off and on states) of the arm detection switches 210A to 210E.

A printing information table 510 that is shown in FIG. 40 is an example of the tables that can be used by the tape printer 1 for specifying the printing information. The printing information table 510 is stored in the ROM 602 (refer to FIG. 14). Note that in the example that is shown in FIG. 40, the arm detection switches 210A to 210E correspond respectively to switches SW1 to SW5. The off state (OFF) and the on state (ON) of each of the arm detection switches 210 respectively correspond to "0" and "1" in the printing information table 510.

In a case where all five of the arm detection switches 210A to 210E are used, a maximum of thirty-two sets of the printing information can be specified, which corresponds to a maximum of thirty-two detection patterns, thirty-two being the number of possible combinations of the on and the off states. In the example that is shown in FIG. 40, sets of the printing information have been defined that correspond to twenty-four detection patterns out of the maximum of thirty-two detection patterns. Out of the remaining eight detection patterns, three of the detection patterns that indicate errors are used for detecting states in which the tape cassette 30 has not been mounted in its proper position in the cassette mounting portion 8. The other five detection patterns have been defined as "reserved" to indicate that they are blank. The mounted states of the tape cassette 30 in the cases where the errors are detected will be described later.

The printing information table 510 that can be used by the tape printer 1 is not limited to the example that is shown in FIG. 40. For example, another version of the printing information table 510 can be used in which other optional tape types have been added for the detection patterns that correspond to "reserved". Another version of the printing information table 510 may also be used in which registered tape types have been deleted, the correspondences between the individual detection patterns and the tape types have been altered, and the descriptions of the tape types that correspond to the individual detection patterns have been modified. In these cases, the prescribed patterns that are defined for specifying the tape type by looking, as described previously, may also be modified as desired.

As described previously, in a case where the indicator portions 800E, 800D are not provided, for example, the corresponding arm detection switches 210E (SW5) and 210D (SW4) will not be used. In this case, it is acceptable for only the printing information that corresponds to the arm detection switches 210A to 210C (SW1 to SW3) to be defined in the printing information table 510.

As was explained previously, the tape cassette 30 according to the present embodiment is structured such that a person and the tape printer 1 are able to specify the tape type (more specifically, the printing information) based on the arm indicator portion 800. Effects like those hereinafter described can be achieved by making it possible for a person to recognize the tape type by looking at the arm indicator portion 800.

In the manufacturing method for the known tape cassette, the operator generally places the tape in a cassette case with a height (what is called the case size) that corresponds to the tape width. In contrast to this, a tape cassette manufacturing method has been proposed in which a plurality of types of tape with different tape widths are respectively placed into cassette cases in which the case size has been commonized. According to the manufacturing method for the tape cassette in which the case size has been commonized, the effects hereinafter described can be expected.

First, when the cassette cases with the case sizes that differ according to the various tape widths were transported from a parts manufacturing plant to an assembly plant, the cassette cases were shipped using shipping containers and the like that are different for each case size. Commonizing the case size makes it possible to commonize the shipping containers and the like that are used when shipping the cassette cases, so the shipping cost for the cassette cases can be reduced.

Second, when the case size is different for each tape width, it is necessary to use different packing boxes and the like for each case size when the tape cassettes are shipped as products from the assembly plant. Commonizing the case size makes it possible to commonize the packing boxes for shipping of the products, the form of packing that is used when shipping the products, and the like, so expenses can be reduced.

Third, because the ink ribbon has poorer physical durability than does the tape, when an ink ribbon with a small width is used for a tape of the same width, the ink ribbon might be cut during printing. Commonizing the case size to a size in which a ribbon width that has sufficient strength can be ensured makes it possible to ensure a ribbon width that has sufficient strength, even in a case where the tape width is small. Therefore, even in a case where the tape width is small, the cutting of the ink ribbon during printing can be inhibited.

In the known tape cassette, in a case where tapes with different tape widths are placed in the cassette case with the common size, a tape with a tape width that is wrong for the cassette case might be placed in the cassette case. For example, for a cassette case for which the case size has been commonized to match a 12-millimeter tape, the rib heights are set such that the case can accommodate the 12-millimeter tape, so a tape that is less than 12 millimeters can also be accommodated. In that case, the operator might mistakenly place a 6-millimeter or 9-millimeter tape into the cassette case that was intended to accommodate the 12-millimeter tape.

As explained previously, the printing modes for the tape cassette include modes for the receptor type and the laminated type. If the case sizes are commonized, the external shapes of the cassette cases become the same. Therefore, with the known tape cassette, a tape that is not compatible with the intended print mode might be placed in the cassette case. For example, cases may occur in which the operator mistakenly places a thermal tape in a cassette case that is intended for the laminated type.

Therefore, the manufacturing process for the known tape cassette includes an inspection process for checking whether or not the tape and the ink ribbon that have been placed in the manufactured tape cassette are in accordance with the intended tape width and printing mode.

According to the tape cassette 30 of the present embodiment, a person is able to check the tape type in the tape cassette 30 simply by looking at the arm indicator portion 800. In other words, a person is able to determine the tape width of the tape that should be placed in the cassette case 31, as well as the printing mode that is intended for the cassette case 31. Therefore, in the manufacturing process for the tape cassette 30, the operator, while working, is able to check the description of what should be mounted in the cassette case 31, so mistakes in the manufacturing of the tape cassette 30 can be reduced. This in turn makes it possible to reduce the burden on the operator of performing the inspection process as described above.

Furthermore, in the manufacturing process for the tape cassette 30, the operator places the tape in the bottom case 312 and inserts a portion of the tape into the arm portion 34. The operator mounts the portion of the tape that is inserted into the arm portion 34 in a position where it is properly restrained by the restraining portions of the arm portion 34 (the separating wall restraining portion 383, the first bottom tape restraining portion 381B, and the like).

As explained previously, a person is able to see the separating wall restraining portion 383, the first bottom tape restraining portion 381B, and the arm indicator portion 800 at the same time from in front of the bottom case 312. Accordingly, by looking at the bottom arm front face wall 35B from the front, the operator is able to check whether or not the tape that is restrained in the width direction inside the arm portion 34 corresponds to the tape type that is indicated by the arm indicator portion 800. The operator is therefore easily able to discover that the wrong type of tape has been placed in the tape cassette 30. This in turn makes it possible to inhibit mistakes in the manufacturing of the tape cassette 30.

When the tape cassette 30 is shipped as a product, an inspector is able to check whether or not what is mounted in the cassette case 31 is correct by looking at the arm indicator portion 800. Specifically, it is possible to check whether or not the tape that is exposed in the open portion 77 of the manufactured tape cassette 30 matches the tape type that can be read from the arm indicator portion 800.

In particular, the arm indicator portion 800 according to the present embodiment is provided on the arm front face wall 35, which is adjacent to the open portion 77 where the tape is exposed. Therefore, a person is able to look at the arm indicator portion 800 and the tape from the same direction (specifically, from in front of the tape cassette 30). The inspector can compare the tape type that is indicated by the arm indicator portion 800 to the tape that is exposed in the open portion 77. It is therefore possible to improve the operability of the product inspection for the tape cassette 30.

The arm indicator portion 800 has a simple configuration that is a combination of the hole(s) and the surface portion(s) (that is, the non-pressing portion(s) 801 and the pressing portion(s) 802) that are provided in the individual vertical information sections X1 to X5 (the indicator portions 800A to 800E). When the tape cassette 30 is manufactured, the arm indicator portion 800 in the cassette case 31 can be formed easily. Accordingly, it may be unnecessary to print anything on the cassette case 31 to indicate what is to be mounted and it may be unnecessary to attach any labels to indicate what is to be mounted. Mistakes in the manufacturing of the tape cassette 30 can therefore be inhibited at low cost.

In the present embodiment, the hole is provided that functions as the latch hole 820 in the first area R1. Within the second area R2, one of the hole (that is, the non-pressing portion 801) and the surface portion (that is, the pressing portion 802) is provided in accordance with the tape type in each of the overlap areas that function as the indicator portions 800A to 800E. However, within the specific area R0, the hole(s) and the surface portion(s) can be formed freely as far as the functions of the latch hole 820 and the indicator portions 800A to 800E can be ensured.

Specifically, in the tape cassette 30 that is described above (refer to FIGS. 37 to 39), all of the areas within the specific area R0 that do not function as the latch hole 820 and the indicator portions 800A to 800E are the same surface as the pressing portions 802. Therefore, the holes (the non-pressing portion(s) 801 and the latch hole 820) that are provided in the specific area R0 are all independent, but it is not necessary for all of the holes to be independent.

For example, in the specific area R0, a single hole (a slot) may be formed with a size and a shape such that it contains at least two of a plurality of non-pressing portions 801. A single slot may also be formed that contains the latch hole 820 and the non-pressing portion 801. A single slot may also be formed such that it contains at least two of a plurality of non-pressing portions 801, plus the latch hole 820. In a case where a single slot is formed, it is desirable for it not to include any portion that functions as the pressing portion 802.

In the present embodiment, the arm indicator portion 800 and the latch hole 820 are provided in the bottom arm front face wall 35B within the arm front face wall 35. This makes it possible to define the positional relationship between the arm indicator portion 800 and the latch hole 820 more accurately than in a case where the arm indicator portion 800 and the latch hole 820 are provided on separate members (for example, on the top arm front face wall 35A and the bottom arm front face wall 35B). This in turn makes it possible to specify the tape type more accurately, both in a case where a person specifies the tape type by looking and in a case where the tape printer 1 uses the arm detection portion 200 to specify the tape type.

Hereinafter, the structure and the function of the rear stepped wall 360A that is included in the rear recessed portion 360 will be explained in detail with reference to FIGS. 41 to 44.

Figure 41:
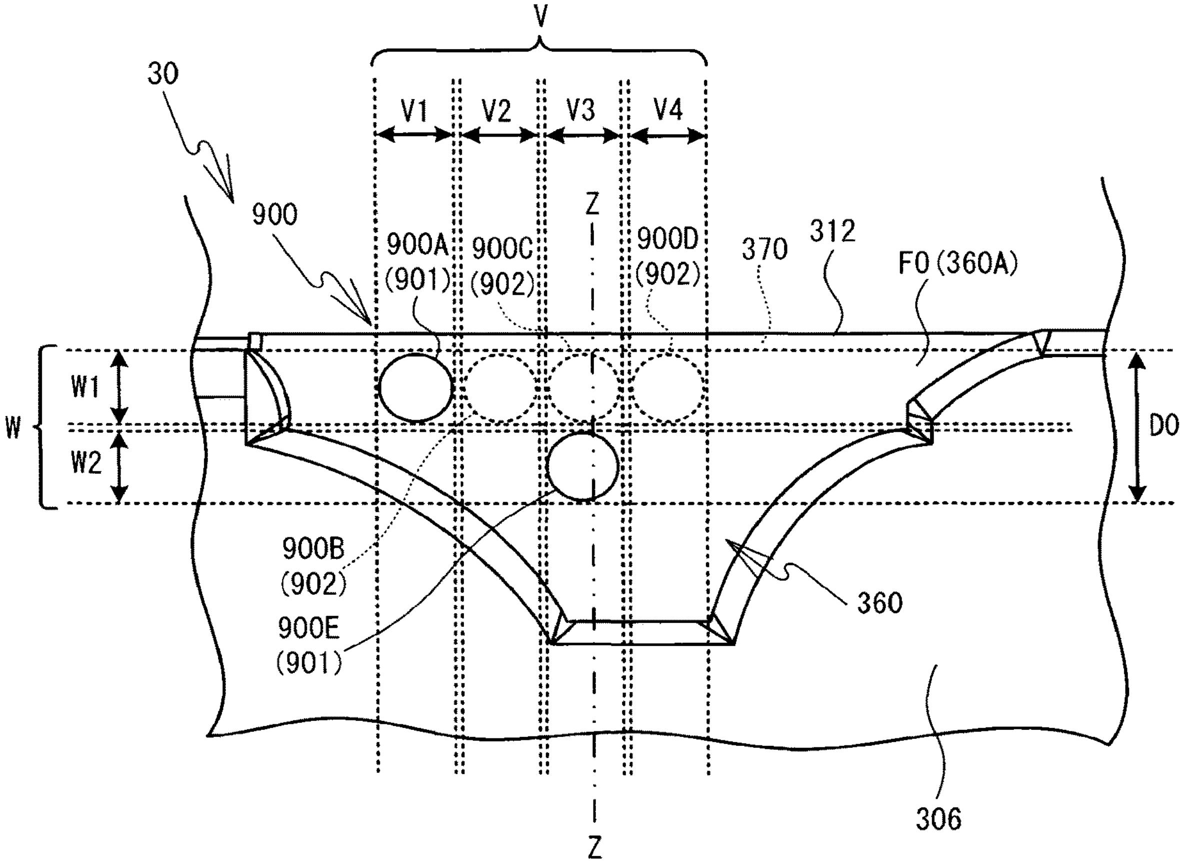
FIG. 41 is an enlarged bottom view of an area around a rear recessed portion 360 of the tape cassette 30.
Figure 42:
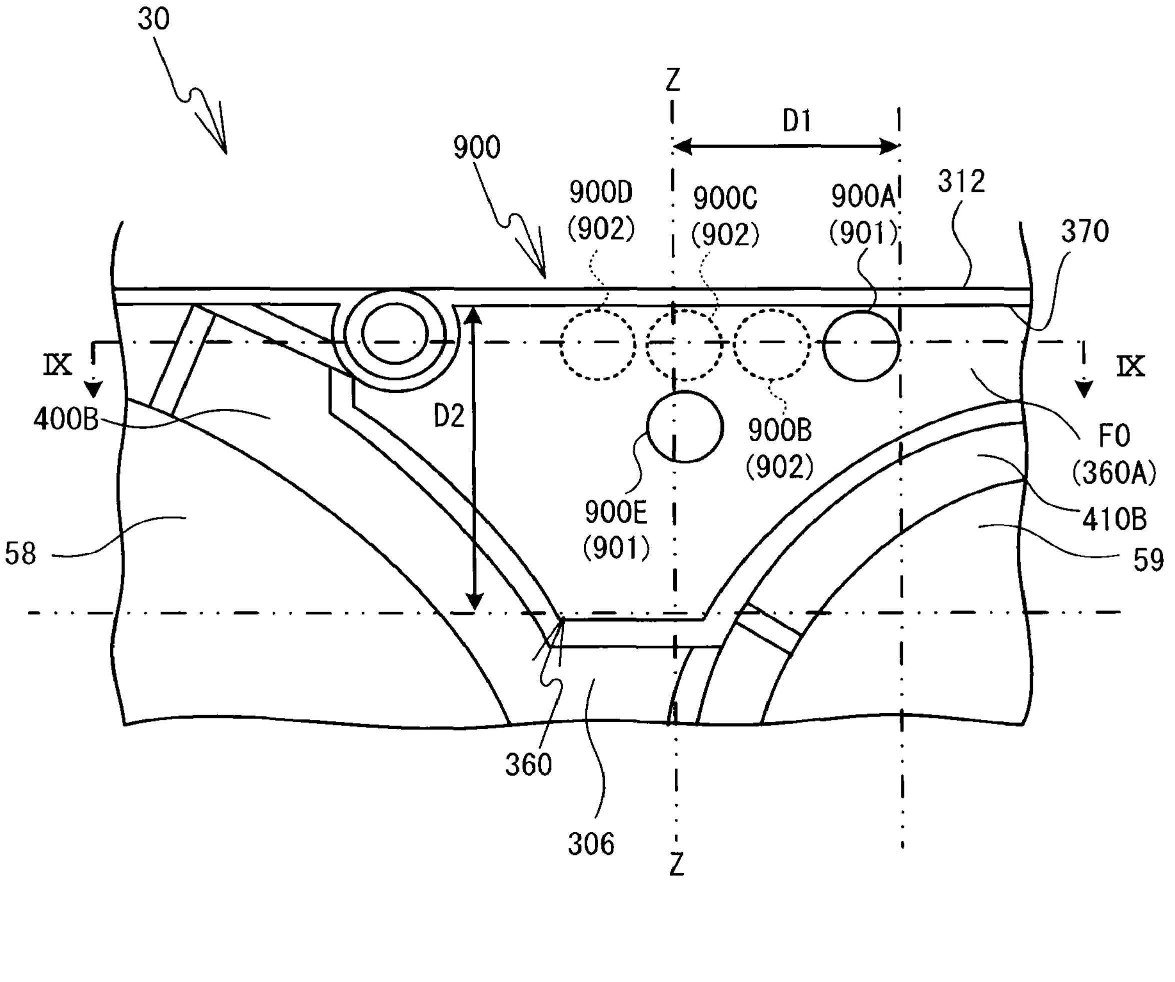
FIG. 42 is an enlarged plan view of the area around the rear recessed portion 360 of the tape cassette 30 in a state in which the top case 311 has been removed.

As shown in FIGS. 41 and 42, the rear stepped wall 360A includes the rear indicator portion 900. The rear indicator portion 900 includes at least one hole and indicates the tape type of the tape cassette 30. A person can specify the tape type by looking at the rear indicator portion 900. In a case where the tape cassette 30 has been mounted in the cassette mounting portion 8, the tape printer 1 can specify the tape type by using the rear detection portion 300 to detect the information that the rear indicator portion 900 indicates.

In the present embodiment, the tape type that the rear indicator portion 900 specifies is color information that pertains to the tape that is contained in the tape cassette 30. Hereinafter, areas that are included in the rear stepped wall 360A and the configuration within those areas will be explained.

The rear stepped wall 360A includes a specific area FO that is an area that extends toward the front from the rear wall 370. In other words, the specific area FO is an area in the rear stepped wall 360A that is adjacent to the rear wall 370. In the present embodiment, the entire rear stepped wall 360A is the specific area FO. The specific area FO includes longitudinal information sections V and transverse information sections W. The longitudinal information sections V are a plurality of strip-shaped sections that extend in the front-rear direction (the up-down direction in FIG. 41), which is the shorter dimension of the cassette case 31. The transverse information sections W are a plurality of strip-shaped sections that extend in the left-right direction (the left-right direction in FIG. 41), which is the longer dimension of the cassette case 31.

The longitudinal information sections V according to the present embodiment include four longitudinal information sections V1 to V4. The longitudinal information sections V1 to V4 are disposed such that they are lined up at equal intervals in the left-right direction of the cassette case 31. The longitudinal information section V1 is positioned the farthest to the right side (the left side in FIG. 41) of the longitudinal information sections V1 to V4. Starting from the longitudinal information section V1 and moving toward the left side (the right side in FIG. 41), the longitudinal information sections V2, V3, V4 are provided in that order. The widths of the longitudinal information sections V1 to V4 (that is, their lengths in the left-right direction) are approximately equal, and among the longitudinal information sections V1 to V4, the adjacent longitudinal information sections are disposed at equal intervals.

In a plan view, the longitudinal information section V3 includes a portion (a contact point P that is shown in FIG. 20) where the outer edges of the first bottom tape area 400B and the second bottom tape area 410B contact one another. In other words, the longitudinal information section V3 includes a virtual line (hereinafter called the reference line Z) that runs in the front-rear direction through the contact point P. In the present embodiment, the reference line Z is positioned slightly to the left (to the right in FIG. 41) of the approximate center position of the longitudinal information section V3 in the left-right direction.

The transverse information sections W according to the present embodiment include two transverse information sections W1, W2. The transverse information sections W1, W2 are disposed such that they are lined up in the front-rear direction of the cassette case 31 (the up-down direction in FIG. 41). The transverse information section W1 is provided adjacent to the rear wall 370 in the specific area FO. The transverse information section W2 is provided to the front of (in FIG. 41, below) the transverse information section W1 in the specific area FO. The widths of the transverse information sections W1, W2 (that is, their lengths in the front-rear direction) are approximately equal.

The specific area FO is an area that is positioned opposite the rear detection switches 310 when the tape cassette 30 is mounted in the cassette mounting portion 8. The rear indicator portion 900, which includes the transverse information sections W1, W2, is provided in the specific area FO. A hole is formed in at least one of the transverse information sections W1, W2. Whether a hole will be formed in each of the transverse information sections W1, W2 is determined in advance in accordance with the color information. The rear indicator portion 900 is adapted to specify the color information using various combinations of a hoe or holes being formed and not formed in the individual transverse information sections W1, W2. A person can recognize the color information by looking at the combination of the hole or holes that have been formed in the transverse information sections W1, W2.

The positions in the left-right direction of the transverse information sections W1, W2 where the hole(s) may be formed may be determined separately for each of the transverse information sections W1, W2. For example, among the plurality of areas (hereinafter called the overlap areas) where the transverse information sections W1, W2 and the longitudinal information sections V1 to V4 intersect and overlap, at least one of the overlap areas may be defined as an indicator portion in each of the transverse information sections W1, W2. The rear indicator portion 900 may also be adapted to specify the color information using various combinations of the hole(s) being formed and not formed in the indicator portions. In that case, if the positions that correspond to the rear detection switches 310 (refer to FIG. 13) are defined as the indicator portions, the tape printer 1 will also be able to specify the color information.

In the present embodiment, the five overlap areas that respectively oppose the five rear detection switches 310A to 310E (refer to FIG. 13) when the tape cassette 30 is mounted in the cassette mounting portion 8 function as indicator portions 900A to 900E. More specifically, as shown in FIG. 41, the area where the transverse information section W1 and the longitudinal information section V1 overlap functions as the indicator portion 900A that is positioned opposite the rear detection switch 310A.

The area where the transverse information section W1 and the longitudinal information section V2 overlap functions as the indicator portion 900B that is positioned opposite the rear detection switch 310B. The area where the transverse information section W1 and the longitudinal information section V3 overlap functions as the indicator portion 900C that is positioned opposite the rear detection switch 310C. The area where the transverse information section W1 and the longitudinal information section V4 overlap functions as the indicator portion 900D that is positioned opposite the rear detection switch 310D. The area where the transverse information section W2 and the longitudinal information section V3 overlap functions as the indicator portion 900E that is positioned opposite the rear detection switch 310E.

In the example that is shown in FIG. 41, holes are formed in the indicator portions 900A, 900E. The indicator portions 900B, 900C, 900D are parts of the surface portions included in the rear stepped wall 360A where holes are not formed. Thus, each of the indicator portions 900A to 900E is formed as one of a hole and a surface portion that a person can recognize by looking. The hole and the surface portion also function respectively as a non-pressing portion 901 and a pressing portion 902, which will be described later. The relationships between the indicator portions 900A to 900E and the rear detection switches 310 will be described in detail later.

In the present embodiment, the specific area FO (that is, the rear stepped wall 360A) is roughly triangular in a plan view, and its length in the front-rear direction is greatest on the reference line Z. In other words, of the longitudinal information sections V1 to V4, the longitudinal information section V3, which includes the reference line Z, has the greatest length in the front-rear direction in the specific area FO. Therefore, one indicator portion is provided in each of the longitudinal information sections V1, V2, V4, and a plurality of indicator portions are provided in the longitudinal information section V3. Thus, in a case where a plurality of indicator portions are lined up in the front-rear direction in the specific area FO, it is desirable for the plurality of indicator portions to be located in the longitudinal information section that has the greatest length in the front-rear direction in the specific area FO.

Figure 43:
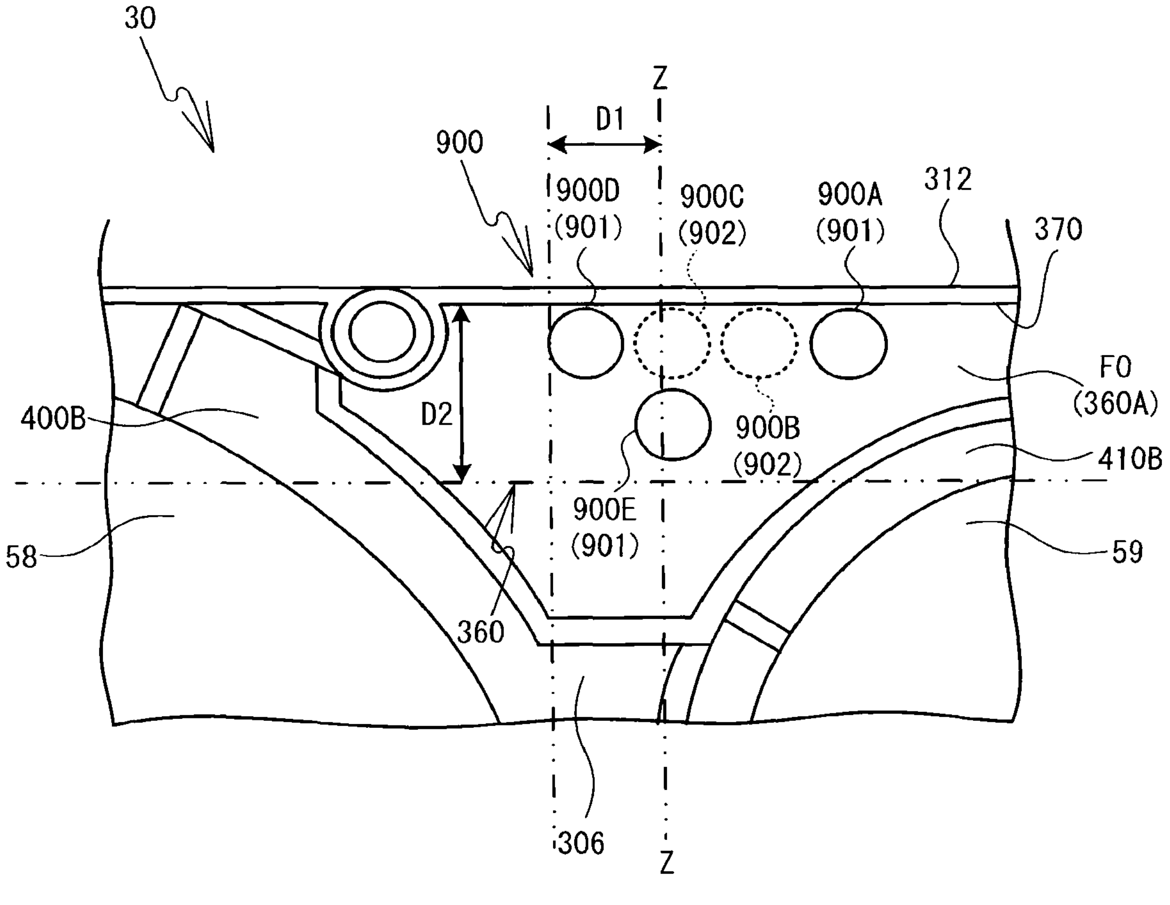
FIG. 43 is an enlarged plan view of the area around the rear recessed portion 360 of the tape cassette 30 in a state in which the top case 311 has been removed, in a comparative example.

A configuration like that described above makes it possible, by looking at the rear stepped wall 360A, for a person to easily recognize the identifying element (the hole or the surface portion) that is formed in each of the transverse information sections W1, W2 and the indicator portions 900A to 900E. The reasons for this will be explained below with reference to FIGS. 41 to 43. FIGS. 41 and 42 show the rear stepped wall 360A (the specific area FO) according to the present embodiment. FIG. 43 shows a comparative example in which the pattern in which the holes are formed in the rear stepped wall 360A (the specific area FO) is modified.

The two patterns described below are assumed as the ways in which a person looks at the rear indicator portion 900. The first pattern is that the person looks at the rear stepped wall 360A from inside the bottom case 312. In this pattern, the person looks at the bottom case 312 from above before the top case 311 is joined to it. This makes it possible for the person to look at the rear indicator portion 900 from the upper surface side of the rear stepped wall 360A.

The second pattern is that the person looks at the rear indicator portion 900 from outside the bottom case 312. In this pattern, the person looks at the bottom case 312 from below. At this time, it is acceptable for the top case 311 to have been joined to the bottom case 312, and it is also acceptable for the top case 311 not to have been joined to the bottom case 312. This makes it possible for the person to look at the rear indicator portion 900 from the lower surface side of the rear stepped wall 360A.

In a case where a person already knows the positions of both of the transverse information sections W1, W2 in the front-rear direction, the person can specify the identifying elements in the transverse information sections W1, W2 by looking. In contrast, in a case where a person does not know the positions of both of the transverse information sections W1, W2 in the front-rear direction, the identifying elements in the transverse information sections W1, W2 can be specified in accordance with the way of looking at the rear indicator portion 900, as described below.

First, the specifying of the elements in the transverse information section W1 will be explained. In a case where the person is looking at the rear indicator portion 900 from the inside of the bottom case 312, as shown in FIG. 42, the person can specify the area that is adjacent to the rear wall 370 and extends in the left-right direction as the transverse information section W1. Furthermore, a hole that is formed adjacent to the rear wall 370 can be specified as a hole that is formed in the transverse information section W1. Within the area that is adjacent to the rear wall 370, a portion in which a hole is not formed can be specified as a surface portion that is provided in the transverse information section W1.

In contrast, in a case where the person is looking at the rear indicator portion 900 from the outside of the bottom case 312, as shown in FIG. 41, the person cannot look directly at the rear wall 370. However, the thickness of the rear wall 370 (its length in the front-rear direction) is small, so the person can regard the rear edge of the bottom case 312 as the rear wall 370 in a bottom view. Accordingly, the person can specify the area that is adjacent to the outline of the rear side of the tape cassette 30 and extends in the left-right direction as the transverse information section W1. The person can also specify the hole and the surface portion that are provided in the transverse information section W1 in the same manner as described above.

Next, the specifying of the elements in the transverse information section W2 will be explained. In a case where the person is looking at the rear indicator portion 900 from the inside of the bottom case 312, as shown in FIG. 42, the person can recognize the first bottom tape area 400B and the second bottom tape area 410B. Using the first bottom tape area 400B and the second bottom tape area 410B as references, the person can recognize the reference line Z that passes through the contact point P (refer to FIG. 20). The element in the transverse information section W2 can be recognized as described below by using the reference line Z as a reference.

First, among the holes that are formed adjacent to the rear wall 370 (that is, the holes that are provided in the transverse information section W1), the person specifies as a reference hole the hole that is in the position that is closest to reference line Z. However, in a case where a hole exists that overlaps the reference line Z in a plan view (that is, a hole that is provided in the longitudinal information section V3 that is shown in FIG. 41), the hole that is in the position that is closest to the reference line Z, other than the hole that is on the reference line Z, is specified as the reference hole. The person then specifies as a reference edge the edge of the reference hole that is the farthest from the reference line Z. The person specifies the distance in the left-right direction between the reference line Z and the reference edge as a distance D1.

In the example that is shown in FIG. 42, among the indicator portions in the transverse information section W1, the hole that is formed in the indicator portion 900A, which is positioned at the far right edge, corresponds to the reference hole. The right edge of the hole that is formed in the indicator portion 900A corresponds to the reference edge. Accordingly, the length in the left-right direction from the right edge of the hole that is formed in the indicator portion 900A to the reference line Z is derived as the distance D1.

A distance D0 (refer to FIG. 41) indicates the length of a range between the rear wall 370 and the transverse information section W2 in the front-rear direction. The position of the transverse information section W2 in the front-rear direction is defined such that the distance D0 is less than two times the distance D1 (refer to FIG. 42). In other words, in the rear stepped wall 360A, at least a portion of the transverse information section W2 is contained in a range that extends toward the front by two times the distance D1 from the rear wall 370 (the range of a distance D2 in FIG. 42; D2=D1×2).

Based on the constraints that are described above, a person can specify that at least a portion of the transverse information section W2, which is positioned in front of the transverse information section W1, exists within the range of the distance D2. In a case where a hole is formed that is separated from the rear wall 370 (that is, a hole that is provided outside the range of the transverse information section W1) within the range of the distance D2, a person can specify that hole as a hole that is formed in the transverse information section W2. In particular, in a case where only one indicator portion is provided in the transverse information section W2, a person can specify whether or not a hole is provided in the transverse information section W2, even if the person does not accurately know the position of the indicator portion.

According to the procedure that is described above, the distance D1, and by extension, the distance D2, differ according to the position in which the reference hole is formed. The distances D1, D2 reach their greatest values in a case where a hole is provided in the indicator portion that is positioned the farthest from the reference line Z (in FIG. 42, in the indicator portion 900A) and that hole is specified as the reference hole. The distances D1, D2 reach their smallest values in a case where a hole is provided in the indicator portion that is positioned the closest to the reference line Z (in FIG. 43, in the indicator portion 900D) and that hole is specified as the reference hole.

In a case where a plurality of holes are formed in the transverse information section W1, as in the example that is shown in FIG. 43, the hole that is the closest to the reference line Z (that is, the hole in the indicator portion 900D) corresponds to the reference hole. In this case, the distances D1, D2 become smaller than in a case where the hole that is the farthest from the reference line Z (that is, the hole in the indicator portion 900A) is taken as the reference hole. Thus, in a case where at least one hole has been provided in the transverse information section W1, a person can specify the range of the distance D2 irrespective of the number and the positions of the holes that are provided in the transverse information section W1.

In contrast, in a case where the person is looking at the rear indicator portion 900 from the outside of the bottom case 312 (refer to FIG. 41), the person cannot look directly at the first bottom tape area 400B and the second bottom tape area 410B. Therefore, it may be difficult in some cases for the person to recognize the contact point P (refer to FIG. 20) and the reference line Z. In those cases, the element in the transverse information section W2 can be specified by the method that is described below.

In a case where the rear indicator portion 900 according to the present embodiment corresponds to the color information (for example, Tape color: Clear, Character color: Black, or the like) for a major tape that has a high percentage of being mounted in the tape cassette 30, among the two indicator portions that are respectively provided in the transverse information sections W1, W2 and are lined up in the front-rear direction, a hole is provided in the front indicator portion, and a surface portion is provided in the rear indicator portion. To be specific, the two indicator portions 900C, 900E through which the reference line Z passes are configured as a combination of a surface portion and a hole, respectively.

Thus, in many of the tape cassettes 30, an indicator portion that is configured as a surface portion that is close to the rear wall 370 and an indicator portion that is configured as a hole that is separated from the rear wall 370 are lined up in the front-rear direction. In a case where a person looks at the rear indicator portion 900 from below, the person can specify a hole that is separated from the rear wall 370 as a hole that is provided in the transverse information section W2. The person can also specify a surface portion that is provided to the rear of the hole as a surface portion that is provided in the transverse information section W1. Furthermore, the person can specify the positions of the transverse information sections W1, W2 based on the surface portion and the hole that have been specified.

Conversely, among the two indicator portions that are respectively provided in the transverse information sections W1, W2 and are lined up in the front-rear direction, it is also acceptable for a hole to be provided in the rear indicator portion and for a surface portion to be provided in the front indicator portion. For example, the two indicator portions through which the reference line Z passes (for example, the two indicator portions 900C, 900E) may also be configured as a combination of a hole and a surface portion, respectively, although this is not shown in the drawings. In this case, an indicator portion that is configured as a hole that is close to the rear wall 370 and an indicator portion that is configured as a surface portion that is separated from the rear wall 370 are lined up in the front-rear direction. In a case where a person looks at the rear indicator portion 900 from below, the person can specify a hole that is close to the rear wall 370 as a hole that is provided in the transverse information section W1. The person can also specify a surface portion that is provided in front of the hole as a surface portion that is provided in the transverse information section W2. Furthermore, the person can specify the positions of the transverse information sections W1, W2 based on the hole and the surface portion that have been specified.

In the rear indicator portion 900 according to the present embodiment, the pattern in which the hole(s) and the surface portion(s) are formed can also be recognized from above. It is therefore possible to specify a hole or a surface portion in the transverse information section W2 can be specified, in the same manner as described above, even in a case where the rear indicator portion 900 is viewed from above (refer to FIG. 42).

Furthermore, in a case where the color information is specified according to whether a hole is formed or not in each of the indicator portions 900A to 900E, as in the examples in FIGS. 41 and 42, it may be necessary to specify the positions of the indicator portions 900A to 900E. If a person already knows all of the positions in the left-right direction in which the longitudinal information sections V1 to V4 are disposed, the person can specify the positions of the indicator portions 900A to 900E in the left-right direction in the transverse information sections W1, W2 by using the longitudinal information sections V1 to V4 as references. In other words, by looking, the person can specify the prescribed positions (the positions in the left-right direction and the positions in the front-rear direction) of the indicator portions 900A to 900E that are provided in the areas where the transverse information sections W1, W2 and the longitudinal information sections V1 to V4 overlap.

By looking at the rear indicator portion 900, a person can specify the positions of the longitudinal information sections V1 to V4 in the left-right direction as hereinafter described. As explained previously, the reference line Z is contained in the longitudinal information section V3. Accordingly, in a case where a person looks at the rear indicator portion 900 from above (refer to FIG. 42), the person can specify the position of the longitudinal information section V3 in the left-right direction by using the reference line Z as a reference. The longitudinal information sections V1 to V4 are arrayed in the specific area FO at almost equal intervals in the left-right direction. Accordingly, by using longitudinal information section V3 as a reference, a person can specify the longitudinal information sections V2, V1 that are lined up at the same intervals to the right and the longitudinal information section V4 that is lined up at the same interval to the left. Thus, even in a case where the positions of the longitudinal information sections V1 to V4 in the left-right direction are not known, it is possible for a person to specify the positions of the longitudinal information sections V1 to V4 by using as a reference the reference line Z, which can be easily determined by looking.

As explained previously, the indicator portions 900C, 900E are configured as a combination of a hole and a surface portion that are lined up in the front-rear direction. Accordingly, in a case where the rear indicator portion 900 is viewed from below (refer to FIG. 41), the position in the left-right direction of the longitudinal information section V3, which contains the indicator portions 900C, 900E, can be specified based on the combination of the hole and the surface portion that are lined up in the front-rear direction. Therefore, the longitudinal information sections V1 to V4, which are lined up at almost equal intervals in the left-right direction in the specific area FO, can be specified in the same manner as described above. Thus, even in a case where the positions of the longitudinal information sections V1 to V4 in the left-right direction are not known, it is possible for a person to specify the positions of the longitudinal information sections V1 to V4 by using as references the indicator portions 900C, 900E (the combination of the hole and the surface portion) that are lined up in the front-rear direction.

Thus, for a hole that is provided in the transverse information section W1, it is possible to specify the one of the indicator portions 900A to 900D in which the hole is provided, based on the one of the longitudinal information sections V1 to V4 in which the hole is provided. For a hole that is provided in the transverse information section W2, it is possible to specify whether or not the hole is provided in the indicator portion 900E, based on whether or not the hole is provided in the longitudinal information section V3. Thus, in the rear indicator portion 900 according to the present embodiment, it is possible for a person, by looking, to specify the combination of the hole(s) and the surface portion(s) that are provided in the indicator portions 900A to 900E.

Next, the specifying of the color information according to the combination of whether or not a hole is formed in each of the transverse information sections W1, W2 or in each of the indicator portions 900A to 900E will be explained. There are various types of elements in the color information, but in the present embodiment, the specifying of the tape color and the character color that are among the elements will be explained as an example. The tape color that is included in the color information indicates a base material color of the tape (the thermal paper tape 55, the printing tape 57, the double-sided adhesive tape 58). For the thermal transfer method that uses the ink ribbon 60, the character color that is included in the color information indicates the color of the ink in the ink ribbon 60. For the thermal method that produces a color on the thermal paper tape 55, the character color indicates the color that is produced on the thermal paper tape 55.

The elements in the color information that is specified by the transverse information sections W1, W2 are determined in advance. In the present embodiment, the transverse information section W1 is defined as the section that indicates information that specifies the tape color. The transverse information section W2 is defined as the section that indicates information that specifies the character color. Furthermore, in a case where the specific overlap areas in the transverse information sections W1, W2 function as the indicator portions 900A to 900E, the color information elements that the indicator portions 900A to 900E specify are determined according to the transverse information sections W1, W2 to which they correspond. In the present embodiment, the indicator portions 900A to 900D are the indicator portions that specify the tape color. The indicator portion 900E is the indicator portion that specifies the character color.

The transverse information section W1 and the indicator portions 900A to 900D each function as the tape color specifying portion. The transverse information section W2 and the indicator portion 900E each function as the character color specifying portion. In the tape cassette 30, it is possible to specify the color information elements using only one of the specifying portions, regardless of the configuration of the other corresponding specifying portion. Hereinafter, a method for specifying of the color information will be explained using as an example a method in which the color information is specified by the indicator portions 900A to 900E.

The elements of the color information (the tape color and the character color) that are specified by the individual specifying portions will be explained with reference to Tables 4 to 6. For the sake of convenience, a case where a hole is formed in one of the indicator portions 900A to 900E is indicated by "0" in the tables. A case where a surface portion is formed and a hole is not formed in one of the indicator portions 900A to 900E is indicated by "1".

Note that in a case where the color information is specified according to the combination of the hole(s) and the surface portion(s) that are formed in the transverse information sections W1, W2, the major tape color can be specified in the same manner as in the explanation below by replacing the indicator portions 900B to 900D in Table 4 with combinations of the hole(s) and the surface portion(s) that are provided in three locations in the transverse information section W1. The special tape color can be specified in the same manner as in the explanation below by replacing the indicator portions 900A to 900D in Table 5 with combinations of the hole(s) and the surface portion(s) that are provided in four locations in the transverse information section W1. The character color can be specified in the same manner as in the explanation below by replacing the indicator portion 900E in Table 6 with one of a hole and a surface portion that is provided in one location in the transverse information section W2.

TABLE 4

| Major Tape Color (W1) | 900B (V2) | 900C (V3) | 900D (V4) |
|---|---|---|---|
| Clear | 1 | 1 | 0 |
| Blue | 0 | 1 | 1 |
| Black | 0 | 0 | 1 |

TABLE 5

| Special Tape Color (W1) | 900A (V1) | 900B (V2) | 900C (V3) | 900D (V4) |
|---|---|---|---|---|
| White | 0 | 1 | 1 | 1 |
| Yellow | 1 | 0 | 1 | 0 |
| Red | 0 | 1 | 0 | 1 |

TABLE 6

| Character Color (W2) | 900E (V3) |
|---|---|
| Black | 0 |
| Other than Black | 1 |

First, a method that a person uses to specify the tape color of the tape cassette 30 by looking will be explained. In the present embodiment, the indicator portions 900A to 900D (the indicator portions in the transverse information section W1) are adapted to indicate the tape color according to the combination of the hole(s) and the surface portion(s). In particular, the major tape color for the major tape, which has a high percentage of being mounted in the tape cassette 30, can be specified by looking at only the three indicator portions 900B to 900D. Some of the special tape colors for the special tape, which has a low percentage of being mounted in the tape cassette 30, can be specified by looking at the four portions 900A to 900D.

As shown in Table 4, three major tape colors, "Clear", "Blue", and "Black", are defined according to the combinations of whether the indicator portions 900B to 900D, which form a part of the tape color specifying portion, are each formed as a hole or a surface portion. More specifically, a case in which the indicator portions 900B to 900D are respectively a surface portion, a surface portion, and a hole (the combination "1, 1, 0" in Table 4) indicates that the tape color is "Clear". A case in which the indicator portions 900B to 900D are respectively a hole, a surface portion, and a surface portion (the combination "0, 1, 1" in Table 4) indicates that the tape color is "Blue". A case in which the indicator portions 900B to 900D are respectively a hole, a hole, and a surface portion (the combination "0, 0, 1" in Table 4) indicates that the tape color is "Black".

A person can recognize the major tape color of the tape cassette 30 simply by looking at the indicator portions 900B to 900D that are located in the transverse information section W1 within the rear indicator portion 900. More specifically, simply by specifying each of the positions of the indicator portions 900B to 900D by looking and checking whether or not a hole is formed there, a person can determine whether or not a color is the major tape color and can distinguish which color it is. For example, in the tape cassette 30 that is shown in FIG. 43, the indicator portions 900B to 900D are respectively a surface portion, a surface portion, and a hole. In this case, by looking at the rear indicator portion 900, a person can specify that the tape color is "Clear".

The indicator portion 900C is provided in the longitudinal information section V3, which can be specified by using the reference line Z as a reference. Therefore, among the indicator portions 900A to 900D in the transverse information section W1, the indicator portion 900C is the easiest for a person to specify by looking. The indicator portions 900B, 900D, which are provided in the longitudinal information sections V2, V4, which are positioned adjacent to the longitudinal information section V3 on the right and left, respectively, are easy for a person to specify by looking. In other words, a person can specify the major tape color simply by checking the indicator portions 900B to 900D, which, among the indicator portions 900A to 900D in the transverse information section W1, are the easiest for a person to check by looking.

As shown in Table 5, three special tape colors, "White", "Yellow", and "Red", are defined according to the combinations of whether the indicator portions 900A to 900D, which form the tape color specifying portion, are each formed as a hole or a surface portion. More specifically, a case in which the indicator portions 900A to 900D are respectively a hole, a surface portion, a surface portion, and a surface portion (the combination "0, 1, 1, 1" in Table 5) indicates that the tape color is "White". A case in which the indicator portions 900A to 900D are respectively a surface portion, a hole, a surface portion, and a hole (the combination "1, 0, 1, 0" in Table 5) indicates that the tape color is "Yellow". A case in which the indicator portions 900A to 900D are respectively a hole, a surface portion, a hole, and a surface portion (the combination "0, 1, 0, 1" in Table 5) indicates that the tape color is "Red".

A person can recognize the special tape color of the tape cassette 30 simply by looking at the indicator portions 900A to 900D that are located in the transverse information section W1 within the rear indicator portion 900. More specifically, simply by specifying each of the positions of the indicator portions 900A to 900D by looking and checking whether or not a hole is formed there, a person can determine whether or not a color is the special tape color and can distinguish which color it is. For example, in the tape cassette 30 that is shown in FIGS. 41 and 42, the indicator portions 900A to 900D are respectively a hole, a surface portion, a surface portion, and a surface portion, so the tape color can be specified as "White".

As shown in Table 6, one of "Black" and "Other than Black" is defined as the character color according to whether the indicator portion 900E, which forms the character color specifying portions, is formed as a hole or a surface portion. More specifically, a case in which the indicator portion 900E is a hole ("0" in Table 6) indicates that the character color is "Black". A case in which the indicator portion 900E is a surface portion ("1" in Table 6) indicates that the character color is "Other than Black".

A person can recognize the character color of the tape cassette 30 simply by looking at the indicator portion 900E that is located in the transverse information section W2 within the rear indicator portion 900. More specifically, simply by specifying the position of the indicator portion 900E by looking and checking whether or not a hole is formed there, a person can distinguish whether the character color is "Black" or "Other than Black". For example, in each of the tape cassettes 30 that are shown in FIGS. 41 to 43, the indicator portion 900E is a hole. In this case, by looking at the rear indicator portion 900, a person can specify that the character color is "Black".

Thus, in the tape cassette 30 according to the present embodiment, a person can recognize the tape color simply by looking at the indicator portions 900B to 900D or the indicator portions 900A to 900D, regardless of whether the indicator portion 900E is a hole or a surface portion. A person can recognize the character color simply by looking at the indicator portion 900E, regardless of the whether each of the indicator portions 900A to 900D is a hole or a surface portion.

As shown in FIG. 29, the first tape area 400 and the second tape area 410 are provided toward the rear in the cassette case 31. The first ribbon area 420 and the second ribbon area 440 are provided toward the front in the cassette case 31. In the tape cassettes 30 that use the ink ribbon 60, the tape and the ink ribbon 60 are lined up in the front-rear direction inside the cassette case 31 in accordance with the order in which the transverse information sections W1, W2 are lined up in the front-rear direction.

Accordingly, the base material color of the tape that is positioned to the rear of the ink ribbon 60 can be specified by looking at the transverse information section W1, which is to the rear of the transverse information section W2 and indicates the tape color. The ink color of the ink ribbon 60 that is positioned in front of the tape can be specified by looking at the transverse information section W2, which is in front of the transverse information section W1 and indicates the character color. This makes it possible for a person to accurately compare the elements of the color information that are indicated by the transverse information sections W1, W2 in the same order that the tape and the ink ribbon 60 are lined up in the cassette case 31.

Note that the particulars of the color information (the tape color and the character color) that is specified by the individual specifying portions are not limited to what is shown in Tables 4 to 6 and may be modified as desired. The number of combinations of the color information that is defined in the Tables 4 to 6 is twenty-eight, but it is not necessary for all of the combinations to be used. However, it is preferable for the combinations of the hole(s) and the surface portion(s) to which the color information corresponds to be defined in accordance with at least the principles described below.

First, excluding the indicator portion 900C, which can be specified easily by using the reference line Z as a reference, it is desirable for the indicator portions 900A, 900B, 900D to be a combination in which at least one hole is formed and at least one surface portion is formed. This makes it possible to enhance the visual recognizability of the combination of the hole(s) and the surface(s) that are provided in the indicator portions 900A to 900D. When looking at the indicator portions 900A to 900D, a person can specify the color information accurately.

Second, it is desirable not to use a combination in which all of the indicator portions 900A to 900D that are located in the transverse information section W1 are surface portions and a combination in which all of the indicator portions 900A to 900E that are located in the specific area FO are surface portions. This is because with these combinations, the rear stepped wall 360A forms a surface portion in which not even one hole exists or a surface portion in which only one hole is formed in a position that is separated from the rear wall 370. In these cases, it may become difficult for a person to know that the rear indicator portion 900 is provided in the rear stepped wall 360A. Providing at least one hole in a position that is adjacent to the rear wall 370 can make it clear that the rear indicator portion 900 is provided in the rear stepped wall 360A.

Third, it is desirable for the color information for a tape that is frequently contained in the tape cassette 30 to be indicated by a combination of a hole in one of the indicator portions 900C, 900E, which are lined up in the front-rear direction in the rear stepped wall 360A, and a surface portion in the other of the indicator portions 900C, 900E. This is because a person can specify the element in the transverse information section W2 by looking at the rear stepped wall 360A, as described previously.

Fourth, in a case where a person specifies the tape color by looking, the person needs to check whether each of the indicator portions 900B to 900D is a hole or a surface portion, regardless of whether the tape color is the major tape color or the special tape color. Accordingly, it is desirable for the detection pattern of the rear detection portion 300 that corresponds to the special tape color (refer to Table 5) not to include the detection pattern of the rear detection portion 300 that corresponds to the major tape color (refer to Table 4). In a case where a person looks at the rear indicator portion 900, this makes it possible for the person to clearly distinguish the major tape color from the other tape color, thus making it possible to specify the tape color easily.

Up to this point, the configuration of the rear indicator portion 900 for specifying the color information and the method by which a person specifies the color information by looking at the rear indicator portion 900 have been explained. Hereinafter, the configuration of the rear indicator portion 900 as seen in terms of its relationship to the rear detection switches 310, and the form in which the color information is specified by the rear detection switches 310, will be explained.

First, the configuration of the rear indicator portion 900 as seen in terms of its relationship to the rear detection switches 310 will be explained. As explained previously, the tape printer 1 according to the present embodiment includes the five rear detection switches 310A to 310E (refer to FIG. 13). In the tape cassette 30 that has been mounted in the cassette mounting portion 8, the overlap areas that are positioned opposite the rear detection switches 310A to 310E are the indicator portions 900A to 900E, respectively (refer to FIG. 41). In the example of the tape cassette 30 that is shown in FIG. 41, the indicator portions 900A, 900E are holes, and the indicator portions 900B to 900D are surface portions.

In a case where a hole is positioned opposite one of the rear detection switches 310, the hole functions as the non-pressing portion 901 that does not depress the switch terminal 317 (refer to FIG. 13). The non-pressing portion 901 has an opening that is circular in a plan view and that is inscribed in the shape of the indicator portion (the overlap area). The switch terminal 317 of the rear detection switch 310 that is positioned opposite the non-pressing portion 901 is inserted into the non-pressing portion 901 and enters the off state.

In a case where the surface portion is positioned opposite one of the rear detection switches 310, the surface portion functions as the pressing portion 902 that depresses the switch terminal 317. The pressing portion 902 is a portion of the rear stepped wall 360A and has a surface that is circular in a plan view and that is inscribed in the shape of the indicator portion (the overlap area). The switch terminal 317 of the rear detection switch 310 that is positioned opposite the pressing portion 902 comes into contact with the pressing portions 902 and enters the on state. In the example of the tape cassette 30 that is shown in FIG. 41, the indicator portions 900A, 900E are the non-pressing portions 901, and the indicator portions 900B to 900D are the pressing portions 902.

As explained previously, in the indicator portions 900A to 900E of the rear indicator portion 900, the hole(s) (the non-pressing portion(s) 901) and the surface portion(s) (the pressing portion(s) 902) are formed in the prescribed patterns that correspond to the color information (Tables 4 to 6). The tape printer 1 is able to specify the color information based on the combination of the on and off states of the rear detection switches 310 that are selectively depressed by the rear indicator portion 900.

More specifically, the tape printer 1 specifies the color information that corresponds to the combination of the on and off states of the five rear detection switches 310A to 310E by referencing a table. In the table, the prescribed patterns (the combinations of the hole(s) and the surface(s)) that have been determined in advance for the indicator portions 900A to 900E are associated with the color information by being replaced by the corresponding detection patterns (the combinations of the off and on states) of the rear detection switches 310A to 310E.

The color information table 520 that is shown in FIG. 44 is an example of the table that is used by the tape printer 1 for specifying the color information. The color information table 520 is stored in the ROM 602 (refer to FIG. 14). Note that in the example that is shown in FIG. 44, the rear detection switches 310A to 310E correspond respectively to switches ST1 to ST5. The off state (OFF) and the on state (ON) of each of the rear detection switches 310 respectively correspond to "0" and "1" in the color information table 520.

The color information table 520 according to the present embodiment includes a plurality of color tables, in each of which the color information that differs according to each of the detection patterns of the rear detection switches 310A to 310E is defined. In the example that is shown in FIG. 44, the color information table 520 includes a first color table 521 and a second color table 522.

The first color table 521 is a standard color table in which a first set of the color information is defined in accordance with the detection patterns of the rear detection switches 310A to 310E. The second color table 522 is a special color table in which a second set of the color information is defined in accordance with the detection patterns of the rear detection switches 310A to 310E. The first set of the color information is used more frequently than is the second set of the color information. The tape printer 1 uses the first color table 521 and the second color table 522 selectively to specify the color information (the first set of the color information or the second set of the color information) in accordance with the detection patterns of the rear detection switches 310A to 310E, but this will be described in detail later.

The color information table 520 that is used by the tape printer 1 is not limited to the example that is shown in FIG. 44. For example, another version of the color information table 520 can be used in which other optional color information has been added for the detection patterns that correspond to "reserved". Another version of the color information table 520 may also be used in which registered color information has been deleted, the correspondences between the individual detection patterns and the color information have been altered, and the descriptions of the color information that correspond to the individual detection patterns have been modified. In these cases, the formation patterns of the hole(s) that is defined for specifying the color information by looking, as described previously, may also be modified as desired.

As was explained previously, the tape cassette 30 according to the present embodiment is structured such that a person and the tape printer 1 are able to specify the tape type (more specifically, the color information) based on the rear indicator portion 900. Effects like those hereinafter described are achieved by making it possible for a person to recognize the tape type by looking at the rear indicator portion 900.

In the manufacturing method for the known tape cassette, the tape and the like that are placed in the cassette case are generally in accordance with the tape type that will be mounted in the tape cassette. For example, in accordance with the color information (the combination of the tape color and the character color) for the tape type that will be mounted in the tape cassette, the operator places in the cassette case a tape with a base material color that matches the tape color and an ink ribbon with an ink color that matches the character color.

However, there are many combinations of the tape color and the character color. During the manufacturing of the tape cassette, the operator might mistakenly place in the cassette case a tape or an ink ribbon that is different from what was specified in advance in the color information. Therefore, the manufacturing process for the known tape cassette includes an inspection process for checking whether or not the tape and the ink ribbon that have been placed in the manufactured tape cassette are in accordance with the intended colors.

In the present embodiment, in the manufacturing process for the tape cassette 30, for example, the operator may look at the rear indicator portion 900 from inside the bottom case 312 before joining the top case 311 to the bottom case 312. Alternatively, the operator may turn the bottom case 312 over and look at the rear indicator portion 900 before placing the tape and the like into the bottom case 312. By specifying the color information that the rear indicator portion 900 indicates, the operator can determine the tape color and the character color for the tape that should be placed in the cassette case 31. The operator, while working, is thus able to check the description of what should be mounted in the cassette case 31, so mistakes in the manufacturing of the tape cassette 30 can be reduced. This in turn makes it possible to reduce the burden on the operator of performing the inspection process as described above.

After the tape cassette 30 has been shipped, the user may be able to recognize the color information based on the rear indicator portion 900 by looking at the tape cassette 30 from below, even in a case where, for some reason, the user is unable to read a label on which the tape type and the like are indicated. Accordingly, the user may be able to select easily, from among a plurality of the tape cassettes 30, a tape cassette 30 that has the desired color information.

The rear indicator portion 900 has a simple configuration that is a combination of the hole(s) and the surface portion(s) (that is, a combination of the non-pressing portion(s) 901 and the pressing portion(s) 902) that are provided in the individual transverse information sections W1, W2 (the indicator portions 900A to 900E). When the tape cassette 30 is manufactured, the rear indicator portion 900 in the cassette case 31 can be formed easily. It is therefore unnecessary to print anything on the cassette case 31 to indicate what is to be mounted or to attach any labels to indicate what is to be mounted. Mistakes in the manufacturing of the tape cassette 30 can therefore be inhibited at low cost.

In the present embodiment, one of the hole (that is, the non-pressing portion 901) and the surface portion (that is, the pressing portion 902) that corresponds to the color information is provided in each of the overlap areas that function as the indicator portions 900A to 900E. However, within the specific area FO, the hole(s) and the surface portion(s) can be formed freely as far as the functions of the indicator portions 900A to 900E can be ensured.

Specifically, in the tape cassette 30 that is described above (refer to FIGS. 41 and 42), all of the areas within the specific area FO that do not function as the indicator portions 900A to 900E are the same surface as the pressing portion(s) 902. Therefore, the holes (the non-pressing portions 901) that are provided in the specific area FO are all independent, but it is not necessary for all of the holes to be independent. For example, in the specific area FO, a single hole (a slot) may be formed with a size and a shape such that it contains at least two of a plurality of the non-pressing portions 901. In a case where a single slot is formed, it is desirable for it not to include any portions that function as the pressing portions 902.

Figure 46:
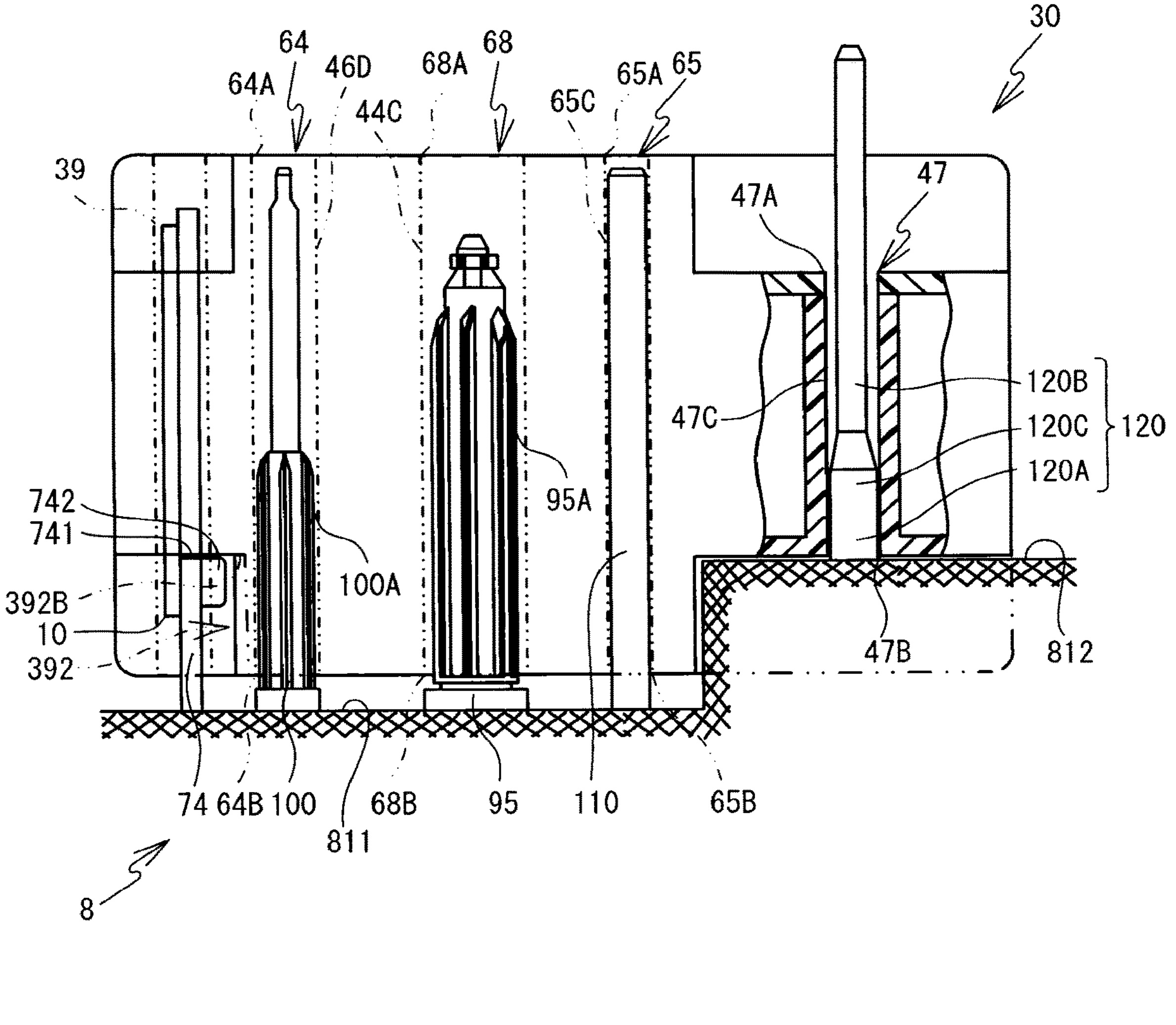
FIG. 46 is an explanatory figure of the cassette mounting portion 8 after the tape cassette 30 has been mounted, as seen from the right side.

The manner in which the tape cassette 30 is mounted in and removed from the cassette mounting portion 8 will be explained with reference to FIGS. 45 and 46. In FIGS. 45 and 46, to facilitate understanding, the holes that are related to the mounting and removal of the tape cassette 30 are shown as virtual lines (tow-dot chain lines). The members within the cassette mounting portion 8 that are related to the mounting and removal of the tape cassette 30 are shown in the drawings. In FIG. 46, the guide hole 47 and the area around it are shown in a sectional view as seen from the right side.

First, the height relationships among the various vertically oriented members that are provided in the cassette mounting portion 8 will be explained. In the present embodiment, the head holder 74, the tape drive shaft 100, the ribbon winding shaft 95, the auxiliary shaft 110, and the guide shaft 120 have shaft lengths (lengths in the up-down direction) that are at least greater than the width T of the common portion 32. Of these, the three guide shafts (that is, the tape drive shaft 100, the auxiliary shaft 110, and the guide shaft 120) have shaft lengths that are approximately equal and are greater than the shaft length of the ribbon winding shaft 95 and the length of the head holder 74 in the up-down direction. Therefore, using the bottom face of the cavity 811 as a reference, the height positions of the upper ends of the tape drive shaft 100 and the auxiliary shaft 110 are higher than the height positions of the upper ends of the head holder 74 and the ribbon winding shaft 95.

As explained previously, the guide shaft 120 is provided in a vertical orientation on the corner support portion 812, which is positioned higher than the cavity 811. The upper end of the guide shaft 120 is positioned higher than the upper ends of the head holder 74, the tape drive shaft 100, the ribbon winding shaft 95, and the auxiliary shaft 110. In other words, the guide shaft 120 extends higher than the tape drive shaft 100 and the auxiliary shaft 110.

When the user mounts the tape cassette 30 in the cassette mounting portion 8, the user presses the tape cassette 30 downward while keeping the top plate 305 (refer to FIG. 20) and the bottom plate 306 (refer to FIG. 22) of the cassette case 31 approximately horizontal. At this time, the user places the roller support hole 64, the first tape support hole 65, and the guide hole 47 in positions that, in a plan view, generally match the relative positions of the tape drive shaft 100, the auxiliary shaft 110, and the guide shaft 120, respectively.

When the tape cassette 30 moves downward toward the cassette mounting portion 8, the upper ends of the tape drive shaft 100, the auxiliary shaft 110, and the guide shaft 120 respectively enter the openings 64B, 65B, 47B that are provided in the bottom plate 306, as shown in FIG. 45. At this time, the head holder 74 and the ribbon winding shaft 95 do not enter the interior of the tape cassette 30, because their upper ends are positioned lower than the bottom plate 306.

When the tape cassette 30 moves farther downward from the state that is shown in FIG. 45, the tape drive shaft 100, the auxiliary shaft 110, and the guide shaft 120 are respectively inserted into the shaft holes 46D, 65C, 47C from below through the openings 64B, 65B, 47B. At this time, the movements of the tape cassette 30 in the peripheral direction can be restrained by the tape drive shaft 100, the auxiliary shaft 110, and the guide shaft 120, which are coming into contact with the inner walls of the shaft holes 46D, 65C, 47C, respectively. The tape cassette 30 thus moves downward under the action of its own weight, while being guided along the vertical directions of the tape drive shaft 100, the auxiliary shaft 110, and the guide shaft 120, which have been inserted into the shaft holes 46D, 65C, 47C, respectively.

In the present embodiment, the upper ends of the tape drive shaft 100, the auxiliary shaft 110, and the guide shaft 120 have tapered shapes, such that their shaft diameters diminish toward their tips. The user is therefore able to insert the tape drive shaft 100, the auxiliary shaft 110, and the guide shaft 120 appropriately and smoothly into the roller support hole 64, the first tape support hole 65, and the guide hole 47, even if slight discrepancies occur in their relative positions in a plan view. The shaft diameter of the tape drive shaft 100 is also slightly smaller than the diameter of the shaft hole 46D. The user is therefore able to insert the tape drive shaft 100 into the roller support hole 64, even in a case where the position in a plan view of the tape drive roller 46 inside the roller support hole 64 has changed slightly due to vibration, tilting, or the like.

As explained previously, the opening width of the guide hole 47 is greater than the shaft diameter of the tip of the guide shaft 120 (that is, the small diameter portion 120B), and in particular, the opening width is greatest in the direction of the parting line K (refer to FIG. 15). In other words, the permissible width of the positioning precision of the guide hole 47 in relation to the position of the guide shaft 120 in a plan view is greater along the parting line K. When mounting the tape cassette 30, the user is able to insert the guide shaft 120 into the guide hole 47, even if, in a plan view, the position of the guide hole 47 in relation to the guide shaft 120 deviates slightly in the direction of the parting line K.

Thus, in relation to all three of the guide shafts that are provided in the cassette mounting portion 8, it is not necessary for the user to precisely position the corresponding individual cavities in the tape cassette 30 (that is, the roller support hole 64, the guide hole 47, and the first tape support hole 65). Therefore, when the tape cassette 30 is mounted, the burden on the user of positioning the tape cassette 30 can be reduced. Furthermore, a high degree of manufacturing precision may be required of the operator in order to perfectly match the width dimensions of the roller support hole 64 and the guide hole 47 to the width dimensions of the tape drive shaft 100 and the guide shaft 120, respectively.

The providing of play for the guide hole 47 in the direction of the parting line K, as described previously, makes it permissible to have a slight error in the dimensional precision of the guide hole 47. Therefore, when the tape cassette 30 is manufactured, the burden on the operator of forming the guide hole 47 precisely can be reduced.

As the tape cassette 30 is guided downward, the head holder 74, on which the thermal head 10 is provided, is inserted into the head insertion portion 39 from below. The ribbon winding shaft 95 is inserted into the shaft hole 44C from below through the opening 68B. At this time, the bottom head perimeter wall 36B of the cassette case 31 (refer to FIG. 49) comes into contact with the upper portion of the hook portion 752 of the cassette hook 75 (refer to FIG. 49), and the projecting portion 751, which is flexible, bends toward the front (toward the right in FIG. 49).

When the tape cassette 30 is pressed downward to its proper position in the cassette mounting portion 8, the position of the tape cassette 30 is fixed as hereinafter described.

As shown in FIG. 46, the base end side of the guide shaft 120 (that is, the large diameter portion 120A) is fitted into guide hole 47. As explained previously, the shaft diameter of the large diameter portion 120A is approximately equal to the opening width of the guide hole 47 along the virtual line G (refer to FIG. 15). Therefore, the large diameter portion 120A that has been inserted into the guide hole 47 is tightly engaged by the tube wall 589 (refer to FIG. 36) in the direction of the virtual line G. The positioning pins 102, 103 (refer to FIG. 4) are respectively inserted into the pin holes 62, 63 (refer to FIG. 16), although this is not shown in FIGS. 45 and 46. The movements of the tape cassette 30 that has been mounted in the cassette mounting portion 8 are thus restrained in the front-rear and left-right directions.

Figure 47:
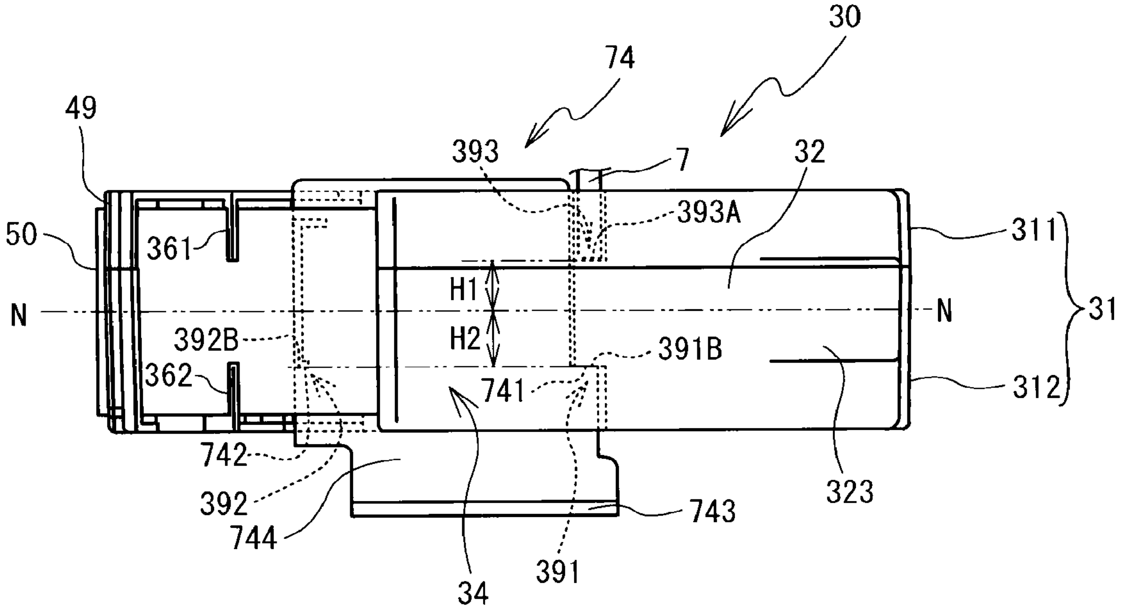
FIG. 47 is an explanatory figure of the tape cassette 30 being supported by the head holder 74, as seen from the front.
Figure 48:
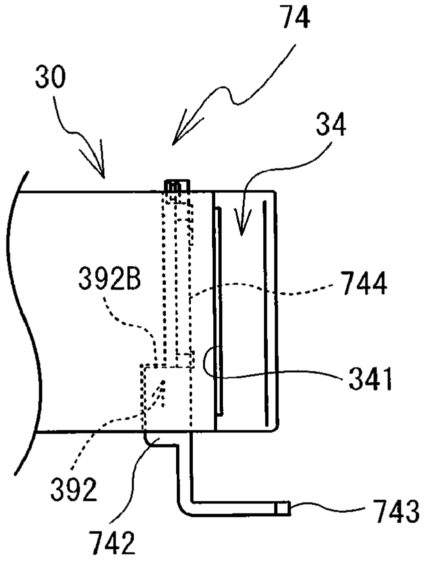
FIG. 48 is an explanatory figure of the tape cassette 30 being supported by the head holder 74, as seen from the left side.

As shown in FIGS. 47 and 48, the first bottom flat surface portion 391B of the first receiving portion 391 comes into contact with the first support portion 741 of the head holder 74. The second bottom flat surface portion 392B of the second receiving portion 392 comes into contact with the second support portion 742 of the head holder 74. In other words, the first and the second support portions 741, 742, which serve as the references for the center position of the thermal head 10 in the up-down direction, come into contact with the first and the second bottom flat surface portions 391B, 392B, which are the reference surfaces, and support the tape cassette 30 from below. At this time, the corner support portion 812 of the cassette mounting portion 8 comes into contact with the lower surfaces of the corner portions 321 to 324 of the cassette case 31 and also supports the tape cassette 30 from below. The movement of the tape cassette 30 that has been mounted in the cassette mounting portion 8 is thus restrained in the downward direction.

Figure 49:
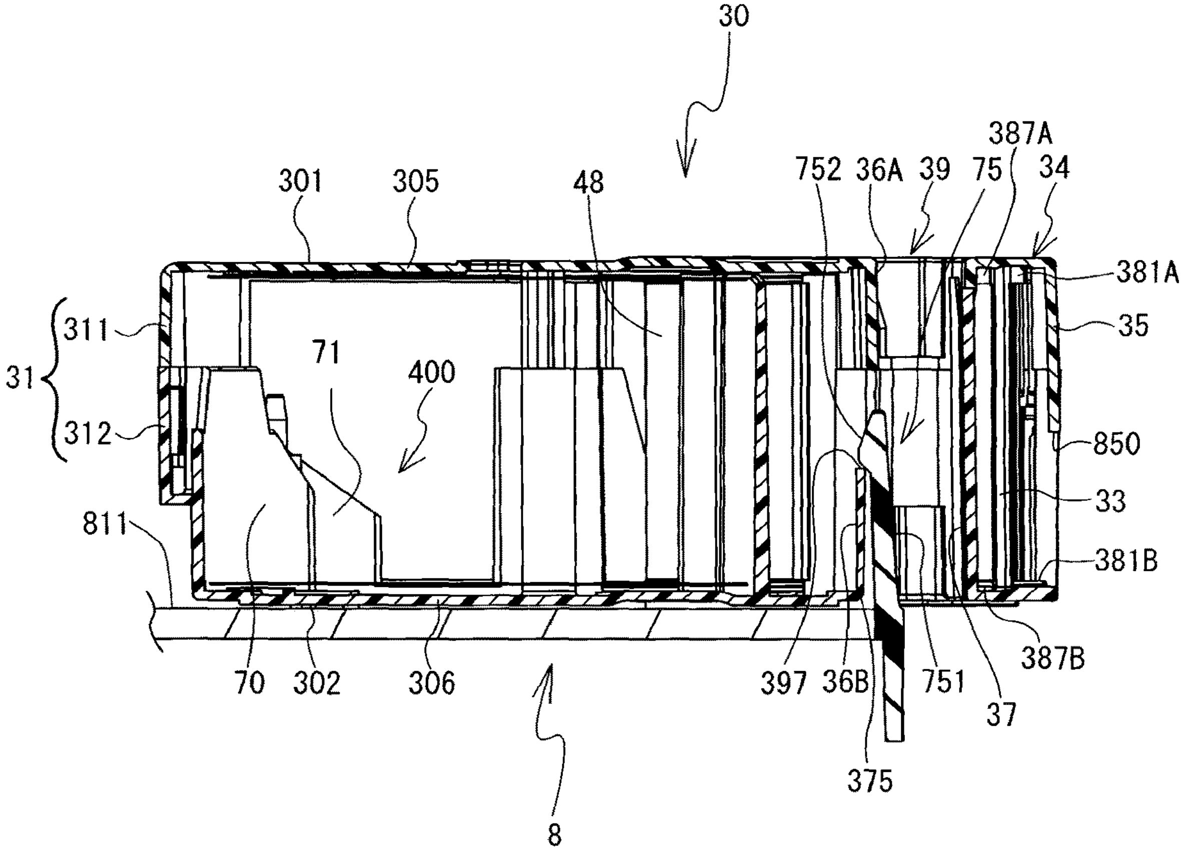
FIG. 49 is a sectional view along a line II-II in FIG. 5 as seen in the direction of the arrows 5.

As shown in FIG. 49, the hook portion 752 of the cassette hook 75 is engaged with the latch portion 397 by the elastic force of the projecting portion 751. Furthermore, when the cassette cover 6 is closed for printing, the head pressing member 7 comes into contact with the first top flat surface portion 393A of the press receiving portion 393 and presses against the tape cassette 30 from above. The periphery pressing members 911, 912 (refer to FIG. 2) respectively come into contact with the second and the third top flat surface portions 321A, 322A of the first and the second corner portions 321, 322 (refer to FIG. 15) and press against the tape cassette 30 from above. The movement of the tape cassette 30 that has been mounted in the cassette mounting portion 8 is thus restrained in the upwardly floating direction, that is, in the upward direction.

As shown in FIG. 49, an inclined portion 375 is provided in a part of a lower edge corner portion that connects the bottom head perimeter wall 36B and the bottom plate 306 in the cassette case 31. The inclined portion 375 is a chamfered portion that is provided directly below the latch portion 397, and it is inclined from the upper front side (the upper right side in FIG. 49) toward the lower rear side (the lower left side in FIG. 49). When the tape cassette 30 is mounted, the inclined portion 375 comes into contact with the hook portion 752 of the cassette hook 75 from above.

As described previously, the hook portion 752 is a projecting portion that is roughly triangular in a section view, and its upper end face is inclined from the upper front side to the lower rear side. When the tape cassette 30 is mounted, the inclined portion 375 slides downward along the upper end face of the hook portion 752. Interference by the cassette hook 75 with the cassette case 31 can be thus inhibited, so the hook portion 752 can be guided smoothly toward the latch portion 397. The user is able to press the tape cassette 30 smoothly into the cassette mounting portion 8.

The cassette cover 6 is axially supported at both the left and right edges in the upper part of the rear face of the tape printer 1. In a case where the cassette cover 6 is being closed, the tip of the head pressing member 7 moves at a sharp angle from the rear toward the front instead of moving in an orthogonal direction toward the top face 301 of the tape cassette 30 that has been mounted in the cassette mounting portion 8. The inclined portion 394 that is provided to the rear of the first top flat surface portion 393A (refer to FIG. 15) functions as a relief portion for eliminating interference when the head pressing member 7 moves closer to the first top flat surface portion 393A.

Thus, in the present embodiment, the tape cassette 30 is guided to its proper position in the cassette mounting portion 8 by the three guide shafts (the tape drive shaft 100, the auxiliary shaft 110, and the guide shaft 120). The tape cassette 30 is positioned in its proper position in a plan view by the guide shaft 120 and the like, and it is positioned in its proper height position by the first and the second support portions 741, 742 and the like. The tape cassette 30 that has been mounted in its proper position in the cassette mounting portion 8 is held by the cassette hook 75, the head pressing member 7, and the like.

In other words, the tape cassette 30 may be guided in the mounting and removal direction (that is, the up-down direction) by at least one of the guide shafts that are adapted to be inserted into at least one of the three cavities (the roller support hole 64, the guide hole 47, the first tape support hole 65), and the movements of the tape cassette 30 in the directions (that is, the front-rear and the left-right directions) that are different from the mounting and removal direction may be restrained. It is therefore possible to position the tape cassette 30 easily in relation to the cassette mounting portion 8.

For example, when the tape cassette 30 is being mounted in the cassette mounting portion 8, the head holder 74 can be inhibited from coming into contact with the outer edge of the head insertion portion 39. Accordingly, the user is able to insert the head holder 74 smoothly into the head insertion portion 39. The user is also able to position the first and the second receiving portions 391, 392 accurately on the first and the second support portions 741, 742, respectively. The first and the second receiving portions 391, 392 can be thus reliably supported by the first and the second support portions 741, 742.

As shown in FIG. 46, in a state in which the tape cassette 30 has been mounted in its proper position, the cam members 100A of the tape drive shaft 100 engage properly with the ribs 46F of the tape drive roller 46 (refer to FIG. 30). The cam members 95A of the ribbon winding shaft 95 engage properly with the ribs 44D of the ribbon winding spool 44 (refer to FIG. 35). The thermal head 10 that is provided in the head holder 74 is disposed in the proper printing position in the head insertion portion 39. Thus, in the tape printer 1, the movements of the tapes and the ink ribbon 60 can be stabilized, and proper printing can be performed.

In the present embodiment, the positioning of the tape cassette 30 in the up-down direction in the vicinity of the thermal head 10 can be performed accurately by the first and the second support portions 741, 742, which are provided in the head holder 74. The center position of the printing range of the thermal head 10 in the up-down direction can be matched precisely to the center positions of the tape and the ink ribbon 60 in the width direction. The quality of the printing on the tape can thus be improved.

In particular, the tape cassette 30 is supported both on the upstream side and on the downstream side in the tape feed direction in the vicinity of the insertion position of the thermal head 10, specifically in relation to the printing position. The feed directions of the tape and the ink ribbon 60 can be maintained such that they are precisely orthogonal to the positioning direction (the up-down direction) of the thermal head 10. This makes it possible to stabilize the movements of the tape and the ink ribbon 60. The center position in the up-down direction for the printing by the thermal head 10 and the center positions of the tape and the ink ribbon 60 in the width direction can thus be matched even more precisely.

Furthermore, the first and the second receiving portions 391, 392, as well as some of the restraining portions that are provided in the arm portion 34 (that is, the separating wall restraining portion 383, the first bottom tape restraining portions 381B, 382B, and the first print surface side restraining portion 389), are all provided in the bottom case 312. The positional relationships among the first and the second receiving portions 391, 392, the separating wall restraining portion 383, the first bottom tape restraining portions 381B, 382B, and the first print surface side restraining portion 389 are thus constant, regardless whether the top case 311 and the bottom case 312 are joined or not.

Therefore, as the first and the second receiving portions 391, 392 are supported in their proper height positions by the first and the second support portions 741, 742, respectively, the separating wall restraining portion 383, the first bottom tape restraining portions 381B, 382B, and the first print surface side restraining portion 389 are also held in their proper height positions. This in turn makes it possible to more accurately match the center position in the width direction of the tape that is fed through the arm portion 34 to the center position in the up-down direction for the printing by the thermal head 10, making it possible to improve the printing quality even more.

When the tape cassette 30 is mounted in the cassette mounting portion 8, the corner portions 321 to 324 are supported from below by the corner support portion 812. In other words, in addition to the first and second bottom flat surface portions 391B, 392B, the third and fourth bottom flat surface portions 321B, 322B, which are similarly reference surfaces, are also supported. Therefore, even in a case where deformation such as warping or the like occurs in the cassette case 31, for example, the height positions of the individual reference surfaces can be corrected by each of the reference surfaces being supported from below in a plurality of positions. It is therefore possible to maintain well the traveling performance of the tape and the ink ribbon 60 and the positional precision of the printing.

When the cassette cover 6 is closed, the head pressing member 7 presses from above against the first top flat surface portion 393A, which is positioned directly above the first bottom flat surface portion 391B. In other words, in the tape cassette 30, the first bottom flat surface portion 391B and the first top flat surface portion 393A, which are reference surfaces, are held between the first support portion 741 and the head pressing member 7 from below and above, respectively.

The tape cassette 30 can therefore be reliably fixed in position from above and below and can be positioned appropriately in the vicinity of the printing position. Movement in the upward direction (what is called floating) by the tape cassette 30 that has been mounted in the cassette mounting portion 8 can be restrained. The center position of the printing range of the thermal head 10 in the up-down direction can be matched even more precisely to the center positions of the tape in the width direction. This in turn makes it possible to perform the feeding of the tape and the printing in a stable manner.

Furthermore, the periphery pressing members 911, 912 press from above against the second and the third top flat surface portions 321A, 322A, respectively. In other words, the tape cassette 30 is held from below and above in three locations. The plane that is enclosed by the connecting line of the three locations extends across a wide range, so the tape cassette 30 can be fixed in place even more reliably. Even in a case where deformation such as warping or the like occurs in the cassette case 31, for example, the height positions of the individual reference surfaces can be reliably corrected. It is therefore possible to improve the traveling performance of the tape and the ink ribbon 60 and the positional precision of the printing.

The first receiving portion 391 and the second receiving portion 392 face the head insertion portion 39 from mutually orthogonal directions. The first and the second receiving portions 391, 392 are respectively inserted into the first and the second support portions 741, 742, which extend in mutually orthogonal directions, and the first and the second bottom flat surface portions 391B, 392B are respectively supported from below. Therefore, the first and the second support portions 741, 742 can restrain not only the movement of the tape cassette 30 in the up-down direction, but also the movements of the tape cassette 30 in the front-rear and the left-right directions. This makes it possible to maintain the positional relationship between the thermal head 10 and the head insertion portion 39 more appropriately.

In the same manner as the head pressing member 7 and the like, the cassette hook 75 can more reliably restrain the movement of the tape cassette 30 in the upwardly floating direction, that is, in the upward direction. This makes it possible to stabilize the feeding of the tape and the printing even more.

As shown in FIG. 47, a distance H2 from the first and second bottom flat surface portions 391B, 392B to the center position in the width direction of the tape that is contained in the cassette case 31 (the center line N of the cassette case 31) remains constant, regardless of the type of the tape in the tape cassette 30. A distance H1 between the first top flat surface portion 393A and the center line N also remains constant, regardless of the type of the tape in the tape cassette 30. In other words, the distances H1, H2 remain constant even if the height of the tape cassette 30 in the up-down direction varies. This makes it possible for a plurality of types of the tape cassette 30 with different heights to be used in the same tape printer 1.

In the known tape cassette, if the center positions in the width direction are not kept the same, regardless of the tape widths, then when the tape is being fed while the printing operation is being performed, the tape may meander if the difference in the pressures that bear on the tape in the width direction exceeds a permissible range. In the present embodiment, the distances H1, H2 remain constant, regardless of the tape width. Therefore, when the printing operation is performed, even the tapes that have different widths can be fed in positions in which the centers in the width direction are kept the same. It is therefore possible to prevent the meandering of the tape that is due to the difference in the pressures that bear on the tape in the width direction.

The distance H1 and the distance H2 are also equal, so there is a good balance between the support of the tape cassette 30 from below and the pressing on the tape cassette 30 from above. This makes it possible to maintain, in a stable manner, an appropriate positional relationship between the center position in the up-down direction of the printing range of the thermal head 10 and the center positions of the tape and the ink ribbon 60 in the width direction.

In a case where the tape cassette 30 is removed from the cassette mounting portion 8, the user may pull the tape cassette 30 upward out of the cassette mounting portion 8 while holding both the left and the right edges of the cassette case 31 with his fingers. At this time as well, the tape cassette 30 may be guided in the upward direction by the three guide shafts (the tape drive shaft 100, the auxiliary shaft 110, the guide shaft 120). This makes tilting of the tape cassette 30 unlikely to occur in the process of removing the tape cassette 30 from the cassette mounting portion 8. This in turn makes it possible to prevent the tape cassette 30 from getting caught on the inner wall or the like of the cassette mounting portion 8.

Thus, when the tape cassette 30 is mounted and removed, the tape cassette 30 can be guided in the up-down direction at three points in a plan view, the three points being a pair of diagonally opposite corner portions of the tape cassette 30 (specifically, the roller support hole 64 and the guide hole 47) and the position of the center of gravity of the tape that is accommodated in the first tape area 400 (specifically, the first tape support hole 65). It is therefore possible to appropriately prevent the tape cassette 30 from being tilted out of its proper position and from being shifted out of position in the processes of its being mounted in the cassette mounting portion 8.

It is preferable for the center of gravity of the entire tape cassette 30 to be positioned within an area that is formed by connecting the roller support hole 64, the first tape support hole 65, and the guide hole 47 in a plan view. Thus, in a plan view, the weight of the tape cassette 30 may be distributed among and act equally on the three points at which the tape cassette 30 is guided (that is, the tape drive shaft 100, the auxiliary shaft 110, the guide shaft 120). The movement of the tape cassette 30 in the mounting and removal direction can thus become smoother, and the occurrence of a position deviation and tilting in the process of the tape cassette 30 being mounted can be more reliably prevented. In the tape cassettes 30 according to the present embodiment, regardless of the tape types, the centers of gravity are positioned within the area that is formed by connecting the roller support hole 64, the first tape support hole 65, and the guide hole 47 in a plan view (refer to FIGS. 5 to 8).

It is more preferable for the center of gravity of the entire tape cassette 30 to be positioned on or in the vicinity of the parting line K in a plan view. In the present embodiment, the laminated type of the tape cassette 30 (refer to FIGS. 5 and 6) and the receptor type of the tape cassette 30 (refer to FIG. 7) have weight distributions that are such that their centers of gravity are positioned on or in the vicinity of the parting line K in a plan view. Tilting of the tape cassette 30 due to its own weight is therefore unlikely to occur in the process of mounting these types of the tape cassette 30 in the cassette mounting portion 8.

The mounting and removal of the tape cassette 30 is guided at a minimum of two points in the fourth corner portion 324 in which the roller support hole 64 is provided and the second corner portion 322 in which the guide hole 47 is provided, which is positioned diagonally opposite the fourth corner portion 324. The feeding out of the tape by the tape drive roller 46 and the printing by the thermal head 10 is performed in the vicinity of the fourth corner portion 324. The tape is exposed for the printing in the open portion 77, which is provided in the vicinity of the fourth corner portion 324. Therefore, the positioning of the tape cassette 30 in the vicinity of the fourth corner portion 324 may strongly influence the printing quality and the traveling of the tape.

In the present embodiment, the tape cassette 30 is guided along the tape drive shaft 100, which is inserted into the roller support hole 64. It is therefore possible to perform the positioning of the tape cassette 30 accurately in the vicinity of the positions where the feeding out of the tape and the printing are performed. In the process of mounting the tape cassette 30, it is possible to inhibit the tape that is exposed to the outside from becoming entangled with another member. Using the tape drive shaft 100 as one of the guide shafts makes it unnecessary to provide a separate vertical shaft to guide the tape cassette 30 in the vicinity of the fourth corner portion 324, and makes it possible to keep the structure of the tape printer 1 from becoming complicated.

The tape cassette 30 is also guided along the guide shaft 120 that is inserted into the guide hole 47. In other words, the tape cassette 30 is guided in the mounting and removal direction in the vicinity of the second corner portion 322, too. The tape cassette 30 can thus be stably guided in the mounting and removal direction at two diagonally opposite positions, the distance between which can be ensured to be the greatest distance between two points in a plan view.

The ways in which the tape printer 1 detects the type of the tape in the tape cassette 30 will be explained with reference to FIGS. 50 and 51.

The way in which the arm indicator portion 800 is detected by the arm detection portion 200 will be explained with reference to FIG. 50. When the tape cassette 30 is mounted in its proper position in the cassette mounting portion 8 and the cassette cover 6 is closed, the platen holder 12 moves from the stand-by position (refer to FIG. 5) to the printing position (refer to FIGS. 6 to 8). At this time, the arm detection portion 200 and the latch piece 225 respectively move toward the arm indicator portion 800 and the latch hole 820 of the tape cassette 30.

If the tape cassette 30 is mounted in its proper position in the cassette mounting portion 8, the latch piece 225 is inserted into the latch hole 820. In this case, the switch terminals 222 of the arm detection switches 210 are positioned opposite the indicator portions (the non-pressing portion(s) 801 and the pressing portion(s) 802) of the arm indicator portion 800 without any interference from the latch piece 225. The arm detection switch 210 that is positioned opposite the non-pressing portion 801 is inserted into the non-pressing portion 801 and enters the off state. The arm detection switch 210 that is positioned opposite the pressing portion 802 is depressed by the pressing portion 802 and enters the on state.

Figure 50:
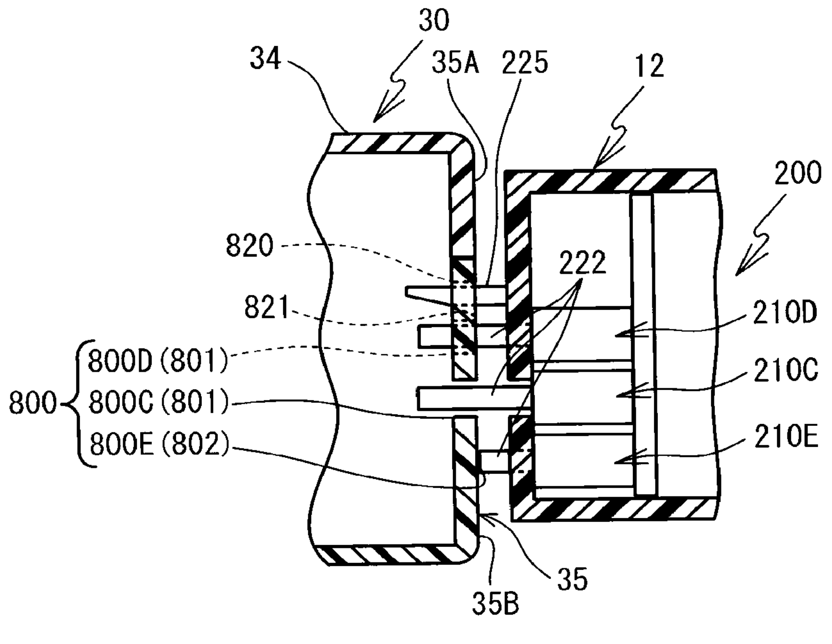
FIG. 50 is a sectional view along a line VIII-VIII in FIG. 39 as seen in the direction of the arrows, showing a state in which the platen holder 12 that is shown in FIG. 12 is positioned opposite the tape cassette 30 that is shown in FIG. 39.

For example, in the case that is shown in FIGS. 37 to 39, where the tape cassette 30 has been mounted in its proper position in the cassette mounting portion 8, the arm detection switches 210A, 210C, 210D, as shown in FIG. 50, are respectively positioned opposite the indicator portions 800A, 800C, 800D, which are the non-pressing portions 801, and enter the off state "0". The arm detection switches 210B, 210E are respectively positioned opposite the indicator portions 800B, 800E, which are the pressing portions 802, and enter the on state "1". In other words, the on and off states of the switches SW1 to SW5 that respectively correspond to the arm detection switches 210A to 210E are "0", "1", "0", "0", "1", respectively.

In the tape printer 1, the printing information is specified as the tape type for the tape cassette 30 based on the detection pattern of the arm detection portion 200 (that is, the combination of the on and off states of the five arm detection switches 210A to 210E). In the example that is described above, by referring to the printing information table 510 (FIG. 40), it is possible to specify that the tape width is "36 millimeters", the printing mode is "mirror image printing (laminated type)", and the color table is the "first color table", which are the same as the visual specification results that were described previously.

As described previously, the inclined portion 226 is provided in the latch piece 225, so the thickness of the latch piece 225 gradually diminishes toward the rear. The inclined portion 821 is provided in the latch hole 820, so the opening width of the latch hole 820 in the up-down direction gradually increases toward the front. In a state in which the tape cassette 30 has floated up slightly from its proper position in the cassette mounting portion 8, for example, the latch piece 225 is misaligned slightly downward in relation to the latch hole 820. Even in this sort of case, when the platen holder 12 moves toward the printing position, the latch piece 225 can be guided into the latch hole 820 by the mutual actions of the inclined portion 226 and the inclined portion 821.

In other words, if the tape cassette 30 has floated up only slightly from its proper position in the cassette mounting portion 8, it is possible for the latch piece 225 to be inserted appropriately into the latch hole 820. This in turn makes it possible to accurately position the arm detection portion 200 opposite the arm indicator portion 800.

In contrast, in a case where the downward pressing of the tape cassette 30 is insufficient, for example, the latch piece 225 comes into contact with the surface of the arm front face wall 35 without being inserted into the latch hole 820. As explained previously, the distance that the latch piece 225 projects outward is slightly greater than that of the switch terminals 222. In a case where the latch piece 225 has come into contact with the surface of the arm front face wall 35, the switch terminals 222 cannot come into contact with the arm front face wall 35.

Thus, in a case where the latch piece 225 obstructs the contact between the switch terminals 222 and the arm indicator portion 800, all of the arm detection switches 210A to 210E are in the off state. In other words, the on and off states of the switches SW1 to SW5 are "0", "0", "0", "0", "0", respectively. In a case where the tape cassette 30 is mounted in this state, the tape printer 1 is able to refer to the printing information table 510 (FIG. 40) and specify "Error 1".

Furthermore, in a case where the tape printer 1 is not provided with the latch piece 225, if any one of the arm detection switches 210 is positioned opposite the surface of the arm front face wall 35, the switch terminal 222 will be depressed (that is, will enter the on state), even if the tape cassette 30 has not been mounted in its proper position. As explained previously, the indicator portions 800A to 800E are disposed in a zigzag pattern, so the indicator portions 800A to 800E are not all lined up on the same line in the up-down direction. Therefore, in a case where the tape cassette 30 has shifted out of its proper position in the cassette mounting portion 8 in the up-down direction, errors can be detected in the manner hereinafter described.

For example, the height position of the lower edge of the arm front face wall 35 might be lower than the arm detection switch 210E in the bottom row because the tape cassette 30 has shifted slightly upward from its proper position in the cassette mounting portion 8. In this case, all of the arm detection switches 210A to 210E are in the on state, because they are all positioned opposite the surface of the arm front face wall 35. In other words, the on and off states of the switches SW1 to SW5 are "1", "1", "1", "1", "1", respectively. In a case where the tape cassette 30 is mounted in this state, the tape printer 1 is able to refer to the printing information table 510 (FIG. 40) and specify "Error 3".

The height position of the lower edge of the arm front face wall 35 might also be between the arm detection switch 210E in the bottom row and the arm detection switches 210A, 210C in the middle row because the tape cassette 30 has shifted substantially upward from its proper position in the cassette mounting portion 8. In this case, the arm detection switches 210A to 210D are in the on state, because they are positioned opposite the surface of the arm front face wall 35, but the arm detection switch 210E is in the off state, because it is not positioned opposite the surface of the arm front face wall 35. In other words, the on and off states of the switches SW1 to SW5 are "1", "1", "1", "1", "0", respectively. In a case where the tape cassette 30 is mounted in this state, the tape printer 1 is able to refer to the printing information table 510 (FIG. 40) and specify "Error 2".

As explained previously, the patterns of the combinations of the pressing portion(s) 802 (the surface portion(s)) and the non-pressing portion(s) 801 (the hole(s)) that correspond to "Error 1" to "Error 3" are not used in the arm indicator portion 800 according to the present embodiment. The tape printer 1 is thus able to detect not only the tape type, but also the mounted state of the tape cassette 30.

The arm portion 34 is the portion where the tape and the ink ribbon 60 are discharged from the exit 341 into the open portion 77. Therefore, the positional relationship in the up-down direction between the thermal head 10 that is inserted into the head insertion portion 39 and the tape and the ink ribbon 60 is determined in the arm portion 34. In the known tape cassette, in a case where the user has not mounted the tape cassette 30 correctly, and in a case where the user has not operated the tape printer 1 correctly, it might happen that the arm portion 34 is not positioned correctly within the cassette mounting portion 8. In that case, an error occurs in the positional relationship between the thermal head 10 and the tape and the ink ribbon 60, and the printing might be performed in a misaligned position in relation to the width direction of the tape.

The arm indicator portion 800 according to the present embodiment is provided in the arm portion 34 (more specifically, in the arm front face wall 35), which is positioned in the vicinity of the head insertion portion 39. The arm portion 34 is a position where it is easy to detect an error in the positional relationship between the thermal head 10 and the tape and the ink ribbon 60. Therefore, by using the arm portion 34 as a reference, the tape printer 1 is able to determine accurately whether or not the tape cassette 30 has been mounted in its proper position in the cassette mounting portion 8.

The latch hole 820 is provided in the bottom arm front face wall 35B. When the latch piece 225 is inserted into the latch hole 820, the position of the bottom arm front face wall 35B is fixed in place, and by extension, the position of the portion of the arm portion 34 of the bottom case 312 is also fixed in place. Therefore, vibration in the arm portion 34 during the printing operation, for example, can be inhibited. Furthermore, the restraining portions that are provided in the portion of the arm portion 34 of the bottom case 312 (the separating wall restraining portion 383, the first bottom tape restraining portion 381B, the first print surface side restraining portion 389, and the like) can be positioned at their proper height positions (refer to FIG. 27). Therefore, regardless of the press fitting state of the top case 311 and the bottom case 312, the feeding of the tape in the arm portion 34 can be stabilized, and the movements of the tape in the width direction and in the direction of the print surface side can be more reliably inhibited.

The arm indicator portion 800 is provided on a side wall (more specifically, the arm front face wall 35) of the cassette case 31, corresponding to the horizontal projecting of the plurality of arm detection switches 210. When the arm indicator portion 800 selectively depresses the plurality of arm detection switches 210, the repelling forces of the arm detection switches 210 against the pressing portions 802 are applied to the arm front face wall 35.

As explained previously, the movements of the tape cassette 30 in the directions that are different from the mounting and removal direction are restrained by at least one of the guide shafts that are inserted into the three cavities. Therefore, even in a case where the repelling forces of the arm detection switches 210 are applied to the arm front face wall 35, the movement of the tape cassette 30 toward the side can be inhibited, and thus the possibility that the tape type will be detected incorrectly can be reduced.

The arm indicator portion 800 is provided in the bottom arm front face wall 35B and is adjacent to the latch hole 820. Accordingly, when the latch piece 225 is inserted into the latch hole 820, the arm indicator portion 800 is fixed in its proper position, so the precision of the detecting of the tape type by the arm detection portion 200 can be improved. Furthermore, in a case where vibration is generated in the tape printer 1 during the printing operation, for example, the position of the bottom contact-separate portion 86B can be maintained, even when the top contact-separate portion 86A is separated from the bottom contact-separate portion 86B. This makes it possible to improve the physical durability performance of the arm portion 34, while inhibiting any effects on the feeding of the tape, the detecting of the tape type, and the like that are performed in the arm portion 34.

The way in which the rear indicator portion 900 is detected by the rear detection portion 300 will be explained with reference to FIG. 51. When the tape cassette 30 is mounted in its proper position in the cassette mounting portion 8, the rear support portion 813 supports the rear stepped wall 360A of the cassette case 31 from below. At this time, the rear detection portion 300, which is provided in the rear support portion 813, is positioned opposite the rear indicator portion 900, which is provided in the rear stepped wall 360A.

In this case, the switch terminals 317 of the rear detection switches 310 are positioned opposite the indicator portions (the non-pressing portion(s) 901 and the pressing portion(s) 902) of the rear indicator portion 900. The rear detection switch 310 that is positioned opposite the non-pressing portion 901 is inserted into the non-pressing portion 901 and enters the off state. The rear detection switch 310 that is positioned opposite the pressing portion 902 is depressed by the pressing portion 902 and enters the on state.

Figure 51:
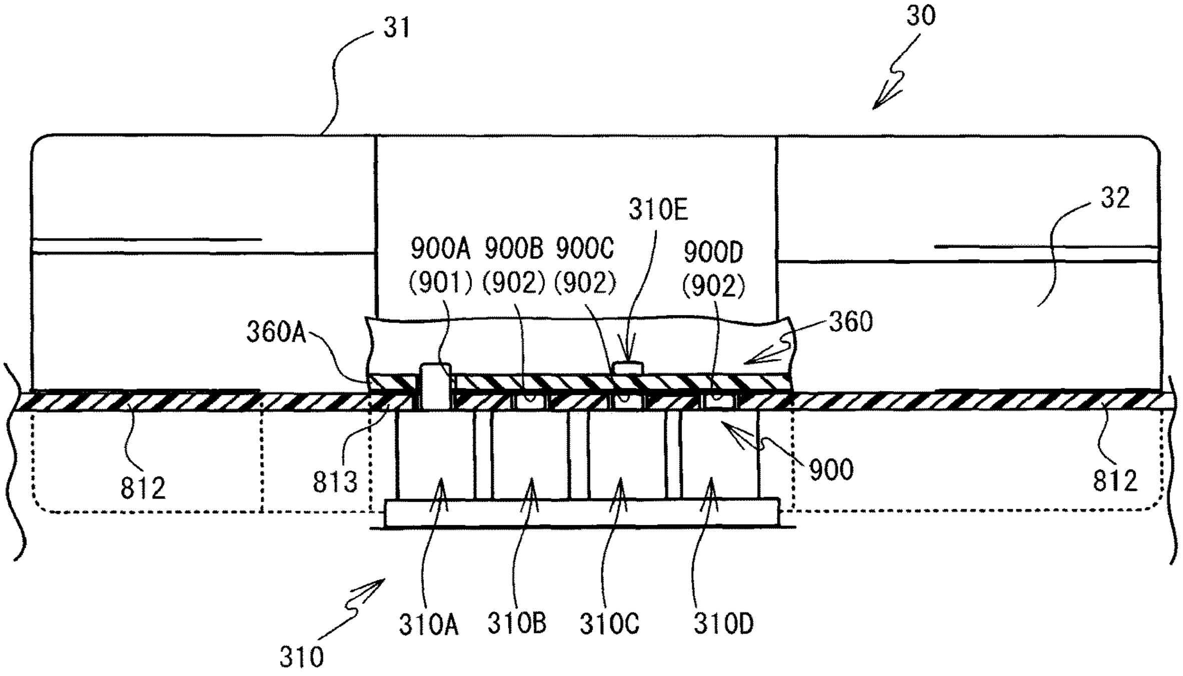
FIG. 51 is a sectional view along a line IX-IX in FIG. 42 as seen in the direction of the arrows, showing a state in which a rear support portion 813 that is shown in FIG. 13 is positioned opposite the tape cassette 30 that is shown in FIG. 42.

For example, in the case where the tape cassette 30 that is shown in FIGS. 41 and 42 has been mounted in its proper position in the cassette mounting portion 8, the rear detection switches 310A, 310E, as shown in FIG. 51, are positioned opposite the indicator portions 900A, 900E, which are the non-pressing portions 901, and enter the off state. The rear detection switches 310B to 310D are positioned opposite the indicator portions 900B to 900D, which are the pressing portions 902, and enter the on state. In other words, the on and off states of the switches ST1 to ST5 that respectively correspond to the rear detection switches 310A to 310E are "0", "1", "1", "1", "0", respectively.

In the tape printer 1, the color information is specified as the tape type for the tape cassette 30 based on the detection pattern of the rear detection portion 300 (in this case, the combination of the on and off states of the five rear detection switches 310A to 310E). In the example that is described above, the color information that corresponds to the on and off states "0", "1", "1", "1", "0", of the rear detection switches 310A to 310E is specified by referring to the color information table 520 (FIG. 44).

However, the color information that is specified differs according to which one of the plurality of color tables that are included in the color information table 520 is used. In the present embodiment, according to the previously described off state of the arm detection switch 210D, the first color table 521 is used for specifying the color information. Therefore, the tape color "White" and the character color "Black" are specified, which are the same as the visual specification results that were described previously.

Thus, in the tape cassette 30 according to the present embodiment, the arm indicator portion 800 and the rear indicator portion 900 are provided in the cassette case 31 in positions that are separated from one another and on different wall surfaces. In other words, the positions and the ranges of the indicator portions that indicate the tape type are not limited to a single wall surface. It is therefore easy to increase the number of the tape type patterns that the tape printer 1 can detect. This in turn makes it possible to increase the degree of freedom in the design of the tape cassette 30.

Furthermore, the arm indicator portion 800 and the rear indicator portion 900 selectively depress the plurality of arm detection switches 210 and the plurality of rear detection switches 310, respectively, in positions that are separated from one another and from different directions. This makes it possible for the tape printer 1 to distinguish clearly among the different elements that are included in the tape type (that is, the printing information and the color information). Therefore, the tape cassette 30 makes it possible for the tape printer 1 to detect the printing information and the color information more accurately.

When the rear indicator portion 900 selectively depresses the plurality of rear detection switches 310, as described previously, the repelling forces of the rear detection switches 310 against the pressing portions 902 are applied to the rear stepped wall 360A. At this time, the rear edge of the cassette case 31 may be lifted up by the repelling forces of the rear detection switches 310.

In the present embodiment, the arm indicator portion 800 and the rear indicator portion 900 are each provided in central positions in the long direction (that is, the left-right direction) of the cassette case 31. In other words, the repelling forces of the rear detection switches 310 are applied in a central position in the left-right direction of the rear edge of the cassette case 31. The cassette case 31 does not readily tilt in the left-right direction, even in a case where the rear edge of the cassette case 31 is lifted up, so the effect on the front edge of the cassette case 31 is slight. Accordingly, any change in the positional relationship of the arm indicator portion 800 and the plurality of arm detection switches 210 can be inhibited, even in a case where the rear edge of the cassette case 31 has been lifted up. This in turn makes it possible to inhibit the tape printer 1 from detecting the printing information erroneously.

The rear indicator portion 900 is provided in the bottom plate 306 (more specifically, the rear stepped wall 360A) of the cassette case 31, corresponding to the upward projecting of the plurality of rear detection switches 310. As explained previously, the tape cassette 30 is guided in the mounting and removal direction along at least one of the guide shafts that are inserted into a pair of cavities. The mounting and removal direction of the tape cassette 30 is parallel to the advancing and retracting direction of the plurality of rear detection switches 310. When the tape cassette 30 has been mounted in the cassette mounting portion 8, the rear detection switch 310 that is positioned opposite the pressing portion 902 is depressed in a direction (that is, the downward direction) that is directly opposite the direction in which the rear detection switch 310 projects.

It is therefore possible to inhibit a load in a direction that is different from the advancing and retracting direction from being imposed on the rear detection switch 310 that is depressed by the pressing portion 902. This in turn makes it possible to inhibit bending, damage, and the like in the rear detection switch 310. Furthermore, because the rear detection switch 310 can be depressed accurately, the precision of the detecting of the tape type can be improved.

The processing that pertains to the printing by the tape printer 1 according to the present embodiment will be explained with reference to FIG. 52. When the power supply to the tape printer 1 is turned on, the CPU 601 performs the processing in the flowchart that is shown in FIG. 52, based on a program that is stored in the ROM 602 (refer to FIG. 14).

Figure 52:
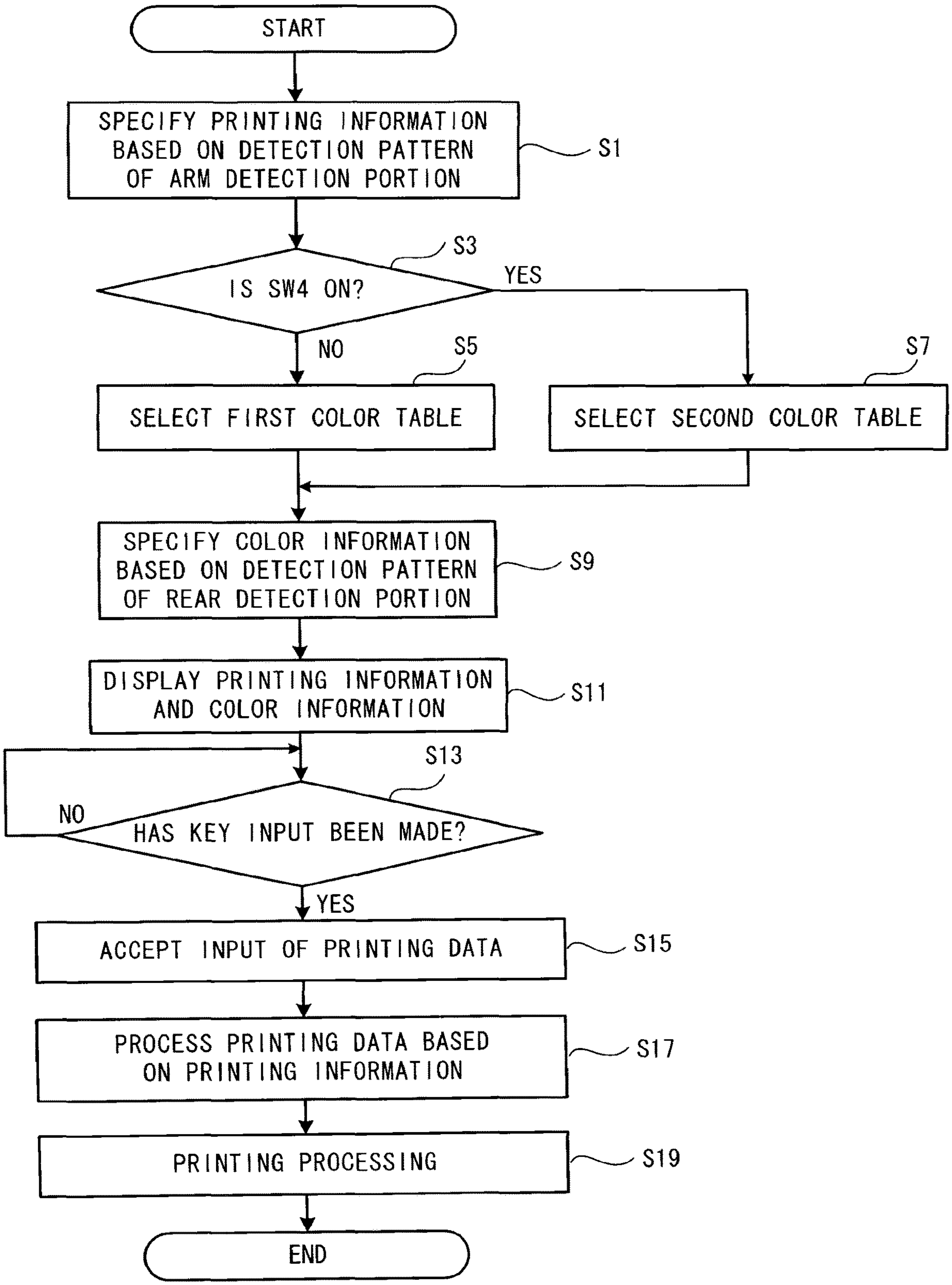
FIG. 52 is a flowchart that shows processing that pertains to printing by the tape printer 1.

As shown in FIG. 52, in the processing that pertains to the printing by the tape printer 1, first, the printing information for the tape cassette 30 is specified based on the detection pattern of the arm detection portion 200 (Step S1). At Step S1, the printing information that corresponds to the combination of the on and off states of the arm detection switches 210A to 210E is specified based on the printing information table 510 (refer to FIG. 40).

After Step S1 has been performed, a determination is made as to whether or not the arm detection switch 210D (hereinafter called the switch SW4) is in the on state (Step S3). In a case where the switch SW4 is in the off state (NO at Step S3), the first color table 521 is selected from the color information table 520 (refer to FIG. 44) (Step S5). In a case where the switch SW4 is in the on state (YES at Step S3), the second color table 522 is selected from the color information table 520 (Step S7).

After one of Step S5 and Step S7 has been performed, the color information for the tape cassette 30 is specified based on the detection pattern of the rear detection portion 300 (Step S9). At Step S9, the color information that corresponds to the combination of the on and off states of the rear detection switches 310A to 310E is specified by referring to the color table that was selected at one of Step S5 and Step S7.

In the present embodiment, the color table that will be used for specifying the color information for the tape cassette 30 is selected according to the detection state of a specific one of the arm detection switches 210 (specifically, the on-off state of the arm detection switch 210D) (refer to Steps S3 to S7). It is therefore possible to increase the number of the color information patterns that the tape printer 1 is able to identify, without increasing the number of the rear detection switches 310 (that is, without making the surface area that is occupied by the rear detection portion 300 larger).

After Step S9 has been performed, the printing information that was specified at Step S1 and the color information that was specified at Step S9 are displayed as text information on the display 5 (Step S11). For example, in a case where the previously described tape cassette 30 (refer to FIGS. 37 to 39, 41, and 42) has been mounted properly, the text "A 36-millimeter laminated type of tape cassette has been mounted. The tape color is White, and the character color is Black," is displayed on the display 5.

After Step S11 has been performed, a determination is made as to whether or not an input has been made from the keyboard 3 (Step S13). In a case where an input has been made from the keyboard 3 (YES at Step S13), input of printing data will be accepted (Step S15). At Step S15, the CPU 601 accepts characters that have been input from the keyboard 3 as the printing data and stores the printing data (text data) in a text memory in the RAM 604. In a case where an input has not been made from the keyboard 3 (NO at Step S13), the processing returns to Step S13, and the CPU 601 waits for an input from the keyboard 3.

Thereafter, when a start printing command is input from the keyboard 3, for example, the printing data that are stored in the text memory are processed in accordance with the printing information that was specified at Step S1 (Step S17). For example, at Step S17, a printing range, a print character size, and the like in the printing data are processed in accordance with the tape width that was specified at Step S1. A printing position and the like in the printing data are processed in accordance with the printing mode (laminated or receptor) that was specified at Step S1. After Step S17 has been performed, the processing for the printing on the tape is performed based on the processed printing data (Step S19). When the printing processing at Step S19 is completed, the processing that pertains to the printing (FIG. 52) is terminated.

In the printing processing at Step S19, in a case where the laminated type of the tape cassette 30 that is shown in FIGS. 5 and 6 has been mounted, the tape drive roller 46 that is rotationally driven by the tape drive shaft 100 operates in conjunction with the movable feed roller 14 to pull the film tape 59 off of the second tape spool 41. The ribbon winding spool 44 that is rotationally driven by the ribbon winding shaft 95 pulls the unused ink ribbon 60 off of the ribbon spool 42 in synchronization with the printing speed.

The film tape 59 and the ink ribbon 60, after being fed into the arm portion 34, are superposed on one another at the exit 341 and discharged into the open portion 77, such that they are fed between the thermal head 10 and the platen roller 15. Using the ink ribbon 60, the thermal head 10 performs the mirror image printing that transfers a mirror image of the characters onto the film tape 59.

Furthermore, the double-sided adhesive tape 58 is pulled off of the first tape spool 40 by the coordinated actions of the tape drive roller 46 and the movable feed roller 14. As the double-sided adhesive tape 58 is guided and caught between the tape drive roller 46 and the movable feed roller 14, it is affixed to the print surface of the printed film tape 59. The used ink ribbon 60 is peeled away from the printed film tape 59 by the ribbon guide wall 38 and is wound around the ribbon winding spool 44. The film tape 59 with the double-sided adhesive tape 58 affixed to it (that is, the printed tape

50) is fed farther toward the discharge guide portion 49 and is cut by the cutting mechanism 17.

In a case where the receptor type of the tape cassette 30 that is shown in FIG. 7 has been mounted, the tape drive roller 46 that is rotationally driven by the tape drive shaft 100 operates in conjunction with the movable feed roller 14 to pull the printing tape 57 off of the first tape spool 40. The ribbon winding spool 44 that is rotationally driven by the ribbon winding shaft 95 pulls the unused ink ribbon 60 off of the ribbon spool 42 in synchronization with the printing speed.

The printing tape 57 and the ink ribbon 60, after being fed into the arm portion 34, are superposed on one another at the exit 341 and discharged into the open portion 77, such that they are fed between the thermal head 10 and the platen roller 15. Using the ink ribbon 60, the thermal head 10 performs the normal image printing that transfers a normal image of the characters onto the printing tape 57.

The used ink ribbon 60 is peeled away from the printed printing tape 57 by the ribbon guide wall 38 and is wound around the ribbon winding spool 44. The printed printing tape 57 (that is, the printed tape 50) is fed farther toward the discharge guide portion 49 and is cut by the cutting mechanism 17.

In a case where the thermal type of the tape cassette 30 that is shown in FIG. 8 has been mounted, the tape drive roller 46 that is rotationally driven by the tape drive shaft 100 operates in conjunction with the movable feed roller 14 to pull the thermal paper tape 55 off of the first tape spool 40. The thermal paper tape 55, after being fed into the arm portion 34, is discharged from the exit 341 into the open portion 77 such that it is fed between the thermal head 10 and the platen roller 15. The thermal head 10 performs the normal image printing that produces a normal image of the characters in color on the thermal paper tape 55. The printed thermal paper tape 55 (that is, the printed tape 50) is fed farther toward the discharge guide portion 49 and is cut by the cutting mechanism 17.

While the printing processing that is described above (Step S19) is being performed, the tape cassette 30 is held in a stably mounted state by the actions of the first and second receiving portions 391, 392, the head pressing member 7, the cassette hook 75, and the like. Accordingly, the tape printer 1 is able to perform the printing on the print surface of the tape in a state in which the center position of the printing range of the thermal head 10 in up-down direction precisely matches the center positions of the tape and the ink ribbon 60 in the width direction.

In the present embodiment, the tape cassette 30, which is a general-purpose cassette, is used in the tape printer 1, which is a general-purpose device. This makes it possible for a single one of the tape printer 1 to be compatible with various types of tape cassettes, such as the thermal type, the receptor type, the laminated type, and the like. It is therefore unnecessary to use a different one of the tape printer 1 for each type of the tape cassette 30. Moreover, in a case where tape cassettes 3 that correspond to the same tape width, except for some of the dies that include the parts that form the arm indicator portion 800 and the rear indicator portion 900, common dies can be used, so the manufacturing cost can be drastically reduced.

Note that the tape cassette 30 and the tape printer 1 according to the present invention are not limited to the embodiment that is described above, and various modifications can obviously be made within the scope of the claims.

Figure 53:
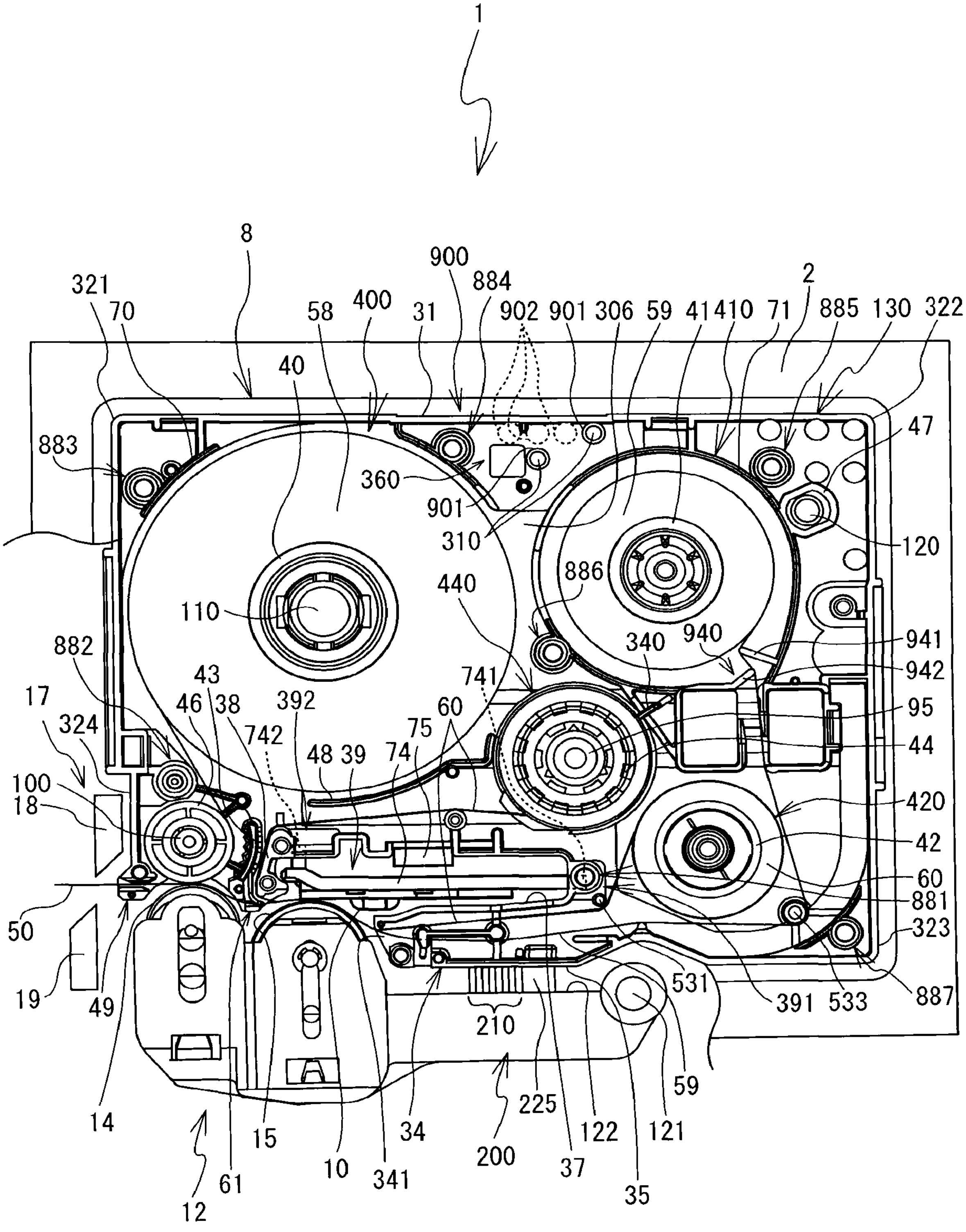
FIG. 53 is a plan view of the cassette mounting portion 8 in which the tape cassette 30 of the laminated type has been mounted, in a case where the platen holder 12 is in the printing position, in a modified example.
Figure 54:
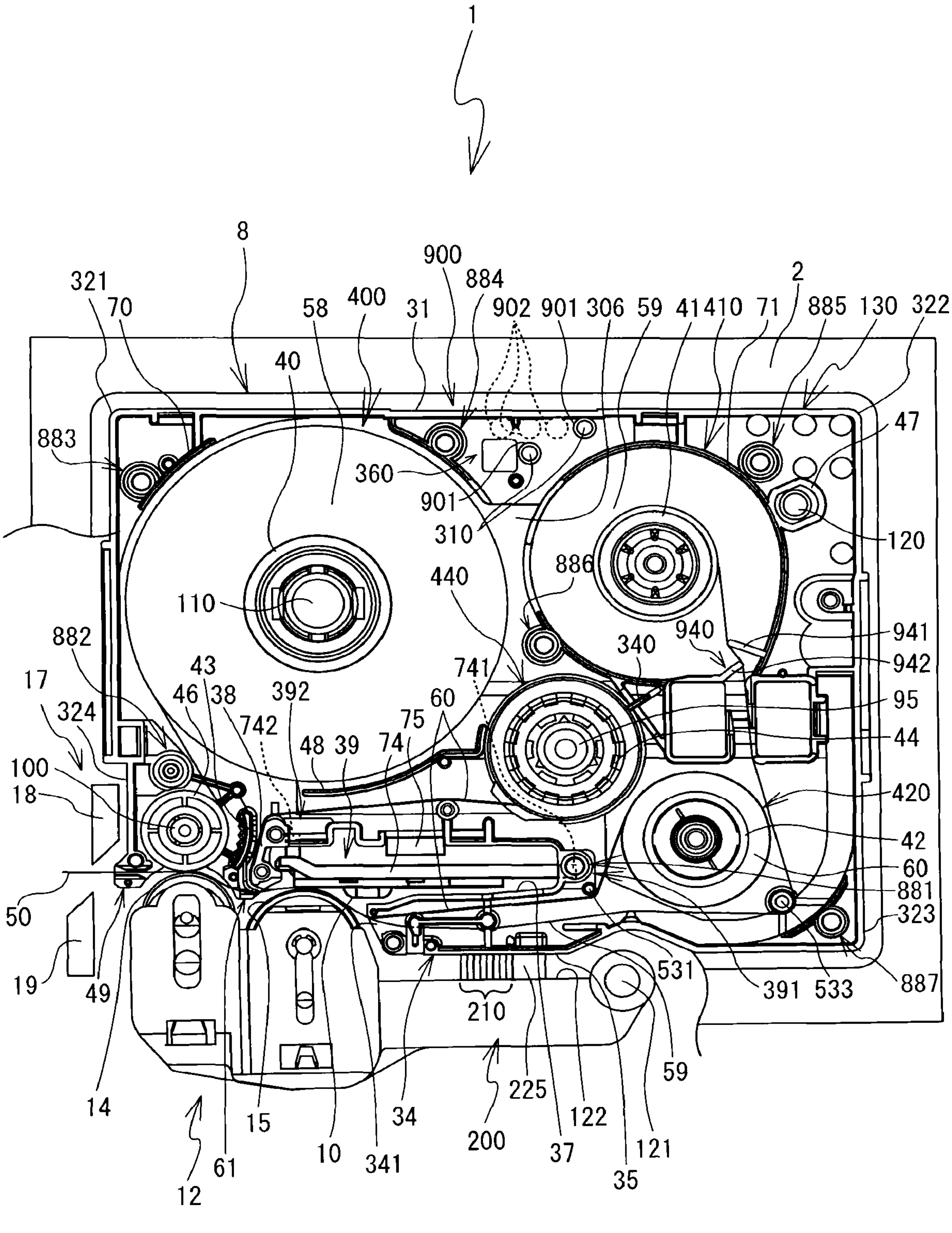
FIG. 54 is another plan view of the cassette mounting portion 8 in which the tape cassette 30 of the laminated type has been mounted, in a case where the platen holder 12 is in the printing position, in the modified example.

For example, adjusting ribs 940 may be provided for stabilizing the amount of the tape that is pulled off of the second tape spool 41 in the second tape area 410, as in a tape cassette 130 that is shown in FIGS. 53 and 54.

The adjusting ribs 940 are plate-shaped members that are provided on the farthest downstream side of the second tape area 410 along the feed path for the film tape 59, and they include a first adjusting rib 941 and a second adjusting rib 942. The first adjusting rib 941 is in contact with the back surface side of the film tape 59 that is pulled off of the second tape spool 41. The second adjusting rib 942 is in contact with the print surface side of the film tape 59 that is pulled off of the second tape spool 41 to the downstream side of the first adjusting rib 941.

When the amount of the film tape 59 that is wound around the second tape spool 41 is large (that is, when the wound diameter of the film tape 59 is large), as shown in FIG. 53, the feed path for the film tape 59 is bent significantly by the first adjusting rib 941. At this time, the friction force of the film tape 59 that is in contact with the first adjusting rib 941 is large, so a large rotational load is imparted to the second tape spool 41.

As the film tape 59 is pulled off of the second tape spool 41, the amount of the film tape 59 that is wound around the second tape spool 41 diminishes (that is, the wound diameter of the film tape 59 becomes smaller). When the wound diameter of the film tape 59 is small, as shown in FIG. 54, the feed path for the film tape 59 is bent slightly by the first adjusting rib 941. At this time, the friction force of the film tape 59 that is in contact with the first adjusting rib 941 becomes smaller, so a smaller rotational load is imparted to the second tape spool 41.

Thus the rotational load that is imparted to the second tape spool 41 increases as the wound diameter of the film tape 59 becomes larger, and the back tension of the film tape 59 increases in conjunction with the increase in the rotational load. In contrast, the rotational load that is imparted to the second tape spool 41 decreases as the wound diameter of the film tape 59 becomes smaller, and the back tension of the film tape 59 decreases in conjunction with the decrease in the rotational load. In other words, the back tension of the film tape 59 can be adjusted by the imparting of the optimum rotational load to the second tape spool 41 in accordance with the wound diameter of the film tape 59. Thus the amount of the tape that is pulled off of the second tape spool 41 can be stabilized by a simple structure in which the adjusting ribs 940 are provided within the second tape area 410.

As explained previously, the clutch spring 572 that imparts the back tension to the film tape 59 is mounted on the second tape spool 41 (refer to FIG. 33). When the film tape 59 is rotating in the direction in which the film tape 59 is pulled off, the rotational load (that is, the load torque) on the second tape spool 41 is imparted by the clutch spring 572 in a stable manner. However, the back tension of the film tape 59 that is generated by the load torque may vary according to the wound diameter of the film tape 59.

To be specific, the load torque that is imparted by the clutch spring 572 is constant. However, while the back tension that is due to the clutch spring 572 becomes relatively smaller as the wound diameter of the film tape 59 becomes greater, the back tension that is imparted by the adjusting ribs 940 becomes relatively greater. In other words, in a case where the back tension that is due to the clutch spring 572 is small, it can be complemented by the large back tension that is due to the adjusting ribs 940.

Furthermore, while the back tension that is due to the clutch spring 572 becomes relatively larger as the wound diameter of the film tape 59 becomes smaller, the back tension that is imparted by the adjusting ribs 940 becomes relatively smaller. In other words, in a case where the back tension that is due to the clutch spring 572 has increased, the complementary back tension that is due to the adjusting ribs 940 diminishes in accordance with the amount of the increase.

That is, in addition to the back tension that is imparted to the film tape 59 by the clutch spring 572, the optimum complementary back tension can be imparted by the adjusting ribs 940 in accordance with the wound diameter of the film tape 59. Thus the back tension of the film tape 59 as a whole can be stabilized, regardless of the wound diameter of the film tape 59, which can make the amount of the film tape 59 that is pulled off of the second tape spool 41 more stable. That in turn makes it possible to make the movement of the film tape 59 more stable during the printing operation and to more reliably inhibit the deterioration in the printing quality that is attributable to faulty movement of the film tape 59.

In the embodiment that is described above, the non-pressing portion 801 and the non-pressing portion 901 are each through-holes that are formed in the cassette case 31. As long as the opposing switch terminal 222 of the arm detection switch 210 can be inserted and removed without being depressed, the non-pressing portion 801 is not limited to being a through-hole. Similarly, as long as the opposing switch terminal 317 of the rear detection switch 310 can be inserted and removed without being depressed, the non-pressing portion 901 is not limited to being a through-hole. For example, the non-pressing portion 801 may also be a recessed portion where a part of the arm front face wall 35 is recessed toward the rear and into and from which the switch terminal 222 can be inserted and removed. The non-pressing portion 901 may also be a recessed portion where a part of the rear stepped wall 360A is recessed upward and into and from which the switch terminal 317 can be inserted and removed.

In the embodiment that is described above, the tapes and the ink ribbon 60 are wound around spools (specifically, the first tape spool 40, the second tape spool 41, the ribbon spool 42). It is also acceptable for the tapes and the ink ribbon 60 not to be wound around spools, as long as they have rotatable roll shapes. For example, the tapes and the ink ribbon 60 may also be what are called coreless type rolls that are wound such that a hole is formed in each of its center without using a spool.

An embodiment of the tape cassette according to the present invention has been explained above. The individual technical features of the tape cassette that is disclosed in the embodiment that is described above may be used independently and may also be used in a plurality of combinations. Hereinafter, examples of various types of embodiments of the tape cassette will be explained that are provided with one or a plurality of the technical features that are described above. Note that numbers in parentheses that are appended to the technical features that are hereinafter explained indicate the reference numerals for the structural elements that correspond to the individual technical features in the embodiment that is described above.

(1) In the known tape cassette, in a case where the user has not mounted the tape cassette correctly, or in a case where the user has not operated tape printer correctly, for example, the tape cassette may be fitted into the cassette mounting portion in a state in which it is tilted out of its proper orientation. In a case where the tape cassette is tilted within the cassette mounting portion, the cassette detection portion may not be accurately positioned opposite the plurality of detection switches. In that case, in the cassette detection portion, the detection switch that should be depressed may not be depressed, and the detection switch that should not be depressed may be depressed.

In a case where the plurality of detection switches are depressed in an incorrect pattern, the tape printer may detect a type of the tape that is different from the type of the tape that is contained within the tape cassette that is mounted in the cassette mounting portion. If an incorrect type of the tape is thus detected by the tape printer, faulty operation of the tape printer, printing defects, and the like may occur. Accordingly, some of the technical features that have been described above may be provided, as in a tape cassette according to the embodiment that is hereinafter described.

A tape cassette (30) according to the present embodiment includes a box-shaped cassette case (31) whose outline is defined by a bottom wall (306), a top wall (305), and a side wall (303, 304) and that includes a plurality of corner portions (321 to 324), at least one tape (55, 57, 58, 59) that is contained within a tape containment area (400, 410) that is defined within the outline, a pair of cavities (47, 64) that extend from the bottom wall and that are provided between the tape containment area and the outline at opposite ends of a diagonal line that connects one of the corner portions (322) to another of the corner portions (324), and a side face indicator portion (800) that is provided in the side wall and that indicates a type of the tape, wherein the side face indicator portion includes a plurality of indicator portions (800A to 800E) that are disposed in a pattern that is in accordance with the type of the tape, and each of the plurality of indicator portions is one of a switch hole (801) and a surface portion (802).

In a case where the tape cassette according to the present embodiment is mounted in or removed from a cassette mounting portion (8) of a tape printer (1) and the tape printer is provided with a pair of guide shafts (100, 120), the pair of guide shafts can be inserted into the pair of cavities. In this case, the tilting of the tape cassette out of its proper position can be inhibited by the user's mounting the tape cassette into and removing the tape cassette from the cassette mounting portion along the pair of guide shafts that are inserted into the pair of cavities.

When the tape cassette is mounted in the cassette mounting portion of the tape printer, which is provided with a plurality of detection switches (210), the side face indicator portion can be accurately positioned opposite the plurality of detection switches. The plurality of detection switches are switches that can advance and retract in a specified direction. The side face indicator portion that is positioned opposite the plurality of detection switches may selectively depress the plurality of detection switches in accordance with the combination of the switch hole(s) and the surface portion(s) in the plurality of indicator portions. In other words, each of the plurality of detection switches enters a state of being depressed or not depressed, in accordance with the type of the tape. The tape cassette thus makes it possible for the tape printer to accurately detect the type of the tape. It is also possible to inhibit faulty movement of the tape, faulty printing by a printing head, and the like that may be caused by the tilting of the tape cassette within the cassette mounting portion.

The side face indicator portion is provided in the side wall of the cassette case in correspondence with horizontal projecting of the plurality of detection switches. When the side face indicator portion selectively depresses the plurality of detection switches, repelling forces of the plurality of detection switches may be applied to the side wall. The movements of the tape cassette in directions that are different from the mounting and removal direction can be inhibited by the pair of guide shafts that have been inserted into the pair of cavities. Therefore, even in a case where the repelling forces of the plurality of detection switches have been applied to the side wall, the movement of the tape cassette in the direction of the side wall can be inhibited, which in turn makes it possible to inhibit the type of the tape from being detected incorrectly.

(2) In the known tape cassette, a cassette detection portion is provided in the bottom face of the tape cassette, in correspondence with a plurality of detection switches that project upward that are provided to a tape printer. Support holes, into which are inserted drive shafts for feeding a tape and an ink ribbon, a head insertion portion, into which is inserted a head holder that is provided with a printing head, and the like are also provided in the bottom face of the tape cassette.

Therefore, a position and a range where the cassette detection portion can be provided in the bottom face of the tape cassette tend to be restricted. For example, in a case where the number of the patterns for the types of the tapes that the tape printer is able to detect will be increased, it may be necessary to enlarge the range within which the cassette detection portion is formed. In a case where the position and the range of the cassette detection portion are restricted as described above, it may become difficult to increase the number of the patterns for the types of the tapes, so the degree of freedom in the design of the tape cassette may be diminished. Accordingly, some of the technical features that have been described above may be provided, as in a tape cassette according to the embodiment that is hereinafter described.

A tape cassette (30) according to the present embodiment includes a cassette case (31) that is a box-like body having a front wall (35), bottom wall (306), and a top wall (305) and in which a left-right direction is a long direction, a tape (55, 57, 58, 59) that is contained within the cassette case, a front face indicator portion (800) that is provided in the front wall in a position that is approximately in a center in the left-right direction and that indicates a first element among a plurality of elements that are included in a type of the tape, and a bottom face indicator portion (900) that is provided in a rear portion of the bottom wall in a position that is approximately in the center in the left-right direction and that indicates a second element among the plurality of the elements, wherein the front face indicator portion includes a plurality of first indicator portions (800A to 800E) that are disposed in a pattern that is in accordance with the first element, the bottom face indicator portion includes a plurality of second indicator portions (900A to 900E) that are disposed in a pattern that is in accordance with the second element, each of the plurality of first indicator portions is one of a switch hole (801) and a surface portion (802), and each of the plurality of second indicator portions is one of a switch hole (901) and a surface portion (902).

The tape cassette according to the present embodiment may be mounted in a cassette mounting portion (8) of a tape printer (1). At this time, in a case where the tape printer is provided with a plurality of first detection switches (210) and a plurality of second detection switches (310), the front face indicator portion may be positioned opposite the plurality of first detection switches, and the bottom face indicator portion may be positioned opposite the plurality of second detection switches. The plurality of first detection switches are switches that can advance and retract in a specified direction. The plurality of second detection switches are switches that can advance and retract in a direction that is different from the specified direction.

The front face indicator portion that is positioned opposite the plurality of first detection switches may selectively depress the plurality of first detection switches in accordance with the combination of the switch hole(s) and the surface portion(s) in the plurality of first indicator portions. The bottom face indicator portion that is positioned opposite the plurality of second detection switches may selectively depress the plurality of second detection switches in accordance with the combination of the switch hole(s) and the surface portion(s) in the plurality of second indicator portions. The tape cassette can thus cause the tape printer to detect the first element and the second element that are included in the type of the tape.

The front face indicator portion and the bottom face indicator portion are provided in positions that are separated from one another in the cassette case and in different walls. In other words, the positions and the ranges of the indicator portions that indicate the type of the tape are not limited to a single wall. It is therefore easy to increase the number of the patterns for the types of the tapes that the tape printer is able to detect. This in turn makes it possible to increase the degree of freedom in the design of the tape cassette that makes it possible for the tape printer to detect the type of the tape.

Furthermore, the front face indicator portion and the bottom face indicator portion may selectively depress the plurality of first detection switches and the plurality of second detection switches, respectively, in positions that are separated from one another and from different directions. This makes it possible for tape printer to distinguish clearly between the different elements that are included in the type of the tape. Therefore, the tape cassette is able to cause the tape printer to detect the first element and the second element more accurately.

The front face indicator portion is provided in the front wall in correspondence with horizontal projecting of the plurality of first detection switches. The bottom face indicator portion is provided in the bottom wall in correspondence with upward projecting of the plurality of second detection switches. When the bottom face indicator portion selectively depress the plurality of second detection switches, repelling force of each of the second detection switches that is positioned opposite a surface portion is applied to the bottom wall. At this time, the rear edge of the cassette case may be lifted up by the repelling forces of the plurality of second detection switches.

Both the front face indicator portion and the bottom face indicator portion are provided in the central position in the long direction of the cassette case. In other words, the repelling forces of the plurality of second detection switches may be applied to the central position in the left-right direction of the rear edge of the cassette case. Even in a case where the rear edge of the cassette case has been lifted up, the cassette case tends not to tilt in the left-right direction, so the effect on the front edge of the cassette case may be slight. Accordingly, any change in the positional relationship of the front face indicator portion and the plurality of first detection switches can be inhibited, even in a case where the rear edge of the cassette case has been lifted up. This in turn makes it possible for the tape cassette to inhibit the tape printer from detecting the first element erroneously.

Note that it is preferable for the first element to be information that has a strong influence on the printing operation of the tape printer (for example, information that is required in order for the tape printer to perform the printing operation properly). It is preferable for the second element to be information that has a small influence on the printing operation of the tape printer (for example, information that is not required in order for the tape printer to perform the printing operation properly). This makes it possible for the tape cassette to inhibit faulty printing and faulty movement by causing the tape printer to detect, among the information on the type of the tape, at least the information that has a strong influence on the printing operation.

(3) In the known tape cassette, the movement in the width direction of the tape that is contained in the cassette case is restrained by a top wall of a top case and a bottom wall of a bottom case. However, in a case where the top case is not joined sufficiently tightly to the bottom case, a gap may occur between the top case and the bottom case. In a case where there are dimensional errors in each of the top case and the bottom case, the dimensional error of the cassette case as a whole may be increased by the top case and the bottom case being joined.

In this sort of case, the distance between the top wall and the bottom wall may become greater than the prescribed distance, and the restraining of the tape in the width direction may become insufficient. If that happens, the tape that is being fed within the cassette case may meander in the width direction, and the printing center position in the up-down direction of the printing head and the center position in the width direction of the tape may be misaligned from one another. This in turn may cause the printing position of the printing head to be misaligned in relation to the tape, and good printing results may not be achieved. As countermeasures in the manufacturing process for the tape cassette, the dimensional precision of the cassette case and the press fitting state of the bottom case and the top case are strictly controlled. Accordingly, some of the technical features that have been described above may be provided, as in a tape cassette according to the embodiment that is hereinafter described.

A tape cassette (30) according to the present embodiment is a tape cassette that can be mounted in and removed from a tape printer (1) that is provide with a head holder (74) that has a printing head (10), and the tape cassette includes a box-shaped cassette case (31) that includes a top case (311) and a bottom case (312), the top case having a top wall (305) and the bottom case having a bottom wall (306) and a bottom outside wall (304) that is an outside wall extending vertically upward from an edge of the bottom wall, a tape (55, 57, 58, 59) that is contained within the cassette case, a head insertion portion (39) that is a space extending through the cassette case in an up-down direction and into which the head holder is to be inserted, an arm portion (34) that has a first wall portion (35B) and a second wall portion (33), and that is adapted to guide the tape along a feed path between the first wall portion and the second wall portion to a exit (341), the first wall portion being a portion of the bottom outside wall, the second wall portion being provided between the first wall portion and the head insertion portion and being a wall extending vertically upward from the bottom wall, a latch hole (820) that is always provided in the first wall portion, regardless of the type of the tape, and a width direction restraining portion (381B, 383) that is provided in the second wall portion and that is adapted to restrain a movement of the tape in the width direction.

The tape cassette according to the present embodiment is provided with the arm portion that is adapted to guide the tape between the first wall portion and the second wall portion that are included in the bottom case. The width direction restraining portion that is adapted to restrain the movement of the tape in the width direction is provided in the second wall portion. Thus the dimensional precision of the width direction restraining portion can be guaranteed, regardless of the press fitting state of the top case and the bottom case, and the movement of the tape in the width direction can be accurately restrained. This in turn makes it possible to precisely match the printing center position in the up-down direction of the printing head with the center position in the width direction of the tape, so the printing quality can be improved. It also makes it possible to reduce the burden on the operator of controlling the dimensional precision and the press fitting state of the top case and the bottom case.

Furthermore, the latch hole is always provided in the first wall portion, regardless of the type of the tape. In a case where the tape cassette is mounted in a cassette mounting portion (8) of the tape printer, and the tape printer is provided with a latch portion (225), the latch hole may be engaged by the latch portion. The position of the first wall portion can be thus fixed, and the position of the arm portion can be fixed in turn. Therefore, vibration of the arm portion can be inhibited during the printing operation, for example, and the movement of the tape within the arm portion can be stabilized.

Both the first wall portion and the second wall portion are wall portions that are included in the bottom case, and each of them is a portion of a wall portion that forms the arm portion. Therefore, if the position of the arm portion is fixed, as described above, the width direction restraining portion can be positioned at the proper height position, regardless of the press fitting state of the top case and the bottom case. This in turn makes it possible to more reliably restrain the movement in the width direction of the tape that is guided within the arm portion and to reliably inhibit the misalignment of the printing position of the printing head in relation to the tape.

(4) In the known tape cassette, the cassette detection portion is provided in the bottom face of the tape cassette, in correspondence with the providing of the tape printer with the plurality of detection switches that project upward. When the tape cassette is being manufactured, for example, the operator might mistakenly place in the cassette case a tape that does not correspond to the type of the tape that the cassette detection portion indicates.

In a case where the type of the tape that has been placed in the cassette case does not correspond to the cassette detection portion, the tape printer detects incorrectly the type of the tape that the cassette detection portion indicates. If the type of the tape is detected incorrectly by the tape printer, faulty operation of the tape printer, printing defects, and the like may occur. As a countermeasure, the manufacturing process for the tape cassette includes an inspection process in which, for each of the manufactured tape cassettes, the type of the tape that the cassette detection portion indicates is compared to the type of the tape that is contained in the cassette case. Accordingly, some of the technical features that have been described above may be provided, as in a tape cassette according to the embodiment that is hereinafter described.

A tape cassette (30) according to the present embodiment is a tape cassette that can be mounted in and removed from a tape printer (1) that is provided with a head holder (74) that has a printing head (10), and the tape cassette includes a box-shaped cassette case (31) that includes a top case (311) and a bottom case (312), the top case having a top wall (305) and the bottom case having a bottom wall (306) and a bottom outside wall (304) that is an outside wall extending vertically upward from an edge of the bottom wall, a tape (55, 57, 58, 59) that is contained within the cassette case, a head insertion portion (39) that is a space extending through the cassette case in an up-down direction and into which the head holder is to be inserted, an arm portion (34) that has a first wall portion (35B) and a second wall portion (33), and that is adapted to guide the tape along a feed path between the first wall portion and the second wall portion to a exit (341), the first wall portion being a portion of the bottom outside wall, the second wall portion being provided between the first wall portion and the head insertion portion and being a wall extending vertically upward from the bottom wall, a front face indicator portion (800) that is provided in the first wall portion and that indicates a type of the tape, and a width direction restraining portion (381B, 383) that is provided in the second wall portion and that is adapted to restrain a movement of the tape in the width direction, wherein the front face indicator portion includes a plurality of indicator portions (800A to 800E) that are disposed in a pattern that is in accordance with the type of the tape, each of the plurality of indicator portions is one of a switch hole (801) and a surface portion (802), and the width direction restraining portion is provided in a position that is adjacent to the front face indicator portion and that is visible from in front of the first wall portion.

The tape cassette according to the present embodiment is provided with the arm portion that is adapted to guide the tape between the first wall portion and the second wall portion. The front face indicator portion that indicates the type of the tape is provided in the first wall portion. The width direction restraining portion that is adapted to restrain the movement of the tape in the width direction is provided in the second wall portion. The width direction restraining portion and the front face indicator portion are adjacent to one another and are visible from in front of the first wall portion. By looking at the front face indicator portion, a person is able to specify the type of the tape based on whether each of the plurality of indicator portions is a switch hole or a surface portion. In other words, a person is able to look at the tape that is restrained by the width direction restraining portion and at the type of the tape that the front face indicator portion indicates at the same time from a single direction.

For example, in the manufacturing process for the tape cassette, the operator places the tape in the bottom case and inserts a portion of the tape into the arm portion. The operator mounts the portion of the tape that has been inserted into the arm portion in a position where it will be properly restrained by the width direction restraining portion. Thereafter, by looking at the first wall portion from the front, the operator can check whether or not the tape that is restrained by the width direction restraining portion corresponds to the type of the tape that the front face indicator portion indicates. Therefore, the operator can easily discover if the wrong type of the tape has been placed in the tape cassette. This in turn makes it possible to inhibit mistakes in the manufacturing of the tape cassette and to reduce the burden on the operator of performing the inspection process.

Both the first wall portion and the second wall portion are wall portions that are included in the bottom case, and each of them is a portion of a wall portion that forms the arm portion. Thus the dimensional precision of the width direction restraining portion can be guaranteed, regardless of the press fitting state of the top case and the bottom case, and the movement of the tape in the width direction can be accurately restrained. This in turn makes it possible to precisely match the printing center position in the up-down direction of the printing head with the center position in the width direction of the tape, so the printing quality can be improved.

Furthermore, in a case where the tape cassette is mounted in a cassette mounting portion (8) of the tape printer, and the tape printer is provided with a plurality of detection switches (210), the front face indicator portion may be positioned opposite the plurality of detection switches. The plurality of detection switches are switches that can advance and retract in a specified direction. The front face indicator portion that is positioned opposite the plurality of detection switches may selectively depress the plurality of detection switches in accordance with the combination of the switch hole(s) and the surface portion(s) in the plurality of indicator portions. Thus the tape cassette can cause the tape printer to detect the type of the tape.

(5) In the known tape cassette, in a case where the user has not mounted the tape cassette correctly, or in a case where the user has not operated tape printer correctly, for example, the tape cassette may be mounted in the cassette mounting portion in a state in which it is tilted out of its proper position. If the printing operation is performed with the tape cassette in a state in which it is tilted within the cassette mounting portion, faulty movement of the tape, faulty printing by a printing head, and the like may occur in the tape printer. Accordingly, some of the technical features that have been described above may be provided, as in a tape cassette according to the embodiment that is hereinafter described.

A tape cassette (30) according to the present embodiment is a tape cassette that can be mounted in and removed from a tape printer (1) that is provided with a head holder (74) that has a printing head (10), and the tape cassette includes a box-shaped cassette case (31) whose outline is defined by a bottom wall (306) forming a bottom face (302), a top wall (305) forming a top face (301), and a side wall (303, 304) forming a side face and that includes a plurality of corner portions (321 to 324), at least one tape (55, 57, 58, 59) that is contained within a tape containment area (400, 410) that is defined within the outline, a pair of cavities (47, 64) that extend from the bottom wall and that are provided between the tape containment area and the outline at opposite ends of a diagonal line that connects one of the corner portions (322) to another of the corner portions (324), a head insertion portion (39) that is a space extending through the cassette case in the up-down direction and into which the head holder is to be inserted, and a support receiving portion (391, 392) that is a recessed portion that is recessed upward from the bottom face and that is provided such that it is connected to an end portion of the head insertion portion.

In a case where the tape cassette according to the present embodiment is mounted in or removed from a cassette mounting portion (8) of the tape printer and the tape printer is provided with a pair of guide shafts (100, 120), the pair of guide shafts may be inserted into the pair of cavities. In this case, the tilting of the tape cassette out of its proper position can be inhibited by the user's mounting the tape cassette into and removing the tape cassette from the cassette mounting portion along the pair of guide shafts that are inserted into the pair of cavities. This in turn makes it possible to inhibit faulty movement of the tape, faulty printing by the printing head, and the like that are caused by the tilting of the tape cassette within the cassette mounting portion.

Furthermore, the support receiving portion, which is a recessed portion that is recessed upward from the bottom face, is provided such that it is connected to an end portion of the head insertion portion. In a case where the tape cassette has been mounted in the cassette mounting portion and the tape printer is provided with a support portion (741, 742), the support receiving portion may be supported from below by the support portion. In this case, the support receiving portion can be supported by the support portion in a position that is in the vicinity of the printing head that performs the printing on the tape. Therefore, when the tape cassette is mounted in the tape printer, it is possible to accurately set the position of the tape cassette in the up-down direction. This in turn makes it possible to precisely match the printing center position in the up-down direction of the printing head with the center position in the width direction of the tape, so the printing quality can be improved.

The tape cassette can be guided in the mounting and removal direction by the pair of guide shafts that have been inserted into the pair of cavities, and movements of the tape cassette can be restrained in directions that are different from the mounting and removal direction. Therefore, the positioning of the tape cassette in relation to the cassette mounting portion can be simple. The head holder can be thus inhibited from coming into contact with an outer edge of the head insertion portion when the tape cassette is mounted in the cassette mounting portion. The user can insert the head holder into the head insertion portion smoothly. The user can also position the support receiving portion accurately on top of the support portion. This means that the support receiving portion can be reliably supported by the support portion, so the printing quality can be improved even more.

(6) In the known tape cassette, in a case where the user has not mounted the tape cassette correctly, or in a case where the user has not operated the tape printer correctly, for example, the tape cassette may be mounted in the cassette mounting portion in a state in which it is tilted out of its proper position. In a case where the tape cassette is tilted within the cassette mounting portion, the cassette detection portion may not be accurately positioned opposite the plurality of detection switches. In that case, the cassette detection portion may not depress the detection switch that should be depressed and may depress the detection switch that should not be depressed.

In a case where the plurality of detection switches are depressed in an incorrect pattern, the tape printer detects a type of the tape that is different from the type of the tape that is contained within the tape cassette that is mounted in the cassette mounting portion. If an incorrect type of the tape is thus detected by the tape printer, faulty operation of the tape printer, printing defects, and the like may occur. Accordingly, some of the technical features that have been described above may be provided, as in a tape cassette according to the embodiment that is hereinafter described.

A tape cassette (30) according to the present embodiment includes a box-shaped cassette case (31) whose outline is defined by a bottom wall (306), a top wall (305), and a side wall (303, 304) and that includes a plurality of corner portions (321 to 324), at least one tape (55, 57, 58, 59) that is contained within a tape containment area (400, 410) that is defined within the outline, a pair of cavities (47, 64) that extend from the bottom wall and that are provided between the tape containment area and the outline at opposite ends of a diagonal line that connects one of the corner portions (322) to another of the corner portions (324), and a bottom face indicator portion (900) that is provided in the bottom wall and that indicates a type of the tape, wherein the bottom face indicator portion includes a plurality of indicator portions (900A to 900E) that are disposed in a pattern that is in accordance with the type of the tape, and each of the indicator portions is one of a switch hole (901) and a surface portion (902).

In a case where the tape cassette according to the present embodiment is mounted in or removed from a cassette mounting portion (8) of a tape printer (1) and the tape printer is provided with a pair of guide shafts (100, 120), the pair of guide shafts may be inserted into the pair of cavities. In this case, the tilting of the tape cassette out of its proper position can be inhibited by the user's mounting the tape cassette into and removing the tape cassette from the cassette mounting portion along the pair of guide shafts that are inserted into the pair of cavities.

When the tape cassette is mounted in the cassette mounting portion of the tape printer, which is provided with a plurality of detection switches (310), the bottom face indicator portion can be accurately positioned opposite the plurality of detection switches. The plurality of detection switches are switches that can advance and retract in a specified direction. The bottom face indicator portion that is positioned opposite the plurality of detection switches may selectively depress the plurality of detection switches in accordance with the combination of the switch hole(s) and the surface portion(s) in the plurality of indicator portions. In other words, each of the plurality of detection switches enters a state of being depressed or not depressed, in accordance with the type of the tape. The tape cassette thus makes it possible for the tape printer to accurately detect the type of the tape. It is also possible to inhibit faulty movement of the tape, faulty printing by a printing head, and the like that are caused by the tilting of the tape cassette within the cassette mounting portion.

Furthermore, the bottom face indicator portion is provided in the bottom wall of the cassette case in correspondence with upward projecting of the plurality of detection switches. The tape cassette may be guided in the mounting and removal direction along the pair of guide shafts that are inserted into the pair of cavities. The mounting and removal direction of the tape cassette is parallel to the advancing and retracting direction of the plurality of detection switches. In a case where the tape cassette has been mounted in the cassette mounting portion, the plurality of detection switches that are positioned opposite the surface portions may be depressed in a direction that is directly opposite the direction in which the detection switches project.

Therefore, a load in a direction that is different from the advancing and retracting direction can be inhibited from being applied to the detection switch that is depressed by the surface portion. This in turn inhibits bending, damage, and the like in the detection switch. Furthermore, because the detection switch can be depressed accurately, the precision of the detecting of the type of the tape can be improved.

(7) In the known tape cassette, pin holes for positioning are provided in a bottom face of the cassette case. When the tape cassette is mounted in the cassette mounting portion, positioning pins that are provided in the cassette mounting portion may be inserted into the pin holes in the tape cassette. The positioning in the up-down direction of the tape cassette that has been mounted in the cassette mounting portion can be thus performed.

However, the pin holes in the tape cassette are provided in two locations that are in the vicinity of the outer edge of the bottom face of the cassette case. The tape printer has positioning pins in two locations that correspond to the pin holes. In other words, the locations for positioning in the tape cassette are provided in positions that are separated from the printing head.

Therefore, in a case where the pin holes and the positioning pins have not been manufactured with accurate dimensions, a misalignment may occur between the printing center position in the up-down direction of the printing head and the center position in the width direction of the tape when the positioning of the tape cassette is performed by inserting the positioning pins into the pin holes. This in turn may cause the printing position of the printing head to be misaligned in relation to the tape, and good printing results may not be achieved. As countermeasures in the manufacturing process for the tape cassette, the dimensions of the pin holes and the positioning pins are controlled with a high degree of precision. Accordingly, some of the technical features that have been described above may be provided, as in a tape cassette according to the embodiment that is hereinafter described.

A tape cassette (30) according to the present embodiment is a tape cassette that can be mounted in and removed from a tape printer (1) that is provided with a head holder (74) that has a printing head (10), and the tape cassette includes a cassette case (31) that has a top face (301), a bottom face (302), a front surface (35), and a pair of side faces (303, 304) and that includes a top case (311) and a bottom case (312), the top case having a top wall (305) and the bottom case (312) having a bottom wall (306) and a bottom outside wall (304) that is an outside wall extending vertically upward from an edge of the bottom wall, a tape roll (55, 57, 58, 59) that is rotatably contained within the cassette case and around which a tape is wound, a head insertion portion (39) that is a space extending through the cassette case in an up-down direction and into which the head holder is to be inserted in a case where the tape cassette is mounted in the tape printer, an arm portion (34) that has a first wall portion (35B) and a second wall portion (33) and that is adapted to guide the tape along a feed path between the first wall portion and the second wall portion to a exit (341), the first wall portion (35B) being a portion of the bottom outside wall and the second wall portion (33) being provided between the first wall portion and the head insertion portion and being a wall extending vertically upward from the bottom wall, a width direction restraining portion (381B, 383) that provided in the second wall portion and that is adapted to restrain a movement of the tape in the width direction, a print surface side restraining portion (389) that is provided in the second wall portion and that is adapted to restrain a movement of the tape in the direction of a print surface side, to bend the feed path toward the head insertion portion, and to guide the tape to be discharged to the outside of the arm portion, a bottom side joining portion (330) that is provided in an upper portion of the width direction restraining portion, a top side joining portion (331) that is provided in the top case and is joined with the bottom side joining portion in a case where the top case and the bottom case are joined, and a support receiving portion (391, 392) that is a recessed portion that is recessed upward from the bottom face, that is connected to an end portion that is positioned in the head insertion portion on an upstream side in a feed direction of the tape, and that faces the head insertion portion in a direction that is parallel to the front surface.

The tape cassette according to the present embodiment is provided with the support receiving portion, which is a recessed portion that is recessed upward from the bottom face and which is connected an end portion of the head insertion portion. In a case where the tape cassette has been mounted in a cassette mounting portion (8) of the tape printer and the tape printer is provided with a support portion (741, 742), the support receiving portion may be supported from below by the support portion. In this case, the support receiving portion can be supported by the support portion in a position that is in the vicinity of the printing head that performs the printing on the tape. Therefore, when the tape cassette is mounted in the tape printer, it is possible to accurately set the position of the tape cassette in the up-down direction. This in turn makes it possible to precisely match the printing center position in the up-down direction of the printing head with the center position in the width direction of the tape, so the printing quality can be improved. It is also possible to reduce the burden on the operator of controlling the dimensional precision.

Further, the bottom case is provided with a guide portion that is adapted to guide the tape that has been pulled off of the tape roll between the first wall portion and the second wall portion. The second wall portion is provided with the width direction restraining portion that is adapted to restrain the movement of the tape in the width direction and the print surface side restraining portion that is adapted to restrain the movement of the tape in the direction of the print surface side of the tape. That is, the members that may restrain the movements of the tape in the width direction and in the direction of the print surface side are provided in the arm portion of the bottom case. Thus the dimensional precision of the width direction restraining portion and the print surface side restraining portion can be guaranteed, regardless of the press fitting state of the top case and the bottom case, and the movements of the tape in the width direction and in the direction of the print surface side can be appropriately restrained. This in turn makes it possible to precisely match the printing center position in the up-down direction of the printing head with the center position in the width direction of the tape, so the printing quality can be improved even more.

The bottom side joining portion is provided in the upper portion of the width direction restraining portion and is joined with the top side joining portion that is provided in the top case. The top case and the bottom case can be thus fixed in place in positions where the movements of the tape in the width direction and in the direction of the print surface side are restrained, and the positions of the width direction restraining portion and the print surface side restraining portion can also be fixed. It is therefore possible to more reliably inhibit the movements, in the width direction and in the direction of the print surface side, of the tape that is fed within the arm portion.

The support receiving portion, the width direction restraining portion, and the print surface side restraining portion are all provided in the bottom case. Thus the positional relationships among the support receiving portion, the width direction restraining portion, and the print surface side restraining portion can be constant, regardless of the press fitting state of the top case and the bottom case. Accordingly, in conjunction with the support receiving portion being supported at the proper height position by the support portion, the width direction restraining portion and the print surface side restraining portion can also be held at their proper height positions. Therefore, the height position of the tape that is fed within the arm portion can more accurately match the printing center position in the up-down direction of the printing head, so the printing quality can be improved even more.

(8) In the tape cassette according to the embodiment in any one of (1), (5), and (6) above, the at least one tape may include a tape (55, 57, 58) that is wound such that a hole is formed in the center, and may be positioned within one of two areas into which the cassette case is divided along a line that connects the pair of cavities. The tape cassette may also be provided with a third cavity (65) that extends from the bottom wall and is positioned to face the hole in the tape.

In a case where the tape cassette according to the present embodiment is mounted in or removed from the cassette mounting portion and the tape printer is provided with a third guide shaft (110), the third guide shaft may be inserted into the third cavity. In this case, the user can mount the tape cassette in and remove the tape cassette from the cassette mounting portion along the pair of guide shafts that are inserted into the pair of cavities and along the third guide shaft that is inserted into the third cavity. This in turn makes it possible to reliably inhibit the tilting of the tape cassette out of its proper orientation.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A tape cassette comprising:

a cassette case having a first end portion and a second end portion separated from the first end portion in a first direction, the cassette case having a third end portion and a fourth end portion separated from the third end portion in a second direction, and the cassette case having a guide hole, the guide hole positioned closer to the second end portion of the cassette case in the first direction than to the first end portion, the guide hole positioned closer to the fourth end portion of the cassette case than to the third end portion of the cassette case in the second direction;

a first spool positioned in the cassette case, the first spool positioned closer to the fourth end portion of the cassette case than to the third end portion in the second direction, the first spool positioned closer to the second end portion than to the first end portion in the first direction;

a ribbon spool positioned in the cassette case, the ribbon spool positioned closer to the fourth end portion than to the third end portion in the second direction; and a tape drive roller rotatable about an axis extending in a third direction, the tape drive roller configured to allow tape to be discharged to the outside of the tape cassette, the tape drive roller positioned closer to the first end portion of the cassette case in the first direction than to the second end portion, the tape drive roller positioned closer to the third end portion of the cassette case than to the fourth end portion of the cassette case in the second direction, wherein the cassette case includes an arm positioned at the first end portion, the arm extending in the second direction, the arm having a first outer surface facing a portion of the cassette case in the first direction and a second outer surface facing away from the cassette case in the first direction, and the arm has an exit configured to allow ink ribbon to be discharged toward the tape drive roller from inside of the cassette case, wherein the arm includes a first indicator and a second indicator arranged at the second outer surface in a predetermined pattern, a position of the first indicator is different from a position of the second indicator in the second direction and the third direction, wherein the guide hole is farther from the tape drive roller than the first spool, wherein a portion of the first spool intersects a line connecting the tape drive roller and the guide hole, and wherein the arm and the ribbon spool are positioned at one side of the line.

2. The tape cassette according to claim 1, wherein guide hole allows a portion of an associated printer to be inserted.

3. The tape cassette according to claim 1, wherein each of the first indicator and the second indicator is one of a hole extending through the second outer surface and a predetermined area of the second outer surface.

4. The tape cassette according to claim 3, wherein the predetermined area is continuous with the second outer surface.

5. The tape cassette according to claim 1, wherein the first indicator is a hole extending through the second outer surface, and wherein the second indicator is a predetermined area of the second outer surface.

6. The tape cassette according to claim 5, wherein the predetermined area is continuous with the second outer surface.

7. The tape cassette according to claim 6, wherein the second direction is orthogonal to the first direction, and wherein the third direction is orthogonal to the first direction and the second direction.

8. The tape cassette according to claim 7, further comprising:

a tape wound around the first spool.

9. The tape cassette according to claim 8, wherein the first indicator indicates a width of the tape.

10. The tape cassette according to claim 6, further comprising:

a tape wound around the first spool.

11. The tape cassette according to claim 10, wherein the first indicator indicates a width of the tape.

12. The tape cassette according to claim 5, wherein the second direction is orthogonal to the first direction, and wherein the third direction is orthogonal to the first direction and the second direction.

13. The tape cassette according to claim 12, further comprising:

a tape wound around the first spool.

14. The tape cassette according to claim 13, wherein the first indicator indicates a width of the tape.

15. The tape cassette according to claim 5, further comprising:

a tape wound around the first spool.

16. The tape cassette according to claim 15, wherein the first indicator indicates a width of the tape.

17. The tape cassette according to claim 1, wherein the second direction is orthogonal to the first direction, and wherein the third direction is orthogonal to the first direction and the second direction.

18. The tape cassette according to claim 17, further comprising:

a tape wound around the first spool.

19. The tape cassette according to claim 18, wherein the first indicator indicates a width of the tape.

20. The tape cassette according to claim 1, further comprising:

a tape wound around the first spool.

21. The tape cassette according to claim 20, wherein the first indicator indicates a width of the tape.

22. The tape cassette according to claim 1, wherein the first indicator is configured to press a first switch of an associated printer, and the second indicator is configured to not press a second switch of an associated printer.

23. The tape cassette according to claim 1, further comprising:

a second spool positioned in the cassette case, the second spool is positioned closer to the third end portion than to the fourth end portion in the second direction, the second spool is positioned closer to the second end portion than to the first end portion in the first direction.

24. The tape cassette according to claim 1, wherein the first indicator is a pressing portion, and the second indicator is a non-pressing portion.

25. The tape cassette according to claim 1, further comprising:

a latching hole positioned at the second outer surface, a portion of the latching hole being farther from the third end portion than the first indicator and the second indicator in the second direction, and wherein the arm has a fifth end portion and a sixth end portion separated from the fifth end portion in the third direction, wherein the latching hole is positioned closer to the fifth end portion than the first indicator and the second indicator to the fifth end portion in the third direction, and wherein the latching hole is spaced away from the first indicator and the second indicator in the second direction and the third direction.

* * * * *